(12) United States Patent
Miller et al.

(10) Patent No.: US 12,381,043 B2
(45) Date of Patent: Aug. 5, 2025

(54) SERVICEABLE ELECTROSTATIC STORAGE DEVICE

(71) Applicant: Atlas Power Technologies Inc., Abbotsford (CA)

(72) Inventors: Mitchell Miller, Mission (CA); Ali Khosrozadeh, Abbotsford (CA); Jian Liu, Kelowna (CA)

(73) Assignee: Atlas Power Technologies Inc., Abbotsford (CA)

( * ) Notice: Subject to any disclaimer, the term of this patent is extended or adjusted under 35 U.S.C. 154(b) by 27 days.

(21) Appl. No.: 18/439,211

(22) Filed: Feb. 12, 2024

(65) Prior Publication Data
US 2024/0242895 A1    Jul. 18, 2024

Related U.S. Application Data

(63) Continuation of application No. 18/012,435, filed as application No. PCT/CA2020/051742 on Dec. 17, 2020.

(30) Foreign Application Priority Data

Jun. 30, 2020   (CA) ................................ CA 3085190

(51) Int. Cl.
*H01G 11/26* (2013.01)
*H01G 11/62* (2013.01)
(Continued)

(52) U.S. Cl.
CPC ............ *H01G 11/26* (2013.01); *H01G 11/62* (2013.01); *H01G 11/78* (2013.01); *H01G 11/86* (2013.01)

(58) Field of Classification Search
None
See application file for complete search history.

(56) References Cited

U.S. PATENT DOCUMENTS 2,798,988 A * 7/1957 Sparkes ............... H01G 9/145
                                                              428/673
4,254,775 A * 3/1981 Langer ............... A61N 1/3956
                                                              607/36
(Continued)

FOREIGN PATENT DOCUMENTS

EP          1472756       11/2004
JP         1995220985      8/1995
(Continued)

OTHER PUBLICATIONS

Dou et al., "A sodium perchlorate-based hybrid electrolyte with high salt-to-water molar ratio for safe 2.5 V carbon-based supercapacitor", Energy Storage Materials 23 (2019) 603-609 (Year: 2019).*

(Continued)

*Primary Examiner* — Eric W Thomas
(74) *Attorney, Agent, or Firm* — Damien G. Loveland; Valuetech Patent Agency Inc.

(57) ABSTRACT

A serviceable energy storage device, such as a capacitor, ultracapacitor or supercapacitor, includes electrodes made from activated carbon produced from a low-cost source, such as thermal coal or another low-cost feedstock. The serviceable energy storage device includes replaceable electrolyte comprising a low-cost co-solvent and salt solution. The activated carbon is manufactured with a pore sizing selected in accordance with the electrolyte such that an electrode material pore configuration matches an ion coupling size of the electrolyte. An improved manufacturing process for the energy storage device is effective at a regular atmospheric environment, allowing the electrolyte to be subsequently replaced at the regular atmospheric environment.

46 Claims, 21 Drawing Sheets

(51) Int. Cl.
  *H01G 11/78* (2013.01)
  *H01G 11/86* (2013.01)

(56) References Cited

U.S. PATENT DOCUMENTS

| | | | | |
|---|---|---|---|---|
| 5,142,451 | A * | 8/1992 | Kurabayashi | H01G 11/86 361/502 |
| 5,227,960 | A * | 7/1993 | Kunishi | H01G 11/04 361/502 |
| 5,400,211 | A * | 3/1995 | Evans | H01M 50/133 361/275.1 |
| 6,072,693 | A * | 6/2000 | Tsushima | H01G 11/32 361/502 |
| 6,097,587 | A * | 8/2000 | Inagawa | H01G 11/80 361/512 |
| 6,212,061 | B1 * | 4/2001 | Irwin | H01G 11/80 361/517 |
| 6,233,135 | B1 * | 5/2001 | Farahmandi | H01G 11/78 361/525 |
| 6,409,776 | B1 * | 6/2002 | Yan | A61N 1/3968 29/25.03 |
| 2003/0035262 | A1 * | 2/2003 | Ikeda | H01G 11/12 361/502 |
| 2004/0012913 | A1 * | 1/2004 | Andelman | H01G 11/24 361/503 |
| 2007/0159769 | A1 * | 7/2007 | Sakamoto | H01G 11/76 361/502 |
| 2008/0013255 | A1 * | 1/2008 | Schneuwly | H01G 11/24 361/502 |
| 2008/0165471 | A1 | 7/2008 | Kojima et al. | |
| 2015/0030526 | A1 * | 1/2015 | Gadkaree | B29C 43/32 423/460 |
| 2015/0291432 | A1 * | 10/2015 | Béguin | C01B 32/324 252/511 |
| 2018/0144878 | A1 * | 5/2018 | Ritter | H01G 11/28 |

FOREIGN PATENT DOCUMENTS

| | | |
|---|---|---|
| JP | 2001089119 | 4/2001 |
| JP | 2016519842 | 7/2016 |
| JP | 2017520125 | 7/2017 |
| JP | 2018092978 | 6/2018 |
| KR | 20040071776 | 8/2004 |
| KR | 20150066925 | 6/2015 |
| KR | 20150122320 | 11/2015 |
| KR | 101948019 | 2/2019 |
| WO | 99/66985 | 12/1999 |
| WO | 03061056 | 11/2004 |
| WO | 2015163279 | 4/2017 |

OTHER PUBLICATIONS

Liao et al., "Preparation of Activated Carbon for Electric Double Layer Capacitors", 2012, China Steel Technical Report, No. 25, pp. 36-41 (Year: 2012).*

* cited by examiner

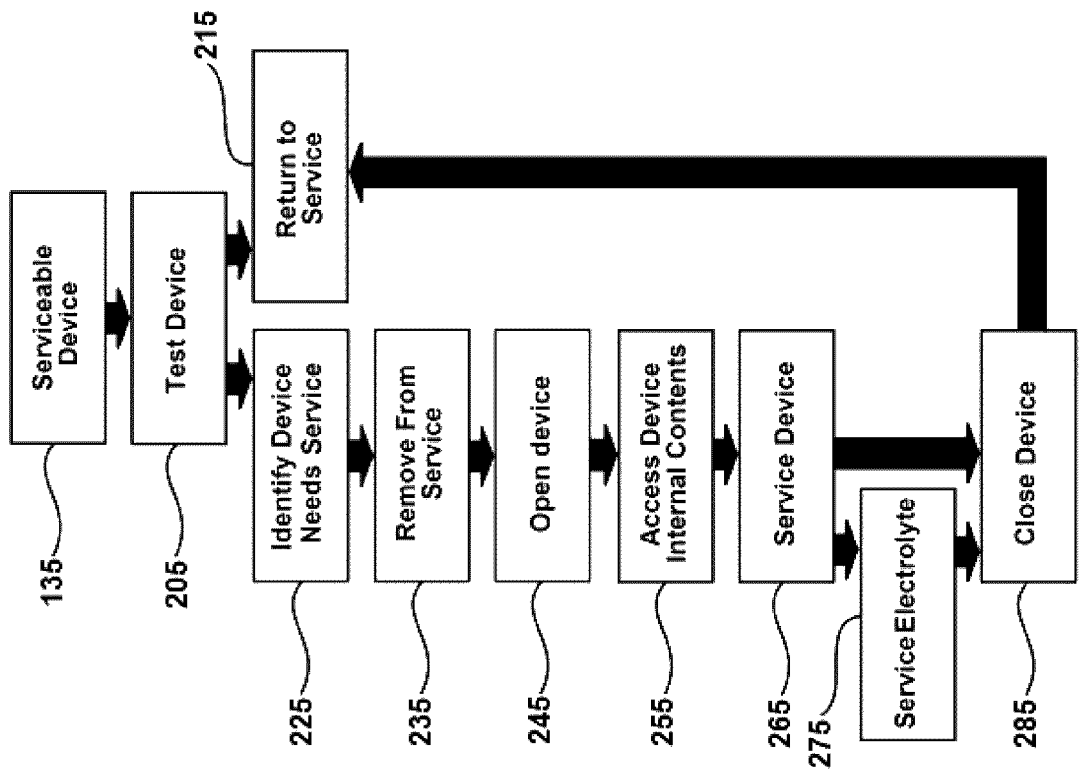

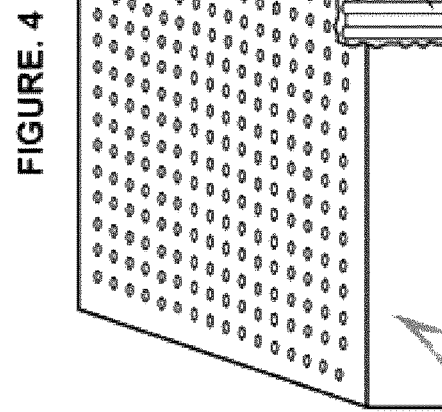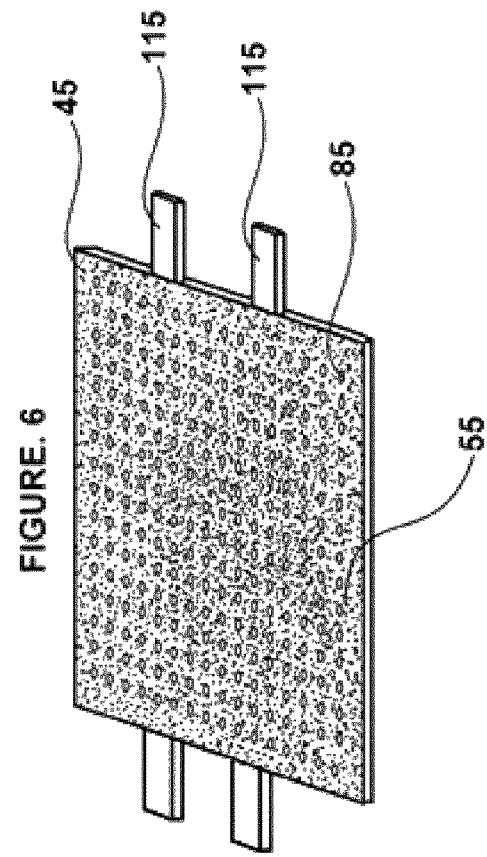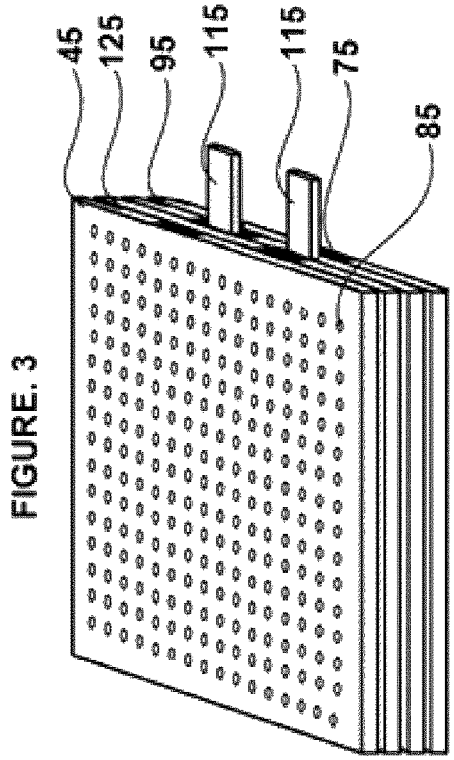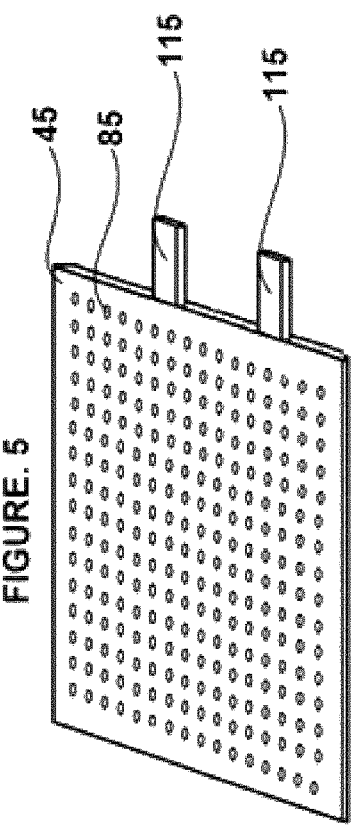

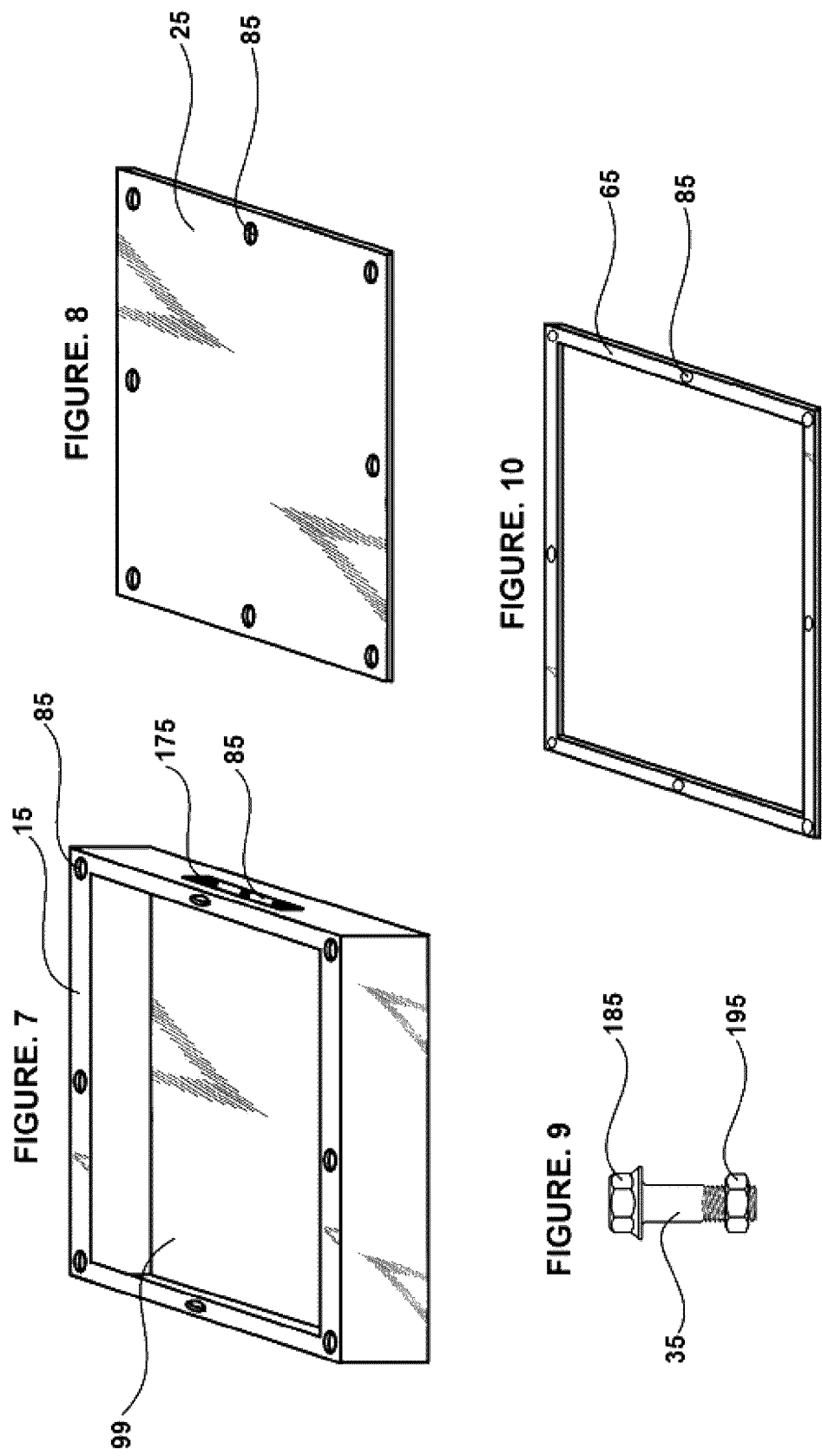

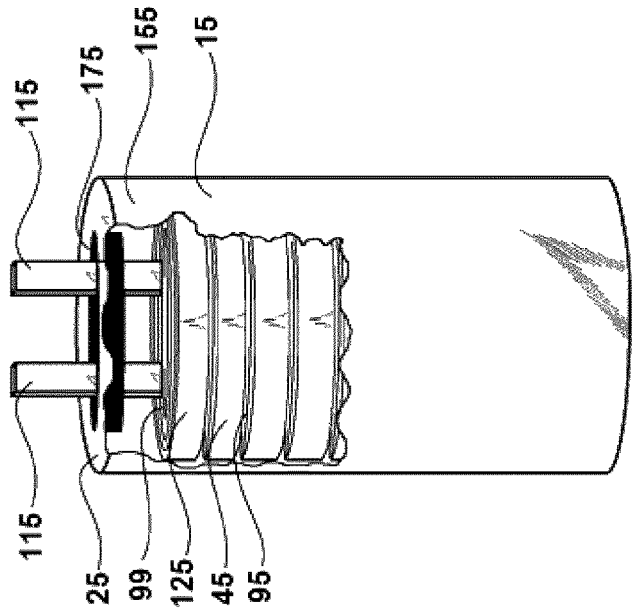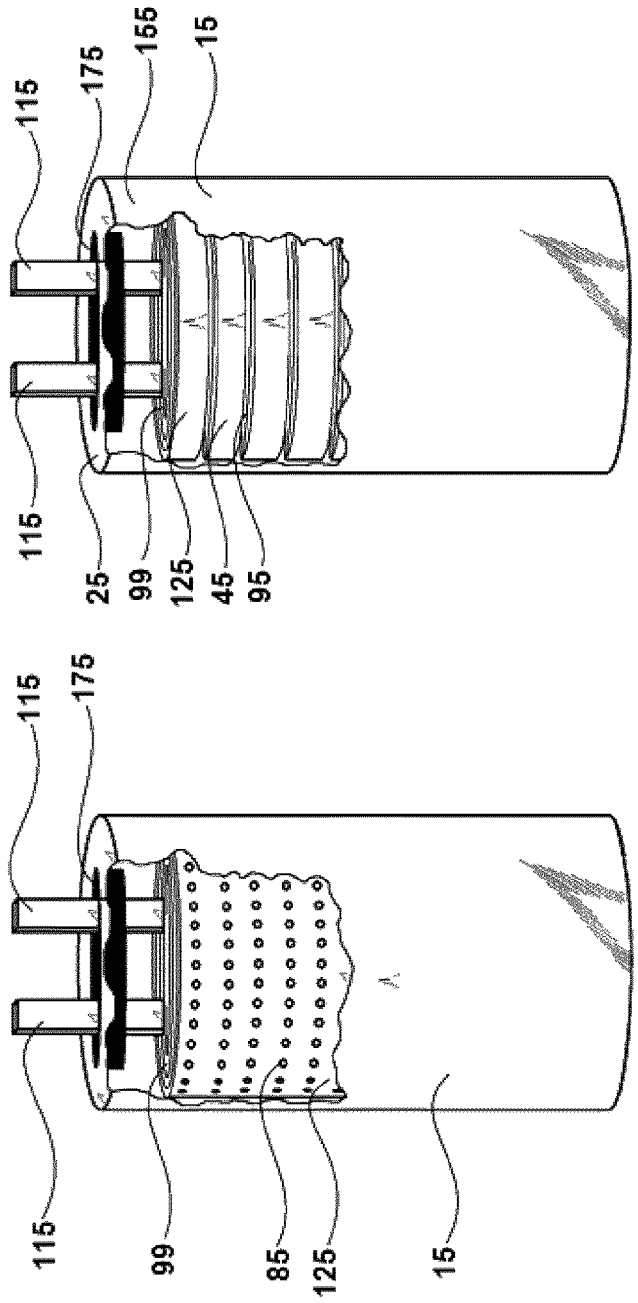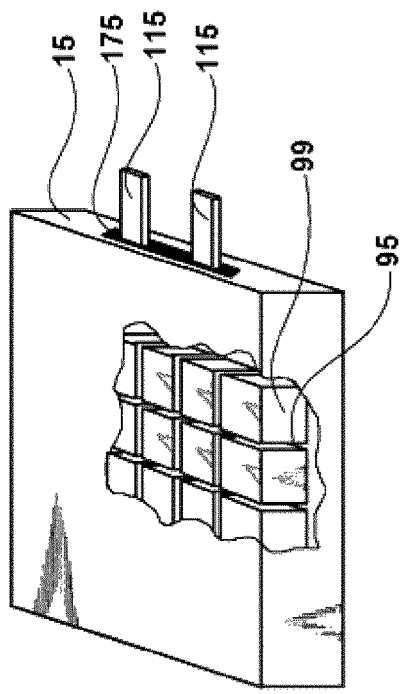

SERVICEABLE ELECTROSTATIC STORAGE DEVICE

CROSS-REFERENCE TO RELATED APPLICATION

This application claims priority of Canadian patent application No. 3085109, which was filed in Canada on Jun. 30, 2020.

TECHNICAL FIELD

The present disclosure is generally related to energy storage devices and, more particularly, is related to systems and methods for the construction, material composition, serviceability, and servicing of serviceable electrostatic storage devices such as capacitors including supercapacitors. The present disclosure also relates to processes, systems, and methods for the production of activated carbon, for tailoring activated carbon characteristics and compositions for various uses, including for supercapacitors. Additionally, an improved manufacturing process for energy storage technologies, and in particular supercapacitors, wherein the manufacturing process may occur in normal atmospheric environments, including during the electrolyte administering step.

BACKGROUND

The concept of using energy storage devices, their construction and different elemental compositions are well known and continue to attract large capital investments due to their societal benefit and need. Batteries have a relatively short lifespan, due to the chemical reaction that is used to store energy, this is due to the elemental degradation that occurs during charging as well as discharging. Some batteries have the ability to be recharged when discharged, while others offer only a single use lifecycle. Capacitors store energy in the form of an electrostatic field, as opposed to an electrochemical reaction. This provides capacitors with the ability to charge and discharge more rapidly than batteries and offers a much longer life expectancy than current battery technologies in the order of multiple magnitudes.

The demand for energy storage has grown considerably in last decade due to solar power generation being established as a low-cost form of power generation, and the exponential growth of installed projects. With the growth in solar generation a critical need for energy storage has been raised, in order to continue the transition to a renewable electrical grid, low-cost abundant materials that offer good energy density are desirable for energy storage and are critical for reaching renewable generation goals. Additionally, longer lifespans for energy storage devices are always desirable, allowing for more commercially competitive solutions.

Supercapacitors are electrochemical energy storage devices that allow electricity to be stored for a later use and thus are among clean energy technologies that play an important role in overcoming global pollution and utilizing sustainable and renewable energy resources. Supercapacitors are being considered as alternatives to batteries for grid scale applications owing to their fast charge-discharge rate, high power density, low maintenance, and long cycle life. Although supercapacitor market has found its way to consumer electronics and transportation technologies, low energy density and the high cost of supercapacitors are yet to be addressed to keep up with the fast-growing market of energy storage for grid scale applications.

A supercapacitor device is commonly composed of two electrodes separated by an ion permeable separator, an electrolyte ionically connecting both electrodes, and two current collectors directly attached to electrodes. Designing a supercapacitor requires the selection of proper electrode materials, electrolytes, separator, and sealants. Electrode materials play the substantial role in the performance of supercapacitors and thus designing proper electrodes are the key to manufacture a device with high energy density and low cost. Activated carbons derived from various sources are widely used as active materials in the electrodes of commercial supercapacitors owing to their high double-layer capacitance, low cost, high surface area, chemical stability and good electrical conductivity.

Traditionally the standard electrostatic and electrochemical energy storage technologies, predominantly batteries and capacitors, relied on mainly two types of electrolytes (aqueous, and organic). The benefits offered by choosing an appropriate electrolyte allowed companies to determine the most desirable electrolyte based on their typical application.

Though the safety and ease of use offered by choosing aqueous electrolytes was attractive, many manufacturers determined instead to opt to use organic electrolytes, primarily due to their high voltage stability, which can greatly improve the energy density (lowering unit size). The problems presented with utilizing organic electrolytes generally root from, but are not limited to, a critical and challenging characteristic of its use and handling. It is highly volatile, and causes a thermochemical reaction when mixed with moisture, including if exposed to micro-droplets contained within our atmosphere. This makes using organic electrolytes, including during manufacturing, challenging and costly.

In addition, manufacturers have chosen to purchase off the shelf products for their designs (activated carbon, electrolyte, etc.), with the industries current development focus being to increase the surface area of activated carbons to increase energy density.

As such the industry and researchers have not developed, or contemplated, specifically tailoring activated carbon pore sizing and distribution, through specific mineral processing, carbon source selection, and manufacturing process control, to create an activated carbon with a specifically design pore hierarchical structure for a particular electrolyte. Also, in order to allow a heightened wettability, intercalation, saturation, and penetration of their desired electrolyte into a pre-designed activated carbon, and ion permeable separator(s), with pre-selected pore sizing and distribution hierarchical structure, and in order for activated carbon pores to synergistically couple to an electrolyte based on ion(s), solvated ion(s), and solvation shell sizes. Then developing a complete end-to-end manufacturing processes to accomplish the aforementioned material processing controls and resultant material features, accomplishable in a safe and low-cost manufacturing process.

SUMMARY

The following disclosure presents inventive embodiments that when utilized can greatly improve the operational life expectancy of electrostatic storage devices, such as capacitors. Additionally, embodiments disclosed herein can be used to create a supercapacitor that has excellent performance, while at the same time uses very inexpensive, widely available, materials for construction such as activated carbon produced from coal, petroleum coke, bituminous coke or biomass, and low-cost co-solvent in salt electrolyte(s).

Currently, commercially available supercapacitors from millifarads to thousands of farads are designed to operate, generally throughout electrical devices, for many tasks including for charging and discharging. They have many applications from sub-circuit level integration, up to and including large installations for grid-scale energy storage, and load shifting.

The design and operation methodology of commercially available supercapacitors systems has been to create a product that offers the most energy dense design attainable, in order to compete with batteries with respect to size. Supercapacitors are self-contained sealed units, that have a relatively long-life expectancy, which are generally discarded and replaced with a new capacitor when their life expectancy is reached or they subsequently fail, which has been the same for battery systems. This method of operation is generally due to the life cycle of these devices, where many supercapacitors have lifespans reaching 20 years or greater, with a common life expectancy referenced being between 1-2 million completed charging/discharging cycles. This in conjunction that the majority of supercapacitors commercially used are for electronics ensures the storage capacity is relatively small, and the cost to make servicing these units commercially viable has not existed or proved economic.

Generally, supercapacitors are relatively inexpensive, and the cost to make these small electronic components serviceable does not present any commercial benefits other than environmental impact, in fact it is currently less expensive to replace the supercapacitor rather than service them. With the transition to energy generation from clean renewable sources being fully underway, and the need for energy storage systems to compensate for the intermittent nature of most forms of renewable generation, supercapacitors are being studied and implemented as a commercially viable solution to our energy storage needs. As we continue to build larger and larger units for energy storage there exists a continuous need to have supercapacitors constructed from cheap abundant materials, and to extend their lifespan. This would allow our society the long-term benefits of energy storage devices with greatly extended lifespans and low cost, to meet our needs while transitioning to a clean energy future.

Reflecting on this, creating an energy storage solution that is inexpensive and can remain in operation for extended periods of time is critical to the transition into a renewable electrical grid, and paramount for the long-term success, and health, of our planet and humanity.

Existing methods of construction and operation of electrostatic storage devices such as supercapacitors are designed as sealed or non-serviceable units, operated throughout their desired and expected life expectancies and then discarded. This presents a system of manufacture, then use, discard, then manufacture again, which is the same challenge posed with commercial battery systems. Additionally, supercapacitors have a wide array of applications and many of these applications demand a premium for space, due to this manufacturers primarily have focused on increasing energy density using expensive materials such as activated carbon derived from coconut shell, and organic or ionic liquid electrolytes which are generally expensive with respect to actual material cost, and costly requirements for facilities during the manufacturing process.

Talking more specifically about grid scale applications, while we transition to a clean energy future the amount of energy storage we need is quite astonishing. We need to accommodate around 40% of our current daytime real-time energy use, in order to load shift renewables over the nighttime hours, which would allow us to fully transition to a renewable electrical grid. With current battery and supercapacitor systems being used and installed commercially, we would be required to construct an immense amount of manufacturing capability, just to catch up to our current demand, then account for consumption growth. This is due to the fact we are constantly having to throw out, replace, the energy storage assets we produce, with batteries generally limited to 3,000-8,000 complete cycles or generally 10 years before reaching their end of life. Supercapacitors are more advantageous with generally 1-2 million complete cycles or a 20-year lifespan. Though supercapacitors have a longer lifespan they are still considered a disposable solution made from high cost precursor ingredients as stated above. This means that the manufacturing capacity required for supercapacitors to allow the transition to a clean energy future would be half that of batteries, which do to the large amount needed would still be an immense undertaking.

The present disclosure offers a system and method to allow supercapacitors (electrostatic storage devices) to be a serviceable product made from low cost abundant materials, extending life expectancies and reducing their cost. This is greatly beneficial in that it reduces the levelized operating cost for this solution, as well as provides a clear path for our society to meet the goal of reaching a fully renewable electrical grid, with substantially less manufacturing than what would otherwise be required to reach this milestone for the human civilization.

One way to implement the system and method is to design electrostatic storage devices (capacitors) to be serviceable. Further embodiments are constructed from low-cost widely available materials such as waste products including a few non-limiting examples of biomass, petroleum coke, bituminous coke, low cost mined minerals such as coal or thermal coal, and use low cost electrolyte materials such as water, salts, solvents, cosolvents, which may be also be in combination.

Serviceable is defined as: to service a device, a device able to be serviced, a device able to be modified, a device able to be openable and closable, a device able to be repurposed, a device able to be administered with a solution for instance an electrolyte, including to be serviced after the point of completed original manufacture of a device. Meaning that a supercapacitor itself can be serviced to extend its life and improve its operation. This can be accomplished by gaining access to the internal contents of the supercapacitor's container, accessing the components needing servicing, servicing the accessed components, then reclosing the container, and returning the device to a state ready for operation.

Where one component of the novelty, and differentiation, of the disclosed system and method resides is for example within the ability to make a supercapacitor serviceable, therefore increasing its life expectancy and potential to be a better product. For instance, re-administering electrolyte and removing old, non-optimal, or spent electrolyte, or by adding an improved electrolyte making it more energy dense, and additionally offering the ability to extend the operational lifespan of the device. For instance, servicing failing or failed components of the device such as the electrolyte, or conductors.

Supercapacitors in some embodiments of the invention include an activated carbon or other material providing a large surface area, conductive agent, binder, current collectors, separator(s), electrolyte, and a number of different elemental compositions, and manufacturing methods. In general the activated carbon product, with a conductive additive, and binder, are bound to a conductive current collector element such as aluminum, copper, stainless steel, or titanium. This combination is then administered with an electrolyte, with a separator intermediary that is used to keep the anode and cathode from making direct contact, and then encased in a sealed container, with generally a rubber or plastic lead-case separator. Depending on the type of electrolyte used will affect a number of a capacitor's properties including, voltage tolerance, stability, volatility, manufacturing process, lifespan, thermal range, energy density.

The electrical storage property of supercapacitors is in the form of an electrostatic field. This is due to charges travelling through the electrolyte and then stored on the surface, and within the porous structure of the activated carbon element. When a supercapacitor is undergoing the charging process charges are being collected in the form of an electrostatic field. This field causes charges on the opposing conductor to be released, completing the circuit and allowing the flow of current. In these devices the conductive element is generally the same for the anode and cathode, as well as the casing, to ensure that a galvanic cell is not created, in other words no electrochemical reaction between metals will generally occur during charging or discharging.

The storage profile and characteristics of batteries are different than supercapacitors, in that within batteries a galvanic cell is created in order to generate an electric current, and charges are stored and used by means of an electrochemical reaction that takes place. This electrochemical process allows charges to be concentrated in greater densities than currently available supercapacitors, which provides batteries the ability to offer relatively high energy densities. The negative side effects of electrochemical reactions are found in the process of discharging, or recharging in the case of rechargeable batteries, which degrades the metals and other elements that batteries are composed from.

Due to the nature of a supercapacitor's energy storage manifestation, in the form of an electrostatic field, causes a limited chemical reaction, which occurs within a supercapacitor during charging and discharging. This causes supercapacitors to not undergo the same elemental decomposition as batteries during their lifespan, caused by charging and discharging.

This leads to the question of why then do supercapacitors fail? Why do supercapacitors have a life expectancy at all, if they are not subject to the same types reactions that seriously degrade the materials of batteries during the charging and discharging process?

The answers to these questions are complex, and many reasons for a supercapacitor's life expectancy factor into their ability to operate over extended periods of time. Some factors affecting their lifespan include: the type of electrolyte and its corrosion effects on the elements of the supercapacitor such as the current collectors, generally the casing and foils. The operation of the device, the temperature and environment the supercapacitor is located, and the electrolytes properties, including its voltage range and temperature stability, also affect the lifespan of a supercapacitor.

The disclosed system and method are an improvement on traditional electrostatic storage devices, by identifying reasons for the failures, and providing solutions to these failures in a practically implementable, commercially applicable way. Additionally, the disclosure also identifies specific low cost widely available ingredients for the construction of supercapacitors, lowering their cost and allowing access to existing infrastructure for feedstock minerals. Specifically, the invention uses a combination of activated carbon derived from a low-cost material such as coal, thermal coal, petroleum coke, bituminous coke, lignin, biomass, or waste such as garbage or plastics. Electrolyte from a selection of aqueous electrolyte, cosolvent in salt electrolyte, salt, water, and/or solvent. Current collectors from a selection of stainless steel, titanium, copper, aluminum, and an ion permeable separator such as paper, glass fiber, plastic fiber. One exemplary embodiment is constructed utilizing activated carbon derived from low-cost thermal coal, an electrolyte which is a cosolvent in salt, a current collector from stainless steel, and an ion permeable separator of paper, cellulose, or plastic fiber, weave or mesh, a binder of PVDF or PTFE, and a conductive additive of carbon black, acetylene black or Super P™.

If order to improve the operation and life expectancy of supercapacitors I have identified reasons for their failure, and one reason in particular is the properties and operational ability of the device's electrolyte over the life of the device.

Electrolytes are subject to the most strenuous physical work of an electrostatic storage device and are the most susceptible to environmental effects. Carbon, specifically activated carbon, is a very stable element that can theoretically survive for indefinite periods of time. The conductor used for the electrodes can again last for indefinite/extended periods of time, as long as the element(s) it comes into contact with does not corrode, or cause a decay of, the conductor. Which in the case of a marine grade stainless steel, for instance 316 stainless steel, has saltwater life expectancies for fifty to one hundred years.

The electrolyte on the other hand will degrade over time, it acts as the ion carrier and transport medium for electric charges within a device. This degradation is exaggerated further depending on the actual operation, voltage charging range, of the device and the environment the device is located in, and because of temperature variance. As the electrolyte degrades the performance of the supercapacitor or electrostatic storage device reduces and may eventually lead to complete failure of the device, which can also occur in the event of applying a voltage over the stability threshold of the electrolyte.

This degradation of the electrolyte and failure of the device can be reduced or eliminated by designing the device to be serviceable, allowing servicing and/or re-administering of the electrolyte, which can be accomplished through a number of improvements to the device. One improvement of the device in the disclosed system and method, is making the actual container that encases the supercapacitor, and/or electrostatic storage device, resealable, making the contents accessible from time to time. This can be accomplished several ways or may conversely be a sealed container that is opened, potentially damaging the container that may then be discarded, and then servicing the contents of the supercapacitor, essentially salvaging the contents of the supercapacitor. Though a resealable container is the preferred approach, allowing opening, servicing, and then resealing of the device.

The next improvement of the disclosed device is by providing an efficient method of re-administering an electrolyte to the internal contents of the supercapacitor. This presents challenges, in that when a supercapacitor has been assembled it is difficult to ensure that the electrolyte reaches the internal or center region of the supercapacitor, without causing damage to the supercapacitor or its layers while administering the electrolyte. Which if tampered with may cause flaking or separation from the current collectors.

This process of servicing the supercapacitor and/or administering electrolyte can be accomplished several ways. One method is by injecting the electrolyte into the supercapacitor, ensuring that saturation of the electrolyte throughout the conductive portions of the device that is desired. This process of injecting and saturating the device can be challenging and time consuming especially for in the case of larger or smaller supercapacitors. Where in the case of extremely large supercapacitors it may not be possible to physically inject the electrolyte to the very centre of the device without adequate separations or perforations.

This challenge is caused by a few factors, one of them being that for cylindrical supercapacitors, which are generally rolled very tight to reduce size and improve performance, or for stacked layer supercapacitors they are generally pressed to reduce size and improve performance.

In order to improve the ability of administering and saturating the supercapacitor with the electrolyte, applied to the desired conductive elements and/or activated carbon of the device, and to make it possible to saturate all of the desired regions, an additional improvement of the disclosed system and method is to perforate the electrodes and separators, or otherwise separate or expose these internal areas. This perforation and/or separation allows the electrolyte to spread (leach) into the regions that surround the perforation and/or separation, and in the case of larger supercapacitors allows the internal areas of the device to be accessible to the electrolyte. This may be accomplished several ways including perforating the supercapacitors layers at a distance apart from other perforations, dependent upon the viscosity of the electrolyte, to allow full saturation. This full saturation may also be accomplished by ensuring the supercapacitor internal layers are made in sections, or slices, that allow for saturation of the electrolyte when servicing later in the device's operational life.

The process of servicing may also include a step of flushing the supercapacitor containing existing electrolyte. This flushing process may be beneficial due to the fact many electrolytes use salts, and other dissolved minerals, that may be deposited, or trapped, within the activated carbon. These dissolved minerals could cause the performance of the device to be negatively affected, and as a result a flushing step may be desirable during servicing in order to extract these dissolved minerals.

This method of servicing is advantageous because the structure of the device is not damaged while extending its operational lifespan as a result of the servicing. To further explain this point, when a supercapacitor is assembled, in this example a double layer electrolytic capacitor (DLEC), the layers are either stacked or rolled together. This layering is designed to be compressed together tightly in order to ensure the bonded carbon does not pull away from the conductor. If during servicing the layers were to be separated the carbon would flake or pull off of the conductor's surface reducing the performance of the device. Additionally, the process of separating layers would be very challenging and time consuming, reducing the viability of servicing this type of device. By providing a resealable container and perforations, or separations, you can access and saturate the internal areas of the supercapacitor more effectively, therefore providing a better end-product, for both performance and lifespan.

Additionally, another improvement of the device is centred around the ability to select higher grade conductive materials for your electrodes. By choosing to make an electrostatic storage device (supercapacitor) serviceable gives the manufacturer or designer the ability to choose conductive materials that may last substantially longer than traditional conductive material such as aluminum or copper. An example of a material that last substantially longer would be stainless steel, or titanium, which might be a requirement when used with specific electrolytes for instance the exemplary cosolvent-in-salt electrolyte. Stainless steel has proven to be a more robust and long-lasting metal for use in environments that are exposed salts, or to saltwater. The benefit of the disclosed system and method is that by having a supercapacitor that is able to be serviced and last dramatically longer than traditional supercapacitors, you can compensate for the initial upfront cost of using more expensive current collectors, due to the longer life expectancies and economic performance, though not a requirement and may still include less advantageous metals such as copper or aluminum. For instance, instead of using aluminum or copper which degrades at a steady rate when exposed to salts, by using a marine grade stainless steel, for instance 316 stainless steel, or a resistant 306 stainless steel, the expected lifespan can be increased from 20 years up to potentially 100 years or more with regular interval servicing. With careful consideration of the electrolyte and conductive electrode material, it is reasonable to assume that capacitors have the potential to have life expectancies that may reach a regular operational lifespan of 50 to 100 years, far surpassing any current technologies.

The disclosed system and method provide for an effective way to drastically lower the cost and improve the lifespan of these devices and ensures a path to a sustainable renewable electrical grid. The stable characteristics of the internal contents of supercapacitors, in conjunction with their non-reactive operation allows for an energy storage solution that can have extremely long lifespans.

The availability of low-cost feedstock minerals such as thermal coal and salt-based cosolvent electrolytes allows the ability to scale manufacturing quickly, in a regular atmospheric environment, and provide low cost manufacturing capability. It should be noted another major benefit of the disclosed invention is the electrolyte's ability to be added to the supercapacitors in a regular atmospheric earth environment, as opposed to organic electrolytes that require moisture free environments due to their reactiveness when mixed with water, including the natural moisture found in the earth's atmosphere. Utilizing the disclosed system and method it is possible to create an energy storage solution that can have an effective operational lifespan which might reach 100 years or more and reach costs below $50.00 a kWh. This extended lifespan and low cost creates a paradigm shift in humankind's ability to produce energy storage to service the needs of humanity and allows the ability to maintain and operate enough energy storage to successfully transition and maintain a fully renewable electrical grid.

Embodiments of the present disclosure can also be viewed as providing systems and methods for managing and controlling the servicing and serviceability of electrostatic storage devices in a novel way, operating an improved method and supercapacitor design, this can be briefly described in architecture one embodiment, among others, can be implemented by: A system for an improved serviceable electrical supercapacitor comprising in combination, a casing, an electrostatic operable section in said casing, said electrostatic operable section comprising in combination, a pair of spaced apart electrodes contacting with activated carbon derived from a low-cost carbon source such as a low-carbon source costing less than $250 per ton, including possibly below $100 per ton, and with a conductive additive, ion permeable separators between said electrodes, (a) a casing with means to connect said electrodes to a source of power, and (b) an electrolyte fluid in said casing and contacting said electrodes and ion permeable material.

(c) an electrostatic storage device being composed of a resealable or un-resealable container that allows the access to the internal contents of said electrostatic storage device, (d) said electrostatic storage device to having its internal contents containing perforations, and/or separations, and/or separated or separate sections, of or to, the electrodes and separators and/or layers, (e) electrostatic storage device having means to undergoing maintenance, and/or servicing, and/or removal, and/or replacement, and/or having electrolyte re-administered and/or removed, and/or having additional electrolyte added, and (f) means for said electrostatic storage device to have its resealable container resealed, or having its internal contents placed into an un-resealable container and sealed, or existing container resealed.

The system wherein the activated carbon is from a low-cost carbon source including; coal, bituminous coke, petroleum coke, or derived from waste or biomass. The system wherein the electrolyte fluid is a cosolvent salt electrolyte and has the ingredients of Sodium Perchlorate with the general formula of NACL04, acetonitrile with the general formula of CH3CN

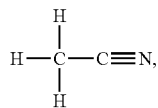

and water.

The system wherein the electrolyte has a molar ratio of approximately 7-8, consisting of 1-part sodium perchlorate to 1.5 parts water to 2.4 parts acetonitrile.

The system wherein the electrolyte has a molar ratio range of 4-10, consisting of a range of 0.25 up to 2 parts sodium perchlorate and a range of 0.25 up to 3 parts water and a range of 0.25 up to 4 parts acetonitrile.

The system wherein said electrolyte is made partially from common salts, lithium bis(trifluoromethanesulfonyl) imide (LiTFSI), Sodium Chloride, Ammonium Dichlorate, Magnesium Sulfate, Sodium Bicarbonate. The system wherein the electrolyte fluid comprises either a cosolvent in-salt electrolyte, or an aqueous electrolyte, or an organic electrolyte, or an ionic fluid. The system wherein the electrodes are composed of stainless steel and/or titanium and/or copper and/or aluminum. The system wherein the electrodes and/or separators have perforations, and/or separations, and/or separated or separate sections, of or to, the electrodes and separators and/or layers. The system wherein said separator layer is a cellulose material, paper dielectric, plastic dielectric and/or a dielectric material. The system wherein the composition of the activated carbon composite is an approximate range of 75% to 88% activated carbon from a low cost carbon source, an approximate range of 4% to 20% conductive additive including carbon black and/or Super P™ and/or acetylene black and/or furnace black and/or lampblack black or channel black, and approximate range of 3% to 12% binding material including PTFE and/or PVDF which is, or not, dispersed in water.

In accordance with another embodiment of the invention, there is provided a method of servicing a serviceable electrostatic storage device (supercapacitor), the electrostatic storage device comprising a resealable or un-resealable container, electrodes, separators, and solid state or liquid electrolyte, the method comprising: (a) identifying that said electrostatic storage device requires servicing by measuring and analysing operational performance; (b) accessing internal contents of said electrostatic storage device when said internal contents contain perforations, and/or separations, and/or separated or separate sections, of or to, the electrodes and separators and/or layers; (c) removing, replacing, re-administering, and/or adding electrolyte; (d) resealing said resealable container or placing new or additional internal contents into an un-resealable container and sealing the un-resealable container.

The method may involve accessing the internal contents via a separable cover.

The method may involve removing the separable cover from a container body of the container. The method may involve attaching or re-attaching the separable cover to the container body. The method may involve accessing the internal contents by separating the separable cover from the container body.

The method may involve replacing, repairing, refurbishing, or reusing a sealable gasket or gasket material of the electrostatic storage device.

The method may involve sealing by welding and/or crimping the supercapacitor. The method may involve sealing or affixing the electrostatic storage device in a permanent or semi-permanent manner.

The method may involve servicing an electrostatic storage device selected from the group consisting of a capacitor, an ultracapacitor, a supercapacitor, a double-layer electrolytic capacitor, and a hybrid capacitor.

The method may involve injecting electrolyte into perforations of the electrostatic storage device. The method may involve injecting the electrolyte so as to allow saturation of the electrodes and conductive energy storage materials.

The method may involve administering an electrolyte of the electrostatic storage device comprising separations, and/or separated or separate sections, of or to, the electrodes and separators and/or layers. The method may involve administering the electrolyte so as to allow saturation of the electrodes and conductive energy storage materials.

The method may involve servicing the electrostatic storage device comprising the resealable container.

The method may involve removing internal contents of the electrostatic storage device. The method may involve placing the internal contents into a new container that is resealable or not resealable. The method may involve placing back into the original container that is resealable or not resealable the removed internal contents. The method may involve sealing the container after internal contents have been replaced, placed, or placed back into the container. The method may involve sealing the container so as to complete the servicing of the electrostatic storage device.

In accordance with another embodiment of the invention, there is provided an electrostatic storage device comprising: (a) a container, electrodes, separators, and solid state or liquid electrolyte, such that a requirement for servicing of said electrostatic storage device is identifiable by measuring and analysing operational performance of the electrostatic storage device; (b) a resealable or un-resealable container that allows access to internal contents of said electrostatic storage device, the internal contents comprising perforations, and/or separations, and/or separated or separate sections, of or to, the electrodes and separators and/or layers, wherein the electrolyte is removable or replaceable such that additional electrolyte can be added to the electrostatic storage device, and wherein the internal contents are operable to be placed into an un-resealable container and sealed or an existing said container resealed.

The electrostatic storage device may include a separable cover. The separable cover may be attachable to a container body of the electrostatic storage device. The separable cover may be removable from the container body. The separable cover may be removable from the container body such that the internal contents become accessible for servicing. The electrostatic storage device may include a sealable gasket. The sealable gasket may by replaceable or reusable. The electrostatic storage device may include gasket material. The gasket material may be replaceable or reusable. The electrostatic storage device may be sealed with a weld and/or crimp. The electrostatic storage device may be permanently or semi-permanently sealed or affixed. The electrostatic storage device may be selected from the group consisting of: a capacitor, an ultracapacitor, a supercapacitor, a double-layer electrolytic capacitor, and a hybrid capacitor. The electrostatic storage device may include perforations. The perforations may be injected with electrolyte such that the electrodes become saturated. The perforations may be injected with electrolyte such that conductive energy storage materials of the electrostatic storage device become saturated. The electrostatic storage device may include separations, and/or separated or separate sections, of or to, the electrodes and separators and/or layers. The electrostatic storage device may include a resealable container.

In accordance with another embodiment of the invention, there is provided an electrostatic storage device comprising: (a) means for providing a container, electrodes, separators, and solid state or liquid electrolyte, such that a requirement for servicing of said electrostatic storage device is identifiable by measuring and analysing operational performance of the electrostatic storage device; (b) means for providing a resealable or un-resealable container that allows the access to internal contents of said electrostatic storage device; (c) means for providing perforations, and/or separations, and/or separations, and/or separated or separate sections, of or to, the electrodes and separators and/or layers, wherein the electrolyte is removable or replaceable such that additional electrolyte can be added to the electrostatic storage device, and wherein the internal contents are operable to be placed into an un-resealable container and sealed or an existing said container resealed.

The present disclosure also provides for a system and method for the manufacturing of energy storage devices, such as specifically supercapacitors, and the process for designing and manufacturing activated carbon with pre-selected pore sizing and distribution hierarchical structure, in order for activated carbon pores to synergistically couple to an electrolyte, or other medium, based on ion(s), solvated ion(s), de-solvated ion(s), and solvation shell(s) sizes wherein; a manufacturing process for activated carbon wherein pre-designing an activated carbon with a predetermined and specified pore size and pore distribution hierarchical structure, which may be determined based on the size of ion(s), ion carrier(s), and solvation shell(s) of a selected electrolyte, or other medium; an energy storage device manufacturing process wherein said pre-designed activated carbon and said selected electrolyte provide for an optimal superior energy storage device, based on ion(s) size and activated carbon pore(s) size matching and hierarchical structure. Additionally, the device's preferred embodiment uses a state-of-the-art co-solvent and/in salt electrolyte, which allows for a simplified manufacturing process. Specifically, due to the use of co-solvent and/in salt electrolyte, manufacturing can occur in normal atmospheric environments, increasing safety and lowering both cost and complexity of energy storage device manufacturing and the manufacturing facility.

A system and method for manufacturing energy storage devices, such as supercapacitors, and the manufacturing process for activated carbon with a predetermined pore size and pore distribution, which may be influenced based on the size of ions and the solvation shell of a particular electrolyte, provides for an optimal construction and design based on ion and pore matching and pore hierarchical structure.

In one embodiment, the device includes a process which includes; an optional carbon source drying step; an optional carbon source carbonization step; contacting or soaking a carbon source such as coal, oil, petroleum coke, biomass, with potassium hydroxide (KOH) flakes or solution for; about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 24 hours, where 12 hours is preferred, at a KOH:C ratio ranging from; about 1:1 wt %, about 2:1 wt %, about 3:1 wt %, about 4:1 wt %, about 5:1 wt %, about 6:1 wt %, about 7:1 wt %, about 8:1 wt %, about 9:1 wt %, about 10:1 wt %, about 11:1 wt %, about 12:1 wt %, with a ratio of 2 part KOH to 1 part carbon source wt % preferred, and wherein water may be used to dilute the base KOH, up to 50 parts water to 1 parts KOH, with a 1 part water to 1 part KOH wt % ratio being preferred. Using a pyrolysis thermal process under nitrogen, helium, or argon atmosphere with nitrogen being preferred, to activate the said contacted carbon source at an activation temperature from 500° C. to 1100° C. for 10 min to 48 hours, with a temperature of 800° C. for 2 hours being preferred, and a ramp rate of 10° C. per minute to produce a predetermined pore size and distribution hierarchical structure activated carbon.

The activated carbon is, or may be, composed of pores with; about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, compositional volume of pores that are about 2 nm (micropores) or less in size in certain embodiments. The activated carbon is, or may be, composed of pores wherein the compositional volume of pores that are about 2 nm (micropores) or smaller in size may compose; more than about 55% and less than about 95%, in certain embodiments. The activated carbon is, or may be, composed of pores wherein the compositional volume of pores that are about 2 nm (micropores) or smaller in size may compose; more than about 60% and less than about 80%, in exemplified preferred embodiments. The activated carbon is, or may be, composed of pores wherein the compositional volume of pores that are about 2 nm (micropores) or smaller in size may compose 67% and is the preferred embodiment. The activated carbon is, or may be, composed of pores with; about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, compositional volume of pores that are about 2 nm (mesopores) or larger in size, in certain embodiments. The activated carbon is, or may be, composed of pores wherein the compositional volume of pores that are about 2 nm (mesopores) or larger in size may compose; more than about 5% and less than about 70%, in certain embodiments. The activated carbon is, or may be, composed of pores wherein the compositional volume of pores that are about 2 nm (mesopores) or larger in size may compose; more than about 20% and less than about 40%, in exemplified preferred embodiments. The activated carbon is, or may be, composed of pores wherein the compositional volume of pores that are about 2 nm (mesopores) or larger in size may compose 32% and is the preferred embodiment. Additionally, in preferred embodiments an average pore size of between 1.8 nm and 2.7 nm is the preferred average pore size. It should be noted that in certain embodiments the compositional volume of pores that are about 2 nm (mesopores) or larger in size are between 2 nm and 50 nm in pore width. It should be noted that in additional embodiments the compositional volume of pores that are about 2 nm (mesopores) or larger in size are between 2 nm and 20 nm in pore width for the majority of mesopores. It should be noted that in additional embodiments the compositional volume of pores that are about 2 nm (mesopores) or larger in size are between 2 nm and 10 nm in pore width for the majority of mesopores. It should be noted that in preferred exemplified embodiments the compositional volume of pores that are about 2 nm (mesopores) or larger in size are between 2 nm and 5 nm in pore width for the majority of mesopores, up to about 10 nm.

The activated carbon is, or may be, composed of pores with; about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, compositional volume of pores that are about 50 nm (macropores) or larger in size in certain embodiments. The activated carbon is, or may be, composed of pores wherein the compositional volume of pores that are about 50 nm (macropores) or larger in size may compose; more than about 0.1% and less than about 35%, in certain embodiments. The activated carbon is, or may be, composed of pores wherein the compositional volume of pores that are about 50 nm (macropores) or larger in size may compose; more than about 0.1% and less than about 10%, in exemplified embodiments. The activated carbon is, or may be, composed of pores wherein the compositional volume of pores that are about 50 nm (macropores) or greater in size may compose less than 5% and is the preferred embodiment.

Additionally, an energy storage device with an electrode composition that includes the activated carbon, may also comprise a conductive additive which may include; carbon black, super p, furnace black, channel black, acetylene black, thermal black, lamp black, conductive carbon. Wherein the compositional volume percentage is between 2% and 25% wt % conductive additive in certain embodiments. Wherein the compositional volume percentage is between 2% and 15% wt % conductive additive in preferred embodiments. Wherein the compositional volume percentage of conductive additives is about 5% wt % acetylene black and is the preferred embodiment.

Additionally, an energy storage device with an electrode composition that includes the activated carbon, may also comprise a mixing agent(s) which may include; 2-propanol, sec-propyl alcohol, IPA, isopropyl, isopropanol, alcohol, and/or water. Wherein the compositional volume percentage is between 1% and 25% wt % mixing agent(s) in certain embodiments. Wherein the compositional volume percentage is between 2% and 10% wt % mixing agent(s) in preferred embodiments. Wherein the compositional volume percentage of mixing agent(s) is 4% wt % isopropanol and is the preferred embodiment.

Additionally, the composition may also include a binder which may include polyvinylidene fluoride (PVDF), polytetrafluoroethylene (PTFE), non-reactive thermoplastic fluoropolymer(s), copolymers, terpolymers, plastics composite, or a binder, with PVDF (ink type electrode) and PTFE (freestanding electrode) being preferred embodiments; in order to form a supercapacitor electrode mix, paint, mixture, paste, ink, or freestanding electrode composite. Wherein the compositional volume percentage is between 1% and 25% wt % binder(s) in certain embodiments. Wherein the compositional volume percentage is between 5% and 20% wt % binder(s) in preferred embodiments. Wherein the compositional volume percentage of the binder(s) is about 10% wt % polytetrafluoroethylene (PTFE; 60 wt % dispersion in water) and is the preferred embodiment.

Additionally, the energy storage device also includes a current collector which may be a variety of conductive metals, foils, mesh, conductive structure(s) and may include; metal, stainless steel, titanium, aluminum, copper, conductive carbon structure or sheet, graphene, with stainless steel and titanium being preferred. Where both the electrode mix and conductive material may be a variety of thicknesses from 0.0001 mm up to and including 10 mm, and a variety of mesh patterns or windings.

Additionally, the energy storage device also includes ion permeable separator(s) which may include porous plastics, paper, fibers, cellulose, ion permeable insulators/separators, where both the ion permeable separator may be a variety of thicknesses from 0.0001 mm up to and including 10 mm, and a variety widths, lengths, and patterns.

Additionally, the energy storage device also includes an electrolyte which may be a number of electrolytes including; aqueous electrolytes, organic electrolytes, co-solvent in (and) salt electrolytes, ion carriers electrolytes, ionic electrolytes, gel electrolytes, hybrid electrolytes, dry polymer electrolytes, ceramic electrolytes, solid state electrolyte device, with co-solvent in (and) salt electrolytes are preferred, and an exemplary embodiment with a molar ratio of 1/1.5/2.5, i.e. 7.7 m to 8.5 m solution of sodium perchlorate ($NaClO_4$; Sigma-Aldrich) in water/acetonitrile is the preferred embodiment.

Additionally, the energy storage device also includes an enclosure or case, which may be of any number of sizes and shapes from small circuit size units, to ultra large kWh or multi-kWh units.

This energy storage device process and composition allows the administering of electrolyte in typical atmospheric environments, wherein the described processes and device provide for a safe low-cost manufacturing process and improved energy storage device, such as a supercapacitor.

This disclosure presents a system and method, an invention, that when utilized can greatly improve the processes, manufacturing, systems, apparatus, and the physical energy storage device. This disclosure presents an invention for producing activated carbon with predetermined pores sizes and distribution hierarchical structure, in conjunction with, and for the manufacturing of, energy storage devices, in particular supercapacitors. It describes a process for matching the electrolyte charge carrier sizes and the activated carbon pore dimensions and allows for the assembly of these devices in normal atmospheric environments, due to the preferred electrolyte. This allows for the production of improved energy storage devices by specifically controlling and matching the pore size distribution of activated carbons, their hierarchical structure, and the desired electrolyte, this allows for improved surface contacting, interconnection, and propagation, of the electrolyte and ions within the activated carbon electrode. These improvements allow for better ionic interconnection, and charge transport, resulting in improved energy density and performance. This is even the case with increased material mass loading (thicknesses) of the electrode material, which would normally face challenges with respect to bidirectional volumetric charge transport, and volumetric ion packing, these challenges would normally result in lower energy density and performance.

The present invention may utilize in some embodiments a multi-step process in order to produce energy storage devices or components, which includes producing activated carbon materials from a carbon source feedstock with a specific pore size and distribution to ensure ion and pore matching between activated carbons and electrolytes.

The described multi-step process may include in exemplary embodiments; a drying step; a particle sizing step or pulverising step, a charring step, a chemical soaking step, a mixing step to ensure a uniform distribution of the soaking chemical, a drying step, a pyrolyzing step that produces the activated carbon material with a predetermined pore size and distribution, a cooling step, a washing activated carbon step which may include an additive, an adding electrode ingredients to activated carbon step, a mixing electrode ingredients step, an electrode application or freestanding electrode forming step, an optional electrode drying step, an energy storage device assembly step, an additional optional assembly drying step, an electrolyte impregnating step, a sealing step.

Activated carbon is typically made using two existing activation methods from carbonaceous or lignocellulose precursors: 1) gasifying agents such as air, carbon dioxide, water vapor, oxygen may be used to physically, thermally, activate the material; and 2) chemical activation done by one or more chemical agents including phosphoric acid, zinc chloride, potassium hydroxide.

Traditional activated carbon production methods generally use hydrocarbon material such as coal or biomass which is typically processed with a number of steps; drying, carbonization, activation. The carbonization and activation steps generate combustible gases such as hydrogen-rich product gas. These gases are typically exhausted from the production furnace into a separate combustion chamber where they are oxidized with air to mainly form carbon dioxide and water vapor, which may then be sent to an air pollution control system in order to remove pollutants such as sulfur dioxide and particulates.

In one embodiment of the invention the present disclosure describes a continuous process for producing supercapacitors, said process comprising;

(a) providing a carbon source as feedstock;
(b) producing activated carbon with predetermined pore sizing and distribution, from said feedstock whereby;
(c) control the varying factors that affect and result for specific pore sizes and distribution within a formed activated carbon, which may include; carbon source, drying, charring, activating chemical mixing and soak time, activating chemical concentration, carbon source concentration, pyrolysis reaction temperature, pyrolysis reactor atmosphere, temperature ramp up and ramp down times, cooling time, particle size, in order to ensure an optimal coupling to an electrolyte for a given, and predetermined, activated carbon pore sizing and distribution;
(d) in one or more reaction zones that are indirectly or directly heated, processing said feedstock with a chemical and/or steam, within said reaction zones using a substantially inert gas and an activation agent comprising at least one of KOH, water or carbon dioxide, to facilitate the activation of carbon, which includes a gas inlet(s) and/or outlet(s) mechanically connected to said reaction zone and/or zones;
(e) removing at least a portion of said vapours and/or steam from said reaction zone and/or reaction zones, which may be separate streams of vapours and/or steam;
(f) recycling at least a portion of said vapour and/or steam, or thermally treated form thereof, to said processing step(s) and/or feedstock throughout said process, and/or conversion to syngas (towngas);
(g) recovering at least a portion of said activated carbon;
(h) grinding said activated carbon to a fine particle size, which may occur prior to activation and/or after carbon activation;
(l) within one or more mixing chambers mix activated carbon with a conductive agent(s), a binder(s), a mixing agent(s), conductive agents may include; carbon black, super p, furnace black, channel black, acetylene black, thermal black, lamp black, conductive carbon, binders which may include; PVDF, PTFE, non-reactive thermoplastic fluoropolymer(s), copolymers, terpolymers, mixing agents may include; 2-propanol, sec-propyl alcohol, IPA, isopropyl, isopropanol, alcohol, water; to form a supercapacitor electrode composition, in the form of a; mix, paint, mixture, or paste, ink, or freestanding electrode;

(j) said mixing chamber(s) interconnected and/or mechanically coupled to an extruder or plurality of extruders or sprayer(s) in order to administer supercapacitor electrode composition, or freestanding electrode, to a conductive material such as; a metal which may be; stainless steel, titanium, copper, aluminum, silver, which may be a foil or mesh, where both the electrode mix and conductive material may be a variety of thicknesses from 0.0001 mm up to and including 10 mm, and a variety of mesh patterns or windings;

(k) said extruder(s) may comprise or be mechanically connected to nozzle(s), sprayer(s), scrapper(s), press, to allow administering said supercapacitor composition or freestanding electrode to said metal, which may be directly contacting said metal, and/or a freestanding design, and may additionally include a mechanical pump, compressor, gravity feed, press, auger or pressure to provide a consistent feed of said supercapacitor composition;

(l) the device may further include mechanical feed units and/or feeders with winders, rollers, drums, cutter(s) or crimper(s), and motors, for the anode material, cathode material, and ion permeable separator, which may be mechanically coupled to the device, and may be used to allow a continuous feed of said conductive metal and an ion permeable separator which may include porous plastics, paper, fibers, ion permeable insulators/separators, and which may be configured to produce a continuously rolled and layered (anode, ion permeable separator, cathode, ion permeable separator) energy storage device, and/or supercapacitor cell configuration, and/or may be configured to allow a layered design with a plurality of anodes, ion permeable separators, and cathodes, for each cell, which may be stacked;

(m) the device may further include mechanical feed units and/or feeders, which may include heaters and/or dehydrators prior to the supercapacitor container and/or shell components, being mechanically coupled to the device and may be used to allow at regular or predetermined intervals the insertion and removal of said supercapacitor containers which may be new containers or partially completed containers containing supercapacitor materials;

(n) the said mechanical feed units and/or feeders for the energy storage container containing energy storage or supercapacitor materials being mechanically connected to an extruder or plurality of extruders, and may additionally include sprayer(s) and/or nozzle(s), in order to administer or inject an electrolyte, said electrolyte may comprise organic electrolytes, aqueous electrolytes, co-solvent in/and salt electrolytes, ion carriers electrolytes, ionic electrolytes, gel electrolytes, dry polymer electrolytes, ceramic electrolytes, with co-solvent in salt electrolytes being preferred to allow administering of electrolyte in typical atmospheric environments;

(o) the device may also include a mechanical feed unit(s) and/or feeders for the energy storage container containing energy storage materials being mechanically connected to a container sealing device, said sealing device may include a crimper(s), screw, rivet, clamp, press, weld or seal, a welder(s) to bind and/or affix anode and cathode leads to positive and negative terminals of said energy storage device, said sealing device may also include sealing means for said container with or without a separate seal or component(s), said sealing device may also include means to control internal energy storage pressure, for instance for a vacuum, a vacuum pump may be used to reduce internal pressure, and may include a finished energy storage cell hopper to deposit finish energy storage devices or supercapacitor cells.

A method of producing activated carbon for use with an electrolyte in an apparatus for storing electrical energy, the activated carbon comprising a plurality of pores comprising micropores having micropore diameters less than 2 nm, mesopores having mesopore diameters in a range of 2 nm to 50 nm, and macropores having macropore diameters greater than 50 nm, the method comprising:

(a) selecting the electrolyte from a group consisting of; a first electrolyte having a first average of solvated ion and/or de-solvated ion sizes equal to or less than 1 nm; a second electrolyte having a second average of solvated ion and/or de-solvated ion sizes greater than 1 nm;

(b) selecting an activation temperature and an activation time period such that; if the first electrolyte is selected, the activation temperature is in a range of 650 to 850 degrees Celsius and the activation time period is in a range of 30 minutes to 4 hours; if the second electrolyte is selected, the activation temperature is in a range of 750 to 950 degrees Celsius and the activation time period is in a range of 30 minutes to 5 hours; and (c) activating a carbon source in the presence of at least nearly inert gas at substantially atmospheric pressure and at the activation temperature for the activation time period so as to produce the activated carbon such that the plurality of pores comprises more of the micropores than the mesopores and more of the mesopores than the macropores, at least 0.001% of the pores being the macropores.

The method wherein step (c) comprises producing the activated carbon such that; if the first electrolyte is selected, 50% to 95% of the pores are micropores, 5% to 50% of the pores are mesopores, and 0.001% to 5% of the pores are macropores; if the second electrolyte is selected, 40% to 80% of the pores are micropores, 20% to 60% of the pores are mesopores, and 0.1% to 20% of the pores are macropores.

The method wherein step (c) comprises producing the activated carbon such that; if the first electrolyte is selected, about 67% of the pores are micropores, about 32% of the pores are mesopores, about 1% of the pores are macropores.

The method of wherein step (c) comprises; producing a first powder by exposing the carbon source to a caustic basic solution; activating the first powder to produce a second powder by heating the first powder at the activation temperature for the activation time period; and producing a third powder by exposing the second powder to an acidic aqueous solution.

The method further comprising at least one of drying and charring the carbon source prior to step (d).

The method wherein step (d) comprises exposing the carbon source to the caustic basic solution being an aqueous solution comprising potassium hydroxide.

The method wherein step (d) comprises exposing the carbon source according to a mass ratio of the caustic basic solution to the carbon source, the mass ratio being in a range of 1:1 to 12:1.

The method wherein step (d) comprises exposing the carbon source to the caustic basic solution for a time period ranging from 1 to 24 hours.

The method wherein step (e) comprises heating the first powder at the activation temperature of 800 degrees Celsius for the activation time period of two hours when the electrolyte comprises water, a co-solvent, and a salt.

The method wherein the co-solvent is acetonitrile.

The method wherein the salt is sodium perchlorate.

The method wherein the molar concentration of the salt is in a range of 4 to 10 M.

The method wherein the molar concentration of the cosolvent and salt electrolyte is in a range of 7 to 8 M.

The method wherein the molar concentration of the cosolvent and salt electrolyte is 7.7.

The method wherein the molar concentration of the salt is in a range of 7 to 8 M.

The method wherein molar ratios of the salt, water, and co-solvent are in ranges of 0.5 to 2 for the salt, 0.5 to 3 for the water, and 1.5 to 4 for the co-solvent, respectively.

The method wherein molar ratios of the salt, water, and co-solvent are 1/1.5/2.5 for the salt, the water, the co-solvent, respectively.

The method wherein step (e) comprises heating the first powder at a temperature that is increased at a heat ramping rate of 10 degrees Celsius per minute prior to heating at the activation temperature.

The method wherein step (e) comprises heating the furnace/reactor up to operational temperature prior to adding carbon material for the pyrolysis process, wherein carbon material is placed in the preheated furnace/reactor and allowed to reach the desired pyrolysis temperature.

The method wherein step (e) comprises heating in the presence of said at least nearly inert gas selected from the group consisting of nitrogen, helium, and argon gas.

The method wherein step (e) comprises optionally drying the first powder prior to activating the first powder.

The method wherein optionally drying the first powder prior to activating the first powder comprises drying at 60 degrees Celsius or up to 200 degrees Celsius.

The method wherein step (f) comprises exposing the second powder to the acidic aqueous solution hydrochloric acid having a molar concentration of 4 M for a time period of 5 minutes to 24 hours, thereby producing a soaked powder.

The method wherein step (f) further comprises washing the soaked powder in water to produce a washed powder, and then drying the washed powder.

A method of producing an electrode, the method comprising:
(g) producing an electrode mixture comprising the activated carbon produced by the above method and, a conductive additive, and a binder.

The method of producing an electrode, wherein step (g) comprises producing the electrode mixture comprising the binder selected from the group consisting of: polyvinylidene difluoride (PVDF), polyvinylidene fluoride, polytetrafluoroethylene (PTFE), a copolymer, and a terpolymer.

The method wherein step (g) comprises producing the electrode mixture further comprising a mixing agent.

The method wherein step (g) comprises producing the electrode mixture comprising the conductive additive carbon black and the mixing agent alcohol which may include an additive for better emulsion of the carbon black.

The method wherein step (g) comprises producing the electrode mixture comprising the conductive additive acetylene black and the mixing agent isopropyl alcohol.

The method wherein step (g) comprises producing the electrode mixture comprising 70 to 90 wt % of the activated carbon, 5 to 20 wt % of the binder polytetrafluoroethylene, 1 to 10 wt % of the conductive additive acetylene black, and less than 0.01 to 3 wt % of the mixing agent isopropyl alcohol.

The method further comprising:
(h) producing one of an anode and a cathode by combining the electrode mixture and an electrically conductive current collector which may be accomplished by; pressing, spraying, scraping, rolling, extruding, forming, or by independently forming a film, the electrode mixture to the current collector; and
(j) optionally, drying said one of the anode and the cathode, which may be through a heated chamber, or natural drying over a period of time in a normal room temperature, where dehumidification may be used to lower the room or chambers relative humidity level to a desired level.

The method wherein step (h) comprises rolling the electrode mixture into a thin film prior to producing said one of the anode and the cathode.

The method wherein step (h) comprises combining the electrode mixture and the electrically conductive current collector comprising a material selected from the group consisting of: stainless steel, titanium, aluminum, copper, conductive carbon, and graphene.

The method wherein step (h) comprises combining the electrode mixture and the electrically conductive current collector comprising stainless steel.

The method wherein step (j) comprises drying said one of the anode and the cathode at 55 degrees Celsius for 12 hours.

An apparatus for storing electrical energy, the apparatus comprising:
(k) a pair of the electrodes produced by the method as described above; and
(l) the electrolyte described above, wherein the electrolyte is disposed between the electrodes of the pair and wherein the electrodes become wetted to a desired wetness, or saturated throughout their electrode mix composition to a desired saturation.

The apparatus further comprising an ion permeable separator disposed between the electrodes of the pair.

The apparatus wherein the apparatus is a supercapacitor.

Electrolyte

There is a large desire to develop low cost and safe supercapacitors (SCs) with high energy to compete with batteries. Activated carbons, the main electrode materials for electrochemical double layer capacitors, have currently reached their capacitance limit. This is due to the limited accessible surface area of carbons in organic electrolyte, commonly used in commercial SCs, even for carbons with a large specific surface area. The disclosed inventions strategy is to increase storage capability of porous carbons by enhancing the accessible surface area by tuning the pore size distribution hierarchical structure adapted to an appropriate electrolyte. The disclosed invention shows that matching the porosity of a microporous carbon to the recently discovered water/acetonitrile hybrid electrolyte along with the good electrolyte wetting is very advantageous. These disclosed inventive embodiments ensure low diffusion resistance and increased accessible surface area of activated carbons, leading to elevated capacitive performance compared to aqueous and organic electrolytes even in thick electrodes. This water/organic hybrid electrolyte with sodium perchlorate salt (which may additionally be an alternative salt, such as an alternate perchlorate from the perchlorate family, organic perchlorate salts, ammonium, alkali metal, and alkali earth perchlorates or transition metal perchlorates), not only has the same benefits of aqueous electrolyte in terms of cost, safety, and smaller ionic size over the organic counterparts, but also offers a wide stability window. Using a hybrid electrolyte for our low-cost coal-derived microporous activated carbon with majority of pores less than 2 nm, we fabricated a high-rate SC with the best capacitance and energy density reported to date for activated carbons including 41.2 F/g (0.3 F/cm$^2$, 18.3 F/cm$^3$) and 35.0 Wh/Kg (271.3 µWh/cm$^2$) at 1 A/g. To further confirm the benefits of the invention, we probed capacitive performance for a commercial activated carbon with higher surface area and more mesopores, which gave comparable gravimetric capacitance but lower volumetric capacitance due to much lower density than our activated carbon (39.5 F/g and 7.4 F/cm$^3$) and final supercapacitor.

The energy storage mechanism of electrical double layer capacitor (EDLC), also known as supercapacitor (SC), comes from electrostatic adsorption and desorption of ions on the surface of highly porous electrodes that is accessible to the electrolyte ion. SCs have found their way to consumer electronics and transportation technologies owing to their fast charge-discharge rate, high power density, low maintenance, and long life. Yet they suffer from low energy densities compared to lithium ion batteries generally preventing them to be considered as alternatives to batteries for grid scale applications and electric vehicles.

Electrode and electrolyte play a substantial role in the performance of SCs and thus are important to manufacture low-cost SCs with higher energy density. On the electrode side, activated carbons (ACs) derived from various sources are the most widely used electrode materials for commercial SCs owing to their high double-layer capacitance, low cost, large specific surface area (SSA), chemical stability, high electrical conductivity, and relatively controllable porosity. Generally, double layer capacitance increases with increasing the SSA, but the capacitance becomes constant for $S_{BET}$ values (obtained from the BET method) higher than a certain value (e.g. 1200-1500 m$^2$/g for some ACs). Studies on ACs with different pore sizes in various electrolytes revealed that there is, in fact, no linear relationship between the capacitance and the SSA and that $S_{BET}$ may not represent the effective SSA. Other characteristics such as the electrolyte type, the surface chemistry, the pore size distribution, the pore shape, and the way pores are connected (hierarchical structure) strongly influence the accessibility of ions and thus the specific capacitance.

A typical AC has a broad pore size distribution including micropores (<2 nm), mesopores (2-50 nm) and macropores (<50 nm). Both micropores and mesopores contribute to the capacitance but the effect of pore size distribution on capacitance is not fully understood due to discrepancies in research findings and interpretations. Aside from the pore size, the pore shape and the way pores are connected (hierarchical structure) differ in ACs depending on the type of carbon source and the activation method, which remain challenging to identify an optimum porosity yielding the best capacitance among related studies. Earlier works suggested that pores smaller than 1 nm were not accessible in organic electrolytes because the size of the solvation shell in organic electrolytes is larger than 1 nm. For example, the size of solvated ions of Et$_4$NBF$_4$ in propylene carbonate (PC) are 1.35 and 1.40 nm for the cation and anion, respectively.

Later on researchers were able to achieve high capacitance in microporous carbide-derived carbon (CDC) with average pore size of smaller than 1 nm. They found that the normalized capacitance increases when the average pore size approaches the ion size. This increase in capacitance (normalized by the surface area) for sub-nanometre pores was explained by partial or complete removal of the solvation shell of ions facilitating their access to the micropores. As such, one opinion suggests for exclusively microporous carbons and matching the pore size with the ion size to yield high capacitance. However, only sub-nanometre pores in an electrode may lead to a higher diffusion resistance giving rise to poor rate capability and power density compromising key advantages of SCs. In addition, it is challenging to translate it into practice as the specific capacitance based on the whole carbon matters the most. Hence, microporous carbons result in enhanced capacitance, but a small proportion of wider pores may lead to lower diffusion resistance by facilitating diffusion within narrow pores.

Our view is for establishing a balance between micropores and mesopores, where the mesopores serve as channels for the ion transport. In addition, size of mesopores smaller than 5 nm, larger than the size of two solvated ions, appears to be the upper limit for mesopores.

The disclosed invention is designed to tune the pore size distribution (hierarchical structure) of a given carbon based on its electrochemical performance using a given electrolyte, which is accomplished by optimizing the activation process steps and processes, as one example of improved aspects of the present disclosure.

On the electrolyte side, the type of electrolyte strongly influences the electrochemical performance of ACs. Organic electrolytes are most commonly used in commercial SCs for their high energy density resulted from their large stability window of 2.5-3 V. Nevertheless, organic electrolytes are moisture sensitive and require purification and fabrication processes in a strictly controlled environment which increases the manufacturing cost of SCs. Inexpensive aqueous electrolytes are inherently safer in terms of flammability and toxicity. In addition, aqueous electrolytes typically give higher capacitance though not necessarily better rate capability and ionic conductivity than organic electrolyte, but their relatively narrow electrochemical stability window limits their energy density.

The operating voltage is relatively low ~1 V in the aqueous electrolytes that are acid and alkaline solutions, while it is higher for neutral electrolytes for example 1.6-1.8 V for Na$_2$SO$_4$.

There was recently a newly developed aqueous/organic hybrid electrolytes for SCs with moisture-tolerant and non-flammable properties similar to aqueous electrolytes. The hybrid electrolyte with an optimal concentration of 5 m (molar) LiTFSI in water/acetonitrile yielded a SC with the stability window of 2.2 V. Additionally, the same co-solvent strategy on the low-cost sodium perchlorate salt to obtain a new high-concentration hybrid electrolyte (8 m salt in water/acetonitrile) for 2.5 V SCs. The combination of high concentration of the salt along with acetonitrile addition helped reaching a wider stability window than aqueous electrolytes originating from the lack of free water molecules in the hybrid electrolyte. However, the specific capacity of currently demonstrated AC-based SC was still lower than previous known SC's using organic electrolyte which could be attributed to the mismatch between the electrode and electrolyte.

Another important benefit of the disclosed system and method, in the design of SCs, is the adaptability of electrode with the electrolyte. One aspect of the disclosed invention is to maximize the accessible surface area of ACs (hierarchical structure) by matching the porosity with the electrolyte ('ion-pore matching') to increase the energy stored by the SC. There is yet a trade-off between the capacitance and rate capability. For example, an exclusively microporous carbon promise high capacitance in organic electrolytes but too narrow micropores lead to a higher diffusion resistance giving rise to a poor rate performance because of larger size of ions and solvated ions. Accommodating mesopores helps with the rapid transport of ions to the micropores, but an excessive amount of large pores results in a carbon with low packing density which leads to an inferior volumetric capacitance. Moreover, electrodes built from ACs with a low density require an excessive use of electrolyte which results in a heavier SC cell and overall low gravimetric capacitance. Thus, there is a narrow window of balance between micropores and mesopores giving best capacitive performance, which should be defined experimentally for the chosen electrolyte, where this disclosed feature/process/system/method, of ion-pore matching identification, is one exemplary aspect and benefit of the disclosed invention.

A good wettability between the electrode and the electrolyte is another important criterion for their adaptability. Wettability strongly affects the infiltration of the electrolyte into the electrode and thus the accessible surface area. Since ACs are commonly hydrophobic, the carbon micropores cannot be fully wetted in the aqueous electrolyte. This indicates that aqueous electrolytes are unfit for hydrophobic carbons, which is exaggerated especially for thick electrodes, while organic electrolytes have typically shown good affinity toward them. One way to enhance the affinity between porous carbon and aqueous electrolytes is introducing nitrogen or oxygen containing functional groups to ACs. However, the excessive heteroatom doping induces low electronic conductivity and structural failure. In the disclosed invention hydrophobic ACs can also be wetted by the hybrid electrolytes, owing to the presence of acetonitrile as co-solvent. The penetration of acetonitrile in the carbon micropores was shown using the nuclear magnetic resonance spectroscopy (NMR), indicating the affinity between the micropores and acetonitrile.

The mismatch between the electrode and electrolyte is a main reason for the unsatisfactory energy density of AC-based SCs originating from either limited accessibility of ions to carbon pores (ion-pore mismatch, wetting issue) or a low packing density caused by excessive porosity. It should be noted that it is an exemplified embodiment of the invention to construct, by means of the above-mentioned criteria, to produce a desired activated carbon paired to an electrolyte, to produce and achieve a supercapacitor with superior performance.

The disclosed invention herein explains a process to adapt the porosity of a microporous carbon to the co-solvent electrolyte in order to be an effective solution to maximize the surface area accessible to electrolyte ions. The low cost and smaller ion size of sodium perchlorate compared to typical salts used in organic electrolytes make it beneficial, and a disclosed beneficial embodiment of the invention, and a desirable salt for the hybrid electrolyte. As for the AC porosity, a microporous carbon with a $S_{BET}$ higher than 1200 m$^2$/g is the preferred choice since the micropores play the critical role in double layer charge storage. Aqueous electrolytes may pass the ion-pore matching test for such AC due to smaller size of ions, but they have low stability window and poor wettability toward ACs. Organic and hybrid electrolytes both fulfill the wettability and stability window (2.7 V vs 2.5 V) requirements, but the smaller size of ions and solvated ions in the hybrid electrolyte make for a superior and improved device. Wherein in the disclosed invention, and when using the same porous carbon, the hybrid electrolyte results in a higher capacitance for its smaller ions have better accessibility to the micropores. For instance, a portion of micropores are too small for the ions of the organic electrolyte to enter while these pores match the size of ions in the hybrid electrolyte, which is an exemplary disclosed improvement of the invention. In addition, the hybrid electrolyte shows better rate capability which is attributed to the lower diffusion resistance of smaller ions and their solvation shell, which is another exemplary disclosed improvement of the invention. In other words, the hybrid electrolyte with smaller size of ions allows using a porous carbon with smaller pores than needed for a carbon adapted to organic electrolyte, which increases energy density and performance, and are exemplary described benefits of the disclosed invention. This additionally helps by tuning the porosity of a carbon without excessive increase of its packing density, which is another embodiment and disclosed benefit of the invention.

One preferred embodiment of the invention describes a microporous coal-derived carbon, as the AC carbon source, by fine-tuning the pore size distribution hierarchical structure based on the KOH saturation and activation temperature to attain the best electrochemical performance using the hybrid electrolyte. The as-prepared AC, denoted TC800 (thermal coal activated at an activation temperature of 800° C.), possesses a hierarchical pore structure with micropores up to 2 nm and a proportion of mesopores in the range 2-6 nm.

Experimentation

Described herein and below are embodiments of the present disclosure, it should be noted experiments and experimental discussion and analysis describes the invention generally at lab scale and wherein the disclosed process steps, material preparation, device construction and compositions, may be, and are intended for adaptation to larger scaled commercial processes and processing. The following sections of the disclosure provides steps, actions, compositions, testing results, and theory that are in no way meant to limit the scope of the invention. Those skilled in the art will understand that with the use of conventional or more modern manufacturing, material processing, and energy storage construction methods, may result, or may be utilized, and offer benefits for the disclosed processes, systems, methods, and compositions. These process and compositions may be implemented and exploited in order to realize the benefit of this disclosure, or as additional embodiments of the disclosed invention.

Activation of Thermal Coal (TC)

The raw thermal coal (TC; sub-bituminous coal, Dodds Coal Mine, Alberta, Canada) was manually crushed and ground by pestle and mortar. TC powder was then sieved (No. 140, 106 μm opening) followed by ball milling (Pulverisette 7, Fritsch GmbH) at 350 rpm for 30 minutes using 2 mm zirconium oxide balls to ensure a fine particle size (d50<20 μm). The raw TC was soaked in KOH aqueous solution (mass ratio of KOH to TC was 2:1) for 12 h and dried in an oven at 60° C. TC/KOH was then placed in a stainless-steel container followed by heating in the tube furnace (Lindberg/Blue M™ Mini-Mite™) under nitrogen flow. The sample was heated with a ramping rate of 10° C. min$^{-1}$ and was held at the activation temperature (600, 700 or 800° C.) for 2 h. The as-prepared activated carbons were then soaked in 4 M HCl solution for 8 h, copiously washed with distilled water and dried in an oven at 60° C. overnight. The final products were denoted at TC600, TC700 and TC800 according to the activation temperature.

Structural Characterizations

The morphology of the samples was obtained using a scanning electron microscopy (SEM; Tescan Mira 3 XMU)

and the elemental compositions were collected using energy dispersive spectrometer (EDS; X-Max detector, Oxford Instruments). X-ray diffraction (XRD; Bruker D8-Advance X-ray diffractometer) spectroscopy was employed to examine the crystalline structure of raw TC and ACs (TC600, TC700 and TC800). To obtain the porosity properties of the ACs, the nitrogen adsorption/desorption at 77 K were measured using Quantachrome Instruments. The apparent surface area was obtained using the Brunauer-Emmett-Teller (BET) method.

Electrochemical Characterization

Electrodes that were prepared are examples of exemplified preferred embodiments of the invention, they were prepared by mixing 85 wt % ACs with 10 wt % of polytetrafluoroethylene (PTFE; 60 wt % dispersion in water, MTI) and 5% acetylene black (AB; MTI), and a few drops of isopropanol. The paste was roll-pressed into a thin film, which was punched into round disks with a diameter of 1.27 cm. The electrodes were manually pressed onto titanium woven mesh of the same diameter and dried in the oven at 55° C. for 12 h. Two types of ACs were used to build electrodes, i.e. TC-based (TC600, TC700 and TC800) and a commercial AC denoted as AC30 (ASAC30, AdvEn Industries Inc.). The areal mass loading of electrodes used for porosity and electrolyte studies was in the range of 3.6-4.5 mg/cm2.

All the electrochemical tests were carried out by assembling SCs in a symmetric two-electrode system (CR2032 coin cell). In brief, two identical electrodes were sandwiched between two stainless-steel current collectors and separated by one separator (Whatman Grade 1 for aqueous and hybrid electrolyte, and glass fiber for organic electrolyte). The volume of electrolyte used in all cells was ~80 µL.

It was found, and also comprise certain exemplified embodiments, that optimized salt/water/acetonitrile molar ratio of 1/1.5/2.4 for the hybrid electrolyte, which gives 8 m (molality, mol kg$^{-1}$) solution. To ensure the stability of the electrolyte at room temperature, and which are also alternative preferred embodiments, we used a similar molar ratio of 1/1.5/2.5, i.e. 7.7 m solution of sodium perchlorate ($NaClO_4$; Sigma-Aldrich) in water/acetonitrile. 1 M $Na_2SO_4$ (Sigma-Aldrich) and 1 M tetraethylammonium tetrafluoroborate ($Et_4NBF_4$; Sigma-Aldrich) in PC were used as the most common aqueous electrolyte and organic electrolyte, respectively. SCs with the organic electrolyte were assembled in an Argon-filled glovebox.

The electrochemical tests were performed using an electrochemical workstation (SP-150, BioLogic). The galvanostatic charge/discharge (GCD) measurements were carried out at a constant current ranging from 1 to 700 mA depending on the rate capability of individual samples. The minimum threshold depends on the ionic conductivity and viscosity of the electrolyte and it can be defined as the current for which the columbic efficiency starts to decrease. The minimum GCD current for the aqueous, organic and hybrid electrolyte were determined as 1, 2, and 3-5 mA, respectively. The electrochemical impedance spectroscopy (EIS) tests were recorded at frequencies ranging from 100 kHz to 0.01 Hz with an AC amplitude of 10 mV and zero DC amplitude. The cyclic voltammetry (CV) curves were performed at scan rates ranging from 20 to 600 mV/s. The GCD cycling tests were carried out on a battery tester (BTS-4008-5V-50 mA, Neware) and an electrochemical workstation (VMP, BioLogic).

The capacitive properties of SCs were calculated based on GCD curves. The cell capacitance was determined using the formula $C=I\Delta t/(\Delta V-V_{IR})$, where I is the discharge current, $\Delta t$ is the discharge time, $\Delta V$ represents the potential window and $V_{IR}$ is the potential drop at the beginning of the discharge curve. The energy (E) and power (P) were estimated by $E=0.5C(\Delta V-V_{IR})^2=0.5 I(\Delta V-V_{IR})\Delta t$ and $P=E/\Delta t$, respectively. The equivalent series resistance (ESR) of a SC was calculated from $ESR=V_{IR}/I$. To obtain gravimetric specific capacitance, energy and power density, they were divided by m, where m is the total weight of both electrodes (including the ACs, binder and conductive additive). Areal specific capacitance, energy and power density were determined by dividing them by A, where A is the geometric area of the electrodes (1.266 cm$^2$). Current density is also defined as I/m or I/A. The current in the CV curves was normalized to capacitance using $C_{cv}=I/(mv)$, where v is the potential scan rate.

BRIEF DESCRIPTION OF DRAWINGS

The invention will be described by reference to the detailed description of exemplary embodiments and to the drawings thereof in which:

FIG. 2 Is a block diagram comprising the functional steps of the disclosed system and method.

FIG. 3 Is a diagram showing the layers and internals of a supercapacitor of the disclosed system and method.

FIG. 4 Is a diagram showing the perforated columns of the internals of a supercapacitor of the disclosed system and method.

FIG. 5 Is a diagram showing a single perforated sheet with two leads of the internals of a supercapacitor of the disclosed system and method.

FIG. 6 Is a diagram showing a single perforated sheet with a plurality of leads on opposing sides of the internals of a supercapacitor of the disclosed system and method.

FIG. 7 Is a diagram showing the outer housing of an exemplified embodiment of a supercapacitor of the disclosed system and method.

FIG. 8 Is a diagram showing the outer housing cover of an exemplified embodiment of a supercapacitor of the disclosed system and method.

FIG. 9 Is a diagram showing the outer housing fasteners of an exemplified embodiment of a supercapacitor of the disclosed system and method.

FIG. 10 Is a diagram showing the outer housing seal, gasket, of an exemplified embodiment of a supercapacitor of the disclosed system and method.

FIG. 12 Is a diagram showing an exemplified embodiment of a cylindrical supercapacitor with perforated internal layers of the disclosed system and method.

FIG. 13 Is a diagram showing an exemplified embodiment of a cylindrical supercapacitor with segmented internal sections of the disclosed system and method.

FIG. 14 Is a diagram showing an exemplified embodiment of a layered and/or cubic supercapacitor with segmented internal sections of the disclosed system and method.

FIG. 31(a) depicts the preferred hierarchical structure of activated carbon as this disclosed by this system and method, the invention. FIG. 31(b) depicts the hierarchical structure of highly microporous activated carbons.

DETAILED DESCRIPTION

Figure 1:
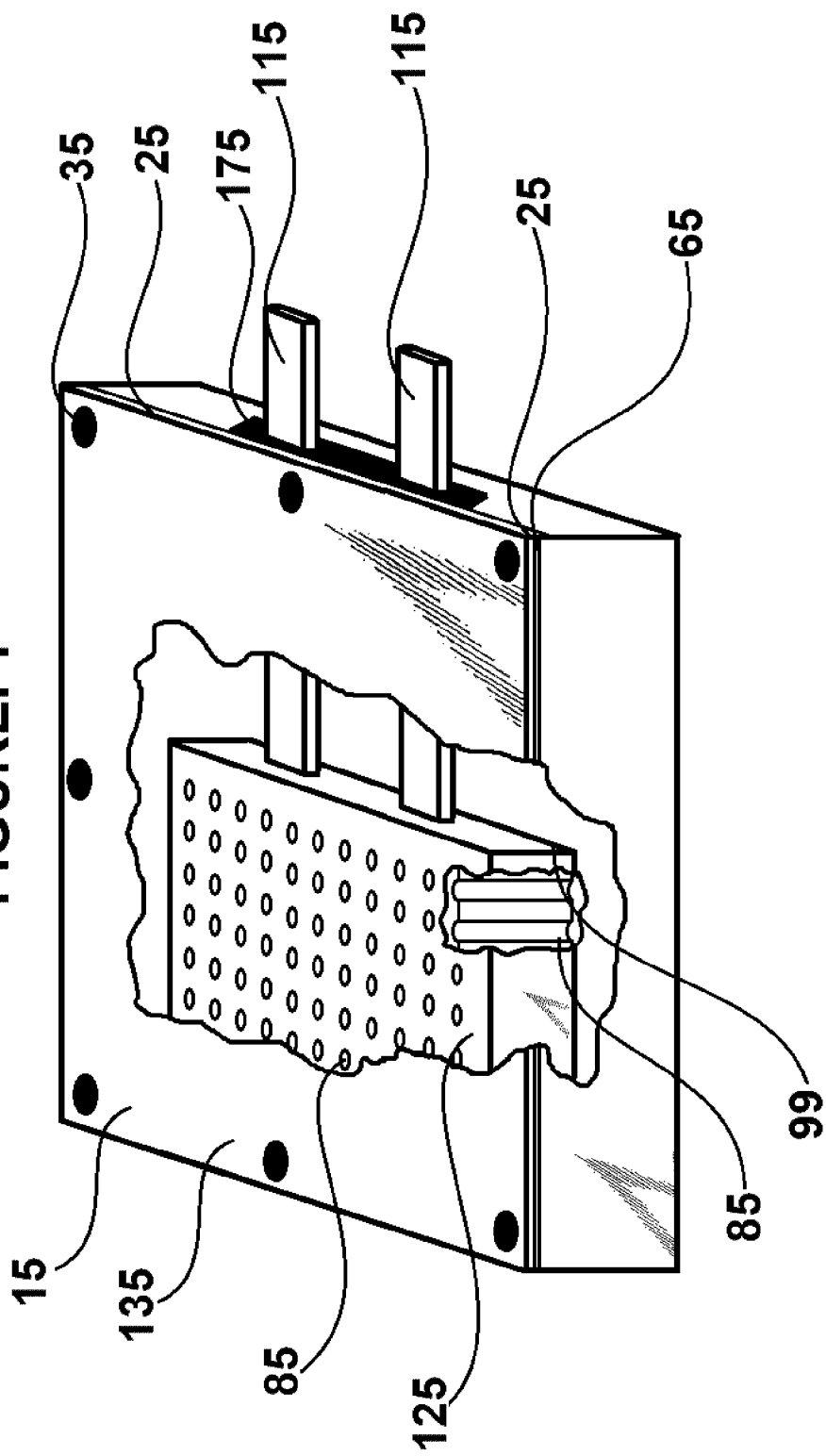
FIG. 1 Is a first embodiment of the disclosed system and method.

This disclosure will enable one skilled in the art to make and use the described invention, it describes several alternate embodiments, adaptations, variations, alternatives, and uses of the disclosure. These and additional embodiments, features, and advantages of the present disclosure will become more apparent to those skilled in the art when taken with reference to the detailed description of this disclosure and in conjunction with the accompanying figures.

Within this specification and claims, the singular forms "a," "an," and "the" may include plural forms unless the context clearly indicates the use of a singular form. Unless clearly indicated otherwise, all technical, scientific, and descriptive terms used herein have the same meaning as their commonly used and forms understood by one with ordinary skill in the art.

Unless specifically indicated, all referenced numbers expressing a reaction condition(s), stoichiometries, concentrations of components, and so forth that have been used in the specification and claims are to be interpreted as being modified or considered in all instances by the term "about." Also, unless specifically indicated to the contrary, the numerical parameters or ranges set forth in the specification and claims are expressed as approximations that may vary depending upon a specific or alternative analytical technique.

Throughout the disclosure the term "macropore" refers to a pore with a diameter above 50 nm. Throughout the disclosure the term "mesopore" refers to a pore with a diameter from about 2 nm to about 50 nm. Throughout the disclosure the term "micropore" refers to a pore with a diameter less than about 2 nm.

For present descriptive purposes, the term "carbon source" is intended to mean a material (whether a feedstock, product, or intermediate) that contains a carbon element, which may be renewable on time scales of days, months, years, decades, centuries, thousands of years, millions of years, or longer time scale.

For present descriptive purposes, the term "reagent" is meant in its broadest sense; a reagent may be a fuel, chemical, material, compound, additive, blend of components, solvent, or other. A reagent is not necessarily a chemical that causes or reacts in a chemical reaction. A reagent may, or may not be, a chemical reactant, which may or may not be consumed in a specific reaction. A reagent which may be a chemical catalyst for a specific reaction. A reagent may cause or be used in adjusting a mechanical, physical, or hydrodynamic element of a material to which the reagent may be a part off.

A carbon source as provided herein would normally contain greater than about half its weight as carbon, where biomass is generally no greater than about 50 percent by weight. Depending on a specific feedstock composition, a carbon source will contain at least 40 percent by weight, at least 45 percent by weight, at least 50 percent by weight, at least 55 percent by weight, at least 60 percent by weight, at least 65 percent by weight, at least 70 percent by weight, at least 75 percent by weight, at least 80 percent by weight, at least 85 percent by weight, at least 90 percent by weight, at least 95 percent by weight, at least 96 percent by weight, at least 97 percent by weight, at least 98 percent by weight, at least 99 percent by weight carbon.

Notwithstanding the foregoing, the term "carbon source" is used herein for practical purposes only and to describe materials that may be processed to produce the systems of the disclosure, in various alternative embodiments. Limitations with respect to specific carbon content, or concentrations or compositions, shall not be implied from use of the term itself but rather only by reference to a particular embodiment(s) and/or equivalents thereof. For example it will be understood that a material having low initial carbon content, and subjected to the disclosed system and method, may produce a carbon source that is highly improved as a carbon source relative to the starting material which may offer a high yielding carbon source, but regardless of a relatively low carbon source starting material with a low purity of carbon, which may include a carbon source that is less than or equal to about 50 percent by weight of carbon. Carbon sources shall also be construed as any feedstock or mixture that contains or may be converted to carbon. Elementally, a carbon source may include carbon, hydrogen, and oxygen. The system and method and device of this disclosure may accommodate a wide range of feedstocks of various types, sizes, and moisture contents.

Carbon sources may include, for example, plant and plant derived material, vegetation, agricultural waste, forestry waste, wood waste, paper waste, animal-derived waste, poultry derived waste, and municipal solid waste, biomass, timber harvesting residues, softwood chips, hardwood chips, tree branches, tree stumps, knots, leaves, bark, sawdust, paper pulp, cellulose, corn, corn stover, wheat straw, rice straw, sugarcane bagasse, switchgrass, *miscanthus*, animal manure, municipal garbage, municipal sewage, commercial waste, grape pumice, almond shells, pecan shells, coconut shells, coffee grounds, grass pellets, hay pellets, wood pellets, cardboard, paper, carbohydrates, plastic, and cloth, carbon containing feedstocks other than biomass, such as fossil fuels, coal, petroleum coke, or any mixtures of biomass and fossil fuels such as biomass and coal blends. In exemplified embodiments, a carbon source feedstock is, or includes, coal, oil shale, crude oil, asphalt, or solids from crude oil processing such as petroleum coke. Carbon sources may include waste tires, recycled plastics, recycled paper, and other waste or recycled materials.

FIG. 1 Is an illustration of first embodiment of the disclosed system and method it illustrates the components required to allow the serviceability of electrostatic storage devices (supercapacitors) 135, including possibly made from low cost abundant materials such as thermal coal, petroleum coke, biomass. Traditionally capacitors are designed to be disposable and not serviceable, this is due to several factors including their typically smaller physical size, the number of supercapacitors used in a single device or unit, and the uneconomical cost of servicing these devices. With the advent of larger supercapacitor 135 based systems for grid scale energy storage the ability to service a supercapacitor 135, with the intent to extend their lifespan and operational performance, is now providing to be a viable and economical alternative to disposal, this can be accomplished utilizing the disclosed system and method. In addition, the use of supercapacitors in grid scale applications allows the use of lower cost, potentially less energy dense materials for construction, not requiring the use of premium materials in order to maximize energy density and compete with battery technologies for their physical size.

The first embodiment utilizes a resealable container 15, meaning the container 15 can be opened and closed at the discretion of the operator. This provides for a supercapacitor 135 to be opened and then resealed after servicing has been completed. This may be accomplished in several ways with the described method involving a main supercapacitor housing or container 15, a gasket or seal 65, a separable cover 25, and fasteners 35, and the internal contents 99 of the supercapacitor 135 suitable for receiving servicing.

Additionally, different embodiments may utilize non-resealable containers 15 where the internal components 99 may be removed and deposited into an additional separate container 15. The supercapacitor 135 utilizes layers of electrodes and separators that are perforated 99. These perforations are to allow, when servicing the supercapacitor 135, the electrolyte (not shown) to be injected and saturate throughout the supercapacitors 135 internal contents 99. These perforations remove the challenges with respect to ensuring a uniform and fully saturated electrodes and conductive material comprising the internal supercapacitor contents 99.

The ingredients of a supercapacitor 135, and the natural characteristics of storing a charge as an electrostatic field provide for less degradation of the elements of a supercapacitor 135. Specifically, activated carbon from a low-cost carbon source (not shown) is a very stable element that is frequently used and is robust offering an extremely long operational lifespan. Additionally, the metallic components of each supercapacitor 135 cell are generally formed of the same metal in order to unsure the charge is stored purely electrostatically, and to prevent the cell from operating galvanically. A galvanic cell causes the metal elements storing a charge to degrade over time, by ensuring that a galvanic cell is not created the main breakdown of the metal used for the electrodes is caused by the corrosion/degradation of an electrolyte (not shown). By ensuring a cell design that does not corrode, or minimally corrodes the electrodes, the cell is stable and can have extremely long operational lifespans. This minimal degradation can be accomplished by using higher grade conductive materials that offer longer lifespan such as stainless steel, chromium, graphene as a few nonlimiting examples.

This design and operating methodology allow supercapacitors 135 advantages that traditional batteries and currently available supercapacitors 135 are not able to exploit. This includes the extension of the operational lifespan of each cell, by ensuring that the components of the cell that do require servicing are able to be serviced. This is accomplished by providing access to these components, ensuring the proper identification of failing or faulty components, and ensuring the uniform and proper servicing of these components. Additionally, the use of low-cost abundant carbon sources allows the reduction in cost of devices, a critical factor for commercial success. Additionally, using widely available carbon sources allows the ability to rapidly scale the technology, again a critical factor for success.

A first exemplary method of service is to administer electrolyte, such as a state-of-the-art cosolvent in salt electrolyte comprising the ingredients of Sodium Perchlorate with the general formula of NaClO$_4$, acetonitrile with the general formula of CH$_3$CN

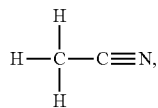

and water. The electrolyte in some embodiments has a molar ratio of approximately 7-8, consisting of 1-part sodium perchlorate to 1.5 parts water to 2.4 parts acetonitrile, but may also include common salts, lithium bis(trifluoromethanesulfonyl) imide (LiTFSI), Sodium Chloride, Ammonium Dichlorate, Magnesium Sulfate, Sodium Bicarbonate. The electrolyte fluid in variations comprises either a cosolvent in-salt electrolyte, or an aqueous electrolyte, or an organic electrolyte, or an ionic fluid. The electrolyte in the first embodiment is administered by perforating 85 the internal layers 99 of the device, then aligning these layers to allow an injector (not shown) to inject electrolyte (not shown) into these columns saturating the conductive elements 99 that saturates throughout the device.

The method or shape of perforation 85 is not necessarily critical, these could include any number of different holes, or slit, or styles, or shapes and/or combinations. Perforation 85 could be preformed on each sheet prior to assembly, or conversely perforation 85 could be preformed on a completed and assembled serviceable device 135 prior to encapsulation. Perforation 85 could be preformed on the separator that is separating the anode and cathode or depending on the desired outcome the separator could be unperforated.

FIG. 1 provides for a serviceable electrostatic storage device 135, the exemplified embodiment being supercapacitor 135 by use of a container 15 a container lid or separable cover 25, fasteners 35, a lead insulator and holder 175, leads 115, and a gasket 65 or seal 65. The supercapacitor section 99, which may include the supercapacitor 135 design of a double layer of electrolytic capacitor 125, which contains perforations 85. The operation of servicing the supercapacitor is done by removing the fasteners 35, the container lid 25, to access the capacitor section 99, then by injecting an electrolyte into the perforations 85 of the double layer electrolytic capacitor 125 you can extend the life of the supercapacitor 135 by providing a new stable electrolyte in essence refreshing the supercapacitor 135. During my work and experimentation with supercapacitors 135, I have determined there are two main causes to a supercapacitor's 135 premature failure this includes the electrolyte (not shown) and the metal that comprises the electrodes 115. Generally, the electrode separators, the container 15, and the carbon material (not shown) that comprise the rest of the cell can be stable for almost indefinite periods of time. With the ability to service the components of the supercapacitor 135 that break down, or wear down over time, you can create a device that provides benefits for extended periods of time, potentially even multigenerational time periods. And though in this exemplary embodiment a double layer electrolytic capacitor 125 is referenced there exists opportunities for many other types of capacitors 135 including hybrid capacitors (not shown), to utilize the benefits of the disclosed system and method to provide robust and extended lifespans of these devices. Though a supercapacitor 135 for charging is referenced possible alternate embodiments are additionally referenced herein and are explained and may be accomplished with reference to the section "Storage devices", also referenced possible alternate embodiments are additionally referenced herein and are explained and may be accomplished with reference to the section "Implementations" as well as the section "Applications".

FIG. 2 Is a block diagram comprising the functional steps of the disclosed system and method. This includes identifying a supercapacitor 135 comprised of a low-cost carbon source and co-solvent in salt electrolyte, or other serviceable device 135, testing the device 205, to determine if it needs servicing 225, and depending upon if the device needs service removing it from service 235, or returning it to service 215. If the device has been removed from service 235, the steps of servicing the device require opening the device 245, accessing the device's internal contents 255, servicing the device 265, which may include servicing the device's electrolyte 275, then after servicing, closing the device 285 and returning the device to service 215. Serviceable devices 135 could include a variety of different electrostatic storage devices or accumulators—supercapacitors 135, solid state capacitors or hybrids (not shown) are a few nonlimiting examples of embodiments. Testing the device 205 could also be accomplished in a number of ways including capacity testing, voltage testing, timing-based testing, thermal testing, fade or stability testing, current absorption testing and various other tests that could confirm if the serviceable device 135 is operating to the desired characteristics and operational performance. Once a serviceable device 135 needing service is identified 225 it will need to be removed from service 235 in order to be serviced. At this point typically the device 135 will be opened for servicing 245 but servicing may be accomplished by not opening the device instead having the servicing systems and components required to service the device 265 built directly into the serviceable device 135. Typically, supercapacitors 135 have very long lifespans, they are said to have the ability to last one to 2 million cycles, this in conjunction with their typically low storage capacity have rendered them noncommercially viable for servicing. With the advent of much larger systems and the development of energy storage solutions that have supercapacitors 135 with the capacity of kilowatt hours, the benefit of being able to offer a serviceable device 135 and extend operational lifespans and reducing construction costs becomes apparent. Through investigation I have determined that there are specific structures and materials within the device that seem to fail causing the device to fail prematurely. Additionally, I have identified applications that benefit from the use of low-cost widely available materials lowering the cost per unit of energy storage for these devices, these may include grid storage, electric vehicles, electronics and electronic and electrical devices.

Specifically, the most frequent reason for a supercapacitor 135 failure is the instability of the electrolyte (not shown). Basically, over time the electrolyte, that in some embodiments is formed with soluble materials (not shown) within a solution (not shown) which acts as the ion conductive agent, begins to lose its stability and separates, this may include gassing or evaporation, and may also include the separation of solids within the solution. Once the electrolyte becomes unstable or inadequate this is the typical point in which a supercapacitor 135 will fail or cease to operate in an optimal way. By being able to service the electrolyte 275 you offer the supercapacitor 135 the ability to extend its operational lifespan and performance. This is greatly beneficial especially considering that other forms of energy storage, especially for grid scale, generally do not have the ability to offer servicing and extend their operational lifespan. An example of this would be lithium-ion where after typically 2000 to 8000 cycles the entire lithium-ion storage solution will need to be replaced. By offering extended lifespans provides both economic and environmental benefits, this is due to allowing our civilization to reach the quantity of energy storage required to fully transition from hydrocarbons, additionally the economic benefit of increasing the operational lifespan of supercapacitors 135 as serviceable devices 135 becomes obvious in that you do not need to replace serviceable storage devices 135 as often. Though a supercapacitor 135 for charging is referenced, possible alternate embodiments are additionally referenced herein and are explained and may be accomplished with reference to the section "Storage devices", also referenced possible alternate embodiments are additionally referenced herein and are explained and may be accomplished with reference to the section "Implementations" as well as the section "Applications".

FIG. 3 Is a diagram showing the layers and internals of a supercapacitor 135 combined to clearly show the perforation columns 85 of the disclosed system and method. The typical design of a supercapacitor with larger capacitances is traditionally in a rolled cylindrical design. The layers of the supercapacitor 135 are wound together during construction, this provides for a mainstream manufacturing process, but makes servicing the electrolyte (not shown) more difficult. Though throughout this document I explain methods to service the internal areas of a capacitor by means of perforations 85, or separations, this is not a requirement, and it should be noted the electrolyte can be serviced through traditional injection/separation methods. The double layer electrolytic capacitor 125 is comprised of material such as conductors 45, separations/separators 95, leads 115, perforations 85, and a high surface area low cost compound (not shown). These materials are generally constructed where the high surface area low cost compound (not shown) is administered/applied to a conductor 45 with a separator 95 layer, and then another high surface area compound (not shown) administered to a separate conductor 45, and then saturated with an electrolyte such as a co-solvent in salt electrolyte (not shown) and stacked, wound, or layered. This design is beneficial when utilized with the disclose system and method, specifically it becomes very advantageous to stack the layers of the double layer electrolytic capacitor 125 in order to allow, during servicing, a simple process, by having injectors able to saturate all of the layers uniformly. The layered and perforated 85 design in FIG. 3 allows for effective servicing of the electrolyte (not shown) and provides a system that can service many separate supercapacitors cells congruently. In order for the disclosed system and method to provide a great deal of economic benefit the ability to simplify servicing becomes an important characteristic allowing for the servicing of many cells 135 and systems.

FIG. 4 Is a diagram showing the perforated columns of the internals of a supercapacitor of the disclosed system and method. This figure is meant to demonstrate the columns of perforations 85 in this nonlimiting example for the double layer electrolytic capacitor 125. In this figure the conductor 45 the separators 95 are perforated 85 in uniform perforation columns 85, this allows for when servicing the electrolyte (not shown) to be injected at uniform distances through the whole double layer electrolytic capacitor 125. The leads 115 are separated so as not to bridge, by an insulating separator 75. The benefit of perforations 85 is that on larger supercapacitors 135, or even supercapacitors that are of typical commercially available sizes you can inject an electrolyte or flushing agent without having to separate the layers of the supercapacitor. By not having to separate the layers during servicing ensures that less damage occurs to the capacitor for instance the carbon element (not shown) flaking off of the conductive electrode. Additionally, the uniform distribution of perforated columns 85 allows the electrolyte to saturate outwardly ensuring that full saturation of all conductive spaces of the capacitor 135 are reached, this allows optimal performance after servicing.

FIG. 5 Is a diagram showing a single perforated 85 sheet with two leads 115 of the internals of a supercapacitor of the disclosed system and method, though it should be noted a plurality of leads may comprise the anode or cathode including for opposing or perpendicular sides. This includes the conductor 45, the perforations 85, and the leads 115. In order for this perforation design to be most effective when single sheets such as depicted in diagram 5 are assembled, they should be stacked to align the columns so as to let an injector reach into the columns without damaging the capacitor internal materials. And though in this example perforations are circular any number of shapes may be used, distances between perforations may vary depending upon the number of factors including the viscosity of the electrolyte (not shown). In some cases, it may be rightly beneficial to build the perforations 85 directly into the separating material so that the material acts to distribute the electrolyte across the conductive material 45. This could be accomplished by building into the separator's channels with small perforations 85 that act as distribution pathways for the electrolyte (not shown).

FIG. 6 Is a diagram showing a single perforated sheet 85 with four leads of the internals of a supercapacitor of the disclosed system and method coated with a high surface area low cost abundant composite 55, for instance activated carbon derived from coal, petroleum coke, or biomass. This includes the conductor 45, the perforations 85, and the leads 115. Certain designs may benefit from having multiple leads from the electrodes 115 (anode and Cathode) allowing a larger variety of assembly and connection layouts, this includes the final connection scheme for pluralities of individual layers as well as pluralities of assembled supercapacitors, where the leads 115 could be on the same side of a container, opposing sides, or perpendicular sides. This multi-lead design may benefit the performance of the supercapacitor because having multiple opposing or perpendicular leads for both the anode and the cathode (positive and negative terminals and current collectors) could allow for a lower diffusion resistance for electrical charges. This lower diffusion resistance may result because the charges have less distance to migrate within the cell. A non-limiting example of this design would be having a cylindrical supercapacitor that has a positive anode and negative cathode on both the upper and lower portion of the supercapacitor. In this nonlimiting example a positive and negative connection could be made individually to the upper or lower anode and cathode separately, or alternatively could have the positive and negative connections connected to the upper and lower anodes and cathodes at the same time. If both of the anodes and cathodes were connected at the same time to a positive and negative connection for the appropriate polarity leads, this configuration could allow a much lower diffusion resistance for charging or discharging, as well as a supercapacitors operation within an in-series circuit or connection. It should be noted that this multi-lead configuration could benefit all forms of supercapacitors, batteries, and electrical storage devices. A few non-limiting examples of types of batteries and supercapacitors are referenced throughout this document and are incorporated herein to this embodiment by reference.

FIG. 7 Is a diagram showing the outer housing container 15 of an exemplified embodiment of a supercapacitor of the disclosed system and method. It shows the internal section 99, perforations 85 for the fasteners, the lead insulator holder 175 with its own perforations 85.

The specific housing 15 is meant to be an example only though cubic in shape typical commercially available supercapacitors use circular configurations as such configurations of different shapes may be used, where the benefit of the disclosed system and method can still be utilized.

The container 15 may also comprise different locking mechanisms (not shown) so the operator can access the internal contents of the supercapacitor, this may be accomplished with different types of circular locking such as twist on separable lids, locking handles, different types of sealing engagements with the housing 15 as a few non limiting examples. It should be noted that some housings 15 may contain inlets and outlets (not shown) to allow servicing of the electrolyte (not shown) or other various parts while the internal supercapacitor components remain within the casing 15. Additionally, some embodiments may utilize the removal of the internal supercapacitor components for servicing.

The serviceable supercapacitor container 15 may contain flanges, or guides, an interlock design that may involve ribs and/or sliders and/or grooves, as well as other variations of these nonlimiting examples, some of which are not shown. Where the internal supercapacitor components may act as a cartridge for removal, servicing and reinstallation in the housing 15. It may be advantageous to use an internal containment mechanism such as a plastic bag or vacuum bag (not shown), an example would be a polycarbonate bag in order to seal the supercapacitor materials. This may be accomplished by putting the supercapacitor materials into a bag and evacuating the air to pull a vacuum, and then placing this sealed bag into a container 15. This operation would allow the removal of the internal components of the supercapacitor without the need to have a vacuum within the actual serviceable container unit 15. This would also allow the outer container 15 to be constructed with different materials adding flexibility to the design, for instance having thinner sidewalls with a reinforced base, or using less expensive materials such as steel, molded plastic or composite.

In one embodiment, the shape of the serviceable container 15 is a parallelogram having a first pair of opposite straight parallel sides, and a second pair of opposite, straight, parallel sides, with a square shape depicted is particularly suitable. Though as stated any number of shapes and variations may be used.

FIG. 8 Is a diagram showing a cover lid 25 of the outer housing (FIG. 7) of an exemplified embodiment of a supercapacitor of the disclosed system and method that shows perforations 85 for the fasteners (see FIG. 9 below, for example). Though in this example perforations 85 are used the separable lid 25 may be constructed to be affixed to the container with for instance a hinge and or a locking mechanism or arm (not shown). The separable lid 25 could also be form fit grooves or channels to slide into position. The separable lid 25 could also be circular with grooves or channels and operate as a screw on type lid. The separable lid 25 could be recessed where it is pressed into place with a seal and pins or inserts could be used to hold it in place. There are a number of variations that do not depart from the scope and intention of the disclosed system and method which is to allow the container to have a separable or removable lid 25 that gives access to the internal contents of the capacitor for servicing.

FIG. 9 Is a diagram showing the outer housing fasteners 35 of an exemplified embodiment of a supercapacitor of the disclosed system and method, including the bolts 185 and nuts 195. Though in this example bolts 185 and nuts 195 are used as examples of the mechanisms used to create a resealable container a number of different types of mechanisms could be used including locking arms, a screw top, a permanent or non-permanent weld, stackable cartridges, interlocking frame, grooves or channels, crimp, clamp or press seal, including riveting, vacuum seal, as a few non-limiting examples.

FIG. 10 Is a diagram showing the outer housing seal 65, gasket 65, of an exemplified embodiment of a supercapacitor of the disclosed system and method including perforations 85. A variety of different types of seals may be utilized for the engagement between the container housing and the separable lid-. In the described invention, a radial seal 65 is depicted, though an axial seal (not shown) may be used. The seal is meant to provide the container with an airtight seal 65 ensuring stable operation and long-life expectancy of the electrolyte (not shown). It should be noted that a radial seal 65 having an inwardly directed configuration may also be used, which may also be a permanent or replaceable seal 65 that may be replaced when servicing. An example of a permanent seal may be a welded seal where the container itself is physically welded as a single unit. Or a material that acts as a permanent weld such as an injectable sealant, as a few nonlimiting examples.

Though many types of seal arrangements, and variations of them, can be utilized with assemblies according to the present disclosure.

Figure 11:
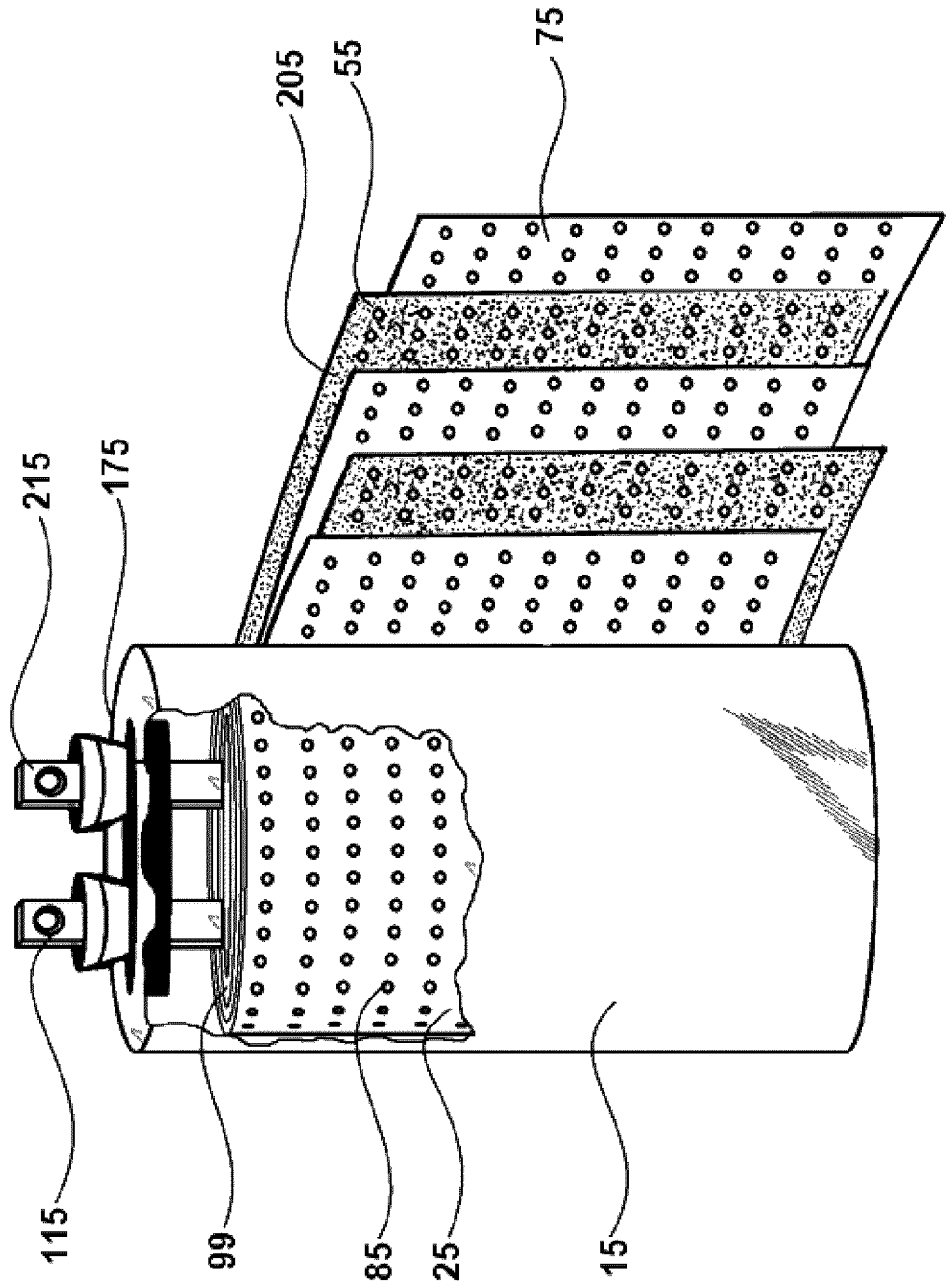
FIG. 11 Is a diagram showing an exemplified embodiment of a cylindrical supercapacitor with perforated internal layers, co-solvent in salt electrolyte, high surface area low-cost widely available derived composite material of the disclosed system and method.

FIG. 11 Is a diagram showing an exemplified embodiment of a cylindrical double layer electrolytic capacitor section as a serviceable device with perforated 85 wound internal layers and separators 75 of the disclosed system and method. This includes the cylindrical container 15, the lead insulator, and holder 175, the leads 115 which may be any plurality including multiple output leads and/or electrical connections on opposing or perpendicular sides, perforations 85, and electrical connectors 215. FIG. 11 is meant to demonstrate the added improvements to be serviceable and including a cosolvent-in-salt electrolyte 205, and a high surface are low-cost composite 55. In this particular case, the cylindrical container 15 is a complete unit that may have been permanently welded or fixed, for example. In this particular example, the service would require cutting into and potentially extracting the internal contents of the double layer electrolytic capacitor 125. Though many different embodiments could incorporate a screw top, a removable lid, or any other form of press, seal, crimp, or lock lids, or built in features allowing service, some of which are not shown. Though a supercapacitor 135 for charging is referenced, possible alternate embodiments are additionally referenced herein and are explained and may be accomplished with reference to the section "Storage devices", also referenced possible alternate embodiments are additionally referenced herein and are explained and may be accomplished with reference to the section "Implementations" as well as the section "Applications".

FIG. 12 is a diagram showing an exemplified embodiment of a cylindrical double layer electrolytic capacitor 125 as a serviceable device with perforated 85 wound internal layers and separators 75 of the disclosed system and method. This includes the cylindrical container 15, the lead insulator and holder 175 and the leads 115 which may be any plurality including multiple output leads and/or electrical connections on opposing or perpendicular sides. FIG. 12 is meant to demonstrate the added improvements to be serviceable. In this particular case, the cylindrical housing 15 is a complete unit that may have been permanently welded or fixed. In this particular example, the service would require cutting into and potentially extracting the internal contents of the double layer electrolytic capacitor 125. Though many different embodiments could incorporate a screw top, a removable lid, or any other form of press, seal, crimp, or lock lids, or built in features allowing service, some of which are not shown. Though a supercapacitor 135 for charging is referenced, possible alternate embodiments are additionally referenced herein and are explained and may be accomplished with reference to the section "Storage devices", also referenced possible alternate embodiments are additionally referenced herein and are explained and may be accomplished with reference to the section "Implementations" as well as the section "Applications".

FIG. 13 Is a diagram showing an exemplified embodiment of a cylindrical double layer electrolytic capacitor 125 with segmented internal sections 95 of the disclosed system and method. This includes the conductors 45 with separations 95, the container 15 and container lid 25, it should be noted that this is a rolled capacitor, that also has the lead insulator holder 175 and leads 115 and the top of the supercapacitor 135 though common arrangements could include pluralities of leads 115 on opposing sides or perpendicular arrangements. FIG. 13 is meant to demonstrate a rolled supercapacitor 125 with the added improvements to be serviceable and using widely available low-cost materials for construction. In this particular case the cylindrical container housing 15 is a complete unit that may have been permanently welded or fixed. In this particular example the service would require cutting into and potentially extracting the internal contents of the double layer electrolytic capacitor 125. Though many different embodiments could incorporate a screw top, a removable lid, or any other form of press, seal, crimp, or lock lids, or built in features allowing service, some of which are not shown. Though a supercapacitor 135 for charging is referenced possible alternate embodiments are additionally referenced herein and are explained and may be accomplished with reference to the section "Storage devices", also referenced possible alternate embodiments are additionally referenced herein and are explained and may be accomplished with reference to the section "Implementations" as well as the section "Applications".

FIG. 14 Is a diagram showing an exemplified embodiment of a layered and/or cubic supercapacitor 135 with segmented internal supercapacitor sections 95 of the disclosed system and method. This particular design has its container 15 lead insulator and holder 175 leads 115, and the internal supercapacitors are separated with separations 95. It should be noted that this is a cubic supercapacitor, that also has the lead insulator holder 175 and leads 115 and the side of the supercapacitor though common arrangements could include leads on opposing sides or perpendicular arrangements. FIG. 14 is meant to demonstrate supercapacitors with the added improvements to be serviceable and using widely available low-cost materials for construction, and wherein the electrolyte being a co-solvent in salt offers improved safety over organic electrolytes that tend to be reactive and potentially toxic. In this particular case, the cubic container 15 is a complete unit that may have been permanently welded or fixed. In this particular example, the service would require cutting into and potentially extracting the internal contents of the double layer electrolytic capacitor 125. Though many different embodiments could incorporate a screw top, a removable lid, or any other form of press, seal, crimp, or lock lids, or built in features allowing service, some of which are not shown.

Though a supercapacitor for charging is referenced possible alternate embodiments are additionally referenced herein and are explained and may be accomplished with reference to the section "Storage devices", also referenced possible alternate embodiments are additionally referenced herein and are explained and may be accomplished with reference to the section "Implementations" as well as the section "Applications".

Applications

This system is described with reference to exemplary embodiments though in some embodiments the method involved herein may utilize different types of electrical accumulators, and/or supercapacitors, referenced as possible embodiments of the disclosed invention of the following non-limiting examples, which may be beneficial for use with power generation, storage, regulating methods and systems and/or energy recovery methods and systems with supply current such as AC currents and/or DC currents, photovoltaic, solar, wind, wind turbines, wave or tidal generators, piezoelectric, thermoelectric, ambient, RF, fuel cell, and electrochemical, existing induction sources such as wind turbines, hydroelectric, geothermal, coal, natural gas, nuclear, wave/tidal energy, liquid gas such as oxygen and other pressure based systems, recovery systems such as regenerative breaking, regenerative turbine, momentum based energy recovery, pressure based energy recovery, temperature based energy recover, motion based energy recovery, constriction and/or expansion based energy recovery, electrical discharge/build-up energy recovery including but not limited to static charge buildup and/or inductive buildup and/or capacitive buildup and/or potential difference a non-limiting example being electromagnetic diffusion. The most notable applications being energy storage systems, regenerative braking, recovery systems, solar or wind generation, or for energy generation and/or distribution systems.

Applications and systems for the use of this technology is to expand the useful operation of devices by means of having serviceable low-cost electrical accumulator(s) and/or electrostatic storage device(s) and are referenced as possible embodiments of the disclosed invention of the following non-limiting examples of; transportation, this includes vehicles and transportation or devices, air transportation or devices, sea transportation or devices, space transportation or devices plane turbines, trains, sky trains, bullet trains, maglev trains, machinery and equipment, elevators, escalators, cranes, bridges and ramps, factory equipment and machinery, farm equipment and machinery, lifting equipment, amusement park rides and equipment, flying vehicles, flying cars, helicopters, quadcopters, drones, electric bikes, motorcycles, wheel cycles, semitrucks, passenger transport, commercial vehicles. Recovery systems could benefit, or high-power consuming devices such as lasers, particle accelerators and electromagnetic and/or magnetic field creating and/or managing devices. Additionally, power producing equipment/generators and/or power utilization may benefit as a result of a combinational arrangement with this system and method which will be of great benefit for many practical implementations. A selected embodiment for the system and method is adopted and scaled up to large-scale industrial applications, and for use with a base load power supply, energy storage and/or energy backup system(s), that may benefit greatly from this disclosed system and method.

Implementations

The devices, applications and possible uses may be non-limiting examples of potential embodiments of energy storage devise(s) from nano-sized to commercial industrial sized, with some of the notable examples being energy storage systems, transportation, regenerative and/or recovery systems located within or as a part of; cars, trucks, airplanes, ships, trains, flying craft, automobile, or machinery. Electrical generation and storage, and/or production, and/or transmission, and possible embodiments may include non-limiting examples such as existing electrical generation and storage systems such as; photovoltaic generation, piezoelectric generation, thermoelectric generation, ambient generation, RF generation, fuel cell generation, electrochemical generation, existing induction generation sources such as wind turbines, hydroelectric, geothermal, coal, natural gas, nuclear, wave/tidal energy.

Storage Devices

This system and method takes advantage of the natural physical characteristics and operation of capacitors (electrostatic storage devices) and this type of electrical component, therefor a broad range of possible alternatives may be used to accomplish this system and method's novelty and usefulness, referenced as possible embodiments of the disclosed invention of the following non-limiting examples include; accumulators, electrostatic accumulators and/or storage devices, batteries and/or electrochemical storage devices, including hybrids, magnetic field storage devices such as inductors, coils, or electrical storage devices may be substituted or used in conjunction with the disclosed invention and are hereby claimed in this disclosure.

The device may use a plurality and multitude of different storage devices described in this system and method referenced as possible embodiments of the disclosed invention of the following; accumulators and may comprise different storage device arrangements, the circuit operating with polarized condensers or with non-polarized storage capacitors/devices, and may include accumulator balancing or balancing IC's (integrated circuits), non-limiting examples of possible embodiments include; single large capacity storage device such as capacitors or ultracapacitors multi-layer or multi cell configuration, multi-storage devices and/or pluralities, perforated storage devices or layers of a device or devices, magnetic field storage device, condensers, and/or capacitors non limiting examples include ceramic, paraelectric, ferroelectric, mixed oxides, class 1, class 2, multi-layer, decoupling, suppression, high voltage power, power film and/or foil, nano-structured crystalline thin film, composite ink/paste, crosslinked gel electrolytes, electrolytes, metalized, plastic, polypropylene, polyester, polyphenylene sulfide, polyethylene naphthalate, polytetrafluoroethylene, RFI, EMI, snubber, motor run, AC capacitors, electrolytic, Aluminum, tantalum, niobium, non-solid, solid manganese oxide, solid conductive polymer, bipolar, axial, SMD, chip, radial, hybrid capacitors, Supercapacitors, double layer, pseudocapacitors, hybrid capacitors, electrochemical capacitors, ultracapacitors, electric double layer capacitors, APowerCAP®, BestCap®, BoostCap®, Cap-XX®, DLCAP®, EneCapTen®, EVerCAP®, DynaCap®, Faradcap®, GreenCap®, Goldcap®, HY-CAP®, Kapton capacitor, 5 Skelcap Super Capacitor®, SuperCap®, PAS Capacitor®, PowerStor®, PsuedoCap, Ultracapacitor, Double layer lithium-ion, class X, class Y, carbon capacitors, graphene capacitors, graphite capacitors, integrated capacitors, nanoscale capacitors, glass capacitors, vacuum capacitors, SF6 gas filled capacitors, printed circuit board capacitor, conductive wire capacitor, mica capacitors, air gap capacitors, variable capacitors, tuning capacitors, trimmer capacitor, super dielectric material capacitor, high energy density capacitors.

"Pyrolysis" and "pyrolyze" are generally used to refer to thermal decomposition of a carbonaceous material. In pyrolysis, lesser amounts of oxygen are present than are required for a complete combustion of material to occur, such as or equal to about 30% less, about 20% less, about 10% less, or equal to or about 5% less, or equal to or about 1% less, or equal to or about 0.5% less, or equal to or about 0.1% less, or equal to or about 0.01% less of oxygen that is required for the combustion to occur. In additional embodiments, pyrolysis may be performed in the absence of oxygen.

Physical changes that may occur during pyrolysis which may include any of the following: (i) heat transfers from a heat source and increases the temperature of the feedstock material; (ii) the pyrolysis reactions at a higher temperature may release volatiles and form a char; (iii) the flow of heat from volatiles into cooler solid feedstock results in a heat transfer between hot volatiles and cooler un-pyrolyzed or partially pyrolyzed feedstock; (iv) condensation from volatiles within cooler parts of the feedstock, which may be followed by secondary reactions, may produce a tar; (v) autocatalytic secondary pyrolysis reactions may proceed while or in simultaneity as primary pyrolytic reactions occur; and may cause (vi) further thermal decomposition, reformation, water and gas shift reactions, free-volatile recombination, and/or dehydration can and may also occur, some may be a function of or effected by the residence time, temperature(s), and pressure.

Pyrolysis may be used to at least partially dehydrate a feedstock. In additional embodiments, pyrolysis removes greater than or about 50%, greater than or about 75%, greater than or about 90%, greater than or about 95%, greater than or about 99% of the water from the feedstock.

It should be noted that the beneficial aspects of the disclosed system and method, may be used for a number of different applications. An example of this would be utilizing the ion-pore matching hierarchical structure, and system and method disclosed herein, as an improved method for producing activated carbon for removing or reducing contaminants contained, or emitted, from a number of different sources, as well as from gasses, liquids, emissions, bodies of water, effluents, or discharges.

Figure 15:
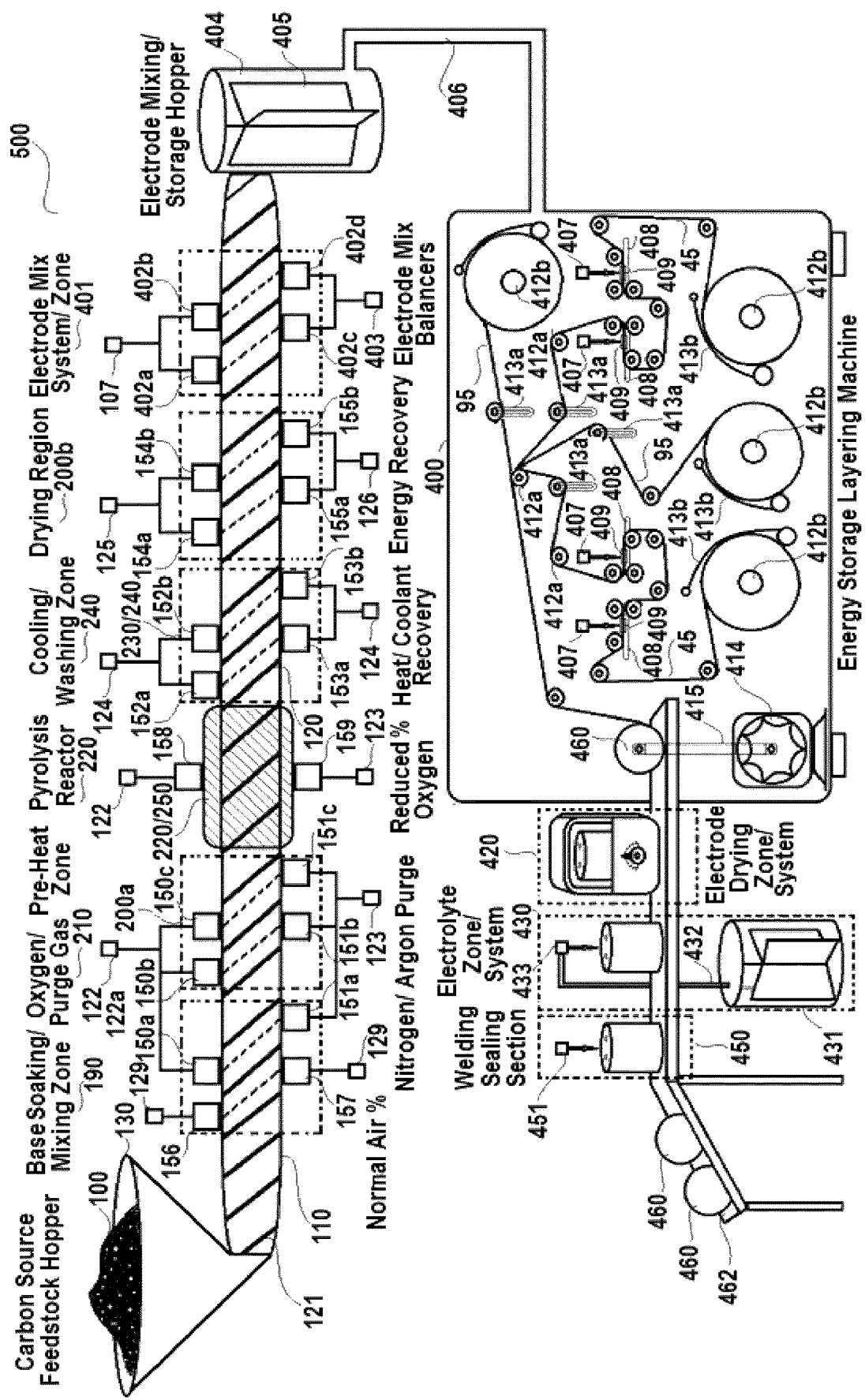
FIG. 15 Is a diagram showing an exemplified embodiment of the invention including a continuous carbon material feed system with a single reactor multi zone activated carbon production system and energy storage production system.

FIG. 15 Is a diagram depicting an exemplified embodiment of the invention including; a continuous carbon source 100 material feed system 110, with a single reactor 220 multi-zone design in order to produce pre-determined pore configuration carbonized activated carbon material and an improved energy storage device(s) production system 500. The device arrangement includes in this embodiment a complete mechanically coupled, and/or operationally connected, energy storage device manufacturing system 500, including an electrode production system 400, operationally coupled to the said pre-determined pore configuration carbonized activated carbon production system 500. The carbon source processing system may include a variety of features, embodiments, and controllable parameters as described throughout this disclosure.

Some of the features as described herein include systems, processes, and devices including; the processing of a variety of carbon sources 100; some exemplary features of the system may include; a step to determine the desired pore sizing and hierarchical structure for the final activated carbon to control the device to produce a desired resultant product; a grinding or pulverising section (not shown) to pulverise the carbon source 100 into a fine powder; a material feed unit or hopper 130 to accept said carbon source, and a material feed system 110 for the said carbon source 100 which may include an auger 121 or alternate feed mechanism or means; a soaking/mixing section/zone 190 for said carbon source 100 which may include inlet(s) 156 and outlet(s) 157, and additionally include gas phase inlet(s) 150a, and outlet(s) 151a, and may include a soaking vessel or comparably similar component(s); an optional inert atmosphere; a thermally controlled drying and/or preheating zone 200a which may include gas phase inlets 150b, 150c, and outlets 151b, 151c; a reactor/gas phase separator 220/250 section/zone for pyrolyzing the said carbon source 100 which may include an inlet(s) 158 and an outlet(s) 159; a cooling and/or washing zone/section 240 which may include liquid and/or gas phase cooling and inlets 152a, 152b, and a liquid/gas phase/heat recovery system outlets 153a, 153b, which in some embodiments is for the washing of the said pyrolyzed carbon and additionally introduce an additive; a drying region 200b that can be used to dry a pre-determined pore configuration pyrolyzed activated carbon; a single or plurality of mixing section(s) 401, which may be located throughout the device(s), the mixing section(s) 401 may be to mix said predetermined pore configuration pyrolyzed activated carbon with additional energy storage electrode materials and/or mix 107, and may include an inlet or inlets 402a, 402b, and may additionally have electrode mix balancers and/or outlets 402c, 402d, which may be used to balance internal pressure and/or to draw samples of said mix, for instance supercapacitor ingredients; additionally the device may also include an activated carbon material feed system 120 that may be used to transport the activated carbon and/or electrode mix throughout the device and into an electrode mixing storage hopper 404; may include electrode mixing systems or devices 405, and additionally an electrode mix feed system 406 that can be used to transport the electrode mix to an energy storage device production and/or layering machine 400; the energy storage device production and/or layering machine 400 may include a number of components required for its operation and for simplicity only the functional components required for a graphical representation have been included and all other additional functional components and operating systems are incorporated herein by reference, though have been omitted; the energy storage production machine may include electrode mix injectors 407, electrode applicators 408, an electrode mix overflow recirculating system 409, a rolling or layering system or device 411, rollers 412a, 412b, tensioners 413a, 413b, a drive mechanism(s) or motor(s) 414, and may additionally include connecting belts gears, and/or direct connection drive mechanisms 415; the energy storage production device and system may additionally include an electrode drying system(s)/zone(s) 420, and electrolyte system/zone which may include electrolyte injectors 433, and electrolyte mixing system 431 and storage tank, and an electrolyte conduit 432, and may additionally include a welding/sealing system/zone 450, that may include a closing or connecting device 451 such as; welder(s), sealer(s), crimper(s), press(s), seal(s) 451 to produce for instance a finished energy storage device 460 that mainly be noted into an optional energy storage device hopper 462, the assembly device 500 may be use to, for instance, produce supercapacitors and/or batteries.

In exemplified embodiments, the closed material feed system 110 includes a material feed hopper 130, a material transport mechanical system 110 and an oxygen purge manifold or mechanical system 150a, 150b, 150c, 151a, 151b, 151c.

In exemplified embodiments, the material feed hopper 130 may be any suitable open-air or closed air container configured to receive carbon source material 100. The material feed hopper 130 may be mechanically and operably connected with the material feed system 110, which may be, in certain embodiments, a screw or auger 121 system operably rotated by a drive source, such as non-limiting examples of a motor or other mechanically operable device (not shown). In an additional embodiment, the carbon source material 100 may be fed into the material feed system 110 which may be accomplished with a gravity-feed system. In certain embodiments the material feed system 110 may be constructed such that the screw or auger 121 and may be enclosed in a suitable enclosure. In additional embodiments, the described enclosure may be substantially cylindrical in shape. In additional embodiments, the material feed system 110 may include a screw, auger, conveyor, drum, screen, chute, drop chamber, pneumatic conveyance device, which may also include a rotary airlock and/or a double or triple flap airlock (not shown).

In certain embodiments, the carbon source material 100 is fed from the carbon source material feed hopper 130 to the material feed system 110, the auger and/or screw is rotated, this rotation causes the moving of the raw carbon source material 100 toward the oxygen purge manifold. It should be expressed that, when the carbon source material 100 reaches the oxygen purge manifold, the ambient air among the raw carbon source material 100 in the material feed system 110 may include roughly about 21% oxygen. In additional embodiments, the oxygen purge manifold may be arranged in such a manner to be adjacent to or around the material feed system 110. In certain embodiments the oxygen fold manifold, and/or the enclosure of the material feed unit 110 may include a plurality of gas inlet ports 151a, 151b, 151c, and a plurality of gas outlet ports 150a, 150b, 150c.

In certain embodiments, the oxygen purge manifold may have at least one gas inlet line 123a and at least one gas outlet line 122a. In additional embodiments, the at least one gas inlet line 123a of the oxygen purge manifold may be in operable communication and mechanically connected with each of the plurality of gas inlet ports 151a, 151b, 151c. In additional embodiments, the at least one gas outlet line 122a of the oxygen purge manifold may be in operable communication and mechanically connected with each of the plurality of gas outlet ports 150a, 150b, 150c. In certain embodiments, the gas inlet line(s) 123a may be configured to pump an inert gas 123 into the gas inlet ports 151a, 151b, 151c. In certain embodiments, the inert gas 123 is nitrogen and/or argon and/or helium containing substantially no oxygen. In an additional embodiment, the inert gas 123 flow is introduced counter-current to the carbon source material.

In certain embodiments, the introduction of an inert gas 123 into the enclosed feed system 110 may and likely will be used to force the ambient air 122 out of the enclosed system. In certain embodiments when in operation, and when the inert gas 123 is introduced to the first gas inlet port 151a, a quantity of oxygen-rich ambient air 122 is forced out of an outlet port 150a. It should be understood that, at this point, the desired level of less than or equal to about 2% oxygen, less than or equal to about 1% oxygen, less than or equal to about 0.5% oxygen or less than or equal to about 0.2% or less than or equal to about 0.1% oxygen may not be achieved. In additional embodiments, additional infusions of the inert gas 123 must be made in order to purge the requisite and/or desired amount of oxygen 122 from the air surrounding the carbon source material 100 in the enclosed system. In additional embodiments, the second gas inlet port 151b may pump the inert gas 123 into the enclosed system in concert with the infusion at the first gas inlet port 151a, thereby allowing for the purging of partially or substantially more of the remaining oxygen 122 from the enclosed system.

It should be understood that after one or two or a plurality of infusions of inert gas 123 to purge the oxygen 122, the desired result of lowering oxygen content percentage may be achieved. In additional embodiments, if the desired oxygen levels are still not achieved after two inert gas 123 infusions, a third infusion 151c of inert gas 123 may be used, and may purge remaining undesired amounts of oxygen 122 from the enclosed system at a gas outlet 150c. Additional inlets and outlets pluralities may also be incorporated, if desired. In additional embodiments, oxygen 122 levels may be monitored throughout the material feed system 110 to allow calibration of the amount and location of inert gas 123 infusions to ensure desired performance, safety and resulting processed pre-determined pore configuration carbonized activated carbon material 105.

In certain embodiments it should be noted that the gas inlet port(s) 151a, 151b, 151c and the corresponding gas outlet port(s) 150a 150b, 150c respectively, are slightly offset from each other with respect to a vertical bisecting plane through the material feed unit 110. In certain embodiments, inlet port(s) 151a, 151b, 151c and corresponding outlet port(s) 150a, 150b, 150c, may be offset on the material feed system 110 by an amount that approximately corresponds with the pitch of the auger 121 in the material feed unit 110. In additional embodiments, after the atmosphere surrounding the raw material 100 is de-oxygenated 122 to a predetermined or satisfactory level, it may then be fed from the material feed system 110 into a reaction zone 220 or zones. In additional embodiments, oxygen levels may be monitored throughout the material feed system 110 to allow the calibration of the amount and location of inert gas 123 infusions to allow pre-determined or desired levels.

In additional embodiments, the device includes a plurality of gas introduction probes (s) 159, 151a, 151b, 151c, 159, 153a, 153b, 155a, 155b, 402c, 402d, and gas extraction probes(s) 156, 150a, 150b, 150c, 158, 152a, 152b, 154a, 154b, 402a, 402b, located at various points throughout the device. In additional embodiments, one of each gas introduction probe(s) 159, 151a, 151b, 151c, 159, 153a, 153b, 155a, 155b, 402c, 402d, and one of each gas extraction probe(s) 156, 150a, 150b, 150c, 158, 152a, 152b, 154a, 154b, 402a, 402b, correspond with a different one of the plurality of zones. In alternative embodiments, the device includes any suitable number of gas introduction probe(s) 159, 151a, 151b, 151c, 159, 153a, 153b, 155a, 155b, 402c, 402d, and gas extraction probes(s) 156, 150a, 150b, 150c, 158, 152a, 152b, 154a, 154b, 402a, 402b, including in certain embodiments having one gas introduction probe(s) 159, 151a, 151b, 151c, 159, 153a, 153b, 155a, 155b, 402c, 402d, and more than one gas extraction probe(s) 156, 150a, 150b, 150c, 158, 152a, 152b, 154a, 154b, 402a, 402b, for each of the plurality of zones.

In alternative embodiments, the drying zone(s) 200a, 200b, are associated with the gas introduction probe(s) 151b, 151c and the gas extraction probe(s) 150b, 150c. In additional embodiments, the gas introduction probe(s) 151b, 151c introduces nitrogen and/or argon and/or helium 123 into the drying zone 200a, 200b, and the gas extraction probe(s) 150b, 150c extracts gas 122 from the drying zone 200a, 200b. In certain embodiments, the gas introduction probe(s) 151b, 151c may be configured to introduce a mixture of gas 123 into the drying zone(s) 200a, 200b. In additional embodiments, the gas extracted 122 may be oxygen. In alternative embodiments, the gas extraction probe(s) 150b, 150c, extracts gases 122 from the drying zone(s) 200a, 200b to be reused in a heat and/or energy recovery system.

In certain embodiments, the pre-heat zone 210 may be associated with the gas introduction probe(s) 151b, 151c, and the gas extraction probe(s) 150b, 150c. In additional embodiments, the gas introduction probe(s) 151b, 151c, introduces nitrogen and/or argon and/or helium 123 into the preheat zone 210 and the gas extraction probe(s) 150b, 150c, extracts gas 122 from the pre-heating zone 200a. In additional embodiments, the gas introduction probe(s) 151b, 151c may be configured to introduce a mixture of gas 123 into the pre-heating zone 210. In additional embodiments, the gas extracted 122 from the gas extraction probe(s) 150b, 150c may includes carbon enriched off gases. In additional embodiments, the gases extracted from the pre-heating zone 210 and/or pyrolysis reactor zone 220 may be reintroduced to the material at a later stage in the process, for example in the carbon recovery unit and/or pyrolysis reactor 220. In additional embodiments, the gases 122 extracted from a plurality of the zones of the device may be used for either energy recovery in the drying, processing, or gas heater, further pyrolysis in the trimming reactor, and/or in the carbon enrichment unit.

In certain embodiments, the pyrolysis reactor/zone 220 may be associated with the gas introduction probe(s) 159, and the gas extraction probe 158. In additional embodiments, the gas introduction probe(s) 159 introduces nitrogen and/or argon and/or helium 123 into the pyrolysis zone 220 and the gas extraction probe(s) 158 extracts gas from the pyrolysis zone 220. In additional embodiments, the gas introduction probe(s) 159 is configured to introduce a mixture of gas 123 into the pyrolysis zone 220. In additional embodiments, the gas extracted 122 from the gas extraction probe 158 may include carbon-enriched off-gases and/or syngas or town gas. In certain embodiments, the carbon-enriched gases 122 extracted from the pyrolysis zone 220 may be used and reintroduced to the material at a later stage and/or subsequent stage in the process. In additional embodiments, the extracted gas 122 from the pre-heat zone 210 and/or the extracted gas 122 from the pyrolysis zone 220 may be combined prior to being reintroduced to the material at any stage within the process.

In an alternative embodiment, the cooling zone 240 may be associated with the gas introduction probe(s) 152a, 152b, and the gas extraction probe(s) 153a, 153b. In additional embodiments, the gas introduction probe(s) 152a, 152b, may introduce nitrogen and/or argon and/or helium 123 into the cooling/washing zone 240 and the gas extraction probe(s) 153a, 153b, may extract gas from the cooling/washing zone 240. In various embodiments, the gas introduction probe(s) 152a, 152b, may be configured to introduce a mixture of gas 123 into the cooling/washing zone 240. In various embodiments, the gas extraction probe(s) 153a, 153b, may extracts gases 122 from the cooling/washing zone 240 to be reused in a heat and/or energy recovery system.

In certain embodiments, the gas introduction probe(s) 152a, 152b, and the gas extraction probe(s) 153a, 153b, described may be configured to operate with the controller and the plurality of sensors to adjust the levels and/or concentrations of gas 123 being introduced and/or gas 123 being extracted from each of the device's zones.

In certain embodiments, the gas introduction probes(s) 152a, 152b, and gas extraction probes(s) 153a, 153b, may include a plurality of openings through which the gas may be introduced 123 and/or extracted 122. In certain embodiments, the plurality of openings may be disposed on the lower side of the inlet and gas extraction probe(s) 152a, 152b. In additional embodiments, each of the plurality of openings extends for a substantial length within the respective zone and/or zones.

In additional embodiments, the gas introduction probe(s) 152a, 152b, may extend from one side of the device through each zone and/or zones. In such specific embodiments, each of the gas introduction probe(s) 152a, 152b, may extend from a single side of the device to each of the respective zones of the device. In additional embodiments, gaseous catalysts may be added in order to enrich fixed carbon levels. In such specific embodiments, the plurality of openings for each of the gas introduction probe(s) 152a, 152b, may only be disposed in the respective zone associated with that particular gas introduction probe 152a, 152b.

In certain embodiments, each of the gas introduction probes 159, 151a, 151b, 151c, 159, 153a, 153b, 155a, 155b, 402c, 402d, may extend from the left side of the base soaking/mixing zone 190 into each one of the zones, in this example the gas introduction probe(s) 159, 151a, 151b, 151c, 159, 153a, 153b, 155a, 155b, 402c, 402d, may travel through the device and to or through electrode mixing system/zone 401, and may be constructed so the said introduction probes terminate in the selected zone including; base soaking/mixing zone 190, drying zone 200a, preheat zone 210, pyrolysis reactor 220, cooling/washing zone 240, drying region 200b, electrode mix system/zone 401, a particular zone(s), all of the zones, or selected zone(s).

In certain embodiments the gas introduction probes may all travel through the pre-heat zone 210, and may have the pre-heat zone gas introduction probe terminating in the pre-heat zone 200a. In such a specific embodiment the remaining gas introduction probes may travel through the pyrolysis zone 220, with the pyrolysis zone gas introduction probe potentially terminating in the pyrolysis zone 220. In additional embodiments, the gas extraction probe(s) may be configured similar to the gas introduction probe(s). In additional embodiments the gas introduction probe(s) and gas extraction probes may originate from either side of the device.

In certain embodiments, the gas introduction probes 159, 151a, 151b, 151c, 159, 153a, 153b, 155a, 155b, 402c, 402d may be arranged concentrically with one another in order to save space which may be used in or by the multiple-port configuration. In embodiment as described, each inlet probes and/or inlet ports 159, 151a, 151b, 151c, 159, 153a, 153b, 155a, 155b, 402c, 402d may have a smaller diameter than the previous inlet probe and inlet port. For example in embodiments as described, the base soaking/mixing zone 190 gas introduction probe 159, 151a, may have the largest interior diameter, and therefore the pre-heat/drying zone 210/200a gas introduction probe(s) 151b, 151c, would be situated within the interior diameter of the base soaking/mixing zone 190 gas introduction probe 159, 151a, therefor pyrolysis zone 220 gas introduction probe 159 would then be situated within the interior diameter of the pre-heat/drying zone 210/200a gas introduction probe(s) 151b, 151c, therefor the cooling/washing zone 240 gas introduction probe(s) 153a, 153b, would be situated within the pyrolysis zone 220 gas introduction probe 159, therefor the drying zone 200b gas introduction probe(s) 155a, 155b, would be situated within the cooling/washing zone 240 gas introduction probe(s) 153a, 153b, therefor the electrode mixing system zone 401 gas introduction probe(s) 402c, 402d, would be situated within the drying zone 200a gas introduction probe(s) 155a, 155b. For embodiments as described, a suitable connector may be attached to each of a possible gas introduction probes 159, 151a, 151b, 151c, 159, 153a, 153b, 155a, 155b, 402c, 402d outside of the device in order to control the air infused into each of the said possible gas introduction probes individually or concertedly.

In certain embodiments as described, a concentric and/or substantially concentric arrangement may be preferred, the outer-most gas introduction probe is only exposed in each zone before it has been terminated. Therefore, for embodiments as described, individual introductions to gas zones may be controlled independent from one and another, this while only requiring a single continuous gas introduction probe line. It should be explained and understood that a similar concentric or substantially concentric configuration may be suitable and used for the gas extraction probes 156, 150a, 150b, 150c, 158, 152a, 152b, 154a, 154b, 402a, 402b, for such an embodiment.

In certain embodiments, the device may include a single reactor 220 having two to a greater plurality of different zones. Described in certain embodiments, multiple zones are shown, however, any different number of zones could be employed in alternate embodiments. In an additional embodiment, each zone may be connected to at least one other zone via a material transport unit 110. In an additional embodiment, the material transport 110 unit may control atmosphere and temperature conditions.

In exemplified embodiments, the carbon source material 100, such as coal or petroleum coke, is optionally dried, ground, pulverised, and sized, for instance by passing through a mesh, outside the reactor 220 and then introduced into a soaking/mixing zone 190 with an optional low-oxygen containing atmosphere, which may occur prior to being introduced into the carbon source hopper 130. This may be accomplished optionally with the use of the material feed system 110. The material feed system 110 may be controlled to reduce the oxygen 122 level for the ambient air of the device to less than or equal to about 3%, 2%, 1%, 0.1%. Once the oxygen levels 122 have been decreased in the device, the raw carbon material 100 enters the soak/mixing zone 190 via the enclosed material feed system 110. In one such embodiment, the raw material feed system 110 may comprise an encapsulated jacket or sleeve by which steam and off-gases from the reactor 220 are used to heat the carbon source material 100, directly, or used by a process gas heater and/or heat exchanger (not shown) which is then used to pre-heat or pyrolyze the carbon source material 100.

Subsequently and in exemplified embodiments, an additive with water, such as a non-limiting example of KOH, is distributed thoroughly and/or evenly throughout the carbon source material 100 for a period of time prior to heating and/or pyrolysis, a soak time, within the soaking/mixing zone 190 for a period of about 10 min, about 20 min, about 30 min, about 40 min, about 50 min, about 1 hour, about 1.5 hours, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 24 hours, about 25 hours, about 26 hours, about 27 hours, about 28 hours, about 29 hours, about 30 hours, about 31 hours, about 32 hours, about 33 hours, about 34 hours, about 35 hours, about 36 hours, about 37 hours, about 38 hours, about 39 hours, about 40 hours, about 41 hours, about 42 hours, about 43 hours, about 44 hours, about 45 hours, about 46 hours, about 47 hours, about 48 hours, about 49 hours, about 50 hours, or around 12 hours which is preferred.

Subsequently and in exemplified embodiments, the pre-soaked carbon source 100 enters the preheating/drying zone 200a, wherein the carbon source 100 and internal temperature is raised from around ambient temperature to around 100° C. to a temperature of about 150° C. to about 200° C. In additional embodiments, the pre-heating/drying zone 200a may include a mechanism (not shown) to capture and/or exhaust off-gases from the pre-soaked carbon source 100 while it is being heated. In additional embodiments, the off-gases can be extracted for optional use at a later time. In additional embodiments, the heating source used for the various mechanical systems is electrical or gas. In additional embodiments, the heating source used for the various zones is waste gas from other reactors of the device and/or may be from external sources. In additional embodiments, the heat may be from an indirect source.

Subsequently after preheating in a heating/drying zone 200a, a material feed system 110 transfers the preheated carbon source 100 into a separate zone/reactor 220 which is optional. In an additional embodiment, the first zone 200a and reactor 220 is the same reactor. In an additional embodiment, where the first zone 200a is different than the reactor 220, a material feed system 110 may penetrate the reactor 220 through as a non-limiting example a high-temperature vapor seal system such as an airlock (not shown), this may allow the carbon source 100 to penetrate the reactor 220 while preventing gas and/or heat from escaping or from oxygen from entering. In an additional embodiment, the interior of the reactor 220 is heated to a temperature of about 100° C., or about 200° C., or about 300° C., or about 400° C., or about 500° C., or about 600° C., or about 700° C., or about 800° C., or about 900° C., or about 1000° C., or about 1100° C., with 800° C., for 2 hours being preferred. In an additional embodiment, the reactor 220 may comprise an output port 159 to capture and exhaust gases 122 given off, for instance from the preheated carbon source material 100 while it is undergoing pyrolysis. In an additional embodiment, gases 122 are extracted and stored for optional later use. In an additional embodiment, the off-gases 122 from the reactor 220 and the off gases 122 from a plurality of zones of the device may be combined into a single gas stream. Once carbonized, the carbon source material 100 is now pre-determined pore configuration pyrolyzed activated carbon with a pre-determined hierarchical pore structure 105 and may exit the reactor 220 by means of an activated carbon feed system 120, which in certain embodiments is the same feed system as the carbon source feed system 110 and may enter an optional cooling/washing zone 240 for cooling and washing. At this stage washing the activated carbon with water and an optional additive is preferred, a non-limiting example of the preferred additive is HCl. In certain embodiments, washing and/or cooling may be accomplished in a certain or controlled amount of time, for instance a soak time, for a period of about 10 min, about 20 min, about 30 min, about 40 min, about 50 min, about 1 hour, about 1.5 hours, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 24 hours, about 25 hours, about 26 hours, about 27 hours, about 28 hours, about 29 hours, about 30 hours, about 31 hours, about 32 hours, about 33 hours, about 34 hours, about 35 hours, about 36 hours, about 37 hours, about 38 hours, about 39 hours, about 40 hours, about 41 hours, about 42 hours, about 43 hours, about 44 hours, about 45 hours, about 46 hours, about 47 hours, about 48 hours, about 49 hours, about 50 hours, or around 8 hours of soaking, which is preferred. Wherein in certain embodiments the cooling/washing zone 420 may be the same reactor 220, and/or a different reactor or zone.

In exemplary embodiments, when the pre-determined hierarchical pore configuration pyrolyzed activated carbon product 105 enters the cooling/washing zone 240, the material is allowed to cool (actively or passively) to a specified temperature. In an additional embodiment, the temperature of the pre-determined pore configuration activated carbon 105 is reduced in the cooling/washing zone 240 within a substantially inert atmosphere. In an additional embodiment, the cooling/washing zone 240 may cool the pre-determined pore configuration activated carbon material 105 with water cooling, and may additionally include an additive such as HCl, which may be a mechanical mechanism, and which may soak the material for a specified or extended period of time. It should be noted that the pre-determined pore configuration carbon material 105 may be allowed to cool in the cooling/washing zone 240 wherein it reaches a point where it will not undergo spontaneous combustion if exposed to normal atmosphere and/or oxygenated air. In an additional embodiment, the cooling/washing zone 240 reduces the temperature of the carbon material below 200° C. or about 150° C. or about 100° C. In exemplified embodiments, the device may include an optional mixing system to mix the activated carbon material 105, coolant, and additive, which may allow for the uniform cooling of the carbon material. Additionally, cooling may occur by either direct or indirect means, which may be with water and/or other liquids or additives; additionally, the cooling process may also occur by direct or indirect means with air or other gases, and/or a combination of the both of the above.

In certain embodiments, the cooling mechanisms are separate from the reactors 220, and may be mechanically coupled to the activated carbon material feed system 120. In additional embodiments, the cooling mechanism is located after the reactors 220. In additional embodiments, the cooling mechanism may be the same as, or built into, the reactors 220. In additional embodiments, the cooler mechanism is comprised of, for non-limiting examples example, a screw, auger 121, conveyor which is specifically a belt conveyor, in certain embodiments, drum, screen, pan, counterflow bed, vertical tower, jacketed paddle, cooled screw, and/or a combination thereof, which cools by either direct or indirect means, and with water and/or other liquids/additives, and/or direct or indirectly with gases and/or any combination of the above. In additional embodiments, the cooler(s) could include a water spraying mechanism or inlet port(s) 152a, 152b (with or without an additive), a cooled inert gas stream mechanism and/or outlet port(s) 153a, 153b, which may be liquid nitrogen, or ambient air if below ignition and/or a combustible temperature. In additional embodiments, heat may be recovered from or during this step, an example would be by capturing the flash steam generated by a water spray, and/or the superheated steam generated when a saturated steam is introduced, which may be mixed into and throughout, and may then heated by the activated carbon material 105.

In exemplified embodiments, the raw carbon source material 100, such as coal, petroleum coke, oil, biomass is introduced into the reactor 220 in a low-oxygen containing atmosphere, which may be accomplished optionally through the use of a material feed system 110 that has been already described. The material feed system 110 may be used to reduce the oxygen level in the ambient air in the system to less than or equal to about 3%, 2%, 1%, 0.1% which may accommodate the process of pyrolysis free of combustion. Raw carbon source material 100 may enter the device in an enclosed material feed system 110, which may be after the oxygen levels have been decreased. In additional embodiments, the material feed system 110 may include an encapsulated jacket(s) or sleeve(s) through which steam and/or off-gases from the reactor are sent and/or used in the pre-heating of the carbon source material 100.

In additional embodiments, the raw carbon source material 100 may first travel from the material feed system 110 and through an optional drying 200a and/or pre-heat zone 210 or area of the device. In an additional embodiment, the optional drying 200a zone may heat the raw material to remove water and other moisture or combustible gases/tars, which may be a separate zone and prior to it being passed along into the separate preheat zone 210. In an additional embodiment, the interior of the optional drying zone 200a may be heated to a temperature of about ambient temperature to about 100° C. to about 150° C. to about 200° C. Water or moisture removed from the raw carbon source material 100 may be exhausted, in one example from outlet ports 150b, 150c, from the optional drying zone 200a or area. In an additional embodiment, the optional drying zone 200a may be adapted to allow vapors, steam, and/or moisture, to be extracted 122. In an additional embodiment, vapors, steam, and/or moisture from the optional drying zone 200a may be extracted for optional later use. This moisture, vapor, or steam, which has been extracted from the optional drying zone 200a may be used in a suitable waste heat recovery system and may be in conjunction with the material feed system 110. In an additional embodiment, the vapor, steam, and/or moisture 122, used in the material feed system 110 may be used to pre-heat the raw carbon source materials 100 while oxygen levels are being purged in or by the material feed system 110. In an additional embodiment, the carbon source material 100 is dried outside of the reactor(s) 220 and the reactor(s) do not comprise a drying zone 220.

In an additional embodiment, the dried carbon source material 100 enters a preheat zone 210, wherein the temperature may be raised from the range of about ambient temperature to a temperature range of about 100° C., to about 150° C., to about 200° C. In an additional embodiment, the temperature does not exceed 200° C. in the preheat zone 210. It should be appreciated that if the preheat zone is too hot, or subsequently not hot enough, then the dried carbon source material 100 may be processed in a non ideal manner prior to entering the reactor 220 zone. The preheat zone 210 may include an output mechanism 150b, 150c, to capture, for current or later reuse, exhaust off gases from the dried carbon source material 100 while it is being preheated. In additional embodiments, the off gases may be extracted for optional later use. In additional embodiments, the heating source used for the various zones may be electric or gas. In additional embodiments, the heating source used for the various zones may be waste gas from other zones of the device and/or from the external source(s). In additional embodiments, the heat may be indirect.

After processing within the preheat zone 210, the material feed system 110 may pass the preheated material into the reactor 220 to undergo the pyrolysis process. In an additional embodiment, the material feed system 110 may penetrate the pyrolysis zone 220, which may be through a high-temperature vapor seal system (not shown), which may include a non-limiting example of an airlock (not shown), which may allow the material feed system to penetrate the high-temperature pyrolysis reactor 220 zone while preventing or minimizing gas from escaping, and/or oxygen from entering. In an additional embodiment, the interior of the pyrolysis zone and/or reactor 220 is heated to a temperature of about 100° C., about 200° C., about 300° C., about 400° C., about 500° C., about 600° C., about 700° C., about 800° C., about 900° C., about 1000° C., about to 1100° C., or to about 800° C., at a rate of 10° C. per minute, which is preferred. In additional embodiments, the pyrolysis zone(s) 220 may include an outlet port(s) 158 and inlet port(s) 159 similar to the preheat zone(s) 210 to capture and exhaust the gases which may be given off of the preheated carbon source material 100 while it is being carbonized. In an additional embodiment, the gases may be extracted for optional later use at the discretion of the operator. In an additional embodiment, the off gases from the preheat zone(s) 210 and the off gases from the pyrolysis zone(s) 220 may be combined into a single gas stream. Once carbonized, the carbonized carbon source material 105 exits the pyrolysis reactor 220 zone and may then enter into a cooling/washing zone 240.

In additional embodiments, the raw carbon source material 100, and subsequently then dried carbon source, preheated carbon source, pre-determined pore configuration carbonized activated carbon material 105, travel through the reactor 220 and/or reactors, along a continuous material feed unit 110 and/or system. In additional embodiments, the material feed system 110 may carry the carbon source material 100 which may differ at different stages in the process. In additional embodiments, the process of moving the material through the reactor 220, zones or reactors is a continuous process. In certain embodiments, the speed of the material feed system 110 may be appropriately calibrated, calculated, and controlled by an associated controller and/or processor (not shown) such that the operation of the material feed system 110 does not require interruption as the material moves through the device and reactor 220 or reactors zone and/or zones. In certain embodiments, the material feed unit 110 may be operationally sectioned, and may include a plurality of separate augers (not shown) or additional carbon material feed mechanisms as described in this disclosure, and controlled by an associated controller and/or processor (not shown) such that the operation individual carbon material feed mechanisms allows of the material feed system 110 to control the rate of progression between zones, stages, or reactors for the carbon material 100 depending on the optimal time for the carbon source material 100 to remain within a specific zone, stage, reactor, of the device.

In additional embodiments, a controller (not shown) associated with the reactor 220 or reactors may be configured to adjust the speed of the material feed unit 110, which may be based on one or more feedback sensors, detected gas which may be from the optional FTIR, measured parameters, temperature gauges, and/or other suitable variables in the reactor 220 or reaction process. It should be noted in additional embodiments, suitable moisture sensors, temperature sensors, or gas sensors in operable communication with the controller and/or processor may be integrated, or mechanically connected, into or between each of the zones and/or reactors 220 or at any suitable position along the material feed unit 110 or device. In additional embodiments, the controller and the processor may use the information obtained from the sensors and/or gauges by which to optimize the speed and efficiency of the device and/or processing systems. In additional embodiments, the controller which may be associated with the reactor 220 and/or reactors is configured to operate the material feed unit 110.

In additional embodiments, the controller associated with the reactor 220 or reactors may be configured to monitor the concentration, temperature, and moisture of the gas inside the material feed unit 110 or inside any of the reactors 220 and/or zones. In additional embodiments, the controller may be configured to adjust the speed of the material feed unit 110, the input of gases 123 into the material feed unit 110, and/or the heat applied to the material 100 in the material feed unit 110, which may be based upon one or more readings taken by the various sensors.

It should also be noted that, in additional embodiments, the device is enclosed in a kiln shell to control and manipulate the high amounts of heat required for the reactor 220 process and reactions to occur. In additional embodiments, the kiln shell of the device may include several insulating chambers which may surround a plurality of zones. In certain embodiments, the kiln includes a plurality separate zones for the device. In additional embodiments, each of the zones of the device includes at least one inlet and at least one outlet. In additional embodiments, within each zone the inlet and outlets are configured to be adjustable in which to control the flow of carbon feed material 100, gas 122, 123, and heat, into and out of the zone or zones. A supply of inert gas 123 may be introduced into the inlet 151a, 151b, 151c, and the purged air 122 may be extracted from the corresponding outlet 150a, 150b, 150c. In additional embodiments, one or more of the outlets of a zone in the device are connected to one or more of the other inlets or outlets in the device.

In additional embodiments, after the raw carbon source material 100 is de-oxygenated in the material feed system 110, it may be introduced to the device, and specifically to the first zones and/or the optional drying zone 200a. The drying zone 200a may include inlet(s) 151b 151c and outlet(s) 150b, 150c. In additional embodiments, the drying zone 200a may be heated to a temperature of about 80° C. to about 200° C. to reduce water and/or other moisture from the carbon source material 100. The carbon source material 100 may then be moved to the pre-heat zone, which may be the same zone, where the material 100 may be pre-heated.

In additional embodiments, the carbon source material 100 that has optionally been dried and/or pre-heated may then be moved into the carbonization reactor 220. In certain embodiments, carbonization may occur at a temperature from about 200° C. to about 1100° C., for example about 200° C., about 210° C., about 220° C., about 230° C., about 240° C., about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., about 400° C., 410° C., about 420° C., about 430° C., about 440° C., about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., about 610° C., about 620° C., about 630° C., about 640° C., about 650° C., about 660° C., about 670° C., about 680° C., about 690° C., about 700° C., about 710° C., about 720° C., about 730° C., about 740° C., about 750° C., about 760° C., about 770° C., about 780° C., about 790° C., about 800° C., about 810° C., about 820° C., about 830° C., about 840° C., about 850° C., about 860° C., about 870° C., about 880° C., about 890° C., about 900° C., about 910° C., about 920° C., about 930° C., about 940° C., about 950° C., about 960° C., about 970° C., about 980° C., about 990° C., about 1000° C., about 1010° C., about 1020° C., about 1030° C., about 1040° C., about 1050° C., about 1060° C., about 1070° C., about 1080° C., about 1090° C., about 1100° C. . . . , or about 800° C. which is preferred.

In additional embodiments, a carbonization zone of a reactor 220 is constructed to allow gases 122 produced during carbonization to be extracted and/or stored for a desired later use. In additional embodiments, gases 122 produced during carbonization are extracted for optional current or later use. In additional embodiments, a carbonization temperature is selected and maintained to reduce and/or eliminate the production of methane ($CH_4$) and maximize carbon content of the carbonized carbon source material 100.

In additional embodiments, the reactor 220 may include at least one input and a plurality of outlet ports 158. In additional embodiments, one of the outlet ports 158 may be connected to collection equipment or to further processing equipment, such as an acid hydrogenation unit or distillation column. In additional embodiments, the reactor 220 may process the off gases 122 that may come from the preheat zone 210 and the pyrolysis reactor 220 zone, which may produce a condensate and/or an enrichment gas. In an additional embodiment, the condensate may include polar compounds, such as non-limiting examples of acetic acid, methanol and furfural. In an additional embodiment, the enrichment gas produced by means of the reactor 220 may include at least nonpolar gases. In an additional embodiment, the gas reactor 220 may comprise a fractionation column. In an additional embodiment, acetic acid may be sent via a line or channel to an optional acid hydrogenation unit. In an additional embodiment, methanol and/or furfural may be sent via optional additional line(s) and/or channels to a distillation/processing unit.

In additional embodiments, the carbon recovery unit may also include an input connected to the reactor 220. In additional embodiments, gases 122 pulled from the carbon recovery unit are optionally used in energy recovery systems and/or systems which may further offer carbon enrichment. Additionally, in various embodiments, gases 122 may be pulled from one or more zones of the device and optionally used in energy recovery systems and/or systems for further carbon processing.

As discussed, high oxygen levels in the ambient air surrounding raw materials 100 as they are processed could result in undesirable combustion or oxidation of the raw material 100 to occur, this can drastically reduce the amount and quality of the final activated carbon material 105. In additional embodiments, the material feed system 110 may be a closed system that includes one or more manifolds configured to purge oxygen 122 from the air surrounding the raw carbon source material 100 and/or within the zone(s) or reactor(s) 220. In additional embodiments, an oxygen level of about 0.5% to about 1.0% may be used for pre-heating, pyrolyzing and/or carbonizing and/or cooling. It should be noted that a goal of the closed material feed system 110 is designed to reduce oxygen levels to less than or equal to about 3%, less than or equal to about 2%, less than or equal to about 1% or less than or equal to about 0.5% throughout the process. Once the oxygen levels are reduced, the carbon source material 100 is transferred along the material feed system 110 in the device. In additional embodiments, the preheating of inert gases throughout the recovery process, and with the subsequent introduction of pre-heated inert gases 123 to the device, reactor, or trimming reactor, makes the system more efficient and may reduce energy consumption.

In additional embodiments, a trimming reactor (not shown) may be included in the system. In an additional embodiment with a trimming reactor (not shown), pyrolyzed material from the device is fed into the separate additional reactor(s) (not shown) for further pyrolysis where heated inert gas 123 may be introduced to create a product with higher fixed carbon level. In additional embodiments, this secondary process may be conducted in a container such as non-limiting examples of, a drum, tank, barrel, bin, tote, pipe, sack, press, or roll-off container. In additional embodiments, a final container may be used for transport of the carbonized material 105. In additional embodiments, inert gas 123 may be heated via a heat exchanger (not shown) which may derive heat from gases 123 extracted from the device, which may be combusted in a process gas heater.

In an additional embodiment, heat, steam and gases 123 recovered from the reactor 220 may be directed to the material feed system 110 where they may be enclosed in jacket and separated from direct contact with the carbon source material 100, but may be used to indirectly heat the carbon source material 100 prior to introduction to the reactor 220 and/or reactors and/or drying zones.

In alternate embodiments, heat, steam and gases 123 recovered from the drying zone(s) 200a 200b, or the reactor(s) 220 may be directed to the material feed system 110 where they may be enclosed in a jacket and/or separated from direct contact with the carbon source material 100, this also allowing the indirect heat of the feed material 100 prior to the introduction of the feed material 100 to the reactor(s) 220.

In additional embodiments, the pre-determined pore configuration carbonized activated carbon material 105 may be moved to a temperature-reducing or cooling zone 240 and may be passively or actively cooled. In additional embodiments, pre-determined pore configuration carbonized activated carbon material 105 may be cooled to a temperature to about 10° C., to about 20° C., to about 30° C. or to about 40° C. In additional embodiments, the pre-determined pore configuration carbonized activated carbon material 105 may be moved to a temperature reducing or cooling zone/washing zone 240, which may be cooled and washed to remove an additive, such as a base, such as specifically KOH, simultaneously. In additional embodiments, the pre-determined pore configuration carbonized activated carbon material 105 may be moved to a temperature-reducing or cooling zone 240, which may be cooled and washed simultaneously with water and an additive, such as hydrochloric acid (HCl).

In exemplified embodiments, when the pre-determined pore configuration carbonized activated carbon material 105 enters the cooling/washing zone 240, the carbonized material 105 is allowed to cool to a predetermined temperature range of about 20° C. to 30° C. which is generally about room temperature. In additional embodiments, the device includes a plurality of cooling/washing zones 240. In additional embodiments, the cooling/washing zone(s) 240 may cool the carbonized material 105 to below 200° C. In an additional embodiment, the cooling/washing zone(s) 240 may include a mixer and/or auger to agitate and uniformly cool and/or wash the carbonized materials 105. In additional embodiments, one or more of a plurality of cooling/washing zones 240 may be outside of the device.

In additional embodiments, the pre-determined pore configuration carbonized activated carbon material 105 exits the cooling/washing zone 240 along the activated carbon feed system 120 and then may enter the carbon recovery unit (not shown).

In additional embodiments, the pre-determined pore configuration carbonized activated carbon material 105 exits the cooling/washing zone 240 along the activated carbon feed system 120 and then may enter the electrode mixing system/zone 401, which may be after being dried in a $1^{st}$ or $2^{nd}$ drying system/zone 200a/200b.

The pre-determined pore configuration carbonized activated carbon material 105 may at this point be in a powder state or may be pulverised to create a fine powder, which may occur within the electrode mixing zone/system 401 or a separate pulverising device. In certain embodiments, the grinding and/or pulverising may occur prior to activation, and/or after carbon activation.

In exemplary embodiments, and within one or more mixing chambers, the activated carbon may be mixed with electrode ingredients to make an electrode mix. Some non-limiting examples of electrode ingredients include; conductive agent(s), a binder(s), a mixing agent(s). Some non-limiting examples of conductive agents may include; carbon black, Super P™, furnace black, channel black, acetylene black, thermal black, lamp black, conductive carbon. Some non-limiting examples of binders may include; PVDF, PTFE, non-reactive thermoplastic fluoropolymer(s), copolymers, terpolymers. Some non-limiting examples of mixing agents may include; 2-propanol, sec-propyl alcohol, IPA, isopropyl, isopropanol, alcohol, water. Some non-limiting examples of an electrode composition include and may be in the form of; a mix, a paint, a mixture, a paste, an ink, or a freestanding electrode.

In certain embodiments, the said mixing electrode mixing system(s) 401 may be interconnected and/or mechanically coupled to an electrode preparation system 400, which may include an extruder 407 or plurality of extruders 407, and/or sprayer(s), in order to administer an electrode mix composition. Additionally, in alternate embodiments the electrode preparation system 400 may form a freestanding electrode, which may be formed, pressed, applied, which may then be attached to a current collector. The electrode mix composition may be applied, pressed, or contacted to, a conductive current collector material such as; a metal which may be; stainless steel, titanium, copper, aluminum, silver, which may be a foil or mesh, and may be a variety of thicknesses from 0.0001 mm up to and including 10 mm, and a variety of mesh patterns or windings. Additionally, the electrode mix and/or freestanding electrode may be a variety of thicknesses from 0.0001 mm up to and including 10 mm, or about 0.05 mm, or about 0.1 mm, or about 0.15 mm, or about 0.2 mm, or about 0.25 mm, or about 0.3 mm, or about 0.35 mm, or about 0.4 mm, or about 0.45 mm, or about 0.5 mm, or about 0.55 mm, or about 0.6 mm, or about 0.65 mm, or about 0.7 mm, or about 0.75 mm, or about 0.8 mm, or about 0.85 mm, or about 0.9 mm, or about 0.95 mm, or about 1.0 mm, or about 1.25 mm, or about 1.5 mm, or about 1.75 mm, or about 2.0 mm, or about 2.25 mm, or about 2.5 mm, or about 2.75 mm, or about 3.0 mm, or about 3.25 mm, or about 3.5 mm, or about 3.75 mm, or about 4.0 mm, or about 4.25 mm, or about 4.5 mm, or about 4.75 mm, or about 5.0 mm, or about 6.0 mm, or about 7.0 mm, or about 8.0 mm, or about 9.0 mm, or about 10.0 mm, or about 1 $mg/cm_2$, or about 1.25 $mg/cm_2$, or about 1.5 $mg/cm_2$, or about 1.75 $mg/cm_2$, or about 2 $mg/cm_2$, or about 2.25 $mg/cm^2$, or about 2.5 $mg/cm^2$, or about 2.75 $mg/cm^2$, or about 3 $mg/cm^2$, or about 3.25 $mg/cm^2$, or about 3.5 $mg/cm^2$, or about 3.75 $mg/cm^2$, or about 4 $mg/cm^2$, or about 4.25 $mg/cm^2$, or about 4.5 mg/cm², or about 4.75 mg/cm², or about 5 mg/cm², or about 5.25 mg/cm², or about 5.5 mg/cm², or about 5.75 mg/cm², or about 6 mg/cm², or about 6.25 mg/cm², or about 6.5 mg/cm², or about 6.75 mg/cm², or about 7 mg/cm², or about 7.25 mg/cm², or about 7.5 mg/cm², or about 7.75 mg/cm², or about 8 mg/cm², or about 8.25 mg/cm², or about 8.5 mg/cm², or about 8.75 mg/cm², or about 9 mg/cm², or about 9.25 mg/cm², or about 9.5 mg/cm², or about 9.75 mg/cm², or about 10 mg/cm², or about 10.25 mg/cm², or about 10.5 mg/cm², or about 10.75 mg/cm², or about 11 mg/cm², or about 11.25 mg/cm², or about 11.5 mg/cm², or about 11.75 mg/cm², or about 12 mg/cm², or about 12.25 mg/cm², or about 12.5 mg/cm², or about 12.75 mg/cm², or about 13 mg/cm², or about 13.25 mg/cm², or about 13.5 mg/cm², or about 13.75 mg/cm², or about 14 mg/cm², or about 14.25 mg/cm², or about 14.5 mg/cm², or about 14.75 mg/cm², or about 15 mg/cm², or about 16 mg/cm², or about 17 mg/cm², or about 18 mg/cm², or about 19 mg/cm², or about 20 mg/cm², or about 21 mg/cm², or about 22 mg/cm², or about 23 mg/cm², or about 24 mg/cm², or about 25 mg/cm², or about 30 mg/cm², or about 35 mg/cm², or about 40 mg/cm², or about 45 mg/cm², or about 50 mg/cm², or about 3.6-10.5 mg/cm² being preferred.

In additional embodiments, said electrode preparation system 400, may comprise or be mechanically connected to an applicator system such as non-limiting examples of; a nozzle(s), a sprayer(s), a scrapper(s), a press, to allow administering said electrode composition mix, and/or freestanding electrode. Which may be directly applied to said metal, which may be directly contacting said metal, and/or a freestanding design. In additional embodiments, the electrode preparation system 400 additionally includes a mechanical pump, compressor, gravity feed, press, auger or pressure to provide a consistent feed of said electrode mix composition.

In additional embodiments, the electrode preparation system/device 400 may include an electrode mix feed system 406, and may further include a mechanical feed system and/or layering device 411. Additionally in certain embodiments, the electrode preparation system/device 400 may include; feeders, winders, rollers 412a/412b, drums, cutter(s) or crimper(s), drive mechanism and/or motors 414, connecting belt 415, gear, and/or direct connection, tensioners 413a/413b, for the anode material, cathode material, and ion permeable separators, electrode mix injectors 407, electrode applicators 408, electrode mix overflow system 409, electrode drying zone(s)/system(s) 420, an electrolyte zone/system 430 which may include an electrolyte mixing system and storage tank 431, and electrolyte conduit 432, electrolyte injectors 433, a welding/sealing zone/system 450, which may include welders 451, sealers, crimpers, press, seal(s), which may form part of the energy storage device production system 500, in alternative embodiments may be mechanically coupled and/or separate from the energy storage production system 500. In additional embodiments, the energy storage production system 500 may additionally have an energy storage device hopper 462 in order to store energy storage devices 460, and/or have energy storage devices 460 deposited.

In additional embodiments electrode preparation system/device 400 may be used to allow a continuous feed of said conductive metal 45. In additional embodiments electrode preparation system/device 400 may be used to allow a continuous feed of said conductive metal 45 applied with an electrode mix, ink, paint, paste, or composition. In additional embodiments electrode preparation system/device 400 may be used to allow a continuous feed of said electrode mix in order to form a freestanding electrode.

In additional embodiments, the electrode preparation system/device 400 may be used to allow a continuous feed of said conductive metal 45 that may be used to affix and/or provide contacting between the conductive metal 45 and freestanding electrode or electrode mix. In additional embodiments, the electrode preparation system/device 400 may be used to allow a continuous feed of an ion permeable separator(s) 95. In additional embodiments, the electrode preparation system/device 400 may be used to allow a continuous feed for layering, and/or multilayering, of said conductive metal 45, electrode mix composition, and ion permeable separators 95. In additional embodiments the electrode preparation system/device 400 may be used to layer an energy storage device. In additional embodiments, the electrode preparation system/device 400 may be used to layer an energy storage device with a layering structure of; two separate conductive metal current collectors 45 with opposing sides applied with the electrode mix; two separate conductive metal current collectors 45 with opposing sides contacting a freestanding electrode; and two ion permeable separators 95 positioned between the two separate current collectors coated and electrode composite. In additional embodiments, the electrode preparation system/device 400 may be used to produce a double layer electrolytic capacitor 460. In additional embodiments, the electrode preparation system/device 400 may be used to produce a supercapacitor 460. In additional embodiments, the electrode preparation system/device 400 may be used to produce an energy storage device 460.

In additional embodiments, the electrode preparation system/device 400 may be configured to produce a continuously rolled and/or layered (anode, ion permeable separator, cathode, ion permeable separator) energy storage device 460-, and/or supercapacitor cell 460 configuration. In additional embodiments, the electrode preparation system/device 400 may be configured to allow a layered design with a plurality of anodes 45, ion permeable separators 95, and cathodes 45, for each cell, which may be stacked and/or grouped. Additionally, in certain embodiments, stacked, layered, or rolled energy storage devices may have leads of anodes connected, and may additionally have leads of cathodes connected. In certain embodiments, the leads of anodes and cathodes may be connected to energy storage device terminals 115, which may additionally protrude out of the energy storage device 460.

In certain embodiments the ion permeable separator 95 may include non-limiting examples of; porous plastics, paper, cellulose, glass, fibers, sheet, spray, ion permeable insulators/separators.

In additional embodiments, the electrode preparation system/device 400 the device may further include mechanical feed units and/or feeders for the supercapacitor container and/or shell. The mechanical feed unit and/or feeders may be mechanically coupled to the device and may be used to allow at regular or predetermined intervals the insertion and removal of said supercapacitor containers, which may be new containers or partially completed containers containing supercapacitor materials.

In additional embodiments, the electrode preparation system/device 400 may include mechanical feed units and/or feeders to place layered or rolled energy storage device internal components into an energy storage container, which may be energy storage materials and/or supercapacitor materials. In additional embodiments, the electrode preparation system/device 400 may be mechanically connected to an electrolyte injector 433 or plurality of electrolyte injectors 433 and may additionally include sprayer(s) and/or nozzle(s). In additional embodiments, the electrode preparation system/device 400 may administer or inject 433 an electrolyte, said electrolyte may comprise organic electrolytes, aqueous electrolytes, co-solvent and salt electrolytes, ion carrier electrolytes, ionic electrolytes, gel electrolytes, dry polymer electrolytes, ceramic electrolytes, with co-solvent in salt electrolytes being preferred, into the energy storage container containing energy storage materials and/or supercapacitor materials.

In exemplified embodiments, the electrode preparation system/device 400 may administer or inject 433 an electrolyte and/or allow the administering of an electrolyte into an energy storage device in typical atmospheric environments. In exemplified embodiments, the electrode preparation system/device 400 administers or injects 433 an electrolyte into an energy storage device in a typical atmospheric environment. In exemplified embodiments, the electrode preparation system/device 400 administers or injects 433 an electrolyte into a supercapacitor in a typical atmospheric environment.

In exemplified embodiments, the electrode preparation system/device 400 may also include a mechanical feed unit(s) and/or feeders for the energy storage container containing energy storage materials and electrolyte. In exemplified embodiments, the electrode preparation system/device 400 may be mechanically connected to a container sealing device, said sealing device may include a crimper(s), screw, rivet, clamp, press, weld or seal, a welder(s) 451, to bind and/or affix anode and cathode leads to positive and negative terminals of said energy storage device, and/or enclose or seal the energy storage device 460. In exemplified embodiments, the electrode preparation system/device 400 may include said sealing device and may also include sealing means for said container with or without a separate seal or component(s).

In exemplified embodiments the electrode preparation system/device 400 may also include means to control internal energy storage pressure, for instance for a vacuum. In certain embodiments the electrode preparation system/device 400 may include a vacuum pump, which may be used to reduce energy storage device internal pressure.

In exemplified embodiments the electrode preparation system/device 400 may include a finished energy storage cell hopper 462 to deposit finish energy storage devices 460 or supercapacitor cells 460.

In exemplified embodiments, the electrode preparation system/device 400 may include a controller and/or processor (not shown) associated with the operation and parameter control of the electrode preparation system/device 400. In additional embodiments, the controller and/or processor may be configured to adjust the speed and control a multitude of systems including non-limiting examples of; anode metal feed 45, cathode metal feed 45, ion permeable separators 95 feed, electrode mixing, electrode material feed system 406, electrode mix applicators 408, electrode mix measurements, electrode mix recirculation systems 409, electrode drying 420, rollers 412a/412b, tensioners 413a/413b, winding speed, winding length, layering speed, layering length, motors 414, drive systems 415, container loading, container filling, container moving, electrolyte mixing 431, electrolyte injecting 432/433, electrolyte measurements, anode and cathode connection, anode cathode terminal connection, welding 450, container sealing 451, container crimping, container closing, vacuum control, energy storage device assembly 460, supercapacitor assembly 460, hopper deposit and control 462. The controller which may be based on one or more inputs, sensors, feedback sensors, measured parameters, measurements, timers, timed process, temperature gauges, and/or other suitable assembly parameters. It should be noted in additional embodiments, suitable moisture sensors, temperature sensors, or gas sensors in operable communication with the controller and/or processor may be integrated, or mechanically connected, into or between each of the zone and/or at any suitable position along or within the energy storage production system 500 or device. In additional embodiments, the controller and the processor may use the information obtained from the sensors and/or gauges to optimize the speed and efficiency of the device and/or processing systems, mechanical components, feed systems, mixing systems, assembly systems, and materials, which may be based upon one or more readings taken by the various sensors.

Figure 16:
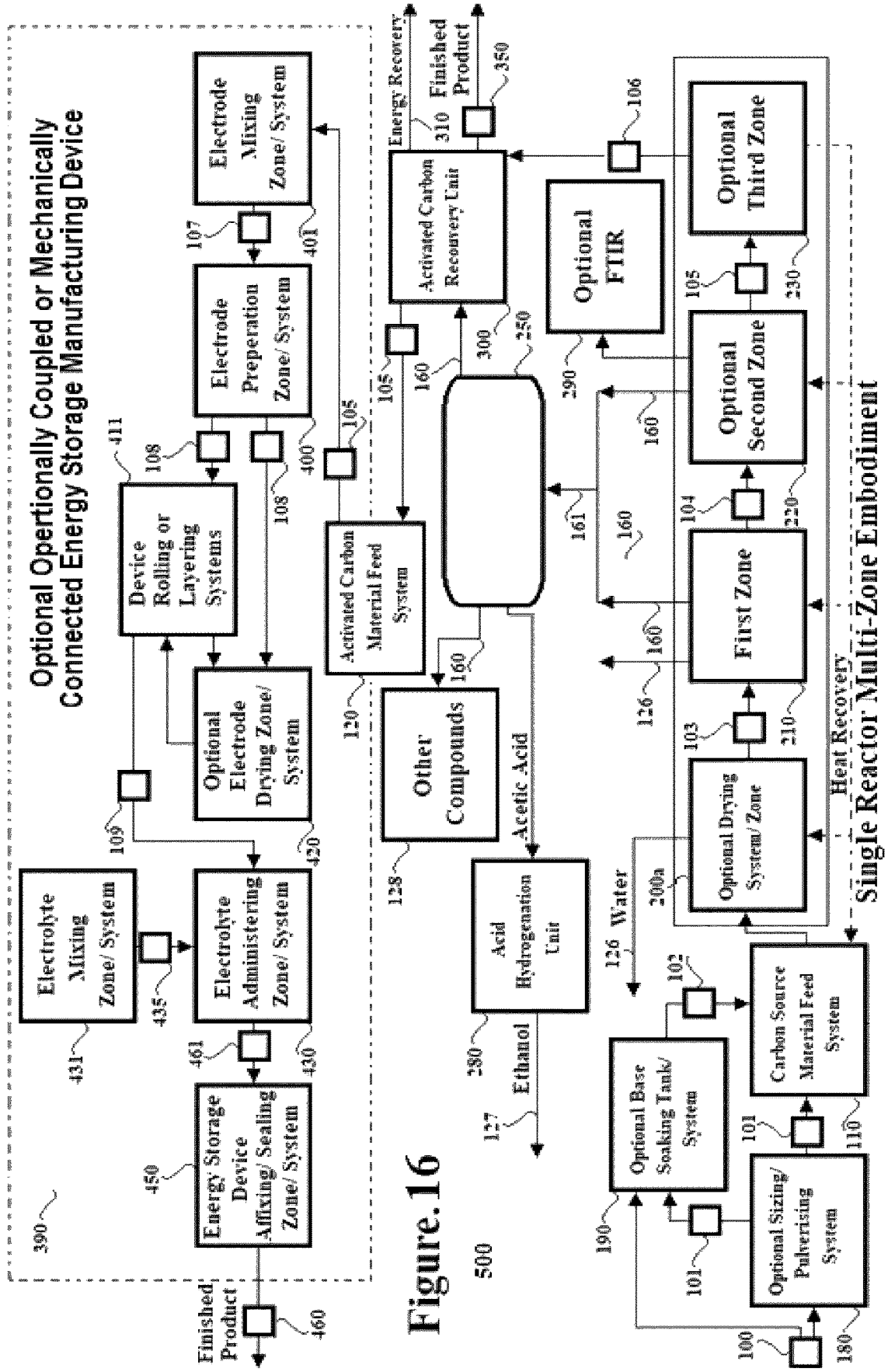
FIG. 16 Is a block diagram of an exemplified embodiment of the invention including a continuous carbon material feed system with a single reactor multi zone activated carbon production system and energy storage production system.

FIG. 16 Is a functional block diagram of an exemplified embodiment of the invention including a continuous carbon material feed system 110, with a single reactor multi zone, pre-determined pore configuration hierarchical structure activated carbon production system 380. The device arrangement includes in this embodiment a complete mechanically coupled, and/or operationally connected, energy storage device manufacturing system 390, including an electrode production system 400, operationally coupled to the said pre-determined pore configuration hierarchical structure activated carbon production system 380. Wherein the invention may be accomplished with a series of steps, or alternate steps comprising;

In an exemplified embodiment, the improved pre-determined pore configuration hierarchical structure activated carbon, and finished energy storage device comprising; a step to determine the desired pore sizing and hierarchical structure for the final activated carbon to control the devices parameters to produce a desired resultant product; an option carbon source drying step 200a; a step to feed the carbon source material 100 into an optional sizing and pulverizing system 180; a step to pulverize carbon material 100 and produce pulverised carbon material 101; a step to feed carbon source material 100 into a chemical base soaking tank/system 190; alternatively, a step to feed pulverised carbon material 101 into a chemical base soaking tank/system 190; alternatively, a step of feeding the pulverized carbon material 101 into to an optional chemical base soaking tank/system 190; a step of soaking the 110 the carbon source material 100 or pulverised carbon material 101 in a base chemical and water solution to produce base soaked carbon material 102; a step of feeding, by means of the material feed system 110, the carbon source material 100; or alternately the pulverised carbon material 101 into an optional drying system/zone 200a; alternatively, a step of feeding base soaked carbon material 102, by means of the carbon source material feed system 110, to the optional drying system/zone 200a; a step of drying the base soaked carbon material 102, or alternatively the carbon source material 100, in the optional drying system/zone 200; a step of removing water 126, and/or chemical such as a base, from the base chemical soaked carbon source material 102; a step of producing dried carbon material 103; a step of recovering and/or recycling heat, by means of a heat recovery system 310; a step of feeding dried carbon material 103 by means of a carbon feed system 110 into an optional first zone/pre-heat reactor 210; a step of pre-heating the dried carbon material 103 in the first zone/pre-heat reactor 210 to produce preheated carbon material 104; a step of exhausting water 126, and/or gasses via a line 160; a step of feeding the preheated carbon material 104 by means of a carbon feed system 110 to an optional second zone/reactor 220 two undergo pyrolysis; a step of the pre-heated material 104 undergoing pyrolysis, or alternatively dried material 103 undergoing pyrolysis, in the second zone/pyrolysis reactor 220 to produce predetermined pore configuration hierarchical structure activated carbon material 105; an optional step of monitoring the second zone/pyrolysis reactor 220 by means of an optional FTIR 290; a step of feeding activated carbon material 105 by means of an activated carbon feed system 120 to an optional third zone/a cooling/washing reactor 230 for cooling, and/or washing, which may include an additive such as HCl; a step of exhausting gases through a line 160 from the first pre-heat zone 210; a step of exhausting gases through a line 160 from the second zone/pyrolysis reactor 220; a step of exhausting gases through a line 160 from a second line 160, which may be combined into a single line 161; a step of exhausting gasses through a combined line 161 into the phase separator 250; a step of capturing, from exhausting gases polar compounds 128, which optionally may be used immediately for heat, or energy recovery, and/or stored for later use; a step of transferring acetic acid through a line 160 from the gas phase separator 250 to an acid hydrogenation unit 280; an optional step of turning acetic acids into ethanol 127; an optional step of feeding cooled/washed activated carbon material 106 via the activated carbon feed system 120 into an active carbon recovery unit 300; an optional step of removing finished activated carbon product 350 from the activated carbon recovery unit 300, produced in the pre-determined pore configuration hierarchical structure activated carbon material production device 380; an optional step of recovering energy 310, by means of the activated carbon recovery unit 300; a step of cooled/washed activated carbon material 106, produced in the pre-determined pore configuration hierarchical structure activated carbon material production device 380, by means of the activated carbon material feed system 120, into the electrode mixing zone/system 401, within the energy storage device manufacturing system 390; a step of mixing additional electrode ingredients, and the pre-determined pore configuration hierarchical structure activated carbon material 105/106 together, to form an electrode composite mix, within the electrode mixing zone/system 401; a step of feeding the electrode composite mix 107 into an electrode preparation zone/system 400; a step of preparing an electrode 108 in the electrode preparation zone/system 400; a step of feeding the electrode 108 into an optional electrode drying zone/system 420, or alternatively feeding the electrode into rolling or layering system/zone which may include an ion permeable separator or separators 411; a step of feeding the prepared electrode 109 into an electrolyte administering zone/system 430; a step of placing the finished energy storage device operational mechanisms 109, into an energy storage device container; a step administering an electrolyte 435, in the electrolyte administering zone/system 430, fed from the electrolyte mixing zone/system 431; a step of sealing or enclosing a finished energy storage device assembly 461, within the fixing/sealing zone/system 450; an optional step of introducing a vacuum into the sealed/enclosed finished energy storage device assembly 461, or alternately producing a finished energy storage device 460;

In an exemplified embodiment, depicted in FIG. 16, the improved pre-determined pore configuration hierarchical structure activated carbon, and finished energy storage device comprising;

In exemplified embodiments, feeding the carbon source material 100 into an optional sizing and pulverizing system 180. In exemplified embodiments, the closed material feed system 110 includes a material feed hopper (not shown), a material transport mechanical system 110 and an oxygen purge manifold or mechanical system (not shown).

In exemplified embodiments, the material feed hopper may be any suitable open-air or closed-air container configured to receive carbon source material 100. The material feed hopper may be mechanically and operably connected with the material feed system 110, which may be, in certain embodiments, a screw or auger system operably rotated by a drive source, such as non-limiting examples of a motor or other mechanically operable device (not shown).

In an additional embodiment, the carbon source material 100 may be fed into the material feed system 110 which may be accomplished with a gravity-feed system. In certain embodiments, the material feed system 110 may be constructed such that the screw or auger and may be enclosed in a suitable enclosure. In additional embodiments, the described enclosure may be substantially cylindrical in shape. In additional embodiments, the material feed system 110 may include a screw, auger, conveyor, drum, screen, chute, drop chamber, pneumatic conveyance device, which may also include a rotary airlock and/or a double or triple flap airlock (not shown).

In certain embodiments, the carbon source material 100 is fed from the carbon source material feed hopper to the material feed system 110, the auger and/or screw is rotated, this rotation causes the moving of the raw carbon source material 100 toward an oxygen purge manifold. It should be expressed that, when the carbon source material 100 reaches the oxygen purge manifold, the ambient air among the raw carbon source material 100 in the material feed system 110 may include roughly about 21% oxygen. In additional embodiments, the oxygen purge manifold may be arranged in such a manner to be adjacent to or around the material feed system 110. In certain embodiments, the oxygen fold manifold, and/or the enclosure of the material feed unit 110 may include a plurality of gas inlet ports and a plurality of gas outlet ports.

In certain embodiments, the oxygen purge manifold may have at least one gas inlet line and at least one gas outlet line. In additional embodiments, the at least one gas inlet line of the oxygen purge manifold may be in operable communication and mechanically connected with each of the plurality of gas inlet ports. In additional embodiments, the at least one gas outlet line of the oxygen purge manifold may be in operable communication and mechanically connected with each of the plurality of gas outlet ports. In certain embodiments, the gas inlet line(s) may be configured to pump an inert gas into the gas inlet ports. In certain embodiments, the inert gas is nitrogen and/or argon and/or helium containing substantially no oxygen. In an additional embodiment, the inert gas flow is introduced counter-current to the carbon source material.

In certain embodiments, the introduction of an inert gas into the enclosed feed system 110 may and likely will be used to force the ambient air out of the enclosed system. In certain embodiments when in operation, and when the inert gas is introduced to the first gas inlet port a quantity of oxygen-rich ambient air is forced out of an outlet port. It should be understood that, at this point, the desired level of less than or equal to about 2% oxygen, less than or equal to about 1% oxygen, less than or equal to about 0.5% oxygen or less than or equal to about 0.2% or less than or equal to about 0.1% oxygen may not be achieved.

In additional embodiments, additional infusions of the inert gas must be made in order to purge the requisite and/or desired amount of oxygen from the air surrounding the carbon source material 100 in the enclosed system. In additional embodiments, the second gas inlet port may pump the inert gas into the enclosed system in concert with the infusion at the first gas inlet port, thereby allowing for the purging of partially or substantially more of the remaining oxygen from the enclosed system. It should be understood that after one or two or a plurality of infusions of inert gas to purge the oxygen, the desired result of lowering oxygen content percentage may be achieved. In additional embodiments, if the desired oxygen levels are still not achieved after two inert gas infusions, a third infusion of inert gas may be used, and may purge remaining undesired amounts of oxygen from the enclosed system at a gas outlet. Additional inlets and outlets pluralities may also be incorporated if desired. In additional embodiments, oxygen levels may be monitored throughout the material feed system 110 to allow calibration of the amount and location of inert gas infusions to ensure desired performance, safety and resulting processed pre-determined pore configuration hierarchical structure activated carbon material 105.

In certain embodiments it should be noted that the gas inlet port(s) and the corresponding gas outlet port(s) respectively, are slightly offset from each other with respect to a vertical bisecting plane through the material feed unit 110. In certain embodiments, inlet port(s) and corresponding outlet port(s) may be offset on the material feed system 110 by an amount that approximately corresponds with the pitch of the auger in the material feed unit 110. In additional embodiments, after the atmosphere surrounding the raw material 100 is de-oxygenated to a predetermined or satisfactory level, it may then be fed from the material feed system 110 into a reaction zone 220 or zones. In additional embodiments, oxygen levels may be monitored throughout the material feed system 110 to allow the calibration of the amount and location of inert gas infusions to allow pre-determined or desired levels.

In additional embodiments, the device includes a plurality of gas introduction probes (s) and gas extraction probes(s) located at various points throughout the device. In additional embodiments, one of each gas introduction probe(s) and one of each gas extraction probe(s) correspond with a different one of the plurality of zones. In alternative embodiments, the device includes any suitable number of gas introduction probe(s) and gas extraction probes(s) including in certain embodiments having one gas introduction probe(s) and more than one gas extraction probe(s) for each of the plurality of zones.

In exemplified embodiments, pulverizing carbon material 100 and producing a pulverised carbon material 101. Feeding carbon source material 100 into a chemical base soaking tank/system 190. Alternatively, feeding pulverised carbon material 101 into a chemical base soaking tank/system 190. Alternatively, feeding the pulverized carbon material 101 into to an optional separate chemical base soaking tank/system 190.

In exemplified embodiments, the carbon source material 100, such as coal or petroleum coke, is optionally dried, ground, pulverised, and sized, for instance by passing through a mesh, outside the reactor 220 and then introduced into a soaking/mixing zone 190 with an optional low-oxygen containing atmosphere, which may occur prior to being introduced into the carbon source hopper. This may be accomplished optionally with the use of the material feed system 110. The material feed system 110 may be controlled to reduce the oxygen level for the ambient air of the device to less than or equal to about 3%, to about 2%, to about 1%, to about 0.1%. Once the oxygen levels have been decreased in the device the raw carbon material 100 enters the soak/mixing zone 190 via the enclosed material feed system 110. In one such embodiment, the raw material feed system 110 may comprise an encapsulated jacket or sleeve by which steam and off-gases from the reactor 220 are used to heat the carbon source material 100, directly, or used by a process gas heater and/or heat exchanger (not shown) which is then used to pre-heat or pyrolyze the carbon source material 100.

Subsequently and in exemplified embodiments, an additive with water, such as a non-limiting example of KOH, is distributed thoroughly and/or evenly throughout the carbon source material 100 for a period of time prior to heating and/or pyrolysis, a soak time, within the soaking/mixing zone 190 for a period of about 10 min, about 20 min, about 30 min, about 40 min, about 50 min, about 1 hour, about 1.5 hours, about 2 hours, about 3 hours, about 4 hours, about 5 hours, about 6 hours, 15 about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 24 hours, about 25 hours, about 26 hours, about 27 hours, about 28 hours, about 29 hours, about 30 hours, about 31 hours, about 32 hours, about 33 hours, about 34 hours, about 35 hours, about 36 hours, about 37 hours, about 38 hours, about 39 hours, about 40 hours, about 41 hours, about 42 hours, about 43 hours, about 44 hours, about 45 hours, about 46 hours, about 47 hours, about 48 hours, about 49 hours, about 50 hours, or around 12 hours which is preferred.

In exemplified embodiments, soaking 110 the carbon source material 100 or pulverised carbon material 101 in a base chemical and water solution to produce base soaked carbon material 102. Feeding, by means of the material feed system 110, the carbon source material 100 or alternately the pulverised carbon material 101 into an optional drying system/zone 200*a*.

In alternative embodiments, the drying zone(s) are associated with the gas introduction probe(s) and the gas extraction probe(s). In additional embodiments, the gas introduction probe(s) introduces nitrogen and/or argon and/or helium into the drying zone and the gas extraction probe(s) extracts gas from the drying zone. In certain embodiments, the gas introduction probe(s) may be configured to introduce a mixture of gas into the drying zone(s). In additional embodiments, the gas extracted may be oxygen. In alternative embodiments, the gas extraction probe(s) extracts gases from the drying zone(s) to be reused in a heat and/or energy recovery system.

In certain embodiments, the pre-heat zone 210 may be associated with the gas introduction probe(s) and the gas extraction probe(s). In additional embodiments, the gas introduction probe(s) introduces nitrogen and/or argon and/or helium into the pre-heat zone 210 and the gas extraction probe(s) extracts gas from the pre-heating zone. In additional embodiments, the gas introduction probe(s) may be configured to introduce a mixture of gas into the pre-heating zone. In additional embodiments, the gas extracted from the gas extraction probe(s) may include carbon-enriched off-gases. In additional embodiments, the gases extracted from the pre-heating zone 210 and/or pyrolysis reactor zone 220 may be reintroduced to the material at a later stage in the process, for example in the carbon recovery unit and/or pyrolysis reactor 220. In additional embodiments, the gases extracted from a plurality of the zones of the device may be used for either energy recovery in the drying, processing, or gas heater, further pyrolysis in the trimming reactor, and/or in the carbon enrichment unit.

In alternative embodiments, feeding base soaked carbon material 102, by means of the carbon source material feed system 110, to the optional drying system/zone 200a. Drying the base soaked carbon material 102, or alternatively the carbon source material 100, in the optional drying system/zone 200. Removing water 126, and/or chemical such as a base, from the base chemical soaked carbon source material 102. Producing dried carbon material 103. Recovering and/or recycling heat, by means of a heat recovery system 310. Feeding dried carbon material 103 by means of a carbon feed system 110 into an optional first zone/pre-heat reactor 210. Pre-heating the dried carbon material 103 in the first zone/pre-heat reactor 210 to produce preheated carbon material 104. Exhausting water 126, and/or gasses via a line 160.

In certain embodiments, the device may include a single reactor 220 having two to a greater plurality of different zones. Described in certain embodiments, multiple zones are shown, however, any different number of zones could be employed in alternate embodiments. In an additional embodiment, each zone may be connected to at least one other zone via a material transport unit 110. In an additional embodiment, the material transport 110 unit may control atmosphere and temperature conditions.

Subsequently and in exemplified embodiments, the pre-soaked carbon source 100 enters the preheating/drying zone 200a, wherein the carbon source 100 and internal temperature is raised from around ambient temperature to around 100° C. to a temperature of about 150° C. to about 200° C. In an additional embodiment, the temperature remains below 200° C. In additional embodiments, the pre-heating/drying zone 200a may include a mechanism (not shown) to capture and/or exhaust off-gases from the pre-soaked carbon source 100 while it is being heated. In additional embodiments, the off-gases can be extracted for optional use at a later time. In additional embodiments, the heating source used for the various mechanical systems is electrical or gas. In additional embodiments, the heating source used for the various reactors is waste gas from other reactors of the device and/or may be from external sources. In additional embodiments, the heat may be from an indirect source.

In exemplified embodiments, feeding the preheated carbon material 104 by means of a carbon feed system 110 to an optional second zone/reactor 220 to undergo pyrolysis.

In certain embodiments, the pyrolysis reactor/zone 220 may be associated with the gas introduction probe(s), and the gas extraction probe. In additional embodiments, the gas introduction probe(s) introduces nitrogen and/or argon and/or helium into the pyrolysis zone 220 and the gas extraction probe(s) extracts gas from the pyrolysis zone 220. In additional embodiments, the gas introduction probe(s) is configured to introduce a mixture of gas into the pyrolysis zone. In additional embodiments, the gas extracted from the gas extraction probe may include carbon-enriched off-gases. In certain embodiments, the carbon-enriched gases extracted from the pyrolysis zone 220 may be used and reintroduced to the material at a later stage and/or subsequent stage in the process. In additional embodiments, the extracted gas from the pre-heat zone 210 and/or the extracted gas from the pyrolysis zone 220 may be combined prior to being reintroduced to the material at any stage within the process.

In exemplified embodiments, the pre-heated material 104 undergoing pyrolysis, or alternatively dried material 103 undergoing pyrolysis, in the second zone/pyrolysis reactor 220 to produce pre-determined pore configuration carbonized activated carbon material 105. Optionally monitoring the second zone/pyrolysis reactor 220 by means of an optional FTIR 290.

Subsequently after preheating in a heating/drying zone 200a, a material feed system 110 transfers the preheated carbon source 100 into a separate reactor 220 which is optional. In an additional embodiment, the first zone 200a and reactor 220 is the same reactor. In an additional embodiment where the first zone 200a is different than the reactor 220, a material feed system 110 may penetrate the reactor 220 through as a non-limiting example a high-temperature vapor seal system such as an airlock (not shown), this may allow the carbon source 100 to penetrate the reactor 220 while preventing gas and/or heat from escaping or from oxygen from entering. In an additional embodiment, the interior of the reactor 220 is heated to a temperature of about 100° C., or about 200° C., or about 300° C., or about 400° C., or about 500° C., or about 600° C., or about 700° C., or about 800° C., or about 900° C., or about 1000° C., or about 1100° C., with 800° C., for 2 hours at a ramp rate of 10 per minute® C., being preferred. In an additional embodiment, the reactor 220 may comprise an output port to capture and exhaust gases given off, for instance from the preheated carbon source material 100 while it is undergoing pyrolysis. In an additional embodiment, gases are extracted and stored for optional later use. In an additional embodiment, the off-gases from the reactor 22 and the off-gases from a plurality of zones of the device may be combined into a single gas stream. Once carbonized, the carbon source material 100 is now pre-determined pore configuration hierarchical structure pyrolyzed activated carbon 105 and may exit the reactor 220 by means of an activated carbon feed system 120, which in certain embodiments is the same feed system as the carbon source feed system 110 and may enter an optional cooling/washing zone 240 for cooling and washing, where washing the activated carbon with water and an optional additive is preferred, a non-limiting example of the preferred additive is HCl. In certain embodiments, washing and/or cooling may be accomplished in a certain or controlled amount of time, for instance a soak time, for a period of about 10 min, about 20 min, about 30 min, about 40 min, about 50 min, about 1 hour, about 1.5 hours, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 24 hours, about 25 hours, about 26 hours, about 27 hours, about 28 hours, about 29 hours, about 30 hours, about 31 hours, about 32 hours, about 33 hours, about 34 hours, about 35 hours, about 36 hours, about 37 hours, about 38 hours, about 39 hours, about 40 hours, about 41 hours, about 42 hours, about 43 hours, about 44 hours, about 45 hours, about 46 hours, about 47 hours, about 48 hours, about 49 hours, about 50 hours, or around 8 hours which is preferred. Wherein in certain embodiments the cooling/washing zone 420 may be the same reactor 220 and/or a different zone/system.

In exemplified embodiments, the raw carbon source material 100, such as coal, petroleum coke, oil, biomass is introduced into the reactor 220 in a low-oxygen containing atmosphere, which may be accomplished optionally through the use of a material feed system 110 that has been already described. The material feed system 110 may be used to reduce the oxygen level in the ambient air in the system to less than or equal to about 3%, or about 2%, or about 1%, or about 0.1% which may accommodate the process of pyrolysis free of combustion. Raw carbon source material 100 may enter the device in an enclosed material feed system 110, which may be after the oxygen levels have been decreased. In additional embodiments, the material feed system 110 may include an encapsulated jacket(s) or sleeve(s) through which steam and/or off-gases from the reactor are sent and/or used in the pre-heating of the carbon source material 100.

In additional embodiments, the raw carbon source material 100 may first travel from the material feed system 110 and through an optional drying 200a and/or pre-heat zone 210 or area of the device.

In an additional embodiment, the optional drying 200a zone may heat the raw material to remove water and other moisture, which may be a separate zone and prior to it being passed along into the separate preheat zone 210. In an additional embodiment, the interior of the optional drying zone 200a may be heated to a temperature of about ambient temperature to about 100° C. to about 150° C. to about 200° C. Water or moisture removed from the raw carbon source material 100 may be exhausted, in one example from outlet ports, from the optional drying zone 200a or area. In an additional embodiment, the optional drying zone 200a may be adapted to allow vapors, steam, and/or moisture, to be extracted. In an additional embodiment, vapors, steam, and/or moisture from the optional drying zone 200a may be extracted for optional later use. This moisture, vapor, or steam, which has been extracted from the optional drying zone 200a may be used in a suitable waste heat recovery system and may be in conjunction with the material feed system 110. In an additional embodiment, the vapor, steam, and/or moisture, used in the material feed system 110 may be used to pre-heat the raw carbon source materials 100 while oxygen levels are being purged in or by the material feed system 110. In an additional embodiment, the carbon source material 100 is dried outside of the reactor(s) 220 if the reactor(s) do not comprise a drying zone 220.

In an additional embodiment, the dried carbon source material 100 enters a preheat zone 210, wherein the temperature may be raised from the range of about ambient temperature to a temperature range of about 100° C., to about 150° C., to about 200° C. In an additional embodiment, the temperature does not exceed 200° C. in the preheat zone 210. It should be appreciated that if the preheat zone is too hot, or subsequently not hot enough, then the dried carbon source material 100 may be processed in a non ideal manner prior to entering the reactor 220 zone. The preheat zone 210 may include an output mechanism to capture, for current or later reuse, exhaust off gases from the dried carbon source material 100 while it is being preheated. In additional embodiments, the off gases may be extracted for optional later use. In additional embodiments, the heating source used for the various zones may be electric or gas. In additional embodiments, the heating source used for the various zones may be waste gas from other zones of the device and/or from the external source(s). In additional embodiments, the heat may be indirect.

In exemplified embodiments, after processing within the preheat zone 210, the material feed system 110 may pass the preheated material into the reactor 220 to undergo the pyrolysis process. In an additional embodiment, the material feed system 110 may penetrate the pyrolysis zone 220, which may be through a high-temperature vapor seal system (not shown), which may include a non-limiting example of an airlock (not shown), which may allow the material feed system to penetrate the high-temperature pyrolysis reactor 220 zone while preventing or minimizing gas from escaping, and/or oxygen from entering. In an additional embodiment, the interior of the pyrolysis zone and/or reactor 220 is heated to a temperature of about 100° C., about 200° C., about 300° C., about 400° C., about 500° C., about 600° C., about 700° C., about 800° C., about 900° C., about 1000° C., about to 1100° C., or to about 800° C., which is preferred. In additional embodiments, the pyrolysis zone(s) 220 may include an outlet port(s) and inlet port(s) similar to the preheat zone(s) 210 to capture and exhaust the gases which may be given off of the preheated carbon source material 100 while it is being carbonized. In an additional embodiment, the gases may be extracted for optional later use at the discretion of the operator. In an additional embodiment, the off gases from the preheat zone(s) 210 and the off gases from the pyrolysis zone(s) 220 may be combined into a single gas stream. Once carbonized, the carbonized carbon source material 105 exits the pyrolysis reactor 220 zone and may then enter into a cooling/washing zone 240.

In additional embodiments, the raw carbon source material 100, and subsequently then dried carbon source, preheated carbon source, pre-determined pore configuration hierarchical structure activated carbon material 105, travel through the reactor 220 and/or reactors, along a continuous material feed unit 110 and/or system. In additional embodiments, the material feed system 110 may carry the carbon source material 100 which may differ at different stages in the process. In additional embodiments, the process of moving the material through the reactor 220, zones or reactors is a continuous process. In certain embodiments, the speed of the material feed system 110 may be appropriately calibrated, calculated, and controlled by an associated controller and/or processor (not shown) such that the operation of the material feed system 110 does not require interruption as the material moves through the device and reactor 220 or reactors zone and/or zones. In certain embodiments, the material feed unit 110 may be operationally sectioned, and may include a plurality of separate augers (not shown) or additional carbon material feed mechanisms as described in this disclosure, and controlled by an associated controller and/or processor (not shown) such that the operation individual carbon material feed mechanisms allows of the material feed system 110 to control the rate of progression between zones, stages, or reactors for the carbon material 100 depending on the optimal time for the carbon source material 100 to remain within a specific zone, stage, reactor, of the device.

In additional embodiments, a controller (not shown) associated with the reactor 220 or reactors may be configured to adjust the speed of the material feed unit 110, which may be based on one or more feedback sensors, detected gas which may be from the optional FTIR, measured parameters, temperature gauges, and/or other suitable variables in the reactor 220 or reaction process. It should be noted in additional embodiments, suitable moisture sensors, temperature sensors, or gas sensors in operable communication with the controller and/or processor may be integrated, or mechanically connected, into or between each of the zones and/or reactors 220 or at any suitable position along the material feed unit 110 or device. In additional embodiments, the controller and the processor may use the information obtained from the sensors and/or gauges by which to optimize the speed and efficiency of the device and/or processing systems. In additional embodiments, the controller which may be associated with the reactor 220 and/or reactors is configured to operate the material feed unit 110.

In additional embodiments, the controller associated with the reactor 220 or reactors may be configured to monitor the concentration, temperature, and moisture of the gas inside the material feed unit 110 or inside any of the reactors 220 and/or zones. In additional embodiments, the controller may be configured to adjust the speed of the material feed unit 110, the input of gases into the material feed unit 110, and/or the heat applied to the material 100 in the material feed unit 110, which may be based upon one or more readings taken by the various sensors.

It should also be noted that, in additional embodiments, the device is enclosed in a kiln shell to control and manipulate the high amounts of heat required for the reactor 220 process and reactions to occur. In additional embodiments, the kiln shell of the device may include several insulating chambers which may surround a plurality of zones. In certain embodiments, the kiln includes a plurality separate zones for the device. In additional embodiments, each of the zones of the device includes at least one inlet and at least one outlet. In additional embodiments, within each zone the inlet and outlets are configured to be adjustable in which to control the flow of carbon feed material 100, gas and heat, into and out of the zone or zones. A supply of inert gas may be introduced into the inlet and the purged air may be extracted from the corresponding outlet. In additional embodiments, one or more of the outlets of a zone in the device are connected to one or more of the other inlets or outlets in the device.

In additional embodiments, after the raw carbon source material 100 is de-oxygenated in the material feed system 110, it may be introduced to the device, and specifically to the first zones and/or the optional drying zone 200a. The drying zone 200a may include inlet(s) and outlet(s). In additional embodiments, the drying zone 200a may be heated to a temperature of about 80° C. to about 200° C. to reduce water and/or other moisture from the carbon source material 100. The carbon source material 100 may then be moved to the pre-heat zone, which may be the same zone, where the material 100 may be pre-heated.

In additional embodiments, the carbon source material 100 that has optionally been dried and/or preheated may then be moved into the carbonization reactor 220. In certain embodiments, carbonization may occur at a temperature from about 200° C. to about 1100° C., for example about 200° C., about 210° C., about 220° C., about 230° C., about 240° C., about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., about 400° C., 410° C., about 420° C., about 430° C., about 440° C., about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., about 610° C., about 620° C., about 630° C., about 640° C., about 650° C., about 660° C., about 670° C., about 680° C., about 690° C., about 700° C., about 710° C., about 720° C., about 730° C., about 740° C., about 750° C., about 760° C., about 770° C., about 780° C., about 790° C., about 800° C., about 810° C., about 820° C., about 830° C., about 840° C., about 850° C., about 860° C., about 870° C., about 880° C., about 890° C., about 900° C., about 910° C., about 920° C., about 930° C., about 940° C., about 950° C., about 960° C., about 970° C., about 980° C., about 990° C., about 1000° C., about 1010° C., about 1020° C., about 1030° C., about 1040° C., about 1050° C., about 1060° C., about 1070° C., about 1080° C., about 1090° C., about 1100° C., or about 800° C.

In additional embodiments, a carbonization zone of a reactor 220 is constructed to allow gases 122 produced during carbonization to be extracted and/or stored for a desired later use. In additional embodiments, gases 122 produced during carbonization are extracted for optional current or later use. In additional embodiments, a carbonization temperature is selected and maintained to reduce and/or eliminate the production of methane ($CH_4$) and maximize carbon content of the carbonized carbon source material 100.

In additional embodiments, the reactor 220 may include at least one input and a plurality of outlet ports. In additional embodiments, one of the outlet ports may be connected to collection equipment or to further processing equipment, such as an acid hydrogenation unit or distillation column. In additional embodiments, the reactor 220 may process the off gases that may come from the preheat zone 210 and the pyrolysis reactor 220 zone, which may produce a condensate and/or an enrichment gas. In an additional embodiment, the condensate may include polar compounds, such as non-limiting examples of acetic acid, methanol and furfural. In an additional embodiment, the enrichment gas produced by means of the reactor 220 may include at least non-polar gases. In an additional embodiment, the gas reactor 220 may comprise a fractionation column. In an additional embodiment, acetic acid may be sent via a line or channel to an optional acid hydrogenation unit. In an additional embodiment, methanol and/or furfural may be sent via optional additional line(s) and/or channels to a distillation/processing unit.

In additional embodiments, the carbon recovery unit may also include an input connected to the reactor 220. In additional embodiments, gases pulled from the carbon recovery unit are optionally used in energy recovery systems and/or systems which may further offer carbon enrichment. Additionally, in various embodiments, gases may be pulled from one or more zones of the device and optionally used in energy recovery systems and/or systems for further carbon processing.

As discussed, high oxygen levels in the ambient air surrounding raw materials 100 as they are processed could result in undesirable combustion or oxidation of the raw material 100 to occur, this can drastically reduce the amount and quality of the final activated carbon material 105. In additional embodiments, the material feed system 110 may be a closed system that includes one or more manifolds configured to purge oxygen from the air surrounding the raw carbon source material 100 and/or within the zone(s) or reactor(s) 220. In additional embodiments, an oxygen level of about 0.5% to about 1.0% may be used for pre-heating, pyrolyzing and/or carbonizing and/or cooling. It should be noted that a goal of the closed material feed system 110 is designed to reduce oxygen levels to less than or equal to about 3%, less than or equal to about 2%, less than or equal to about 1% or less than or equal to about 0.5% throughout the process. Once the oxygen levels are reduced, the carbon source material 100 is transferred along the material feed system 110 in the device. In additional embodiments, the preheating of inert gases throughout the recovery process, and with the subsequent introduction of pre-heated inert gases to the device, reactor, or trimming reactor, makes the system more efficient and may reduce energy consumption.

In additional embodiments, a trimming reactor (not shown) may be included in the system. In an additional embodiment with a trimming reactor (not shown), pyrolyzed material from the device is fed into the separate additional reactor(s) (not shown) for further pyrolysis where heated inert gas may be introduced to create a product with higher fixed carbon level. In additional embodiments, this secondary process may be conducted in a container such as non-limiting examples of, a drum, tank, barrel, bin, tote, pipe, sack, press, or roll-off container. In additional embodiments, a final container may be used for transport of the carbonized material 105. In additional embodiments, inert gas may be heated via a heat exchanger (not shown) which may derive heat from gases extracted from the device, which may be combusted in a process gas heater.

In an additional embodiment, heat, steam and gases recovered from the reactor 220 may be directed to the material feed system 110 where they may be enclosed in jacket and separated from direct contact with the carbon source material 100, but may be used to indirectly heat the carbon source material 100 prior to introduction to the reactor 220 and/or reactors and/or drying zones.

In alternate embodiments, heat, steam and gases recovered from the drying zone(s) 200a 200b or the reactor(s) 220 may be directed to the material feed system 110 where they may be enclosed in a jacket and/or separated from direct contact with the carbon source material 100, this also allowing the indirect heat of the feed material 100 prior to the introduction of the feed material 100 to the reactor(s) 220.

In exemplified embodiments, feeding activated carbon material 105 by means of an activated carbon feed system 120 to an optional third zone/a cooling/washing reactor 230 for cooling, and/or washing, which may include an additive such as HCl. Exhausting gases through a line 160 from the first preheat zone 210.

In exemplary embodiments, when the pre-determined pore configuration hierarchical structure activated carbon product 105 enters the cooling/washing zone 420, the material is allowed to cool (actively or passively) to a specified temperature. In an additional embodiment, the temperature of the pre-determined pore configuration activated carbon 105 is reduced in the cooling/washing zone 420 within a substantially inert atmosphere. In an additional embodiment, the cooling/washing zone 420 may cool the pre-determined pore configuration hierarchical structure activated carbon material 105 with water cooling, and may additionally include an additive such as HCl, which may be a mechanical mechanism, and which may soak the material for a specified or extended period of time. It should be noted that the pre-determined pore configuration carbon material 105 may be allowed to cool in the cooling/washing zone 420 wherein it reaches a point where it will not undergo spontaneous combustion if exposed to normal atmosphere and/or oxygenated air. In an additional embodiment, the cooling/washing zone 420 reduces the temperature of the carbon material below 200° C. or about 150° C. or about 100° C. In exemplified embodiments, the device may include an optional mixing system to mix the activated carbon material 105, coolant, and additive, which may allow for the uniform cooling of the carbon material. Additionally, cooling may occur by either direct or indirect means, which may be with water and/or other liquids or additives; additionally, the cooling process may also occur by direct or indirect means with air or other gases, and/or a combination of the both of the above In certain embodiments, the cooling mechanisms are separate from the reactors 220, and may be mechanically coupled to the activated carbon material feed system 120. In additional embodiments, the cooling mechanism is located after the reactors 220. In additional embodiments, the cooling mechanism may be the same as, or built into, the reactors 220. In additional embodiments, the cooler mechanism is comprised of, for non-limiting examples, a screw, auger, conveyor which is specifically a belt conveyor, in certain embodiments, drum, screen, pan, counterflow bed, vertical tower, jacketed paddle, cooled screw, and/or a combination thereof, which cools by either direct or indirect means, and with water and/or other liquids/additives, and/or direct or indirectly with gases, and/or any combination of the above. In additional embodiments, the cooler(s) could include a water spraying mechanism or inlet port(s) (with or without an additive), a cooled inert gas stream mechanism and/or outlet port(s) which may be liquid nitrogen, or ambient air if below ignition and/or a combustible temperature. In additional embodiments, heat may be recovered from or during this step, an example would be by capturing the flash steam generated by a water spray, and/or the superheated steam generated when a saturated steam is introduced, which may be mixed into and throughout, and may then be heated by the activated carbon material 105.

In additional embodiments, the pre-determined pore configuration carbonized activated carbon material 105 may be moved to a temperature-reducing or cooling zone 240 and may be passively or actively cooled. In additional embodiments, pre-determined pore configuration hierarchical structure activated carbon material 105 may be cooled to a temperature to about 10° C., to about 20° C., to about 30° C. or to about 40° C. In additional embodiments, the pre-determined pore configuration hierarchical structure activated carbon material 105 may be moved to a temperature reducing or cooling zone/washing zone 240, which may be cooled and washed to remove an additive, such as a base, such as specifically KOH, simultaneously. In additional embodiments, the pre-determined pore configuration carbonized activated carbon material 105 may be moved to a temperature reducing or cooling zone 240, which may be cooled and washed simultaneously with water and an additive, such as HCl.

In exemplified embodiments, when the pre-determined pore configuration hierarchical structure activated carbon material 105 enters the cooling/washing zone 240, the carbonized material 105 is allowed to cool to a predetermined temperature range of about 20° C. to 30° C. which is generally about room temperature. In additional embodiments, the device includes a plurality of cooling/washing zones 240. In additional embodiments, the cooling/washing zone(s) 240 may cool the carbonized material 105 to below 200° C. In an additional embodiment, the cooling/washing zone(s) 240 may include a mixer and/or auger to agitate and uniformly cool and/or wash the carbonized materials 105. In additional embodiments, one or more of a plurality of cooling/washing zones 240 may be outside of the device.

In additional embodiments, the pre-determined pore configuration hierarchical structure activated carbon material 105 exits the cooling/washing zone 240 along the activated carbon feed system 120 and then may enter the carbon recovery unit (not shown).

In additional embodiments, the pre-determined pore configuration hierarchical structure activated carbon material 105 exits the cooling/washing zone 240 along the activated carbon feed system 120 and then may enter the electrode mixing system/zone 401.

In exemplified embodiments, exhausting gases through a line 160 from the second zone/pyrolysis reactor 220. Exhausting gases through a line 160 from a second line 160, which may be combined into a single line 161. Exhausting gases through a combined line 161 into the phase separator 250. Capturing, from exhausting gases polar compounds 128, which optionally may be used immediately for heat, or energy recovery, and/or stored for later use. The transferring of acetic acid through a line 160 from the gas phase separator 250 to an acid hydrogenation unit 280. Turning acetic acids into ethanol 127.

In an alternative embodiment, the cooling zone 240 may be associated with the gas introduction probe(s) and the gas extraction probe(s). In additional embodiments, the gas introduction probe(s) may introduce nitrogen and/or argon and/or helium into the cooling/washing zone 240 and the gas extraction probe(s) may extract gas from the cooling/washing zone 240. In various embodiments, the gas introduction probe(s) may be configured to introduce a mixture of gas into the cooling/washing zone 240. In various embodiments, the gas extraction probe(s) extracts gases from the cooling/washing zone 240 to be reused in a heat and/or energy recovery system.

In certain embodiments, the gas introduction probe(s) and the gas extraction probe(s), described may be configured to operate with the controller and the plurality of sensors to adjust the levels and/or concentrations of gas being introduced and/or gas being extracted from each of the device's zones.

In certain embodiments, the gas introduction probe(s) and gas extraction probe(s) may be made of a suitable pipe and be made to withstand high temperature fluctuations. In certain embodiments, the gas introduction probes(s), and gas extraction probes(s) may include a plurality of openings through which the gas may be introduced and/or extracted. In certain embodiments, the plurality of openings may be disposed on the lower side of the inlet and gas extraction probe(s). In additional embodiments, each of the plurality of openings extends for a substantial length within the respective zone and/or zones.

In additional embodiments, the gas introduction probe(s) may extend from one side of the device through each zone and/or zones. In such specific embodiments, each of the gas introduction probe(s) may extend from a single side of the device to each of the respective zones of the device. In additional embodiments, gaseous catalysts may be added in order to enrich fixed carbon levels. In such specific embodiments, the plurality of openings for each of the gas introduction probe(s) may only be disposed in the respective zone associated with that particular gas introduction probe.

In certain embodiments, each of the gas introduction probes may extend from the left side of the base soaking/mixing zone 190 into each one of the zones, in this example the gas introduction probe(s) may travel through the device and to or through electrode mixing system/zone 401, and may be constructed so the said introduction probes terminate in the selected zone including; base soaking/mixing zone 190, drying zone 200*a*, preheat zone 210, pyrolysis reactor 220, cooling/washing zone 240, drying region 200*b*, electrode mix system/zone 401, a particular zone(s), all of the zones, or selected zone(s).

In certain embodiments the gas introduction probes may all travel through the pre-heat zone 210, and may have the pre-heat zone gas introduction probe terminating in the pre-heat zone 200*a*. In such a specific embodiment the remaining gas introduction probes may travel through the pyrolysis zone 220, with the pyrolysis zone gas introduction probe potentially terminating in the pyrolysis zone 220. In additional embodiments, the gas extraction probe(s) may be configured similar to the gas introduction probe(s). In additional embodiments the gas introduction probe(s) and gas extraction probes may originate from either side of the device.

In certain embodiments, the gas introduction probes may be arranged concentrically with one another in order to save space which may be used in or by the multiple-port configuration. In embodiment as described, each inlet probes and/or inlet ports may have a smaller diameter than the previous inlet probe and inlet port. For example in embodiments as described, the base soaking/mixing zone 190 gas introduction probe may have the largest interior diameter, and therefore the pre-heat/drying zone 210/200*a* gas introduction probe(s) would be situated within the interior diameter of the base soaking/mixing zone 190 gas introduction probe, therefor pyrolysis zone 220 gas introduction probe would then be situated within the interior diameter of the pre-heat/drying zone gas introduction probe(s) therefor the cooling/washing zone 240 gas introduction probe(s) would be situated within the pyrolysis zone 220 gas introduction probe 159, therefor the drying zone 200*b* gas introduction probe(s) would be situated within the cooling/washing zone 240 gas introduction probe(s) therefor the electrode mixing system zone 401 gas introduction probe(s) would be situated within the drying zone 200*a* gas introduction probe(s). For embodiments as described, a suitable connector may be attached to each of a possible gas introduction probes outside of the device in order to control the air infused into each of the said possible gas introduction probes individually or concertedly.

In certain embodiments as described, a concentric and/or substantially concentric arrangement may be preferred, the outer-most gas introduction probe is only exposed in each zone before it has been terminated. Therefore, for embodiments as described, individual introductions to gas zones may be controlled independent from one and another, this while only requiring a single continuous gas introduction probe line. It should be explained and understood that a similar concentric or substantially concentric configuration may be suitable and used for the gas extraction probes for such an embodiment.

In exemplified embodiments, feeding cooled/washed activated carbon material 106 via the activated carbon feed system 120 into an active carbon recovery unit 300. Removing finished activated carbon product 350 from the activated carbon recovery unit 300, produced in the pre-determined pore configuration hierarchical structure activated carbon material production device 380. Optionally, recovering energy 310, by means of the activated carbon recovery unit 300.

In exemplified embodiments, cooled/washed activated carbon material 106, produced in the pre-determined pore configuration hierarchical structure activated carbon material production device 380, by means of the activated carbon material feed system 120, into the electrode mixing zone/system 401, within the energy storage device manufacturing system 390. Mixing additional electrode ingredients, and the pre-determined pore configuration hierarchical structure activated carbon material 105/106 together, to form an electrode composite mix, within the electrode mixing zone/system 401.

The pre-determined pore configuration hierarchical structure activated carbon material 105 may at this point may be in a powder state or may be pulverised to create a fine powder, which my occur within the electrode mixing zone/system 401 or a separate pulverising device. In certain embodiments the grinding and/or pulverising may occur prior to activation, and/or after carbon activation.

In exemplary embodiments, and within one or more mixing chambers, the activated carbon may be mixed with electrode ingredients to make an electrode mix. Some non-limiting examples of electrode ingredients include; conductive agent(s), a binder(s), a mixing agent(s). Some non-limiting examples of conductive agents may include; carbon black, Super P™, furnace black, channel black, acetylene black, thermal black, lamp black, conductive carbon. Some non-limiting examples of binders may include; PVDF, PTFE, non-reactive thermoplastic fluoropolymer(s), copolymers, terpolymers. Some non-limiting examples of mixing agents may include; 2-propanol, sec-propyl alcohol, IPA, isopropyl, isopropanol, alcohol, water. Some non-limiting examples of an electrode composition include and may be in the form of; a mix, a paint, a mixture, a paste, an ink, or a freestanding electrode.

In exemplified embodiments, feeding the electrode composite mix 107 into an electrode preparation zone/system 400. Preparing an electrode 108 in the electrode preparation zone/system 400.

In certain embodiments, the said mixing electrode mixing system(s) 401 may be interconnected and/or mechanically coupled to an electrode preparation system 400, which may include an extruder or plurality of extruders, and/or sprayer(s), in order to administer an electrode mix composition. Additionally, in alternate embodiments the electrode preparation system 400 may form a freestanding electrode, which may be formed, pressed, applied, which may then be attached to a current collector. The electrode mix composition may be applied, pressed, or contacted to, a conductive current collector material such as; a metal which may be; stainless steel, titanium, copper, aluminum, silver, which may be a foil or mesh, and may be a variety of thicknesses from 0.0001 mm up to and including 10 mm, and a variety of mesh patterns or windings. Additionally, the electrode mix and/or freestanding electrode may be a variety of thicknesses from 0.0001 mm up to and including 10 mm, or about 0.05 mm, or about 0.1 mm, or about 0.15 mm, or about 0.2 mm, or about 0.25 mm, or about 0.3 mm, or about 0.35 mm, or about 0.4 mm, or about 0.45 mm, or about 0.5 mm, or about 0.55 mm, or about 0.6 mm, or about 0.65 mm, or about 0.7 mm, or about 0.75 mm, or about 0.8 mm, or about 0.85 mm, or about 0.9 mm, or about 0.95 mm, or about 1.0 mm, or about 1.25 mm, or about 1.5 mm, or about 1.75 mm, or about 2.0 mm, or about 2.25 mm, or about 2.5 mm, or about 2.75 mm, or about 3.0 mm, or about 3.25 mm, or about 3.5 mm, or about 3.75 mm, or about 4.0 mm, or about 4.25 mm, or about 4.5 mm, or about 4.75 mm, or about 5.0 mm, or about 6.0 mm, or about 7.0 mm, or about 8.0 mm, or about 9.0 mm, or about 10.0 mm, or about 1 mg/cm$^2$, or about 1.25 mg/cm$^2$, or about 1.5 mg/cm$^2$, or about 1.75 mg/cm$^2$, or about 2 mg/cm$^2$, or about 2.25 mg/cm$^2$, or about 2.5 mg/cm$^2$, or about 2.75 mg/cm$^2$, or about 3 mg/cm$^2$, or about 3.25 mg/cm$^2$, or about 3.5 mg/cm$^2$, or about 3.75 mg/cm$^2$, or about 4 mg/cm$^2$, or about 4.25 mg/cm$^2$, or about 4.5 mg/cm$^2$, or about 4.75 mg/cm$^2$, or about 5 mg/cm$^2$, or about 5.25 mg/cm$^2$, or about 5.5 mg/cm$^2$, or about 5.75 mg/cm$^2$, or about 6 mg/cm$^2$, or about 6.25 mg/cm$^2$, or about 6.5 mg/cm$^2$, or about 6.75 mg/cm$^2$, or about 7 mg/cm$^2$, or about 7.25 mg/cm$^2$, or about 7.5 mg/cm$^2$, or about 7.75 mg/cm$^2$, or about 8 mg/cm$^2$, or about 8.25 mg/cm$^2$, or about 8.5 mg/cm$^2$, or about 8.75 mg/cm$^2$, or about 9 mg/cm$^2$, or about 9.25 mg/cm$^2$, or about 9.5 mg/cm$^2$, or about 9.75 mg/cm$^2$, or about 10 mg/cm$^2$, or about 10.25 mg/cm$^2$, or about 10.5 mg/cm$^2$, or about 10.75 mg/cm$^2$, or about 11 mg/cm$^2$, or about 11.25 mg/cm$^2$, or about 11.5 mg/cm$^2$, or about 11.75 mg/cm$^2$, or about 12 mg/cm$^2$, or about 12.25 mg/cm$^2$, or about 12.5 mg/cm$^2$, or about 12.75 mg/cm$^2$, or about 13 mg/cm$^2$, or about 13.25 mg/cm$^2$, or about 13.5 mg/cm$^2$, or about 13.75 mg/cm$^2$, or about 14 mg/cm$^2$, or about 14.25 mg/cm$^2$, or about 14.5 mg/cm$^2$, or about 14.75 mg/cm$^2$, or about 15 mg/cm$^2$, or about 16 mg/cm$^2$, or about 17 mg/cm$^2$, or about 18 mg/cm$^2$, or about 19 mg/cm$^2$, or about 20 mg/cm$^2$, or about 21 mg/cm$^2$, or about 22 mg/cm$^2$, or about 23 mg/cm$^2$, or about 24 mg/cm$^2$, or about 25 mg/cm$^2$, or about 30 mg/cm$^2$, or about 35 mg/cm$^2$, or about 40 mg/cm$^2$, or about 45 mg/cm$^2$, or about 50 mg/cm$^2$, or about 3.6-10.5 mg/cm$^2$ being preferred.

In additional embodiments, said electrode preparation system 400, may comprise or be mechanically connected to an applicator system such as non-limiting examples of; a nozzle(s), a sprayer(s), a scrapper(s), a press, to allow administering said electrode composition mix, and/or freestanding electrode. Which may be directly applied to said metal, which may be directly contacting said metal, and/or a freestanding design. In additional embodiments, the electrode preparation system 400 additionally include a mechanical pump, compressor, gravity feed, press, auger or pressure to provide a consistent feed of said electrode mix composition.

In additional embodiments the device includes an analyzer to determine the ion size of electrolytes, to determine the ideal sizes and distribution of the final hierarchical structure activated carbon pores, prior to the process beginning. In additional embodiments the device includes a step to determine the desired and ideal sizing and distribution for the final hierarchical structure activated carbon pores prior to the process beginning, or alternatively during the process.

In additional embodiments, the electrode preparation system/device 400 may include an electrode mix feed system 406, and may further include a mechanical feed system and/or layering device 411. Additionally in certain embodiments, the electrode preparation system/device 400 may include; feeders, winders, rollers drums, cutter(s) or crimper(s), drive mechanism and/or motors, connecting belt, gear, and/or direct connection, tensioners for the anode material, cathode material, and ion permeable separator, electrode mix injectors, electrode applicators, electrode mix overflow system, an electrode drying zone/system 420, an electrolyte zone/system which may include an electrolyte mixing system and storage tank 431, and electrolyte conduit, electrolyte injectors, a welding/sealing zone/system 450, which may include welders, sealers, crimpers, press, seal(s) which may form part of the energy storage device production system 500, or in alternative embodiments may be mechanically coupled and/or separate from the energy storage production system 500. In additional embodiments, the energy storage production system 500 may additionally have an energy storage device hopper in order to store energy storage devices 460, and/or have energy storage devices 460 deposited.

In additional embodiments electrode preparation system/device 400 may be used to allow a continuous feed of said conductive metal. In additional embodiments electrode preparation system/device 400 may be used to allow a continuous feed of said conductive metal applied with an electrode mix, ink, paint, paste, or composition. In additional embodiments electrode preparation system/device 400 may be used to allow a continuous feed of said electrode mix in order to form a freestanding electrode.

In additional embodiments, the electrode preparation system/device 400 may be used to allow a continuous feed of said conductive metal that may be used to affix and/or provide contacting between the conductive metal and freestanding electrode or electrode mix, and may include additional drying or moisture removal. In additional embodiments, the electrode preparation system/device 400 may be used to allow a continuous feed of an ion permeable separator or separators. In additional embodiments, the electrode preparation system/device 400 may be used to allow a continuous feed for layering, and/or multilayering, of said conductive metal, electrode mix composition, and an ion permeable separator. In additional embodiments, the electrode preparation system/device 400 may be used to layer an energy storage device. In additional embodiments, the electrode preparation system/device 400 may be used to layer an energy storage device with a layering structure of; two separate conductive metal current collectors with opposing sides applied with the electrode mix; two separate conductive metal current collectors with opposing sides contacting a freestanding electrode; and two ion permeable separators positioned between the two separate current collectors coated and electrode composite. In additional embodiments, the electrode preparation system/device 400 may be used to produce a double layer electrolytic capacitor 460. In additional embodiments, the electrode preparation system/device 400 may be used to produce a supercapacitor 460. In additional embodiments, the electrode preparation system/device 400 may be used to produce an energy storage device 460.

In exemplified embodiments, feeding the electrode 108 into an optional electrode drying zone/system 420, or alternatively feeding the electrode into rolling or layering system/zone 411.

In additional embodiments, the electrode preparation system/device 400 may be configured to produce a continuously rolled and/or layered (anode, ion permeable separator, cathode) energy storage device 460, and/or supercapacitor cell 460 configuration. In additional embodiments, the electrode preparation system/device 400 may be configured to allow a layered design with a plurality of anodes, ion permeable separators, and cathodes, for each cell, which may be stacked and/or grouped. Additionally, in certain embodiments, stacked, layered, or rolled energy storage devices may have leads of anodes connected, and may additionally have leads of cathodes connected. In certain embodiments, the leads of anodes and cathodes may be connected to energy storage device 460 terminals, which may additionally protrude out of the energy storage device 460.

In certain embodiments the ion permeable separator may include non-limiting examples of; porous plastics, paper, cellulose, fibers, glass, ion permeable insulators/separators.

In exemplified embodiments, feeding the prepared electrode 109 into an electrolyte administering zone/system 430. Placing the finished energy storage device operational mechanisms 109, into an energy storage device container.

In additional embodiments, the electrode preparation system/device 400 may further include mechanical feed units and/or feeders for the supercapacitor container and/or shell. The mechanical feed unit and/or feeders may be mechanically coupled to the device and may be used to allow at regular or predetermined intervals the insertion and removal of said supercapacitor containers, which may be new containers or partially completed containers containing supercapacitor materials.

In additional embodiments, the electrode preparation system/device 400 may include mechanical feed units and/or feeders to place layered or rolled energy storage device internal components into an energy storage container, which may be energy storage materials, and/or supercapacitor materials.

In exemplified embodiments, administering an electrolyte 435, in the electrolyte administering zone/system 430, fed from the electrolyte mixing zone/system 431.

In additional embodiments, the electrode preparation system/device 400 may be mechanically connected to an electrolyte injector or plurality of electrolyte injectors, and may additionally include sprayer(s) and/or nozzle(s). In additional embodiments, the electrode preparation system/device 400 may administer or inject an electrolyte, said electrolyte may comprise organic electrolytes, aqueous electrolytes, co-solvent and salt electrolytes, ion carrier electrolytes, ionic electrolytes, gel electrolytes, dry polymer electrolytes, ceramic electrolytes, with co-solvent in salt electrolytes being preferred, into the energy storage container containing energy storage materials and/or supercapacitor materials.

In additional embodiments, the electrode preparation system/device 400 may include mechanical feed units and/or feeders to place layered or rolled energy storage device internal components into an energy storage container, which may be energy storage materials and/or supercapacitor materials. In additional embodiments, the electrode preparation system/device 400 may be mechanically connected to an electrolyte injector 433 or plurality of electrolyte injectors 433, and may additionally include sprayer(s) and/or nozzle(s). In additional embodiments, the electrode preparation system/device 400 may administer or inject 433 an electrolyte, said electrolyte may comprise organic electrolytes, aqueous electrolytes, co-solvent and salt electrolytes, ion carrier electrolytes, ionic electrolytes, gel electrolytes, dry polymer electrolytes, ceramic electrolytes, with co-solvent in salt electrolytes being preferred, into the energy storage container containing energy storage materials and/or supercapacitor materials.

In exemplified embodiments, the electrode preparation system/device 400 may administer or inject 433 an electrolyte and/or allow the administering of an electrolyte into an energy storage device in typical atmospheric environments. In exemplified embodiments, the electrode preparation system/device 400 administers or injects 433 an electrolyte into an energy storage device in a typical atmospheric environment. In exemplified embodiments, the electrode preparation system/device 400 administers or injects 433 an electrolyte into a supercapacitor in a typical atmospheric environment.

In exemplified embodiments, the electrode preparation system/device 400 the device may also include a mechanical feed unit(s) and/or feeders for the energy storage container containing energy storage materials and electrolyte. In exemplified embodiments, the electrode preparation system/device 400 may be mechanically connected to a container sealing device, said sealing device may include a crimper(s), screw, rivet, clamp, press, weld or seal, a welder(s) 451, to bind and/or affix anode and cathode leads to positive and negative terminals of said energy storage device, and/or enclose or seal the energy storage device 460. In exemplified embodiments, the electrode preparation system/device 400 may include said sealing device and may also include sealing means for said container with or without a separate seal or component(s).

In exemplified embodiments the electrode preparation system/device 400 may also include means to control internal energy storage pressure, for instance for a vacuum. In certain embodiments the electrode preparation system/device 400 may include a vacuum pump, which may be used to reduce energy storage device internal pressure.

In exemplified embodiments the electrode preparation system/device 400 may include a finished energy storage cell hopper 462 to deposit finish energy storage devices 460 or supercapacitor cells 460.

In exemplified embodiments, the electrode preparation system/device 400 may include a controller and/or processor (not shown) associated with the operation and parameter control of the electrode preparation system/device 400. In additional embodiments, the controller and/or processor may be configured to adjust the speed and control a multitude of systems including non-limiting examples of; anode metal feed, cathode metal feed, ion permeable separator feed, electrode mixing, electrode material feed system 406, electrode mix applicators 408, electrode mix measurements, electrode mix recirculation systems 409, electrode drying 420, rollers 412a/412b, tensioners 413a/413b, winding speed, winding length, layering speed, layering length, motors 414, drive systems 415, container loading, container filling, container moving, electrolyte mixing 431, electrolyte injecting 432/433, electrolyte measurements, anode and cathode connection, anode cathode terminal connection, welding 450, container sealing 451, container crimping, container closing, vacuum control, energy storage device assembly 460, supercapacitor assembly 460, hopper deposit and control 462. The controller which may be based on one or more inputs, sensors, feedback sensors, measured parameters, measurements, timers, timed process, temperature gauges, and/or other suitable assembly parameters. It should be noted in additional embodiments, suitable moisture sensors, temperature sensors, or gas sensors in operable communication with the controller and/or processor may be integrated, or mechanically connected, into or between each of the zones and/or at any suitable position along or within the energy storage production system 500 or device. In additional embodiments, the controller and the processor may use the information obtained from the sensors and/or gauges by which to optimize the speed and efficiency of the device and/or processing systems, mechanical components, feed systems, mixing systems, assembly systems, and materials, which may be based upon one or more readings taken by the various sensors.

In exemplified embodiments the electrode preparation system/device 400 may also include means to control internal energy storage pressure, for instance for a vacuum. In certain embodiments the electrode preparation system/device 400 may include a vacuum pump, which may be used to reduce internal pressure.

Figure 17:
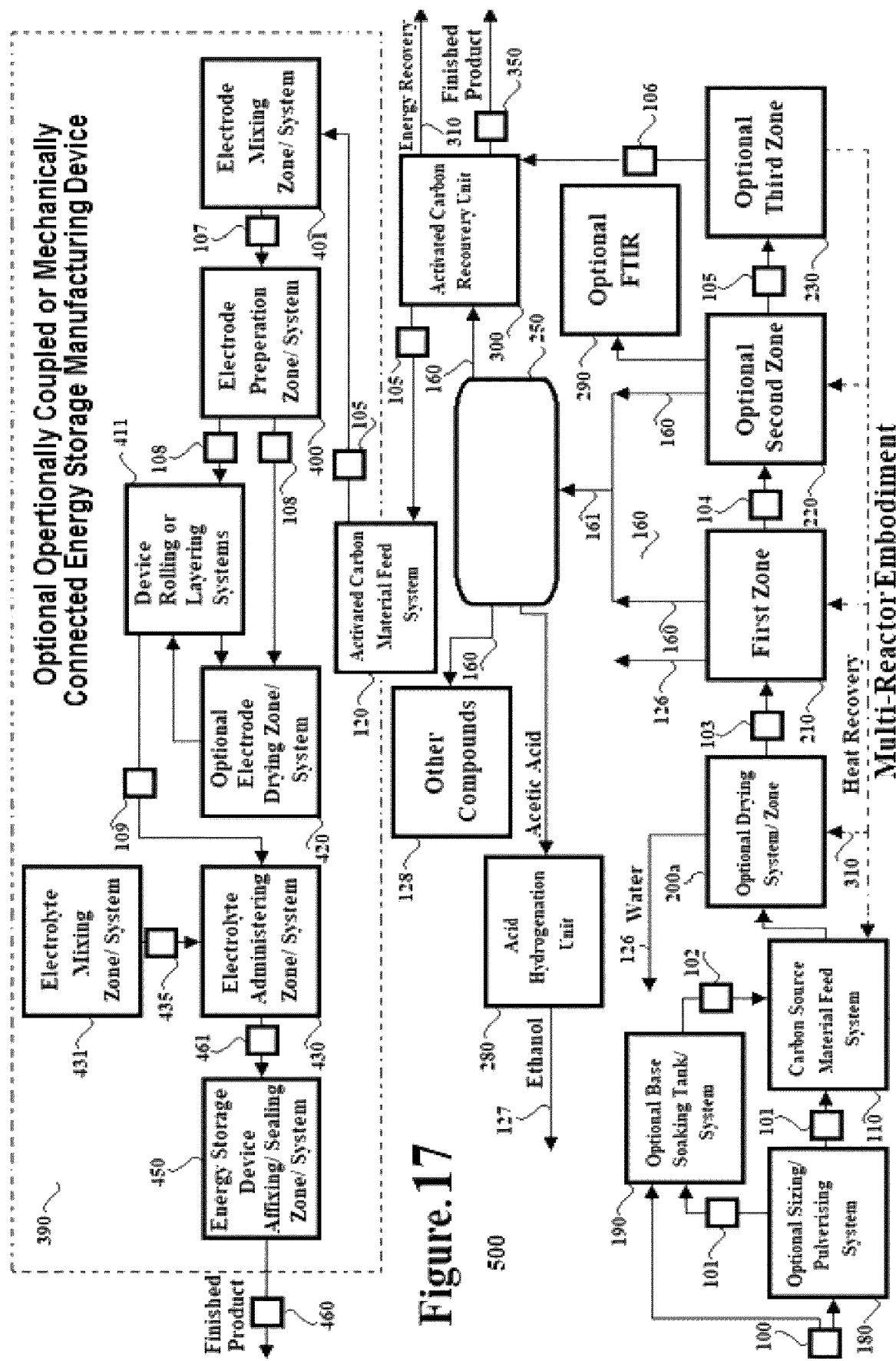
FIG. 17 Is a block diagram of an exemplified embodiment of the invention including a continuous carbon material feed system with a multi reactor multi zone activated carbon production system and energy storage production system.

FIG. 17 Is a functional block diagram of an exemplified embodiment of the invention including a continuous carbon material feed system 110, with a multi reactor multi zone, pre-determined pore configuration hierarchical structure activated carbon production system 380. The device arrangement includes in this embodiment a complete mechanically coupled, and/or operationally connected, energy storage device manufacturing system 390, including an electrode production system 400, operationally coupled to the said pre-determined pore configuration carbonized activated carbon production system 380 wherein the invention may be accomplished with a series of steps, or alternate steps comprising:

In an exemplified embodiment, the improved pre-determined pore configuration hierarchical structure activated carbon, and finished energy storage device comprising; a step to determine the desired pore sizing and hierarchical structure for the final activated carbon to control the devices controllable systems to produce a desired resultant product; an option carbon source drying step 200a; a step to feed the carbon source material 100 into an optional sizing and pulverizing system 180; a step to pulverize carbon material 100 and produce pulverised carbon material 101; a step to feed carbon source material 100 into a chemical base soaking tank/system 190; alternatively, a step to feed pulverised carbon material 101 into a chemical base soaking tank/system 190; alternatively, a step of feeding the pulverized carbon material 101 into to an optional chemical base soaking tank/system 190; a step of soaking 110 the carbon source material 100 or pulverised carbon material 101 in a base chemical and water solution to produce base soaked carbon material 102; a step of feeding, by means of the material feed system 110, the carbon source material 100; or alternately the pulverised carbon material 101 into an optional drying system/reactor 200a; alternatively, a step of feeding base soaked carbon material 102, by means of the carbon source material feed system 110, to the optional drying system/reactor 200a; a step of drying the base soaked carbon material 102, or alternatively the carbon source material 100, in the optional drying system/reactor 200; a step of removing water 126, and/or chemical such as a base, from the base chemical soaked carbon source material 102; a step of producing dried carbon material 103; a step of recovering and/or recycling heat, by means of a heat recovery system 310; a step of feeding dried carbon material 103 by means of a carbon feed system 110 into an optional first zone/pre-heat reactor 210; a step of pre-heating the dried carbon material 103 in the first zone/pre-heat reactor 210 to produce preheated carbon material 104; a step of exhausting water 126, and/or gases via a line 160; a step of feeding the preheated carbon material 104 by means of a carbon feed system 110 to an optional second zone/reactor 220 to undergo pyrolysis; a step of the pre-heated material 104 undergoing pyrolysis, or alternatively dried material 103 undergoing pyrolysis, in the second zone/pyrolysis reactor 220 to produce pre-determined pore configuration hierarchical structure activated carbon material 105; an optional step of monitoring the second zone/pyrolysis reactor 220 by means of an optional FTIR 290; a step of feeding activated carbon material 105 by means of an activated carbon feed system 120 to an optional third zone/a cooling/washing reactor 230 for cooling, and/or washing, which may include an additive such as HCl; a step of exhausting gases through a line 160 from the first pre-heat zone/reactor 210; a step of exhausting gases through a line 160 from the second zone/pyrolysis reactor 220; a step of exhausting gases through a line 160 from a second line 160, which may be combined into a single line 161; a step of exhausting through a combined line 161 into the phase separator 250; a step of capturing, from exhausting gases polar compounds 128, which optionally may be used immediately for heat, or energy recovery, and/or stored for later use; a step of transferring acetic acid through a line 160 from the gas phase separator 250 to an acid hydrogenation unit 280; an optional step of turning acetic acids into ethanol 127; an optional step of feeding cooled/washed activated carbon material 106 via the activated carbon feed system 120 into an active carbon recovery unit 300; an optional step of removing finished activated carbon product 350 from the activated carbon recovery unit 300, produced in the pre-determined pore configuration hierarchical structure activated carbon material production device 380; an optional step of recovering energy 310, by means of the activated carbon recovery unit 300; a step of cooled/washed activated carbon material 106, produced in the pre-determined pore configuration hierarchical structure activated carbon material production device 380, by means of the activated carbon material feed system 120, into the electrode mixing zone/system 401, within the energy storage device manufacturing system 390; a step of mixing additional electrode ingredients, and the pre-determined pore configuration hierarchical structure activated carbon material 105/106 together, to form an electrode composite mix, within the electrode mixing zone/system 401; a step of feeding the electrode composite mix 107 into an electrode preparation zone/system 400; a step of preparing an electrode 108 in the electrode preparation zone/system 400; a step of feeding the electrode 108 into an optional electrode drying zone/system 420, or alternatively feeding the electrode into rolling or layering system/zone which may include ion permeable separator(s) 411; a step of feeding the prepared electrode 109 into an electrolyte administering zone/system 430; a step of placing the finished energy storage device operational mechanisms 109, into an energy storage device container; a step administering an electrolyte 435, in the electrolyte administering zone/system 430, fed from the electrolyte mixing zone/system 431; a step of sealing or enclosing a finished energy storage device assembly 461, within the fixing/sealing zone/system 450; an optional step of introducing a vacuum into the sealed/enclosed finished energy storage device assembly 461, or alternately producing a finished energy storage device 460.

In an exemplified embodiment, depicted in FIG. 17, the improved pre-determined pore configuration hierarchical structure activated carbon, and finished energy storage device comprising;

In exemplified embodiments, feeding the carbon source material 100 into an optional sizing and pulverizing system 180. In exemplified embodiments, the closed material feed system 110 includes a material feed hopper (not shown), a material transport mechanical system 110 and an oxygen purge manifold or mechanical system (not shown).

In exemplified embodiments, the material feed hopper may be any suitable open-air or closed-air container configured to receive carbon source material 100. The material feed hopper may be mechanically and operably connected with the material feed system 110, which may be, in certain embodiments, a screw or auger system operably rotated by a drive source, such as non-limiting examples of a motor or other mechanically operable device (not shown).

In an additional embodiment, the carbon source material 100 may be fed into the material feed system 110 which may be accomplished with a gravity-feed system. In certain embodiments, the material feed system 110 may be constructed such that the screw or auger may be enclosed in a suitable enclosure. In additional embodiments, the described enclosure may be substantially cylindrical in shape. In additional embodiments, the material feed system 110 may include a screw, auger, conveyor, drum, screen, chute, drop chamber, pneumatic conveyance device, which may also include a rotary airlock and/or a double or triple flap airlock (not shown).

In certain embodiments, the carbon source material 100 is fed from the carbon source material feed hopper to the material feed system 110, the auger and/or screw is rotated, this rotation causes the moving of the raw carbon source material 100 toward an oxygen purge manifold. It should be expressed that, when the carbon source material 100 reaches the oxygen purge manifold, the ambient air among the raw carbon source material 100 in the material feed system 110 may include roughly about 21% oxygen. In additional embodiments, the oxygen purge manifold may be arranged in such a manner to be adjacent to or around the material feed system 110. In certain embodiments, the oxygen fold manifold, and/or the enclosure of the material feed unit 110 may include a plurality of gas inlet ports and a plurality of gas outlet ports.

In certain embodiments, the oxygen purge manifold may have at least one gas inlet line and at least one gas outlet line. In additional embodiments, the at least one gas inlet line of the oxygen purge manifold may be in operable communication and mechanically connected with each of the plurality of gas inlet ports. In additional embodiments, the at least one gas outlet line of the oxygen purge manifold may be in operable communication and mechanically connected with each of the plurality of gas outlet ports. In certain embodiments, the gas inlet line(s) may be configured to pump an inert gas into the gas inlet ports. In certain embodiments, the inert gas is nitrogen and/or argon and/or helium containing substantially no oxygen. In an additional embodiment, the inert gas flow is introduced counter-current to the carbon source material.

In certain embodiments, the introduction of an inert gas into the enclosed feed system 110 may and likely will be used to force the ambient air out of the enclosed system. In certain embodiments when in operation, and when the inert gas is introduced to the first gas inlet port a quantity of oxygen-rich ambient air is forced out of an outlet port. It should be understood that, at this point, the desired level of less than or equal to about 2% oxygen, less than or equal to about 1% oxygen, less than or equal to about 0.5% oxygen or less than or equal to about 0.2% or less than or equal to about 0.1% oxygen may not be achieved.

In additional embodiments, additional infusions of the inert gas must be made in order to purge the requisite and/or desired amount of oxygen from the air surrounding the carbon source material 100 in the enclosed system. In additional embodiments, the second gas inlet port may pump the inert gas into the enclosed system in concert with the infusion at the first gas inlet port, thereby allowing for the purging of partially or substantially more of the remaining oxygen from the enclosed system. It should be understood that after one or two or a plurality of infusions of inert gas to purge the oxygen, the desired result of lowering oxygen content percentage may be achieved. In additional embodiments, if the desired oxygen levels are still not achieved after two inert gas infusions, a third infusion of inert gas may be used, and may purge remaining undesired amounts of oxygen from the enclosed system at a gas outlet. Additional inlets and outlets pluralities may also be incorporated if desired. In additional embodiments, oxygen levels may be monitored throughout the material feed system 110 to allow calibration of the amount and location of inert gas infusions to ensure desired performance, safety and resulting processed pre-determined pore configuration hierarchical structure activated carbon material 105.

In certain embodiments it should be noted that the gas inlet port(s) and the corresponding gas outlet port(s) respectively, are slightly offset from each other with respect to a vertical bisecting plane through the material feed unit 110. In certain embodiments, inlet port(s) and corresponding outlet port(s) may be offset on the material feed system 110 by an amount that approximately corresponds with the pitch of the auger in the material feed unit 110. In additional embodiments, after the atmosphere surrounding the raw material 100 is de-oxygenated to a predetermined or satisfactory level, it may then be fed from the material feed system 110 into a reaction zone 220 or zones. In additional embodiments, oxygen levels may be monitored throughout the material feed system 110 to allow the calibration of the amount and location of inert gas infusions to allow predetermined or desired levels.

In exemplified embodiments of the multi reactor multi zone design the multiple reactors may be a single reactor, where each step or steps are accomplished during different periods of time within the said single reactor.

In additional embodiments, the device includes a plurality of gas introduction probes (s) and gas extraction probes(s) located at various points throughout the device. In additional embodiments, one of each gas introduction probe(s) and one of each gas extraction probe(s) correspond with a different one of the plurality of zones. In alternative embodiments, the device includes any suitable number of gas introduction probe(s) and gas extraction probes(s) including in certain embodiments having one gas introduction probe(s) and more than one gas extraction probe(s) for each of the plurality of zones.

In exemplified embodiments, pulverizing carbon material 100 and producing a pulverised carbon material 101. Feeding carbon source material 100 into a chemical base soaking tank/system 190. Alternatively, feeding pulverised carbon material 101 into a chemical base soaking tank/system 190. Alternatively, feeding the pulverized carbon material 101 into an optional separate chemical base soaking tank/system 190.

In exemplified embodiments, the carbon source material 100, such as coal or petroleum coke, is optionally dried, ground, pulverised, and sized, for instance by passing through a mesh, outside the reactor 220 and then introduced into a soaking/mixing zone 190 with an optional low-oxygen containing atmosphere, which may occur prior to being introduced into the carbon source hopper. This may be accomplished optionally with the use of the material feed system 110. The material feed system 110 may be controlled to reduce the oxygen level for the ambient air of the device to less than or equal to about 3%, to about 2%, to about 1%, to about 0.1%. Once the oxygen levels have been decreased in the device the raw carbon material 100 enters the soak/mixing zone 190 via the enclosed material feed system 110. In one such embodiment, the raw material feed system 110 may comprise an encapsulated jacket or sleeve by which steam and off-gases from the reactor 220 are used to heat the carbon source material 100, directly, or used by a process gas heater and/or heat exchanger (not shown) which is then used to pre-heat or pyrolyze the carbon source material 100.

Subsequently and in exemplified embodiments, an additive with water, such as a non-limiting example of KOH, is distributed thoroughly and/or evenly throughout the carbon source material 100 for a period of time prior to heating and/or pyrolysis, a soak time, within the soaking/mixing zone 190 for a period of about 10 min, about 20 min, about 30 min, about 40 min, about 50 min, about 1 hour, about 1.5 hours, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 24 hours, about 25 hours, about 26 hours, about 27 hours, about 28 hours, about 29 hours, about 30 hours, about 31 hours, about 32 hours, about 33 hours, about 34 hours, about 35 hours, about 36 hours, about 37 hours, about 38 hours, about 39 hours, about 40 hours, about 41 hours, about 42 hours, about 43 hours, about 44 hours, about 45 hours, about 46 hours, about 47 hours, about 48 hours, about 49 hours, about 50 hours, or around 12 hours which is preferred.

In exemplified embodiments, soaking 110 the carbon source material 100 or pulverised carbon material 101 in a base chemical and water solution to produce base soaked carbon material 102. Feeding, by means of the material feed system 110, the carbon source material 100 or alternately the pulverised carbon material 101 into an optional drying system/zone 200*a*.

In alternative embodiments, the drying zone(s) are associated with the gas introduction probe(s) and the gas extraction probe(s). In additional embodiments, the gas introduction probe(s) introduces nitrogen and/or argon and/or helium into the drying zone and the gas extraction probe(s) extracts gas from the drying zone. In certain embodiments, the gas introduction probe(s) may be configured to introduce a mixture of gas into the drying zone(s). In additional embodiments, the gas extracted may be oxygen. In alternative embodiments, the gas extraction probe(s) extracts gases from the drying zone(s) to be reused in a heat and/or energy recovery system.

In certain embodiments, the pre-heat zone 210 may be associated with the gas introduction probe(s) and the gas extraction probe(s). In additional embodiments, the gas introduction probe(s) introduces nitrogen and/or argon and/or helium into the pre-heat zone 210 and the gas extraction probe(s) extracts gas from the pre-heating zone. In additional embodiments, the gas introduction probe(s) may be configured to introduce a mixture of gas into the pre-heating zone. In additional embodiments, the gas extracted from the gas extraction probe(s) may include carbon-enriched off gases. In additional embodiments, the gases extracted from the pre-heating zone 210 and/or pyrolysis reactor zone 220 may be reintroduced to the material at a later stage in the process, for example in the carbon recovery unit and/or pyrolysis reactor 220. In additional embodiments, the gases extracted from a plurality of the zones of the device may be used for either energy recovery in the drying, processing, or gas heater, further pyrolysis in the trimming reactor, and/or in the carbon enrichment unit.

In alternative embodiments, feeding base soaked carbon material 102, by means of the carbon source material feed system 110, to the optional drying system/zone 200*a*. Drying the base soaked carbon material 102, or alternatively the carbon source material 100, in the optional drying system/zone 200. Removing water 126, and/or chemical such as a base, from the base chemical soaked carbon source material 102. Producing dried carbon material 103. Recovering and/or recycling heat, by means of a heat recovery system 310. Feeding dried carbon material 103 by means of a carbon feed system 110 into an optional first zone/pre-heat reactor 210. Pre-heating the dried carbon material 103 in the first zone/pre-heat reactor 210 to produce preheated carbon material 104. Exhausting water 126, and/or gases via a line 160.

In certain embodiments, the device may include a single reactor 220 having two to a greater plurality of different zones. Described in certain embodiments, multiple zones are shown, however, any different number of zones could be employed in alternate embodiments. In an additional embodiment, each zone may be connected to at least one other zone via a material transport unit 110. In an additional embodiment, the material transport 110 unit may control atmosphere and temperature conditions.

Subsequently and in exemplified embodiments, the pre-soaked carbon source 100 enters the preheating/drying zone 200*a*, wherein the carbon source 100 and internal temperature is raised from around ambient temperature to around 100° C. to a temperature of about 150° C. to about 200° C. In an additional embodiment, the temperature remains below 200° C. In additional embodiments, the pre-heating/drying zone 200a may include a mechanism (not shown) to capture and/or exhaust off-gases from the pre-soaked carbon source 100 while it is being heated. In additional embodiments, the off-gases can be extracted for optional use at a later time. In additional embodiments, the heating source used for the various mechanical systems is electrical or gas. In additional embodiments, the heating source used for the various reactors is waste gas from other reactors of the device and/or may be from external sources. In additional embodiments, the heat may be from an indirect source.

In exemplified embodiments, feeding the preheated carbon material 104 by means of a carbon feed system 110 to an optional second zone/reactor 220 to undergo pyrolysis.

In certain embodiments, the pyrolysis reactor/zone 220 may be associated with the gas introduction probe(s), and the gas extraction probe. In additional embodiments, the gas introduction probe(s) introduces nitrogen and/or argon and/or helium into the pyrolysis zone 220 and the gas extraction probe(s) extracts gas from the pyrolysis zone 220. In additional embodiments, the gas introduction probe(s) is configured to introduce a mixture of gas into the pyrolysis zone. In additional embodiments, the gas extracted from the gas extraction probe may include carbon-enriched off-gases. In certain embodiments, the carbon-enriched gases extracted from the pyrolysis zone 220 may be used and reintroduced to the material at a later stage and/or subsequent stage in the process. In additional embodiments, the extracted gas from the pre-heat zone/reactor 210 and/or the extracted gas from the pyrolysis zone 220 may be combined prior to being reintroduced to the material at any stage within the process.

In exemplified embodiments, the pre-heated material 104 undergoing pyrolysis, or alternatively dried material 103 undergoing pyrolysis, in the second zone/pyrolysis reactor 220 to produce pre-determined pore configuration carbonized activated carbon material 105. Optionally monitoring the second zone/pyrolysis reactor 220 by means of an optional FTIR 290.

Subsequently after preheating in a heating/drying zone 200a, a material feed system 110 transfers the preheated carbon source 100 into a separate reactor 220 which is optional. In an additional embodiment, the first zone 200a and reactor 220 is the same reactor. In an additional embodiment where the first zone 200a is different than the reactor 220, a material feed system 110 may penetrate the reactor 220 through as a non-limiting example a high-temperature vapor seal system such as an airlock (not shown), this may allow the carbon source 100 to penetrate the reactor 220 while preventing gas and/or heat from escaping or from oxygen from entering. In an additional embodiment, the interior of the reactor 220 is heated to a temperature of about 100° C., or about 200° C., or about 300° C., or about 400° C., or about 500° C., or about 600° C., or about 700° C., or about 800° C., or about 900° C., or about 1000° C., or about 1100° C., with 800° C., for 2 hours at a ramp rate of 10 per minute® C., being preferred. In an additional embodiment, the reactor 220 may comprise an output port to capture and exhaust gases given off, for instance from the preheated carbon source material 100 while it is undergoing pyrolysis. In an additional embodiment, gases are extracted and stored for optional later use. In an additional embodiment, the off-gases from the reactor 220 and the off-gases from a plurality of zones of the device may be combined into a single gas stream. Once carbonized, the carbon source material 100 is now pre-determined pore configuration hierarchical structure pyrolyzed activated carbon 105 and may exit the reactor 220 by means of an activated carbon feed system 120, which in certain embodiments is the same feed system as the carbon source feed system 110 and may enter an optional cooling/washing zone 240 for cooling and washing, where washing the activated carbon with water and an optional additive is preferred, a non-limiting example of the preferred additive is [HCL]] HCl. In certain embodiments, washing and/or cooling may be accomplished in a certain or controlled amount of time, for instance a soak time, for a period of about 10 min, about 20 min, about 30 min, about 40 min, about 50 min, about 1 hour, about 1.5 hours, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 24 hours, about 25 hours, about 26 hours, about 27 hours, about 28 hours, about 29 hours, about 30 hours, about 31 hours, about 32 hours, about 33 hours, about 34 hours, about 35 hours, about 36 hours, about 37 hours, about 38 hours, about 39 hours, about 40 hours, about 41 hours, about 42 hours, about 43 hours, about 44 hours, about 45 hours, about 46 hours, about 47 hours, about 48 hours, about 49 hours, about 50 hours, or around 8 hours which is preferred. Wherein, in certain embodiments, the cooling/washing zone 420 may be the same reactor 220 and/or a different zone/system.

In exemplified embodiments, the raw carbon source material 100, such as coal, petroleum coke, oil, biomass is introduced into the reactor 220 in a low-oxygen containing atmosphere, which may be accomplished optionally through the use of a material feed system 110 that has been already described. The material feed system 110 may be used to reduce the oxygen level in the ambient air in the system to less than or equal to about 3%, or about 2%, or about 1%, or about 0.1% which may accommodate the process of pyrolysis free of combustion. Raw carbon source material 100 may enter the device in an enclosed material feed system 110, which may be after the oxygen levels have been decreased. In additional embodiments, the material feed system 110 may include an encapsulated jacket(s) or sleeve(s) through which steam and/or off-gases from the reactor are sent and/or used in the pre-heating of the carbon source material 100.

In additional embodiments, the raw carbon source material 100 may first travel from the material feed system 110 and through an optional drying 200a and/or pre-heat zone 210 or area of the device. In an additional embodiment, the optional drying 200a zone may heat the raw material to remove water and other moisture, which may be a separate zone and prior to it being passed along into the separate preheat zone 210. In an additional embodiment, the interior of the optional drying zone 200a may be heated to a temperature of about ambient temperature to about 100° C. to about 150° C. to about 200° C. Water or moisture removed from the raw carbon source material 100 may be exhausted, in one example from outlet ports, from the optional drying zone 200a or area. In an additional embodiment, the optional drying zone 200a may be adapted to allow vapors, steam, and/or moisture, to be extracted. In an additional embodiment, vapors, steam, and/or moisture from the optional drying zone 200a may be extracted for optional later use. This moisture, vapor, or steam, which has been extracted from the optional drying zone 200a may be used in a suitable waste heat recovery system and may be in conjunction with the material feed system 110. In an additional embodiment, the vapor, steam, and/or moisture, used in the material feed system 110 may be used to pre-heat the raw carbon source materials 100 while oxygen levels are being purged in or by the material feed system 110. In an additional embodiment, the carbon source material 100 is dried outside of the reactor(s) 220 if the reactor(s) do not comprise a drying zone 220.

In an additional embodiment, the dried carbon source material 100 enters a preheat zone 210, wherein the temperature may be raised from the range of about ambient temperature to a temperature range of about 100° C., to about 150° C., to about 200° C. In an additional embodiment, the temperature does not exceed 200° C. in the preheat zone 210. It should be appreciated that if the preheat zone is too hot, or subsequently not hot enough, then the dried carbon source material 100 may be processed in a non ideal manner prior to entering the reactor 220 zone. The preheat zone 210 may include an output mechanism to capture, for current or later reuse, exhaust off gases from the dried carbon source material 100 while it is being preheated. In additional embodiments, the off gases may be extracted for optional later use. In additional embodiments, the heating source used for the various zones may be electric or gas. In additional embodiments, the heating source used for the various zones may be waste gas from other zones of the device and/or from the external source(s). In additional embodiments, the heat may be indirect.

In exemplified embodiments, after processing within the preheat zone 210, the material feed system 110 may pass the preheated material into the reactor 220 to undergo the pyrolysis process. In an additional embodiment, the material feed system 110 may penetrate the pyrolysis zone 220, which may be through a high-temperature vapor seal system (not shown), which may include a non-limiting example of an airlock (not shown), which may allow the material feed system to penetrate the high-temperature pyrolysis reactor 220 zone while preventing or minimizing gas from escaping, and/or oxygen from entering. In an additional embodiment, the interior of the pyrolysis zone and/or reactor 220 is heated to a temperature of about 100° C., about 200° C., about 300° C., about 400° C., about 500° C., about 600° C., about 700° C., about 800° C., about 900° C., about 1000° C., about to 1100° C., or to about 800° C., which is preferred. In additional embodiments, the pyrolysis zone(s) 220 may include an outlet port(s) and inlet port(s) similar to the preheat zone(s) 210 to capture and exhaust the gases which may be given off of the preheated carbon source material 100 while it is being carbonized. In an additional embodiment, the gases may be extracted for optional later use at the discretion of the operator. In an additional embodiment, the off gases from the preheat zone(s) 210 and the off gases from the pyrolysis zone(s) 220 may be combined into a single gas stream. Once carbonized, the carbonized carbon source material 105 exits the pyrolysis reactor 220 zone and may then enter into a cooling/washing zone 240.

In additional embodiments, the raw carbon source material 100, and subsequently then dried carbon source, preheated carbon source, pre-determined pore configuration hierarchical structure activated carbon material 105, travel through the reactor 220 and/or reactors, along a continuous material feed unit 110 and/or system. In additional embodiments, the material feed system 110 may carry the carbon source material 100 which may differ at different stages in the process. In additional embodiments, the process of moving the material through the reactor 220, zones or reactors is a continuous process. In certain embodiments, the speed of the material feed system 110 may be appropriately calibrated, calculated, and controlled by an associated controller and/or processor (not shown) such that the operation of the material feed system 110 does not require interruption as the material moves through the device and reactor 220 or reactors zone and/or zones. In certain embodiments, the material feed unit 110 may be operationally sectioned, and may include a plurality of separate augers (not shown) or additional carbon material feed mechanisms as described in this disclosure, and controlled by an associated controller and/or processor (not shown) such that the operation individual carbon material feed mechanisms allows of the material feed system 110 to control the rate of progression between zones, stages, or reactors for the carbon material 100 depending on the optimal time for the carbon source material 100 to remain within a specific zone, stage, reactor, of the device.

In additional embodiments, a controller (not shown) associated with the reactor 220 or reactors may be configured to adjust the speed of the material feed unit 110, which may be based on one or more feedback sensors, detected gas which may be from the optional FTIR, measured parameters, temperature gauges, and/or other suitable variables in the reactor 220 or reaction process. It should be noted in additional embodiments, suitable moisture sensors, temperature sensors, or gas sensors in operable communication with the controller and/or processor may be integrated, or mechanically connected, into or between each of the zones and/or reactors 220 or at any suitable position along the material feed unit 110 or device. In additional embodiments, the controller and the processor may use the information obtained from the sensors and/or gauges by which to optimize the speed and efficiency of the device and/or processing systems. In additional embodiments, the controller which may be associated with the reactor 220 and/or reactors is configured to operate the material feed unit 110.

In additional embodiments, the controller associated with the reactor 220 or reactors may be configured to monitor the concentration, temperature, and moisture of the gas inside the material feed unit 110 or inside any of the reactors 220 and/or zones. In additional embodiments, the controller may be configured to adjust the speed of the material feed unit 110, the input of gases into the material feed unit 110, and/or the heat applied to the material 100 in the material feed unit 110, which may be based upon one or more readings taken by the various sensors.

It should also be noted that, in additional embodiments, the device is enclosed in a kiln shell to control and manipulate the high amounts of heat required for the reactor 220 process and reactions to occur. In additional embodiments, the kiln shell of the device may include several insulating chambers which may surround a plurality of zones. In certain embodiments, the kiln includes a plurality separate zones for the device. In additional embodiments, each of the zones of the device includes at least one inlet and at least one outlet. In additional embodiments, within each zone the inlet and outlets are configured to be adjustable in which to control the flow of carbon feed material 100, gas and heat, into and out of the zone or zones. A supply of inert gas may be introduced into the inlet and the purged air may be extracted from the corresponding outlet. In additional embodiments, one or more of the outlets of a zone in the device are connected to one or more of the other inlets or outlets in the device.

In additional embodiments, after the raw carbon source material 100 is de-oxygenated in the material feed system 110, it may be introduced to the device, and specifically to the first zones and/or the optional drying zone 200a. The drying zone 200a may include inlet(s) and outlet(s). In additional embodiments, the drying zone 200a may be heated to a temperature of about 80° C. to about 200° C. to reduce water and/or other moisture from the carbon source material 100. The carbon source material 100 may then be moved to the pre-heat zone, which may be the same zone, where the material 100 may be pre-heated.

In additional embodiments, the carbon source material 100 that has optionally been dried and/or preheated may then be moved into the carbonization reactor 220. In certain embodiments, carbonization may occur at a temperature from about 200° C. to about 1100° C., for example about 200° C., about 210° C., about 220° C., about 230° C., about 240° C., about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., about 400° C., 410° C., about 420° C., about 430° C., about 440° C., about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., about 610° C., about 620° C., about 630° C., about 640° C., about 650° C., about 660° C., about 670° C., about 680° C., about 690° C., about 700° C., about 710° C., about 720° C., about 730° C., about 740° C., about 750° C., about 760° C., about 770° C., about 780° C., about 790° C., about 800° C., about 810° C., about 820° C., about 830° C., about 840° C., about 850° C., about 860° C., about 870° C., about 880° C., about 890° C., about 900° C., about 910° C., about 920° C., about 930° C., about 940° C., about 950° C., about 960° C., about 970° C., about 980° C., about 990° C., about 1000° C., about 1010° C., about 1020° C., about 1030° C., about 1040° C., about 1050° C., about 1060° C., about 1070° C., about 1080° C., about 1090° C., about 1100° C., or about 800° C.

In additional embodiments, a carbonization zone of a reactor 220 is constructed to allow gases 122 produced during carbonization to be extracted and/or stored for a desired later use. In additional embodiments, gases 122 produced during carbonization are extracted for optional current or later use. In additional embodiments, a carbonization temperature is selected and maintained to reduce and/or eliminate the production of methane ($CH_4$) and maximize carbon content of the carbonized carbon source material 100.

In additional embodiments, the reactor 220 may include at least one input and a plurality of outlet ports. In additional embodiments, one of the outlet ports may be connected to collection equipment or to further processing equipment, such as an acid hydrogenation unit or distillation column. In additional embodiments, the reactor 220 may process the off gases that may come from the preheat zone 210 and the pyrolysis reactor 220 zone, which may produce a condensate and/or an enrichment gas. In an additional embodiment, the condensate may include polar compounds, such as non-limiting examples of acetic acid, methanol and furfural. In an additional embodiment, the enrichment gas produced by means of the reactor 220 may include at least non-polar gases. In an additional embodiment, the gas reactor 220 may comprise a fractionation column. In an additional embodiment, acetic acid may be sent via a line or channel to an optional acid hydrogenation unit. In an additional embodiment, methanol and/or furfural may be sent via optional additional line(s) and/or channels to a distillation/processing unit.

In additional embodiments, the carbon recovery unit may also include an input connected to the reactor 220. In additional embodiments, gases pulled from the carbon recovery unit are optionally used in energy recovery systems and/or systems which may further offer carbon enrichment. Additionally, in various embodiments, gases may be pulled from one or more zones of the device and optionally used in energy recovery systems and/or systems for further carbon processing.

As discussed, high oxygen levels in the ambient air surrounding raw materials 100 as they are processed could result in undesirable combustion or oxidation of the raw material 100 occurring; this can drastically reduce the amount and quality of the final activated carbon material 105. In additional embodiments, the material feed system 110 may be a closed system that includes one or more manifolds configured to purge oxygen from the air surrounding the raw carbon source material 100 and/or within the zone(s) or reactor(s) 220. In additional embodiments, an oxygen level of about 0.5% to about 1.0% may be used for pre-heating, pyrolyzing and/or carbonizing and/or cooling. It should be noted that a goal of the closed material feed system 110 is designed to reduce oxygen levels to less than or equal to about 3%, less than or equal to about 2%, less than or equal to about 1% or less than or equal to about 0.5% throughout the process. Once the oxygen levels are reduced, the carbon source material 100 is transferred along the material feed system 110 in the device. In additional embodiments, the preheating of inert gases throughout the recovery process, and with the subsequent introduction of pre-heated inert gases to the device, reactor, or trimming reactor, makes the system more efficient and may reduce energy consumption.

In additional embodiments, a trimming reactor (not shown) may be included in the system. In an additional embodiment with a trimming reactor (not shown), pyrolyzed material from the device is fed into the separate additional reactor(s) (not shown) for further pyrolysis where heated inert gas may be introduced to create a product with higher fixed carbon level. In additional embodiments, this secondary process may be conducted in a container such as non-limiting examples of, a drum, tank, barrel, bin, tote, pipe, sack, press, or roll-off container. In additional embodiments, a final container may be used for transport of the carbonized material 105. In additional embodiments, inert gas may be heated via a heat exchanger (not shown) which may derive heat from gases extracted from the device, which may be combusted in a process gas heater.

In an additional embodiment, heat, steam and gases recovered from the reactor 220 may be directed to the material feed system 110 where they may be enclosed in jacket and separated from direct contact with the carbon source material 100, but may be used to indirectly heat the carbon source material 100 prior to introduction to the reactor 220 and/or reactors and/or drying zones.

In alternate embodiments, heat, steam and gases recovered from the drying zone(s) 200a 200b, or the reactor(s) 220 may be directed to the material feed system 110 where they may be enclosed in a jacket and/or separated from direct contact with the carbon source material 100, this also allowing the indirect heat of the feed material 100 prior to the introduction of the feed material 100 to the reactor(s) 220.

In exemplified embodiments, feeding activated carbon material 105 by means of an activated carbon feed system 120 to an optional third zone/a cooling/washing reactor 230 for cooling, and/or washing, which may include an additive such as HCl. Exhausting gases through a line 160 from the first preheat zone 210.

In exemplary embodiments, when the pre-determined pore configuration hierarchical structure activated carbon product 105 enters the cooling/washing zone 420, the material is allowed to cool (actively or passively) to a specified temperature. In an additional embodiment, the temperature of the pre-determined pore configuration activated carbon 105 is reduced in the cooling/washing zone 420 within a substantially inert atmosphere. In an additional embodiment, the cooling/washing zone 420 may cool the pre-determined pore configuration hierarchical structure activated carbon material 105 with water cooling, and may additionally include an additive such as HCl, which may be a mechanical mechanism, and which may soak the material for a specified or extended period of time. It should be noted that the pre-determined pore configuration carbon material 105 may be allowed to cool in the cooling/washing zone 420 wherein it reaches a point where it will not undergo spontaneous combustion if exposed to normal atmosphere and/or oxygenated air. In an additional embodiment, the cooling/washing zone 420 reduces the temperature of the carbon material below 200° C. or about 150° C. or about 100° C. In exemplified embodiments, the device may include an optional mixing system to mix the activated carbon material 105, coolant, and additive, which may allow for the uniform cooling of the carbon material. Additionally, cooling may occur by either direct or indirect means, which may be with water and/or other liquids or additives; additionally, the cooling process may also occur by direct or indirect means with air or other gases, and/or a combination of the both of the above.

In certain embodiments, the cooling mechanisms are separate from the reactors 220, and may be mechanically coupled to the activated carbon material feed system 120. In additional embodiments, the cooling mechanism is located after the reactors 220. In additional embodiments, the cooling mechanism may be the same as, or built into, the reactors 220. In additional embodiments, the cooler mechanism is comprised of, for non-limiting examples example, a screw, auger, conveyor which is specifically a belt conveyor, in certain embodiments, drum, screen, pan, counterflow bed, vertical tower, jacketed paddle, cooled screw, and/or a combination thereof, which cools by either direct or indirect means, and with water and/or other liquids/additives, and/or direct or indirectly with gases, and/or any combination of the above. In additional embodiments, the cooler(s) could include a water spraying mechanism or inlet port(s) (with or without an additive), a cooled inert gas stream mechanism and/or outlet port(s) which may be liquid nitrogen, or ambient air if below ignition and/or a combustible temperature. In additional embodiments, heat may be recovered from or during this step, an example would be by capturing the flash steam generated by a water spray, and/or the superheated steam generated when a saturated steam is introduced, which may be mixed into and throughout, and may then heated by the activated carbon material 105.

In additional embodiments, the pre-determined pore configuration carbonized activated carbon material 105 may be moved to a temperature-reducing or cooling zone 240 and may be passively or actively cooled. In additional embodiments, pre-determined pore configuration hierarchical structure activated carbon material 105 may be cooled to a temperature to about 10° C., to about 20° C., to about 30° C. or to about 40° C. In additional embodiments, the pre-determined pore configuration hierarchical structure activated carbon material 105 may be moved to a temperature reducing or cooling zone/washing zone 240, which may be cooled and washed to remove an additive, such as a base, such as specifically KOH, simultaneously. In additional embodiments, the pre-determined pore configuration carbonized activated carbon material 105 may be moved to a temperature reducing or cooling zone 240, which may be cooled and washed simultaneously with water and an additive, such as HCl.

In exemplified embodiments, when the pre-determined pore configuration hierarchical structure activated carbon material 105 enters the cooling/washing zone 240, the carbonized material 105 is allowed to cool to a predetermined temperature range of about 20° C. to 30° C. which is generally about room temperature. In additional embodiments, the device includes a plurality of cooling/washing zones 240. In additional embodiments, the cooling/washing zone(s) 240 may cool the carbonized material 105 to below 200° C. In an additional embodiment, the cooling/washing zone(s) 240 may include a mixer and/or auger to agitate and uniformly cool and/or wash the carbonized materials 105. In additional embodiments, one or more of a plurality of cooling/washing zones 240 may be outside of the device.

In additional embodiments, the pre-determined pore configuration hierarchical structure activated carbon material 105 exits the cooling/washing zone 240 along the activated carbon feed system 120 and then may enter the carbon recovery unit (not shown).

In additional embodiments, the pre-determined pore configuration hierarchical structure activated carbon material 105 exits the cooling/washing zone 240 along the activated carbon feed system 120 and then may enter the electrode mixing system/zone 401.

In exemplified embodiments, exhausting gases through a line 160 from the second zone/pyrolysis reactor 220. Exhausting gases through a line 160 from a second line 160, which may be combined into a single line 161. Exhausting gases through a combined line 161 into the phase separator 250. Capturing, from exhausting gases polar compounds 128, which optionally may be used immediately for heat, or energy recovery, and/or stored for later use. The transferring of acetic acid through a line 160 from the gas phase separator 250 to an acid hydrogenation unit 280. Turning acetic acids into ethanol 127.

In an alternative embodiment, the cooling zone 240 may be associated with the gas introduction probe(s) and the gas extraction probe(s). In additional embodiments, the gas introduction probe(s) may introduce nitrogen and/or argon and/or helium into the cooling/washing zone 240 and the gas extraction probe(s) may extract gas from the cooling/washing zone 240. In various embodiments, the gas introduction probe(s) may be configured to introduce a mixture of gas into the cooling/washing zone 240. In various embodiments, the gas extraction probe(s) extracts gases from the cooling/washing zone 240 to be reused in a heat and/or energy recovery system.

In certain embodiments, the gas introduction probe(s) and the gas extraction probe(s), described may be configured to operate with the controller and the plurality of sensors to adjust the levels and/or concentrations of gas being introduced and/or gas being extracted from each of the device's zones.

In certain embodiments, the gas introduction probe(s) and gas extraction probe(s) may be made of a suitable pipe and be made to withstand high temperature fluctuations. In certain embodiments, the gas introduction probes(s), and gas extraction probes(s) may include a plurality of openings through which the gas may be introduced and/or extracted. In certain embodiments, the plurality of openings may be disposed on the lower side of the inlet and gas extraction probe(s). In additional embodiments, each of the plurality of openings extends for a substantial length within the respective zone and/or zones.

In additional embodiments, the gas introduction probe(s) may extend from one side of the device through each zone and/or zones. In such specific embodiments, each of the gas introduction probe(s) may extend from a single side of the device to each of the respective zones of the device. In additional embodiments, gaseous catalysts may be added in order to enrich fixed carbon levels. In such specific embodiments, the plurality of openings for each of the gas introduction probe(s) may only be disposed in the respective zone associated with that particular gas introduction probe.

In certain embodiments, each of the gas introduction probes may extend from the left side of the base soaking/mixing zone 190 into each one of the zones, in this example the gas introduction probe(s) may travel through the device and to or through electrode mixing system/zone 401, and may be constructed so the said introduction probes terminate in the selected zone including; base soaking/mixing zone 190, drying zone 200a, preheat zone 210, pyrolysis reactor 220, cooling/washing zone 240, drying region 200b, electrode mix system/zone 401, a particular zone(s), all of the zones, or selected zone(s).

In certain embodiments the gas introduction probes may all travel through the pre-heat zone 210, and may have the pre-heat zone gas introduction probe terminating in the pre-heat zone 200a. In such a specific embodiment the remaining gas introduction probes may travel through the pyrolysis zone 220, with the pyrolysis zone gas introduction probe potentially terminating in the pyrolysis zone 220. In additional embodiments, the gas extraction probe(s) may be configured similar to the gas introduction probe(s). In additional embodiments the gas introduction probe(s) and gas extraction probes may originate from either side of the device.

In certain embodiments, the gas introduction probes may be arranged concentrically with one another in order to save space which may be used in or by the multiple-port configuration. In embodiment as described, each inlet probes and/or inlet ports may have a smaller diameter than the previous inlet probe and inlet port. For example in embodiments as described, the base soaking/mixing zone 190 gas introduction probe may have the largest interior diameter, and therefore the pre-heat/drying zone 210/200a gas introduction probe(s) would be situated within the interior diameter of the base soaking/mixing zone 190 gas introduction probe, therefor pyrolysis zone 220 gas introduction probe would then be situated within the interior diameter of the pre-heat/drying zone gas introduction probe(s) therefor the cooling/washing zone 240 gas introduction probe(s) would be situated within the pyrolysis zone 220 gas introduction probe 159, therefor the drying zone 200b gas introduction probe(s) would be situated within the cooling/washing zone 240 gas introduction probe(s) therefor the electrode mixing system zone 401 gas introduction probe(s) would be situated within the drying zone 200a gas introduction probe(s). For embodiments as described, a suitable connector may be attached to each of a possible gas introduction probe outside of the device in order to control the air infused into each of the said possible gas introduction probes individually or concertedly.

In certain embodiments as described, a concentric and/or substantially concentric arrangement may be preferred, the outer-most gas introduction probe is only exposed in each zone before it has been terminated. Therefore, for embodiments as described, individual introductions to gas zones may be controlled independent from one and another, this while only requiring a single continuous gas introduction probe line. It should be explained and understood that a similar concentric or substantially concentric configuration may be suitable and used for the gas extraction probes for such an embodiment.

In exemplified embodiments, feeding cooled/washed activated carbon material 106 via the activated carbon feed system 120 into an active carbon recovery unit 300. Removing finished activated carbon product 350 from the activated carbon recovery unit 300, produced in the pre-determined pore configuration hierarchical structure activated carbon material production device 380. Optionally, recovering energy 310, by means of the activated carbon recovery unit 300.

In exemplified embodiments, cooled/washed activated carbon material 106, produced in the pre-determined pore configuration hierarchical structure activated carbon material production device 380, by means of the activated carbon material feed system 120, into the electrode mixing zone/system 401, within the energy storage device manufacturing system 390. Mixing additional electrode ingredients, and the pre-determined pore configuration hierarchical structure activated carbon material 105/106 together, to form an electrode composite mix, within the electrode mixing zone/system 401.

The pre-determined pore configuration hierarchical structure activated carbon material 105 may at this point be in a powder state or may be pulverised to create a fine powder, which my occur within the electrode mixing zone/system 401 or a separate pulverising device. In certain embodiments the grinding and/or pulverising may occur prior to activation, and/or after carbon activation.

In exemplary embodiments, and within one or more mixing chambers, the activated carbon may be mixed with electrode ingredients to make an electrode mix. Some non-limiting examples of electrode ingredients include conductive agent(s), a binder(s), a mixing agent(s). Some non-limiting examples of conductive agents may include carbon black, Super PIM, furnace black, channel black, acetylene black, thermal black, lamp black, conductive carbon. Some non-limiting examples of binders may include PVDF, PTFE, non-reactive thermoplastic fluoropolymer(s), copolymers, terpolymers. Some non-limiting examples of mixing agents may include 2-propanol, sec-propyl alcohol, IPA, isopropyl, isopropanol, alcohol, water. Some non-limiting examples of an electrode composition include and may be in the form of a mix, a paint, a mixture, a paste, an ink, or a freestanding electrode.

In exemplified embodiments, feeding the electrode composite mix 107 into an electrode preparation zone/system 400. Preparing an electrode 108 in the electrode preparation zone/system 400.

In certain embodiments, the said mixing electrode mixing system(s) 401 may be interconnected and/or mechanically coupled to an electrode preparation system 400, which may include an extruder or plurality of extruders, and/or sprayer(s), in order to administer an electrode mix composition. Additionally, in alternate embodiments the electrode preparation system 400 may form a freestanding electrode, which may be formed, pressed, applied, which may then be attached to a current collector. The electrode mix composition may be applied, pressed, or contacted to, a conductive current collector material such as; a metal which may be; stainless steel, titanium, copper, aluminum, silver, which may be a foil or mesh, and may be a variety of thicknesses from 0.0001 mm up to and including 10 mm, and a variety of mesh patterns or windings. Additionally, the electrode mix and/or freestanding electrode may be a variety of thicknesses from 0.0001 mm up to and including 10 mm, or about 0.05 mm, or about 0.1 mm, or about 0.15 mm, or about 0.2 mm, or about 0.25 mm, or about 0.3 mm, or about 0.35 mm, or about 0.4 mm, or about 0.45 mm, or about 0.5 mm, or about 0.55 mm, or about 0.6 mm, or about 0.65 mm, or about 0.7 mm, or about 0.75 mm, or about 0.8 mm, or about 0.85 mm, or about 0.9 mm, or about 0.95 mm, or about 1.0 mm, or about 1.25 mm, or about 1.5 mm, or about 1.75 mm, or about 2.0 mm, or about 2.25 mm, or about 2.5 mm, or about 2.75 mm, or about 3.0 mm, or about 3.25 mm, or about 3.5 mm, or about 3.75 mm, or about 4.0 mm, or about 4.25 mm, or about 4.5 mm, or about 4.75 mm, or about 5.0 mm, or about 6.0 mm, or about 7.0 mm, or about 8.0 mm, or about 9.0 mm, or about 10.0 mm, or about 1 mg/cm$^2$, or about 1.25 mg/cm$^2$, or about 1.5 mg/cm$^2$, or about 1.75 mg/cm$^2$, or about 2 mg/cm$^2$, or about 2.25 mg/cm$^2$, or about 2.5 mg/cm$^2$, or about 2.75 mg/cm$^2$, or about 3 mg/cm$^2$, or about 3.25 mg/cm$^2$, or about 3.5 mg/cm$^2$, or about 3.75 mg/cm$^2$, or about 4 mg/cm$^2$, or about 4.25 mg/cm$^2$, or about 4.5 mg/cm$^2$, or about 4.75 mg/cm$^2$, or about 5 mg/cm$^2$, or about 5.25 mg/cm$^2$, or about 5.5 mg/cm$^2$, or about 5.75 mg/cm$^2$, or about 6 mg/cm$^2$, or about 6.25 mg/cm$^2$, or about 6.5 mg/cm$^2$, or about 6.75 mg/cm$^2$, or about 7 mg/cm$^2$, or about 7.25 mg/cm$^2$, or about 7.5 mg/cm$^2$, or about 7.75 mg/cm$^2$, or about 8 mg/cm$^2$, or about 8.25 mg/cm$^2$, or about 8.5 mg/cm$^2$, or about 8.75 mg/cm$^2$, or about 9 mg/cm$^2$, or about 9.25 mg/cm$^2$, or about 9.5 mg/cm$^2$, or about 9.75 mg/cm$^2$, or about 10 mg/cm$^2$, or about 10.25 mg/cm$^2$, or about 10.5 mg/cm$^2$, or about 10.75 mg/cm$^2$, or about 11 mg/cm$^2$, or about 11.25 mg/cm$^2$, or about 11.5 mg/cm$^2$, or about 11.75 mg/cm$^2$, or about 12 mg/cm$^2$, or about 12.2 mg/cm$^2$, or about 12.5 mg/cm$^2$, or about 12.75 mg/cm$^2$, or about 13 mg/cm$^2$, or about 13.25 mg/cm$^2$, or about 13.5 mg/cm$^2$, or about 13.75 mg/cm$^2$, or about 14 mg/cm$^2$, or about 14.25 mg/cm$^2$, or about 14.5 mg/cm$^2$, or about 14.75 mg/cm$^2$, or about 15 mg/cm$^2$, or about 16 mg/cm$^2$, or about 17 mg/cm$^2$, or about 18 mg/cm$^2$, or about 19 mg/cm$^2$, or about 20 mg/cm$^2$, or about 21 mg/cm$^2$, or about 22 mg/cm$^2$, or about 23 mg/cm$^2$, or about 24 mg/cm$^2$, or about 25 mg/cm$^2$, or about 30 mg/cm$^2$, or about 35 mg/cm$^2$, or about 40 mg/cm$^2$, or about 45 mg/cm$^2$, or about 50 mg/cm$^2$, or about 3.6-10.5 mg/cm$^2$ being preferred.

In additional embodiments, said electrode preparation system 400, may comprise or be mechanically connected to an applicator system such as non-limiting examples of; a nozzle(s), a sprayer(s), a scrapper(s), a press, to allow administering said electrode composition mix, and/or freestanding electrode. Which may be directly applied to said metal, which may be directly contacting said metal, and/or a freestanding design. In additional embodiments, the electrode preparation system 400 additionally includes a mechanical pump, compressor, gravity feed, press, auger or pressure to provide a consistent feed of said electrode mix composition.

In additional embodiments the device includes an analyzer to determine the ion size of electrolytes, to determine the ideal sizes and distribution of the final hierarchical structure activated carbon pores, prior to the process beginning. In additional embodiments the device includes a step to determine the desired and ideal sizing and distribution for the final hierarchical structure activated carbon pores prior to the process beginning, or alternatively during the process.

In additional embodiments, the electrode preparation system/device 400 may include an electrode mix feed system 406, and may further include a mechanical feed system and/or layering device 411. Additionally in certain embodiments the electrode preparation system/device 400 may include; feeders, winders, rollers drums, cutter(s) or crimper(s), drive mechanism and/or motors, connecting belt, gear, and/or direct connection, tensioners for the anode material, cathode material, and ion permeable separator, electrode mix injectors, electrode applicators, electrode mix overflow system, an electrode drying zone/system 420, an electrolyte zone/system which may include an electrolyte mixing system and storage tank 431, and electrolyte conduit, electrolyte injectors, a welding/sealing zone/system 450, which may include welders, sealers, crimpers, press, seal(s) which may form part of the energy storage device production system 500, or in alternative embodiments may be mechanically coupled and/or separate from the energy storage production system 500. In additional embodiments, the energy storage production system 500 may additionally have an energy storage device hopper in order to store energy storage devices 460, and/or have energy storage devices 460 deposited.

In additional embodiments electrode preparation system/device 400 may be used to allow a continuous feed of said conductive metal. In additional embodiments electrode preparation system/device 400 may be used to allow a continuous feed of said conductive metal applied with an electrode mix, ink, paint, paste, or composition. In additional embodiments electrode preparation system/device 400 may be used to allow a continuous feed of said electrode mix in order to form a freestanding electrode.

In additional embodiments, the electrode preparation system/device 400 may be used to allow a continuous feed of said conductive metal that may be used to affix and/or provide contacting between the conductive metal and freestanding electrode or electrode mix. In additional embodiments the electrode preparation system/device 400 may be used to allow a continuous feed of ion permeable separators. In additional embodiments, the electrode preparation system/device 400 may be used to allow a continuous feed for layering, and/or multilayering, of said conductive metal, electrode mix composition, and ion permeable separators. In additional embodiments, the electrode preparation system/device 400 may be used to layer an energy storage device. In additional embodiments, the electrode preparation system/device 400 may be used to layer an energy storage device with a layering structure of; two separate conductive metal current collectors with opposing sides applied with the electrode mix; two separate conductive metal current collectors with opposing sides contacting a freestanding electrode; and ion permeable separators positioned between the two separate current collectors coated and electrode composite. In additional embodiments, the electrode preparation system/device 400 may be used to produce a double layer electrolytic capacitor 460. In additional embodiments, the electrode preparation system/device 400 may be used to produce a supercapacitor 460. In additional embodiments, the electrode preparation system/device 400 may be used to produce an energy storage device 460.

In exemplified embodiments, feeding the electrode 108 into an optional electrode drying zone/system 420, or alternatively feeding the electrode into rolling or layering system/zone 411.

In additional embodiments, the electrode preparation system/device 400 may be configured to produce a continuously rolled and/or layered (anode, ion permeable separator, cathode, ion permeable separator) energy storage device 460, and/or supercapacitor cell 460 configuration. In additional embodiments, the electrode preparation system/device 400 may be configured to allow a layered design with a plurality of anodes, ion permeable separators, and cathodes, for each cell, which may be stacked and/or grouped. Additionally, in certain embodiments, stacked, layered, or rolled energy storage devices may have leads of anodes connected, and may additionally have leads of cathodes connected. In certain embodiments, the leads of anodes and cathodes may be connected to energy storage device 460 terminals, which may additionally protrude out of the energy storage device 460.

In certain embodiments the ion permeable separator may include non-limiting examples of; porous plastics, paper, cellulose, fibers, glass, ion permeable insulators/separators.

In exemplified embodiments, feeding the prepared electrode 109 into an electrolyte administering zone/system 430. Placing the finished energy storage device operational mechanisms 109, into an energy storage device container.

In additional embodiments, the electrode preparation system/device 400 may further include mechanical feed units and/or feeders for the supercapacitor container and/or shell. The mechanical feed unit and/or feeders may be mechanically coupled to the device and may be used to allow at regular or predetermined intervals the insertion and removal of said supercapacitor containers, which may be new containers or partially completed containers containing supercapacitor materials.

In additional embodiments, the electrode preparation system/device 400 may include mechanical feed units and/or feeders to place layered or rolled energy storage device internal components into an energy storage container, which may be energy storage materials, and/or supercapacitor materials.

In exemplified embodiments, administering an electrolyte 435, in the electrolyte administering zone/system 430, fed from the electrolyte mixing zone/system 431.

In additional embodiments, the electrode preparation system/device 400 may be mechanically connected to an electrolyte injector or plurality of electrolyte injectors, and may additionally include sprayer(s) and/or nozzle(s). In additional embodiments, the electrode preparation system/device 400 may administer or inject an electrolyte, said electrolyte may comprise organic electrolytes, aqueous electrolytes, co-solvent and salt electrolytes, ion carrier electrolytes, ionic electrolytes, gel electrolytes, dry polymer electrolytes, ceramic electrolytes, with co-solvent in salt electrolytes being preferred, into the energy storage container containing energy storage materials and/or supercapacitor materials.

In additional embodiments, the electrode preparation system/device 400 may include mechanical feed units and/or feeders to place layered or rolled energy storage device internal components into an energy storage container, which may be energy storage materials and/or supercapacitor materials. In additional embodiments, the electrode preparation system/device 400 may be mechanically connected to an electrolyte injector 433 or plurality of electrolyte injectors 433, and may additionally include sprayer(s) and/or nozzle(s). In additional embodiments, the electrode preparation system/device 400 may administer or inject 433 an electrolyte, said electrolyte may comprise organic electrolytes, aqueous electrolytes, co-solvent and salt electrolytes, ion carrier electrolytes, ionic electrolytes, gel electrolytes, dry polymer electrolytes, ceramic electrolytes, with co-solvent in salt electrolytes being preferred, into the energy storage container containing energy storage materials and/or supercapacitor materials.

In exemplified embodiments, the electrode preparation system/device 400 may administer or inject 433 an electrolyte and/or allow the administering of an electrolyte into an energy storage device in typical atmospheric environments. In exemplified embodiments, the electrode preparation system/device 400 administers or injects 433 an electrolyte into an energy storage device in a typical atmospheric environment. In exemplified embodiments, the electrode preparation system/device 400 administers or injects 433 an electrolyte into a supercapacitor in a typical atmospheric environment.

In exemplified embodiments, the electrode preparation system/device 400 may also include a mechanical feed unit(s) and/or feeders for the energy storage container containing energy storage materials and electrolyte. In exemplified embodiments, the electrode preparation system/device 400 may be mechanically connected to a container sealing device, said sealing device may include a crimper(s), screw, rivet, clamp, press, weld or seal, a welder(s) 451, to bind and/or affix anode and cathode leads to positive and negative terminals of said energy storage device, and/or to enclose or seal the energy storage device 460. In exemplified embodiments, the electrode preparation system/device 400 may include said sealing device and may also include sealing means for said container with or without a separate seal or component(s).

In exemplified embodiments the electrode preparation system/device 400 may also include means to control internal energy storage pressure, for instance for a vacuum. In certain embodiments the electrode preparation system/device 400 may include a vacuum pump, which may be used to reduce energy storage device internal pressure.

In exemplified embodiments the electrode preparation system/device 400 may include a finished energy storage cell hopper 462 to deposit finish energy storage devices 460 or supercapacitor cells 460.

In exemplified embodiments, the electrode preparation system/device 400 may include a controller and/or processor (not shown) associated with the operation and parameter control of the electrode preparation system/device 400. In additional embodiments, the controller and/or processor may be configured to adjust the speed and control a multitude of systems including non-limiting examples of; anode metal feed, cathode metal feed, ion permeable separator(s) feed, electrode mixing, electrode material feed system 406, electrode mix applicators 408, electrode mix measurements, electrode mix recirculation systems 409, electrode drying 420, rollers 412a/412b, tensioners 413a/413b, winding speed, winding length, layering speed, layering length, motors 414, drive systems 415, container loading, container filling, container moving, electrolyte mixing 431, electrolyte injecting 432/433, electrolyte 5 measurements, anode and cathode connection, anode cathode terminal connection, welding 450, container sealing 451, container crimping, container closing, vacuum control, energy storage device assembly 460, supercapacitor assembly 460, hopper deposit and control 462. The controller which may be based on one or more inputs, sensors, feedback sensors, measured parameters, measurements, timers, timed process, temperature gauges, and/or other suitable assembly parameters. It should be noted in additional embodiments, suitable moisture sensors, temperature sensors, or gas sensors in operable communication with the controller and/or processor may be integrated, or mechanically connected, into or between each of the zones and/or at any suitable position along or within the energy storage production system 500 or device. In additional embodiments, the controller and the processor may use the information obtained from the sensors and/or gauges by which to optimize the speed and efficiency of the device and/or processing systems, mechanical components, feed systems, mixing systems, assembly systems, and materials, which may be based upon one or more readings taken by the various sensors.

In exemplified embodiments the electrode preparation system/device 400 may also include means to control internal energy storage pressure, for instance for a vacuum. In certain embodiments the electrode preparation system/device 400 may include a vacuum pump, which may be used to reduce internal pressure.

Figure 18:
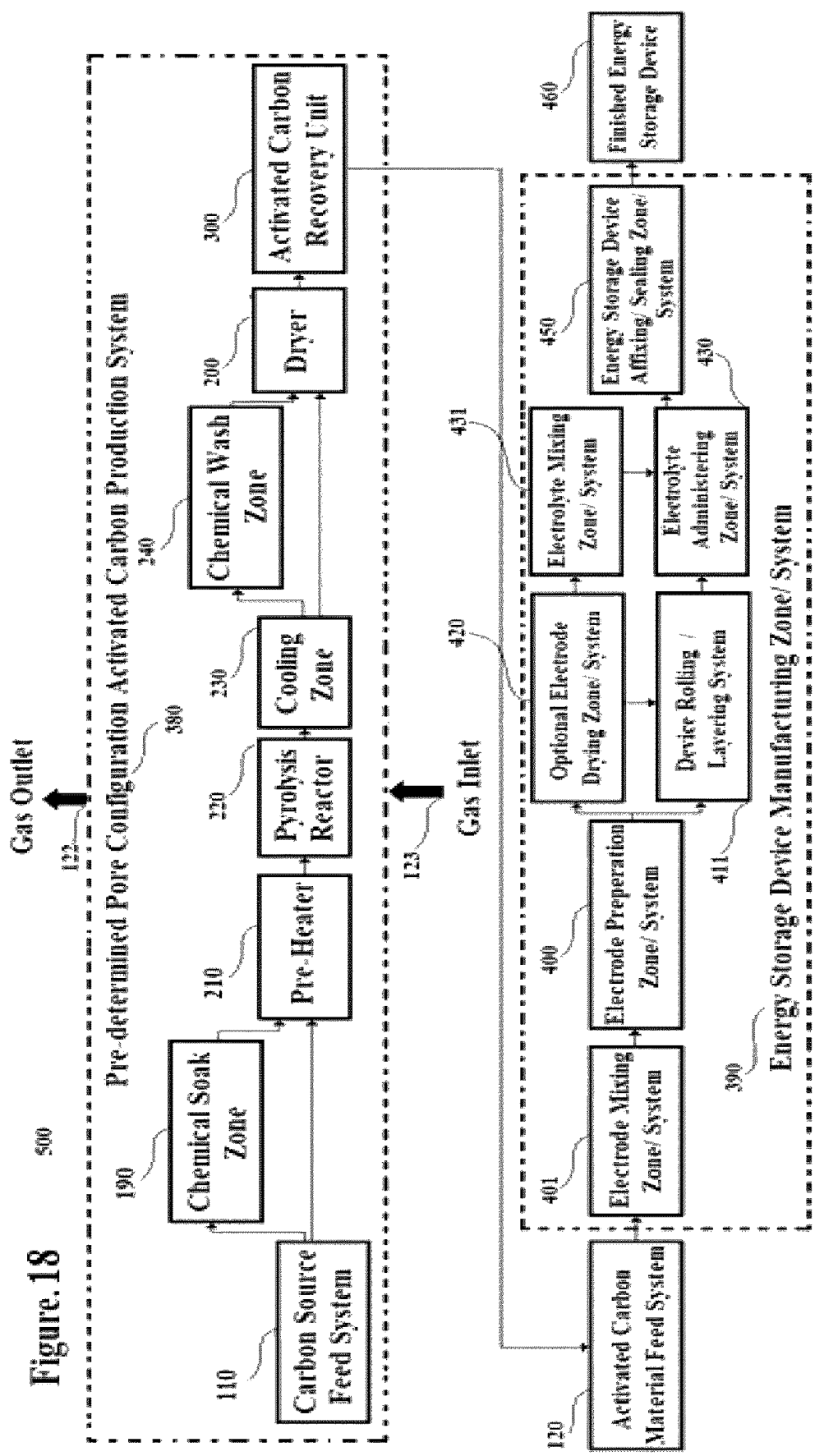
FIG. 18 Is a block diagram of an embodiment of the invention including an activated carbon production system and energy storage production system.

FIG. 18 is a block diagram of exemplified embodiments of the invention, FIG. 18 depicts the general blocks and zones of the device, wherein blocks may be omitted or reconfigured in order to accomplish the beneficial aspects of the invention. Additionally, the figures describe zones or blocks, specific features/devices/processes, and benefits described throughout the document, including in FIGS. 15, 16, and 17, are hereby incorporated by reference into the blocks or zones of the described invention depicted in FIG. 18. An exemplified embodiment of the disclosed invention; described in the figure(s) as systems, zones, and blocks, described in our general way, and is in no way meant to limit the devices systems, zones, blocks or benefits of the disclosed invention. The figure is meant to describe the stages involved through the progression of a raw carbon source material into a finished energy storage device. The energy storage device production system 500 includes; a pre-determined pore configuration hierarchical structure activated carbon production system/zone 380; a carbon source feed system 110; a chemical soak/mixing zone 190; a preheating/drying zone 210; a pyrolysis reactor 220; and a cooling zone 230; which may also include a gas inlet 123; and a gas outlet 122; a chemical washing zone 240; a dryer 200; and activated carbon recovery unit 300; and activated carbon material feed system 120; an energy storage device production system 390; an electrode mixing zone/system 401; an electrode preparation zone/system 400; an optional electrode drying zone/system 420; a device rolling/layering system 411; an electrolyte mixing zone/system 431; an electrolyte administering zone/system 430; and energy storage device affixing/ceiling zone/system 450; capable of producing a finished energy storage device 460.

Figure 19:
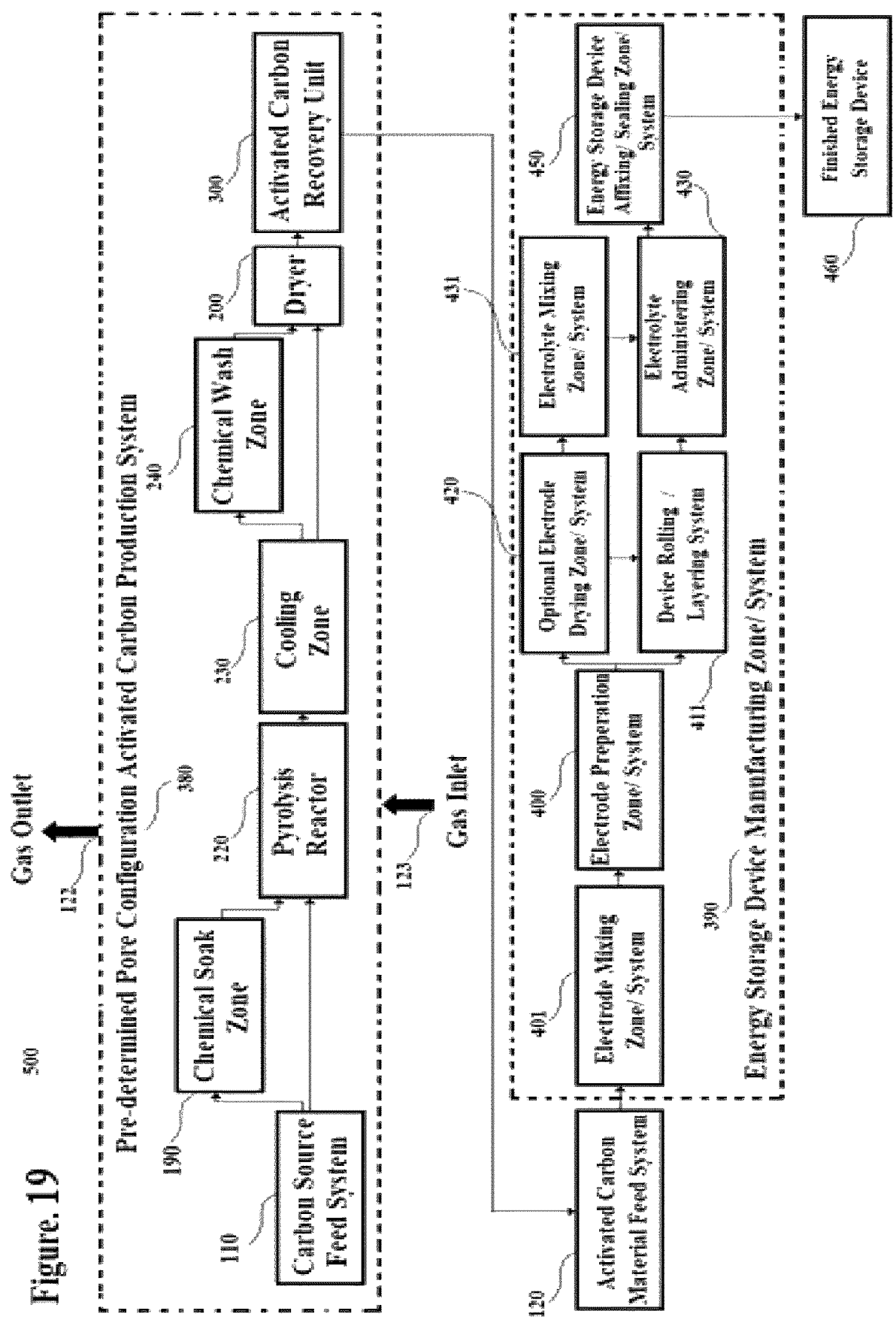
FIG. 19 Is a block diagram of an embodiment of the invention including an activated carbon production system and energy storage production system.

FIG. 19 is a block diagram of exemplified embodiments of the invention, FIG. 19 depicts the general blocks and zones of the device, wherein blocks may be omitted or reconfigured in order to accomplish the beneficial aspects of the invention. Additionally, the figures describe zones or blocks, specific features/devices/processes, and benefits described throughout the document, including in FIGS. 15, 16, and 17, are hereby incorporated by reference into the blocks or zones of the described invention depicted in FIG. 19. An exemplified embodiment of the disclosed invention includes; described in the figure as systems, zones, and blocks, described in our general way, and is in no way meant to limit the devices systems, zones, blocks or benefits of the disclosed invention. The figure is meant to describe the stages involved through the progression of a raw carbon source material into a finished energy storage device. The energy storage device production system 500 includes; a pre-determined pore configuration activated carbon production system/zone 380; a carbon source feed system 110; a chemical soak/mixing zone 190; a pyrolysis reactor 220; and a cooling zone 230; which may also include a gas inlet 123; and a gas outlet 122; a chemical washing zone 240; a dryer 200; and activated carbon recovery unit 300; and activated carbon material feed system 120; an energy storage device production system 390; an electrode mixing zone/system 401; an electrode preparation zone/system 400; an optional electrode drying zone/system 420; a device rolling/layering system 411; an electrolyte mixing zone/system 431; an electrolyte administering zone/system 430; and energy storage device affixing/ceiling zone/system 450; capable of producing a finished energy storage device 460.

Figure 20:
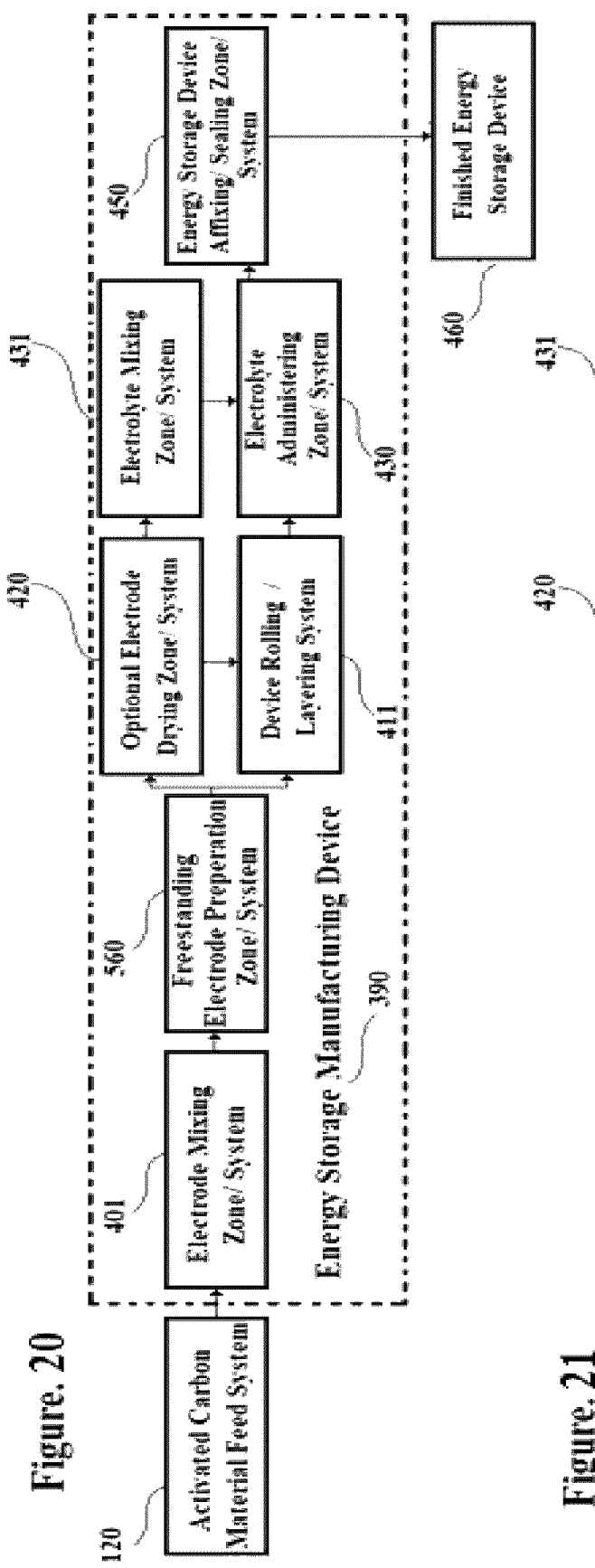
FIG. 20 Is a block diagram of an embodiment of the invention including an energy storage production system with a freestanding electrode production system.

FIG. 20 is a block diagram of exemplified embodiments of the invention, FIG. 20 depicts the general blocks and zones of the device, wherein blocks may be omitted or reconfigured in order to accomplish the beneficial aspects of the invention. Additionally, the figures describe zones or blocks specific features/devices/processes, and benefits described throughout the document, including in FIGS. 15, 16, and 17, are hereby incorporated by reference into the blocks or zones of the described invention depicted in FIG. 20. An exemplified embodiment of the disclosed invention includes; described in the figure as systems, zones, and blocks, described in our general way, and is in no way meant to limit the devices systems, zones, blocks or benefits of the disclosed invention. The figure is meant to describe the stages involved for the production of energy storage devices with freestanding electrodes utilizing a pre-determined pore configuration activated carbon. The energy storage device production system 390 includes; an activated carbon material feed system 120; an electrode mixing zone/system 401; a freestanding electrode preparation zone/system 560; an optional electrode drying zone/system 420; a device rolling/layering system 411; an electrolyte mixing zone/system 431; an electrolyte administering zone/system 430; and energy storage device affixing/ceiling zone/system 450; capable of producing a finished energy storage device 460. In this exemplified embodiment, the energy storage device production system 390 is configured to allow the construction of energy storage devices such as supercapacitors wherein the design includes a freestanding electrode.

Figure 21:
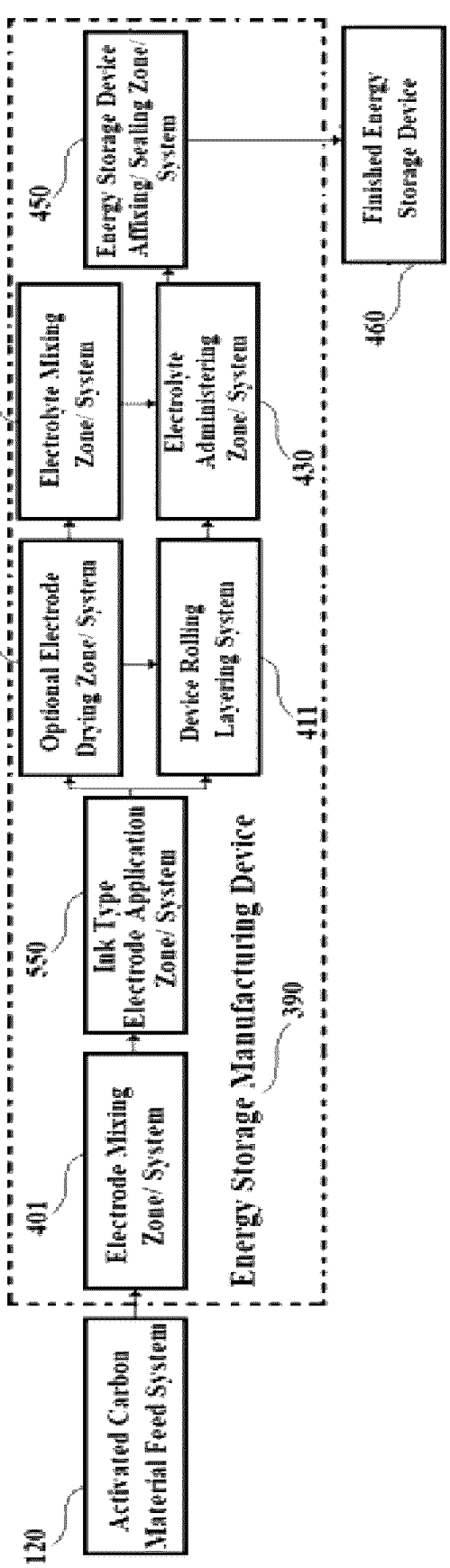
FIG. 21 Is a block diagram of an embodiment of the invention including an energy storage production system with an ink type/mix electrode production system.

FIG. 21 is a block diagram of exemplified embodiments of the invention, FIG. 21 depicts the general blocks and zones of the device, wherein blocks may be omitted or reconfigured in order to accomplish the beneficial aspects of the invention. Additionally, the figures describe zones or blocks, specific features/devices/processes, and benefits described throughout the document, including in FIGS. 15, 16, and 17, are hereby incorporated by reference into the blocks or zones of the described invention depicted in FIG. 21. An exemplified embodiment of the disclosed invention described in the figure as systems, zones, and blocks, described in our general way, and is in no way meant to limit the devices systems, zones, blocks or benefits of the disclosed invention. The figure is meant to describe the stages involved for the production of energy storage devices with freestanding electrodes utilizing a pre-determined pore configuration activated carbon. The energy storage device production system 390 includes; an activated carbon material feed system 120; an electrode mixing zone/system 401; an ink type electrode preparation zone/system 550; an optional electrode drying zone/system 420; a device rolling/layering system 411; an electrolyte mixing zone/system 431; an electrolyte administering zone/system 430; and energy storage device affixing/ceiling zone/system 450; capable of producing a finished energy storage device 460. In this exemplified embodiment the energy storage device production system 390 is configured to allow the construction of energy storage devices such as super capacitors wherein the design includes an ink type or mix applied directly to the current collector of the electrode.

Figure 22:
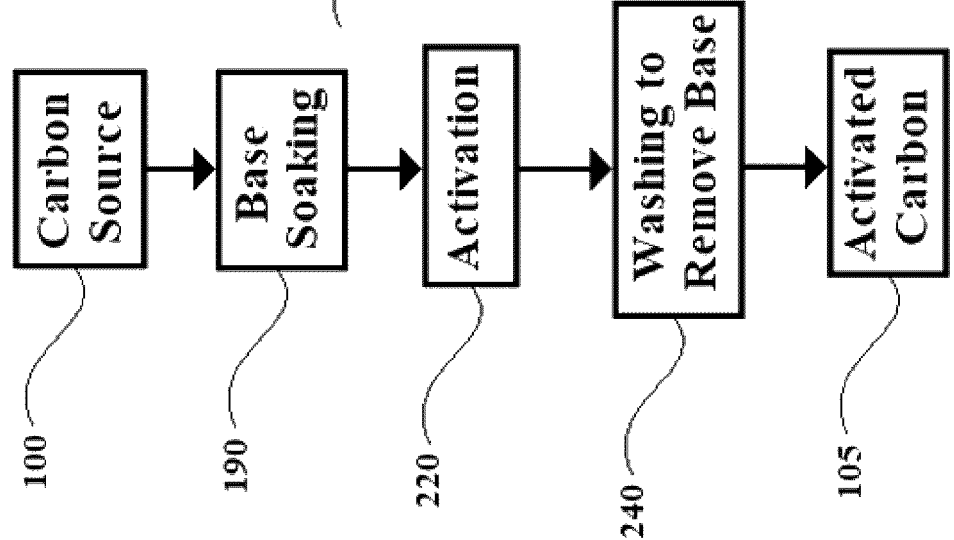
FIG. 22 Is a block diagram of an embodiment of the invention including a pre-determined pore distribution activated carbon production system.

FIG. 22 is a block diagram of exemplified embodiments of the invention, FIG. 22 depicts the general blocks and zones of the device, wherein blocks may be omitted or reconfigured in order to accomplish the beneficial aspects of the invention. Additionally, the figures describe zones or blocks, specific features/devices/processes, and benefits throughout the document, including in FIGS. 15, 16, and 17, are hereby incorporated by reference into the blocks or zones of the described invention depicted in FIG. 22. An exemplified embodiment of the disclosed invention described in the figure as systems, zones, and blocks, described in our general way, and is in no way meant to limit the devices systems, zones, blocks or benefits of the disclosed invention. The figure is meant to describe the stages involved through the progression of a raw carbon source material a pre-determined pore configuration activated carbon. The predetermined pore configuration activated carbon production system/zone 380 includes; a carbon source feed material system/zone 100; a feeding carbon source material step 100; a carbon source feed material chemical soak/mixing system/zone 190; a carbon source material chemical soaking and/or mixing step 190; a pre-determined pore configuration activated carbon pyrolysis reaction system/zone 220; a pyrolysis reaction producing pre-determined pore configuration activated carbon step 220; a pre-determined pore configuration activated carbon washing system/zone 240; a predetermined pore configuration activated carbon washing step 240; a finished pre-determined pore configuration activated carbon system/zone 105; producing a pre-determined pore configuration activated carbon step 105.

Figure 23:
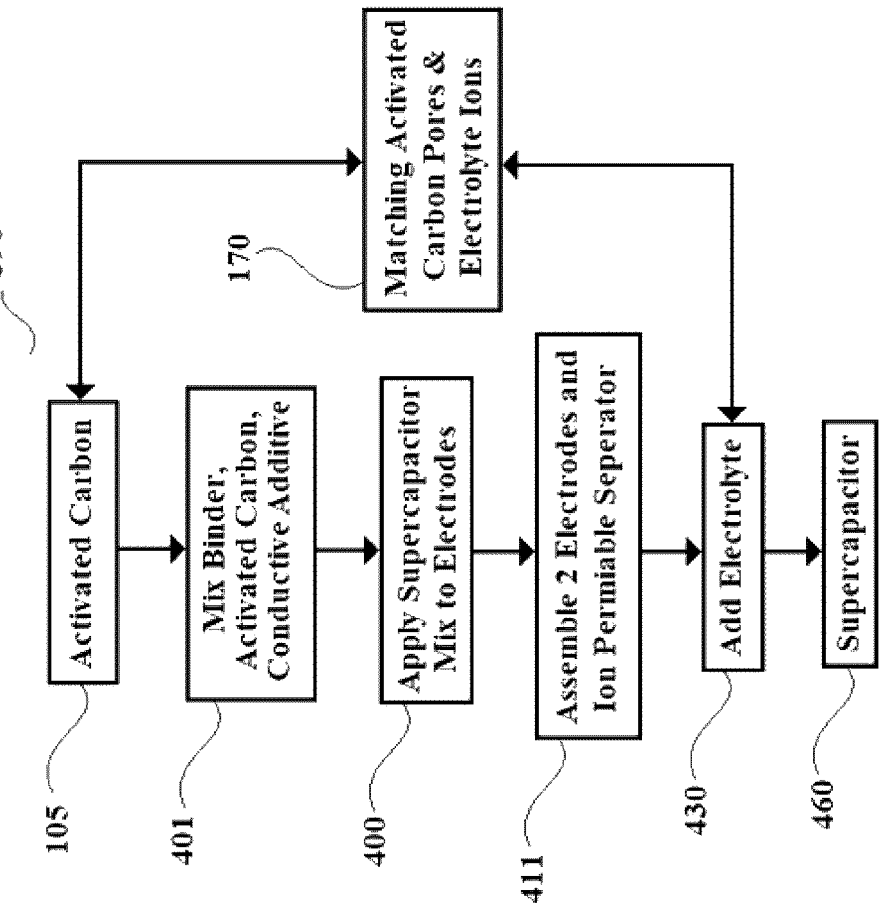
FIG. 23 Is a block diagram of an embodiment of the invention including an energy storage production system wherein activated carbon pores and electrolyte ions are matched for size and distribution.

FIG. 23 is a block diagram of exemplified embodiments of the invention, FIG. 23 depicts the general blocks and zones of the device, wherein blocks may be omitted or reconfigured in order to accomplish the beneficial aspects of the invention. Additionally, the figures describe zones or blocks, specific features/devices/processes and benefits throughout the document, including in FIGS. 15, 16, and 17, are hereby incorporated by reference into the blocks or zones of the described invention depicted in FIG. 23. An exemplified embodiment of the disclosed invention described in the figure as systems, zones, and blocks, described in our general way, and is in no way meant to limit the devices systems, zones, blocks or benefits of the disclosed invention. The figure is meant to describe the stages involved for the production of energy storage devices wherein the electrolyte is matched with a pre-determined pore configuration activated carbon. The energy storage device production system 390 includes; a pre-determined pore configuration activated carbon 105; an electrode pore size and distribution, and an electrolyte ion/solvated ion/de-solvated ion size, sizing and matching zone/system 170; an electrode pore size and distribution, and an electrolyte ion/solvated ion/de-solvated ion sizing and matching step 170; an electrode mixing zone/system 401; a mixing electrode ingredients together step 401; an electrode preparation zone/system 400; an electrode preparation step 400; a device rolling/layering zone/system 411; an energy storage device rolling/layering step 411; an electrolyte administering zone/system 430; an administering electrolyte step 430; a producing a finished energy storage device step 460. In this exemplified embodiment the energy storage device production system 390 is configured to allow the construction of energy storage devices such as super capacitors wherein the design includes the sizing and matching of electrode pore sizing and structures with the sizing and structures of electrolytes in order to produce an improved energy storage device, for instance a supercapacitor or battery.

Figure 24:
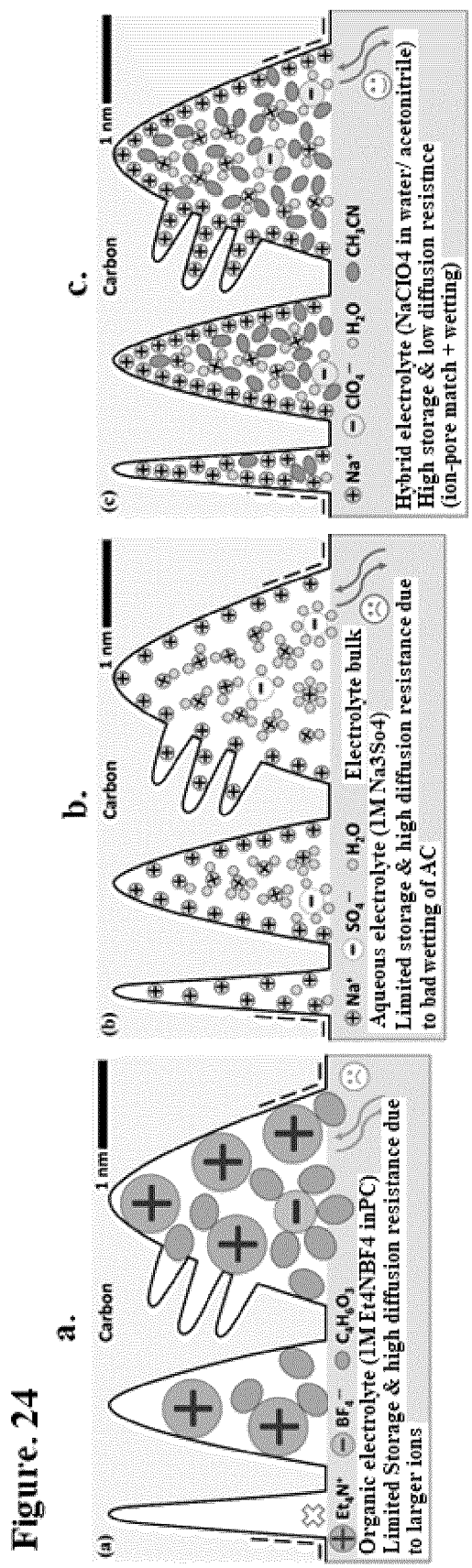
FIG. 24 (a, b, c) are images depicting the adsorption of electrolyte ions with or without solvation shells to the surface of pores with different sizes (micropore <0.6 nm, micropore <1.5 nm, and mesopore <2.5 nm) for the (a) organic, (b) aqueous and (c) hybrid electrolytes.

FIG. 24 shows the adsorption of electrolyte ions with or without solvation shells to the surface of pores with different sizes (micropore <0.6 nm, micropore <1.5 nm, and mesopore <2.5 nm) for the (a) organic, (b) aqueous and (c) hybrid electrolytes. The size of ions are displayed relative to their actual size as listed in Table S1 (except $Na^+$ for which the size is 1.7 times larger for demonstration purpose). For a certain rate of charge/discharge, the electrode suffers from limited accessible surface area in the organic and aqueous electrolytes due to high diffusion resistance. Bad wetting of aqueous electrolyte prevents ions to diffuse into the carbon and larger size of ions in the organic electrolyte results in less ions diffuse into the pores.

Figure 25:
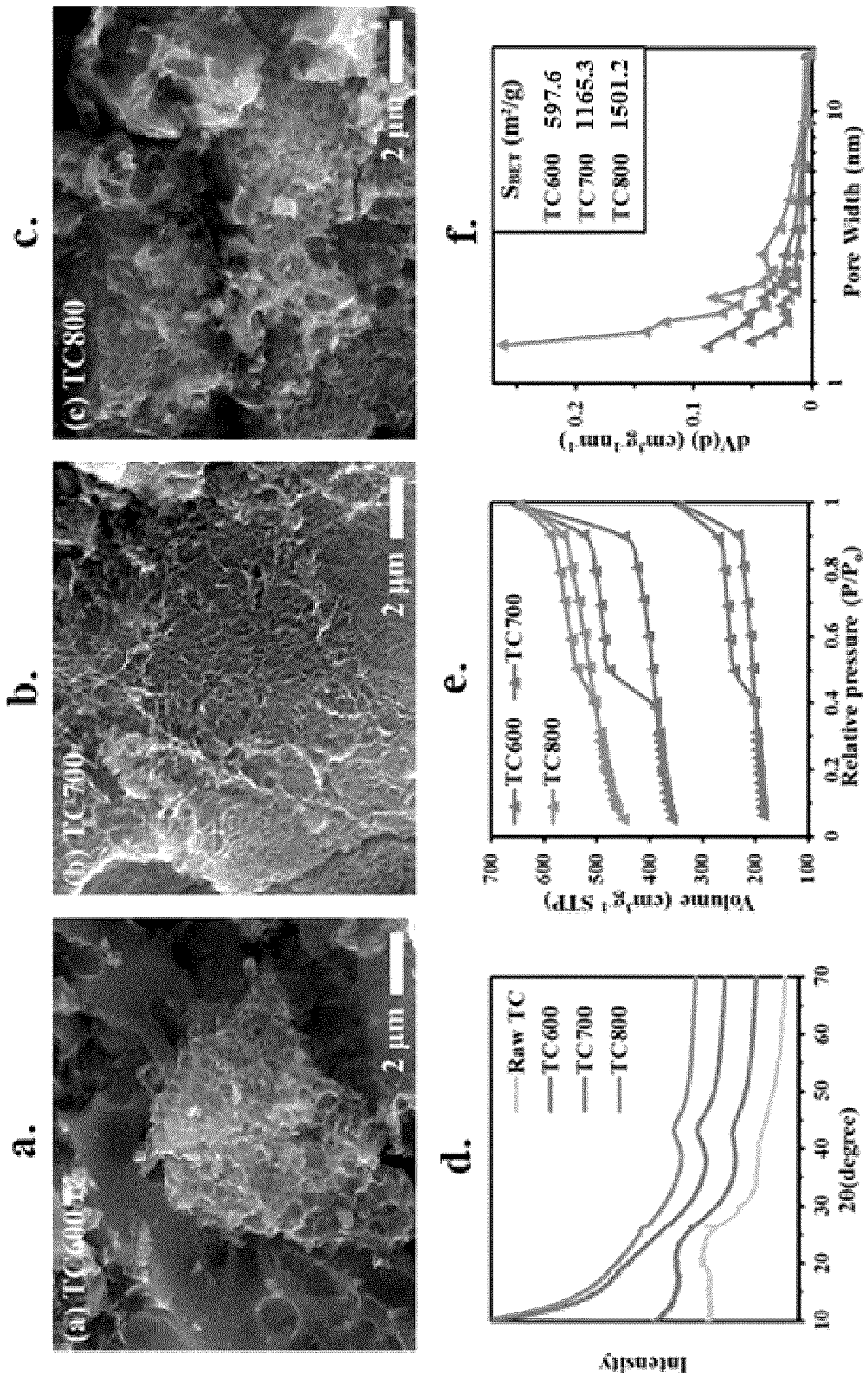
FIG. 25 (a, b, c, d, e, f) are images depicting the effect of activation temperature on the carbon structure and supercapacitor performance of TC600, TC700 and TC800 with the hybrid electrolyte. (a-c) SEM images, (d) XRD patterns, (e) nitrogen adsorption/desorption isotherms, and (f) pore size distribution.

FIG. 25 shows the effect of activation temperature on the carbon structure and supercapacitor performance of TC600, TC700 and TC800 with the hybrid electrolyte. (a-c) SEM images, (d) XRD patterns, (e) nitrogen adsorption/desorption isotherms, and (f) pore size distribution.

Low-cost ACs in alternate embodiments can be obtained from various precursors such as; biomass, oil, petroleum coke, and coal. The low bulk density of biomass-derived ACs hinders their application in SCs as it leads to a low volumetric capacitance, whereas preferred embodiments using coal generally yield more dense ACs. In addition, the coal industry can be saved by using coal for a cleaner application, particularly as a source for producing ACs. Here, in our preferred process embodiment, we used scalable KOH activation method to synthesize microporous ACs from thermal coal by tuning the porosity (hierarchical structure) based on the activation temperature and KOH saturation and soak times. This chemical activation process usually yields a fractal-like hierarchical pore structure including micro-, meso- and macropores.

The described invention herein contains; macropores act as ion-buffering reservoirs, the mesopores serve as channels for the rapid transport of ions, while the micropores are the primary location for the double-layer charge storage.

SEM images show successful activation process for all samples with plenty of macropores ensuring effective penetration of bulk of the electrolyte into the ACs (FIG. 25*a-c*). SEM images reveal that increasing the temperature from 600° C. to 800° C. results in improved distribution of macropores in AC particles. As in preferred embodiments, this indicates that the diffusion distance of electrolyte ions within the particles is shorter for TC800, leading to its better ionic conductivity. These images show the presence of AC particles without macropores, which results in limited ion-transport kinetics within those particles. EDS results demonstrate high carbon content of TC-based ACs compared to the raw TC, re-confirming the successful activation process. It is also seen that the C/O ratios of TC, TC600, TC700 and TC800 are 2.2, 7.3, 11.2 and 11.5, respectively, indicating a better electronic conductivity in TC800 and TC700.

XRD was performed to further study the effect the activation temperature on the crystalline structure of ACs (FIG. 25*d*). The diffraction peak at 26° corresponds to the (002) plane of aromatic layers in carbons. This peak is broadened around 15-30° in the XRD of raw TC, which shows the degradation of aromatic layers and the relatively amorphous matrix of TC as a great precursor for ACs with high porosity. This peak fully disappears in TC700 and TC800, revealing their highly amorphous structure and the formation of well-developed pores caused by the reaction of carbon with KOH during the activation process. The broad and weak peak at 43° in the XRD of ACs corresponds to the (100) plane of aromatic layers, implying the presence of graphitic carbon in them as a result of the activation process. The higher intensity of this peak in TC700 and TC800 is the indication of more graphitic phase compared to TC600 and thus more electronic conductivity.

To quantify the porosity of the ACs, particularly micro- and mesopores, nitrogen adsorption/desorption measurements at 77 K for the as-prepared ACs were carried out. The isotherm profiles of all three samples can be considered as type I indicating microporous ACs (FIG. 25e). The nitrogen sorption tests along with SEM morphology of ACs suggest that they have similar type of nanostructured morphology or porosity as their precursor and the activation method are the same, but the activation temperature has remarkable influence on the level of porosity. As the temperature of activation increases from 600° C. to 800° C., one can observe the elevation of isotherms suggesting the increased porosity and widening of pores. The increase of the isotherm slope at higher relative pressures ($P/P_0>0.3$) with the increase of activation temperature is also the indication of more mesopores.

In preferred embodiments, the pore distribution curves reveal that the as-prepared ACs possess a hierarchical pore structure with most pores less than 2 nm and a small proportion of mesopores in the range of 2-5 nm (FIG. 25f). The pore distribution curves also show a shift in the pore size distribution toward larger pores and the pore volume increases as the activation temperature increases. As such, TC600 is a microporous AC with a very limited mesopores as observed in the pore distribution curve as well as its nearly horizontal isotherm, whereas an exemplified embodiment TC800 exhibits more developed micro- and mesopores.

Though yet still additional embodiments, the low SSA of TC600 with $S_{BET}$ of 597.6 m$^2$/g clearly demonstrate its inadequate porosity for the SC application. The calculated $S_{BET}$ for TC700 and TC800 are 1165.3 and 1501.2 m$^2$/g, respectively, implying that their SSA are in the acceptable range for an electrode material for SCs of different embodiments. The higher SSA, wider micropore size distribution, and a small amount of mesopores favor TC800 in terms of rate capability. However, the electrochemical tests will further define the appropriate range of porosity (i.e. TC700 vs TC800) based on the capacitive performance using the hybrid electrolyte.

In the description invention, and additionally as preferred embodiments and disclosed benefits of the invention, the porosity of TC-based AC was tuned to obtain a microporous AC with as less mesopores as possible to avoid a low density while maintaining a good rate performance using the hybrid electrolyte. Hence, creating more mesopores in TC using activation temperature higher than 800° C. were not pursued currently, though may result in alternate embodiments, to limit excessive volume expansion. In additional preferred embodiments, since the size of ions in the hybrid electrolyte (NaClO$_4$) is smaller than common salts used in organic electrolyte (e.g. Et$_4$NBF$_4$), using the hybrid electrolyte allows using ACs with least amount of mesopores (to avoid low density) without sacrificing the rate performance.

Figure 26:
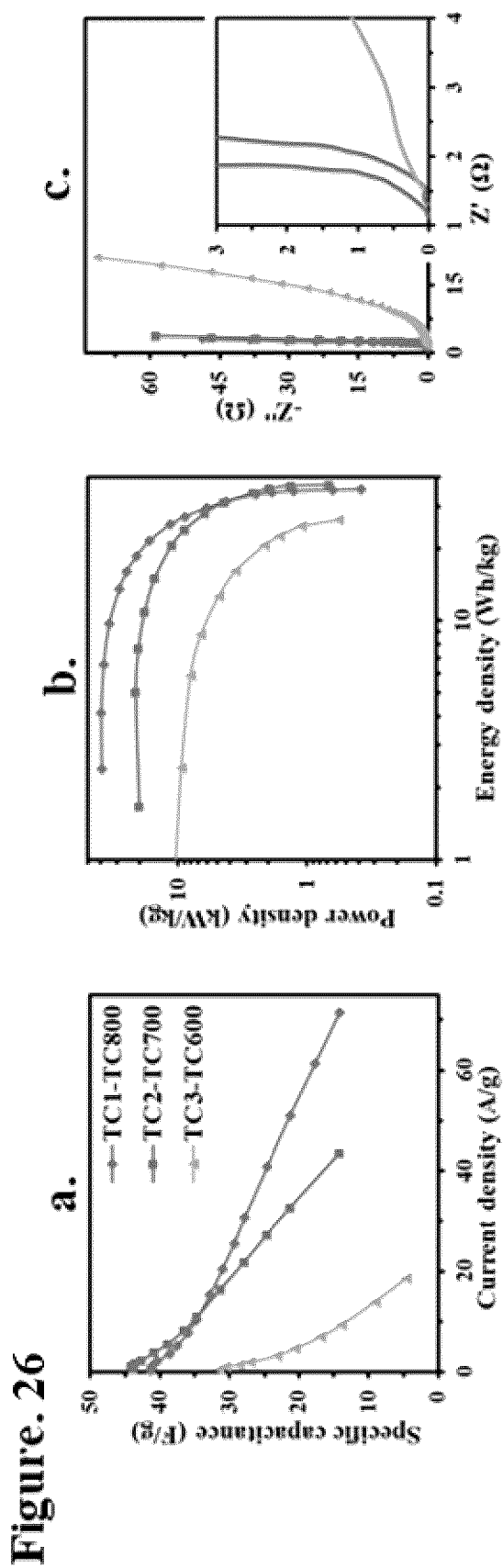
FIG. 26 (a, b, c) are images depicting the performance of SCs assembled from TC800 with hybrid, organic and aqueous electrolyte (a-c). Specific capacitance (a) and Ragone plot (b) obtained from GCD curves of TC1, TC4 and TC5. Nyquist plots obtained from EIS tests (c).

FIG. 26 shows the effect of activation temperature or porosity of ACs on the performance of assembled SCs with the hybrid electrolyte. Specific capacitance versus current density (a) and Ragone plot (b) obtained from GCD curves of TC1, TC2 and TC3. Nyquist plot obtained from EIS tests (c).

To identify the most appropriate range of porosity for the hybrid electrolyte (7.7 m NaClO$_4$ in water/acetonitrile), the electrochemical tests were carried out for the SCs assembled using the as-prepared ACs (FIG. 26). The inferior capacitance and rate performance of TC3 indicates TC600 has limited porosity and low accessible SSA as discussed earlier. This is also reflected in the lower power and energy density of TC3 compared to TC1 and TC2.

Near vertical line at the low frequency region in the Nyquist plot of TC1 and TC2 demonstrates their purely capacitive behavior (FIG. 26c). On the other hand, the oblique line of TC3 at the low frequency shows its deviation from ideal capacitive behavior, and its longer Warburg region further supports its high diffusion resistance caused by the limited porosity (FIG. 12c). The Warburg region in the Nyquist plot is governed by the diffusion of the charged species within the porosity.

TC1 outperforms TC2 in terms of rate performance and power density even though TC2 exhibits slightly higher capacitance at low rates. The maximum current density of TC2 is 43.5 A/g (316.2 mA/cm$^2$) whereas TC1 can operate up to an ultrahigh current density of 71.4 A/g (553.4 mA/cm$^2$) with a smaller capacitance depletion as the current increases. For an example embodiment, TC1 with the mass loading of 3.87 mg/cm$^2$ retains 75.2% of its capacitance when the current is increased from 5 to 200 mA (or 0.5 to 20.4 A/g; 20 A/g is the highest rate reported in majority of studies with mass loading less than 2 mg/cm$^2$). Meanwhile, the capacitance retentions from 5 to 200 mA are 63.7% and 14.5% for TC2 and TC3, respectively.

The higher SSA and wider pores in the TC800 embodiment lead to lower diffusion resistance and better ion mobility in the electrode, resulting in better rate capability and power density, which is a disclosed embodiment and disclosed benefit of the described invention. This is also confirmed by the slightly smaller semi-circle (charge transfer resistance) and shorter mid-frequency Warburg region (diffusion resistance) in the Nyquist plot of TC1 compared to that of TC2 (FIG. 12c). Consequently, TC800 has the most suitable porosity for the hybrid electrolyte ('ion-pore matching').

CV curves of TC1 and TC2 at a high scan rate of 100 mV/s are nearly rectangular shape (double-later capacitance), whereas the CV curve of TC3 deviates from the rectangular shape indicating a poor capacitive performance. The CV curves of TC1 for various rates show nearly rectangular shape up to 600 mV/s and confirm the stability window of 2.5 V for the hybrid electrolyte. The fact that the current near 2.5 V starts to rise is an indication of the water splitting threshold.

Figure 27:
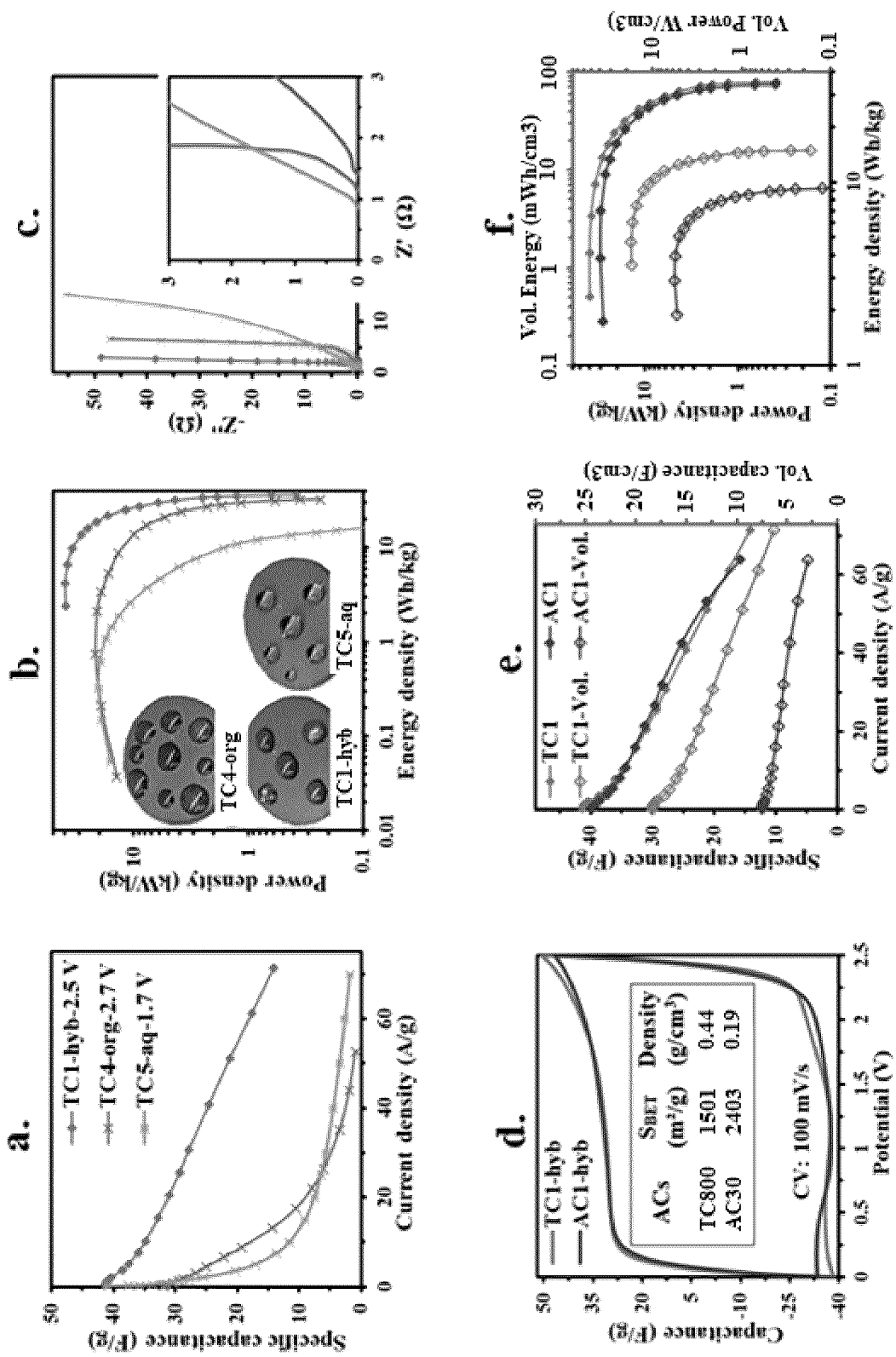
FIG. 27 (a, b, c, d, e, f) are images depicting the performance of SCs assembled from TC800 with hybrid, organic and aqueous electrolyte (a-c). Specific capacitance (a) and Ragone plot (b) obtained from GCD curves of TC1, TC4 and TC5. Nyquist plots obtained from EIS tests (c). Photos in the inset were taken ~4 s after dropping electrolytes on the electrodes exhibiting the surface wettability for each electrolyte. Performance comparison of SCs fabricated from TC800 (TC1) and AC30 (AC1) electrodes with the hybrid electrolyte (d-f). CV (d), gravimetric and volumetric capacitance (e), and Ragone plot with both gravimetric and volumetric parameters (f) for TC1 and AC1.

FIG. 27 shows the performance of SCs assembled from TC800 with hybrid, organic and aqueous electrolyte (a-c). Specific capacitance (a) and Ragone plot (b) obtained from GCD curves of TC1, TC4 and TC5. Nyquist plots obtained from EIS tests (c). Photos in the inset were taken ~4 s after dropping electrolytes on the electrodes exhibiting the surface wettability for each electrolyte. Performance comparison of SCs fabricated from TC800 (TC1) and AC30 (AC1) electrodes with the hybrid electrolyte (d-f). CV (d), gravimetric and volumetric capacitance (e), and Ragone plot with both gravimetric and volumetric parameters (f) for TC1 and AC1.

To further demonstrate that the SC assembled from the embodiment TC800 hybrid electrolyte deliver the best overall performance, TC800 electrodes were tested using three kinds of electrolyte, i.e. neutral aqueous, organic and hybrid (FIG. 27a-c). It is seen that the SC with hybrid electrolyte (TC1) outperforms organic (TC4) and aqueous (TC5) electrolytes with regard to all capacitive metrics including capacitance, rate capability, energy and power densities. For instance, when the current is increased from 5 to 200 mA, the capacitance retentions of TC1, TC4 and TC5 are 75.2%, 33.5% and 22.5%, respectively (FIG. 27a). The wider stability windows of TC1 (2.5 V) and TC4 (2.7 V) compared to TC5 (1.7 V) offer higher energy and power densities.

These results clearly demonstrate the adaptability of the hybrid electrolyte with TC800 electrode embodiment, originating from the interplay between ion size and pore size distribution, and the electrolyte wetting and are certain specifically disclosed benefits of the system and method. The mismatch between the electrode and the electrolyte is the main reason for the poor performance of TC4 and TC5. TC4 suffers from the poor rate performance because the lack of adaptability between the electrode porosity and the organic electrolyte (ion-pore mismatch), while the poor wettability between the aqueous electrolyte and the electrode is the case for TC5.

Aqueous electrolytes are normally expected to deliver a higher specific capacitance compared to the organic electrolytes (owing to smaller ions and solvent molecules in the aqueous electrolyte), but TC5 delivers a larger capacitance than TC4 only at a current density less than 1 A/g. TC5 suffers from limited rate performance because the poor wetting of hydrophobic TC800 electrode by the aqueous electrolyte (FIG. 27b inset) mitigates the access of solvated ions to the pores and thus less charge storage at higher current densities. The limited diffusion of ions to the pores is further supported by the Nyquist plot of TC5, i.e. the very long Warburg region such that there is virtually no vertical line in the low frequency region (FIG. 27c). This wettability issue becomes more pronounce for thicker electrodes (loading >1 mg/cm$^2$) as the aqueous electrolyte cannot reach part of active materials, even under the cell potential during the charge/discharge, leading to increased dead mass.

It should be noted that the wettability is unrelated to the ionic conductivity but rather it directly affects the accessibility of the ions to the pores. In addition, the ESR of a SC is related to the contact resistance of electrode/current collector, electrical resistance of the electrodes, and ion charge transfer resistance. The ESR can be identified by the resistance where the semi-circle ends (and Warburg region starts) in the Nyquist plot or the potential drop ($V_{IR}$) in the GCD curves. A very tiny semi-circle in the Nyquist plots of all assembled SCs in this work (FIGS. 26c and 27c) is the indication of high electrical conductivity of electrodes as well as good ionic conductivity of electrolytes in the cells. Expectedly, the ionic conductivity of the organic electrolyte is slightly lower than those of the aqueous and hybrid electrolytes according to the Nyquist plots (FIG. 27c) and the ESR of TC1, TC4 and TC5. This is also evident in the larger potential drop at higher currents in the GCD curves of TC4 compared to those of TC1 and TC5. The lower ionic conductivity of the organic electrolyte negatively affects the energy and power density of TC4.

The wettability demonstration (FIG. 27b inset) exhibits that the hybrid and organic electrolytes can wet the as-prepared electrode enabling efficient electrolyte diffusion into the electrodes, demonstration exemplary benefits of the disclosed invention. Although the contact angle of the droplets is slightly smaller for the organic electrolyte, the presence of acetonitrile in the hybrid electrolyte ensures effective ionic transport to the pores, as a disclosed benefit of the disclosed invention.

The higher capacitance of TC1 compared to TC4 (FIG. 27a) is attributed to the better accessibility of the hybrid electrolyte to the micropores (ion-pore matching as a described feature of the invention). Regardless of the current density, a portion of TC800 micropores are too narrow for the ions of the organic electrolyte ($Et_4NBF_4$) to enter while these pores match the size of ions in the hybrid electrolyte ($NaClO_4$). This scenario is valid for both solvated ions and de-solvated ones (partial or complete removal of solvation shells) because solvated ions in the organic electrolyte are also bigger than those in the hybrid electrolyte as both the ions and solvent molecules are larger.

The superior rate capability of TC1 compared to TC4 (FIG. 27a) is likewise attributed to the smaller size of ions and solvated ions in the hybrid electrolyte, facilitating rapid transport of ions to the pores of TC800, and is an example of the disclosed system and methods benefit including certain disclosed features of the invention, ion and pore matching (hierarchical structure) for increasing energy density and lowering resistance. This lower diffusion resistance for the hybrid electrolyte ensures increased accessible surface area of TC800 even at a high current density, as describe for the disclosed invention herein. The shorter Warburg region in the Nyquist plot of TC1 as opposed to TC4 (FIG. 27c) further supports its lower diffusion resistance.

To attain additional insight into the relation between porosity and the electrolyte, we probed capacitive performance of a commercial AC (AC30) with a large SSA using three electrolytes. SEM images show the macroporous morphology of AC30 and EDS analysis confirm its high carbon content with C/O ratios of 16.2. AC30 has a wide pore size distribution with micropores (<2 nm), well-developed mesopores in the range of 2-6 nm, and $S_{BET}$ of 2403 m$^2$/g.

An additional embodiment similar to TC800, AC30-based SC with the hybrid electrolyte (AC1) was seen to deliver better rate capability, energy and power compared to SCs with organic (AC2) and aqueous (AC3) electrolytes. This further supports our assessment that the hybrid electrolyte yields better capacitive performance than its organic and aqueous even with an AC with higher porosity than TC800. In additional embodiments, AC30-based SCs are expected to exhibit a better rate performance than TC800-based SCs because AC30 has more mesopores which mitigates diffusion-related issues in the organic and aqueous electrolytes. However, lower packing density of AC30 leads to smaller volumetric capacitive parameters (AC30 electrode: 0.19 g/cm$^3$; TC800 electrode: 0.44 g/cm$^3$). When using the organic electrolyte, AC2 showed better rate performance than TC4, but AC2 delivers inferior volumetric performance. Likewise, AC3 surpassed TC5 in terms of rate capability when using the aqueous electrolyte, but it suffered from lower volumetric performances.

When using the hybrid electrolyte, AC30-based SC (AC1) delivers the same gravimetric performance as TC800-based SC (TC1) but lower volumetric capacitance, energy and power due to its lower density (FIG. 27d-f). For example, the maximum specific capacitance of TC1 and AC1 at 1 A/g are 41.2 F/g (18.3 F/cm$^3$) and 39.5 F/g (7.4 F/cm$^3$), respectively, elucidating the superior performance of TC1. Moreover, TC1 and AC1 display similar rate capability even though AC30 has more mesopores.

Therefore, the comparison of TC1 and AC1 highlights the well-tuned porosity of embodiment TC800, its hierarchical pore structure adapted to the hybrid electrolyte as described, and producible by the disclosed invention. In other words, and in exemplified embodiments, the TC800 maintains the lower threshold of porosity with the best capacitive performance while avoiding further increase of porosity that decreases the packing density.

Figure 28:
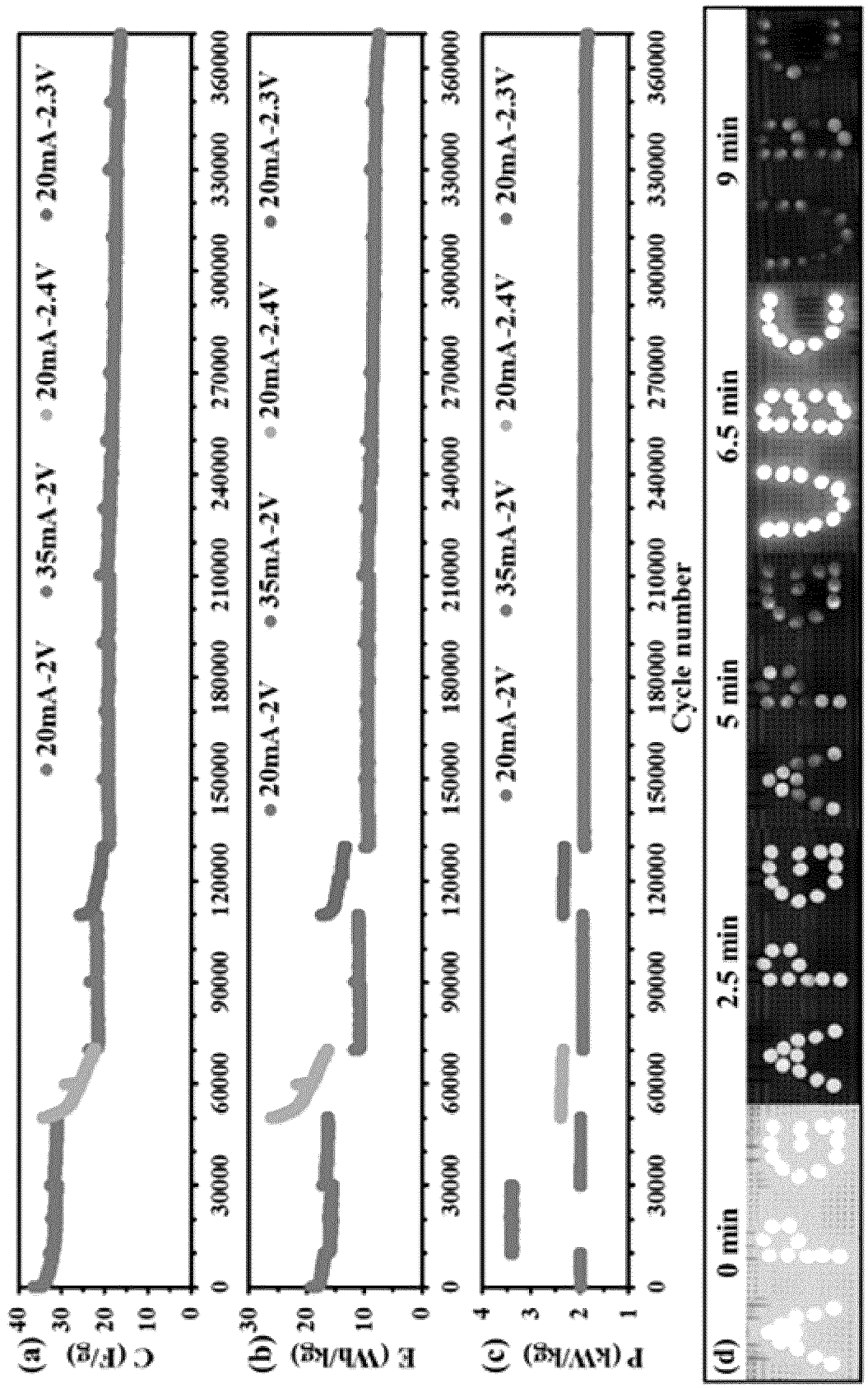
FIG. 28 (a, b, c, d) are images depicting the cycling performance of TC8 (TC800, 3.95 mg/cm2) with the hybrid electrolyte over 370 k GCD cycles for different currents and voltages; specific capacitance (a), energy density (b) and power density (c) versus cycle number. The photos (d) illustrate 31 green LEDs lit for 5.5 min followed by 32 red LEDs lit for 4 min, all connected in parallel and were powered by one SC charged to 2.5.

FIG. 28 shows the cycling performance of TC8 (TC800, 3.95 mg/cm2) with the hybrid electrolyte over 370 k GCD cycles for different currents and voltages; specific capacitance (a), energy density (b) and power density (c) versus cycle number. The photos (d) illustrate 31 green LEDs lit for 5.5 min followed by 32 red LEDs lit for 4 min, all connected in parallel and were powered by one SC charged to 2.5.

To evaluate the cycling performance of the current SC, 370,000 GCD cycles were performed on TC8 embodiment with different currents and operating voltages in the form of a series of 10 k or 20 k successive cycles with a rest period of approximately 5 h between each set of cycling tests (FIG. 28a-c). It is clearly seen that the TC8 embodiment maintains its performance when cycled at 2 V, whereas a slight decline in the capacitance was observed during the cycling test at 2.4V. For instance, after initial 50 k cycles at 2 V, the retention percentages for capacitance, energy and power were 91.2%, 91.2% and 100%, respectively. After 20 k GCD cycles at 2.4 V, the retention percentages for capacitance, energy and power were 75.3%, 71.4% and 97.4%, respectively, while the retention for 2.3 V were 92.3%, 88.4% and 97.8%.

A negligible loss in the power density during the cycling at 2.4 V implies that the electrode conductivity is unchanged. The loss in the capacitance and energy is related to the hybrid electrolyte operating near the threshold of cell stability at 2.5 V. This degradation could also originate form acetonitrile molecules entering and blocking AC pores under large potential (2.4V) or from ions trapped in narrow pores. Overall, the fact that TC8 can function for a huge number of GCD cycles (370 k) without failure indicates its outstanding cycling stability and is a specifically disclosed benefit of the disclosed invention.

In exemplary embodiments the design of electrodes are with a high loading of active materials (up to 10 mg/cm² or greater in certain embodiments) which is critical for designing commercial SCs and wearable electronics considering the current demand for high-energy storage solutions and is referenced herein. Hence, we evaluated the capacitive performance of additional TC800 embodiments with the hybrid electrolyte for higher mass loadings (i.e. 5.3 and 9.1 mg/cm²). Typically, increasing the mass loading of electrodes leads to inferior rate due to the longer diffusion length of charges (electrons and ions) in thicker electrodes. In addition, increasing the mass loading of electrodes usually gives rise to the dead mass and thus lower gravimetric capacitance in binder-type electrodes. However, and as disclosed benefits and as additional exemplified embodiments of the invention, the efficient wetting of TC800-based electrode by the hybrid electrolyte ensures electrolyte reaching the whole electrode mass even for thicker ones. As such, and as additional exemplified embodiments of the invention, an energy storage device with loading of 9.1 mg/cm² delivers an unprecedented maximum areal capacitance and energy density of 0.78 F/cm² (42.95 F/g) and 654.4 µWh/cm² (36.0 Wh/Kg), respectively. Furthermore, as additional exemplified embodiments, TC6 shows excellent cycle life over 110 k GCD cycles confirming the long-term stability of high loading SCs.

For the comparison purpose, a commercial SC (CSC, 1 F Eaton®, ~10.65 mg/cm²) was also tested, which gave much lower capacitance and energy density compared to our SC design (TC1, TC6 and TC7). For instance, the maximum areal capacitance (and energy density) of TC1 and TC7 are 1.3 and 3.2 times higher than those of CSC as disclosed benefits, indicating the high-energy merit of our disclosed supercapacitors for practical applications and various embodiments. CSC showed slightly smaller ESR compared to our SCs, which is attributed to the lower contact resistance between its electrode and current collector as seen in the Nyquist plots (CSC: 0.18 ohm, TC1: 1.12 ohm). This could be also due to more compression of CSC electrode and different ratio of the conductive additive. CSC shows better rate performance than TC7 because of its lower ESR along with its slightly shorter diffusion length (smaller Warburg region).

To reveal the high-energy and high-voltage merit of the disclosed invention SC design, TC7 was used to light a series of green and red light-emitting diodes (LEDs) in sequence for more than 9 min (FIG. 19). Both green and red LEDs glittered upon connecting to the SC, which shows fast delivery of energy that is an important feature of SCs.

Figure 29:
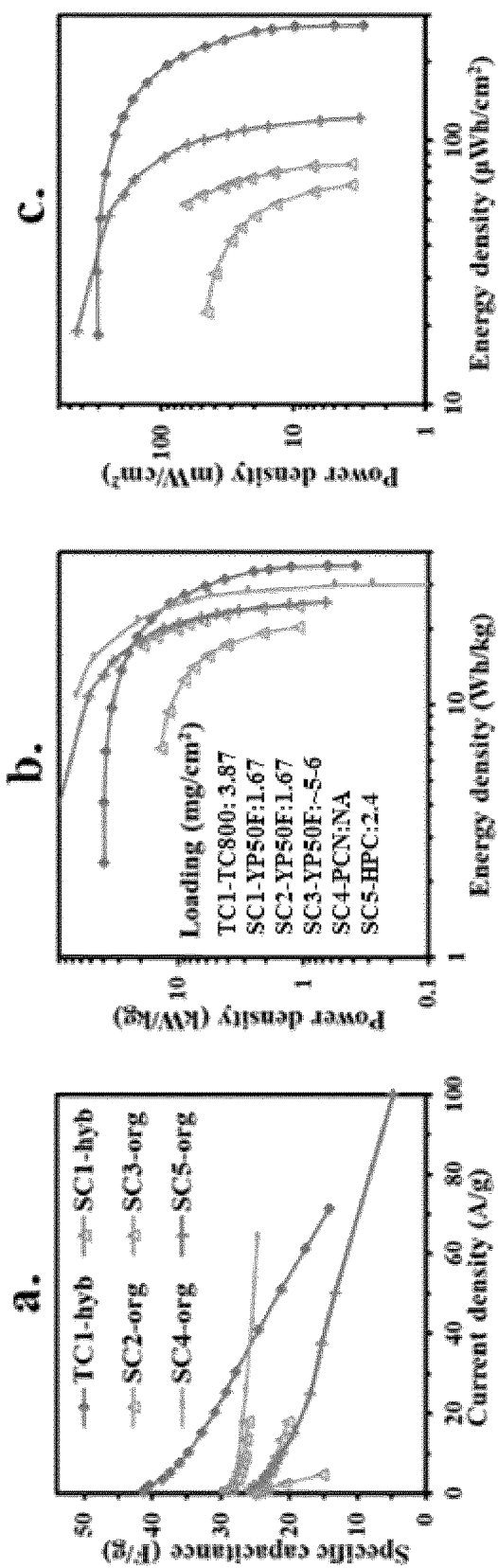
FIG. 29 (a, b, c) are images depicting the performance comparison of TC1 with the state-of-the-art AC-based SCs (SC1, SC2, SC3, SC4, and SC5) reported in researched literature; specific capacitance (a), gravimetric Ragone plot (b), and areal Ragone plot (c).
Figure 30:
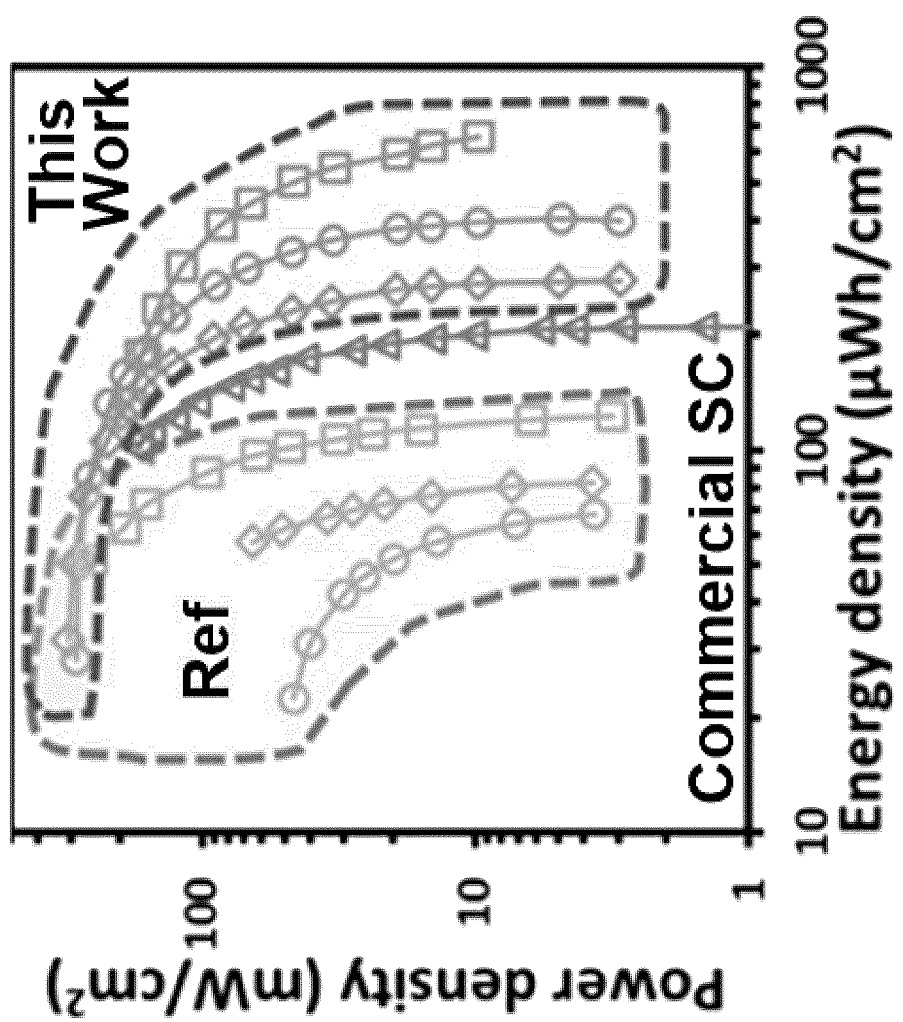
FIG. 30 is an image depicting the performance comparison of current literature for the study of performance of supercapacitors, performance results for a commercially available supercapacitor, and performance results for supercapacitors made from the disclosed inventions system and method.
Figure 31:
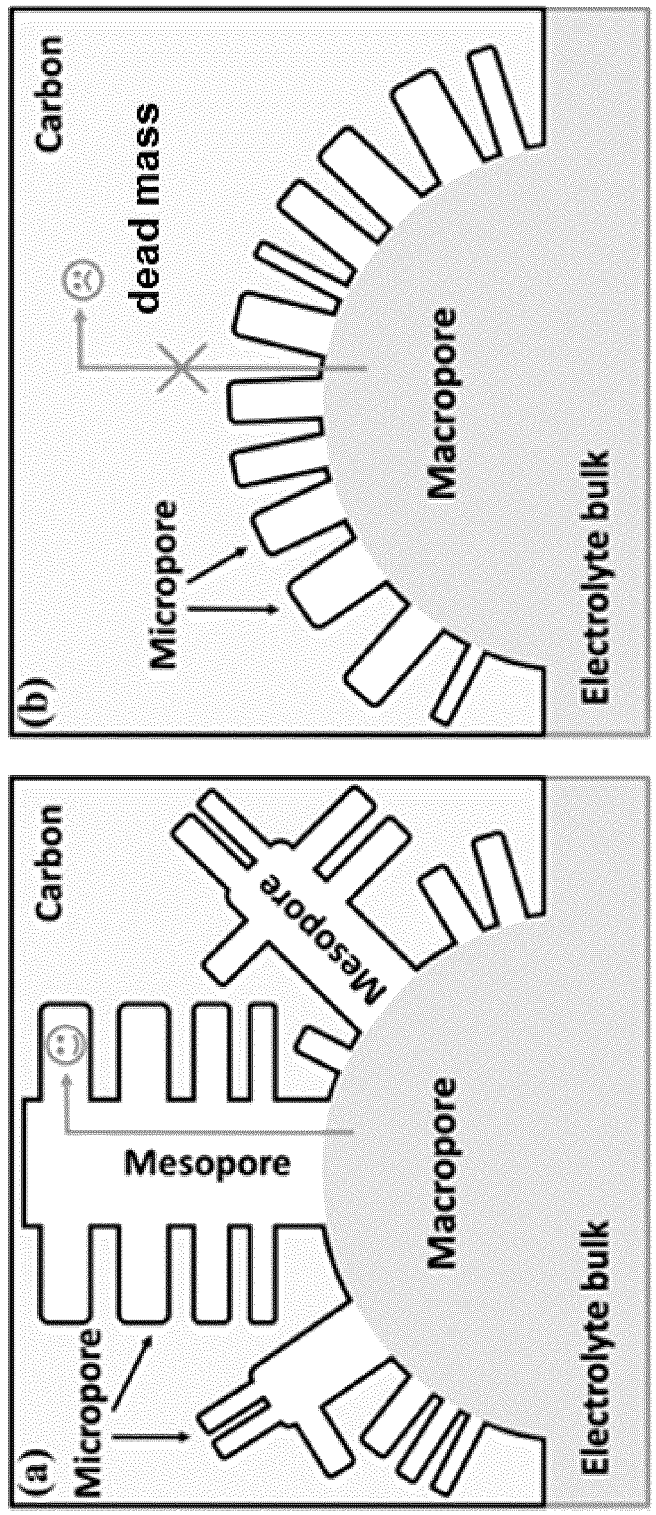
FIG. 31 (a, b) are images depicting the carbon pore(s) hierarchical structure of different activated carbons.

FIG. 29 shows performance comparison of TC1 with the state-of-the-art AC-based SCs (SC1, SC2, SC3, SC4, and SC5) reported in researched literature; specific capacitance (a), gravimetric Ragone plot (b), and areal Ragone plot (c). The capacitive data were calculated for the whole cell (mass of both electrodes).

The disclosed inventions exemplary embodiments were shown to have promising energy storage capability, TC800-based SC embodiments with the hybrid electrolyte (TC1) are well reflected in its superior capacitive performance to that of the state-of-the-art AC-based SCs reported to date (FIG. 29). For a comprehensive comparison of this work with other studies and to shed light on the electrode/electrolyte adaptability, ACs with different porosities from highly mesoporous to exclusively microporous were studied. Overall, the TC1 exemplary embodiment shows the best areal and gravimetric energy density even with its high loading of 3.87 mg/cm².

HPC (Hierarchical porous carbon) with the highest $S_{BET}$ and the largest pore volume among these ACs has a wide range of meso- and macropores. It, however, shows inferior capacitance and energy density compared to TC1 because of its excessive porosity limiting its storage ability (FIG. 29).

On the other side of the porosity, YP50F as a dominant commercial microporous carbon with an average pore width of 0.94 nm and no mesopores gives lower capacitance and energy density for both organic and hybrid electrolytes (SC1, SC2, SC3) when compared to TC1 (FIG. 29). For instance, TC1 (TC800) embodiment exhibits more than 40% higher capacitance and energy density compared to SC1 (YP50F) using the hybrid electrolyte, which originates from much higher accessible surface area of TC800. This clearly demonstrate that the porosity of YP50F is inadequate for both organic and hybrid electrolytes (the mismatch between the electrode and electrolyte), which leads to limited accessible surface area and lower capacitance. The fact that the capacitance of SC1 is higher than that of SC2 indicates that the hybrid electrolyte yields better performance than the organic electrolyte for YP50F, which is the case for TC800 too. It is worth noting that SC3 shows the same maximum capacitance, but an inferior rate capability compared with SC2 as its mass loading is almost triple to that of SC2. This explains the seemingly lower rate capability of TC1 than that of other references (FIG. 29a).

PCN (porous carbon nanosheets) is a microporous AC with an average micropore size of 1.6 nm and a small proportion of mesopores in the range 2-5 nm. PCN has a similar porosity range to TC800 but slightly wider pores and higher $S_{BET}$. When using the organic electrolyte, SC4 (PCN) outperforms SC2 (YP50F), which further supports the notion of limited porosity of YP50F. According to the isotherm curves, AC30 clearly has much more mesopores and larger $S_{BET}$ than those of YP50F and TC800, but less than HPC. The porosity of these ACs increases in the following order: YP50F<TC800<PCN<AC30<HPC.

The capacitance comparison of these electrodes at the low current clearly reveals that ACs with a porosity higher than YP50F and lower than HPC (i.e. PCN, TC800 and AC30) yield the best capacitance for organic electrolytes. For example, the maximum specific capacitance of YP50F (SC2), TC800 (TC4), PCN (SC4), AC30 (AC2) and HPC (SC5) using the organic electrolyte are 24.3, 32.0, 30.0, 32.9 and 25.8 F/g, respectively. PCN, TC800 and AC30 are expected to perform even better using the hybrid electrolyte owing to the smaller ions and solvated ions compared to the organic one and are disclosed alternate embodiments of the invention. For instance, the maximum specific capacitance of TC800 (TC1) and AC30 (AC1) using the hybrid electrolyte are 41.3 and 39.8 F/g, which increased 29.3% and 21.0%, respectively, compared to the organic electrolyte. Therefore in exemplary embodiments, TC800 with less mesopores and smaller $S_{BET}$ than those of PCN and AC30 gives the best overall performance for the hybrid electrolyte when considering the volumetric capacitive performance as increasing mesopores leads to increased density of ACs. These arguments suggest the importance of the discovery of the invention and disclosed beneficial aspects of the invention, for ion-pore (hierarchical structure) matching for a given AC and that there is a range of porosity for which the AC yields acceptable capacitance. In sum, the general strategy of the invention, and for exemplary embodiments, in achieving enhanced performance is to aim for a microporous AC with a small proportion of mesopores in the range of 2-5 nm and tune the porosity according to its capacitive behavior using the hybrid electrolyte as disclosed herein.

Despite considerable efforts in exploring new energy storage materials, the adaptability between the electrode and electrolyte has not received adequate attention. In the disclosed system and method, the invention and process, we have disclosed and demonstrated that adapting the porosity of a microporous carbon to the water/acetonitrile hybrid electrolyte along with the good wettability between them is an effective strategy to achieve elevated energy density in many embodiments. We have disclosed beneficial aspects and results of the invention such as, by fine-tuning the porosity (hierarchical structure) to match the hybrid electrolyte, we prepared a microporous coal-derived carbon with a small proportion of mesopores in the range 2-5 nm as the AC model (TC800) embodiment. We disclosed and showed that the preferred embodiment TC800-based SC using the hybrid electrolyte (7.7 M NaClO$_4$ in water/acetonitrile) performed much better than aqueous and organic electrolytes in terms of capacitance, rate, energy and power density. We also disclosed additional beneficial aspects of the invention/device such as, the hybrid electrolyte also inherits the nonflammability and low-cost nature of aqueous electrolytes. The invention, preferred embodiment TC800-based SC's, delivered the same gravimetric but better volumetric performance compared with a SC fabricated from a commercial AC with more porosity and lower density, which further elucidates the well-tuned porosity of the TC800 hierarchical structure adapted to the hybrid electrolyte. The disclosed invention also achieved a high-rate, exemplified supercapacitor embodiment, with the best capacitance and energy density reported to date for ACs including 41.2 F/g (0.3 F/cm$^2$) and 35.0 Wh/Kg (271.3 µWh/cm$^2$) at 1 A/g. Moreover, we disclosed additional beneficial aspects about the invention including, the remarkable cycling stability of this SC was manifested over 370 k GCD cycles. For additional exemplified embodiments we disclosed a SC with the high loading of 9.1 mg/cm$^2$ that gave ultrahigh maximum areal capacitance and energy density of 0.78 F/cm$^2$ and 654.4 µWh/cm$^2$ (over 3 times higher than those of a commercial SC), which do to our disclosed invention/process/device/system/method, will result in the unravelling of the potential of the current approach for high-energy commercial SCs.

The superior performance of the invention disclosed herein is partially attributed to the discovery of the synergy between the AC and the hybrid electrolyte, the ion-pore matching hierarchical structure, and the electrolyte wetting, and the numerous benefits for the production of, and manufacturing techniques, for the disclosed system and method. This strategy can be employed for numerous additional applications and embodiments including alternate types of ACs as well as other double-layer materials such as graphene, carbon nanotubes, MOF, nano materials, energy storage devices, batteries, capacitors, supercapacitors, ultracapacitors, hybrid-capacitors, DLEC's, electronics, etc.

Additional Alternate Embodiments of the Invention

In additional embodiments, the feedstock may be provided or processed into a wide variety of particle sizes or shapes, such as a fine powder, or a mixture of fine and coarse particles or may be in the form of large pieces of material and may be round, cylindrical, square, etc.

In some embodiments, an activated carbon comprises, on a dry basis, about 90 wt % or more total carbon, about 10 wt % or less oxygen, with $S_{BET}$ of 700 to 3,000 m$^2$/g.

In certain embodiments, the activated carbon comprises at least about 55 wt. %, for example at least 55 wt. %, at least 60 wt. %, at least 65 wt. %, at least 70 wt. %, at least 75 wt. %, at least 80 wt. %, at least 85 wt. %, at least 90 wt. %, at least 95 wt. %, at least 96 wt. %, at least 97 wt. %, at least 98 wt %, or at least 99 wt. % total carbon on a dry basis. In these examples the total carbon includes at least 40 wt. % fixed carbon, and may further include carbon from volatile matter. In alternative embodiments, carbon from volatile matter is about at least 5%, at least 10%, at least 25%, or at least 50% of the total carbon present in the pre-determined pore configuration activated carbon. It should be noted fixed carbon may be measured using ASTM D3172, while volatile carbon may be estimated using ASTM D3175.

The pre-determined pore configuration activated carbon according to the present disclosure may comprise about 0 wt % to about 8 wt % hydrogen. In additional embodiments, the pre-determined pore configuration activated carbon comprises greater than about 0.5 wt % hydrogen, for example about 0.6 wt %, about 0.7 wt %, about 0.8 wt %, about 0.9 wt %, about 1 wt %, about 1.2 wt %, about 1.4 wt %, about 1.6 wt %, about 1.8 wt %, about 2 wt %, about 2.2 wt %, about 2.4 wt %, about 2.6 wt %, about 2.8 wt %, about 3 wt %, about 3.2 wt %, about 3.4 wt %, about 3.6 wt %, about 3.8 wt %, about 4 wt %, or greater than about 4 wt % hydrogen. The hydrogen content of a pre-determined pore configuration activated carbon may be determined by any suitable method known in the art, for example by the combustion analysis procedure outlined in ASTM D5373.

In certain embodiments, various amounts of non-combustible matter such as ash may be present. The pre-determined pore configuration activated carbon may comprise about 10 wt % or less, such as about 5 wt %, about 2 wt %, about 1 wt % or less than or equal to about 1 wt % of non-combustible matter on a dry basis. In additional embodiments, the reagent contains little ash, or even essentially no ash or other non-combustible matter. Additional embodiments provide for essentially pure a pre-determined pore configuration activated carbon, including 100% carbon, on a dry basis.

In certain embodiments, various amounts of moisture may be present, for a total mass basis, the pre-determined pore configuration activated carbon may comprise at least 1 wt %, at least 2 wt %, at least 5 wt %, at least 10 wt %, at least 15 wt %, at least 25 wt %, at least 35 wt %, at least 50 wt %, or more than 50 wt % of moisture. As described herein, "moisture" is to be understood as including any form of water present in the pre-determined pore configuration activated carbon product, which may include absorbed moisture, adsorbed water molecules, chemical hydrates, and physical hydrates.

The pre-determined pore configuration activated carbon and/or carbon source material may be formed into a powder or pellet, such as a coarse, fine, ultra-fine, or nano sized, powder. As an example in certain embodiments, the reagent may be formed into a powder with an average mesh size of about 200 mesh, about 100 mesh, about 50 mesh, about 10 mesh, about 6 mesh, about 4 mesh, or about 2 mesh. In exemplary embodiments, the pre-determined pore configuration activated carbon has an average particle size of up to about 500 µm, for example less than or equal to about 0.1, about 1 µm, about 2 µm, about 3 µm, about 4 µm, about 5 µm, about 6 µm, about 7 µm, about µm, about 9 µm, about 10 µm, about 25 µm, about 50 µm, about 75 µm, about 100 µm, about 200 µm, about 300 µm, about 400 µm, or about 500 µm.

In certain embodiments, the pre-determined pore configuration activated carbon may be formed into structural objects comprising pressed, bound, or agglomerated particles. The starting material to form these objects may be a powder form of the reagent, such as an intermediate obtained by particle size reduction. The desired shapes of the pre-determined pore configuration activated carbon may be formed by mechanical pressing or other forces, optionally with a binder or other means of agglomerating particles together, which may include a paste, paint, freestanding electrode or the like.

Additionally, embodiments of the improved energy storage device, and/or supercapacitor, may utilize a variety of metals, and/or conductive material, for the current collector. These may include non limiting examples of; Titanium, Stainless Steel of various grades, Aluminum, Zinc, Copper, Lead, Chromium, Lithium, Vanadium, Ruthenium, Beryllium, Sodium, Magnesium, Scandium, Potassium, Calcium, Manganese, Molybdenum, Lanthanum, Barium, Bismuth, Cobalt, Niobium, Nickel, Zirconium, Gallium, Yttrium, Rubidium, Strontium, Cesium, Technetium, Antimony, Osmium, Rhodium, Indium, Palladium, Silver, Gold, Cadmium, Thallium, Hafnium, Mercury, Tantalum, Tin, Platinum, Tungsten, Iridium, Rhenium, composites and blends of various thicknesses, foils, mesh, interconnection structure, or grade.

In certain embodiments, additives and/or catalysts may be utilized in the process, and temperature profiles within the device may be selected to promote production of carbon dioxide over carbon monoxide, this may be used to lead to a greater fixed carbon in the final product.

In certain embodiments the amount of additive, or total additives, may vary widely, such as from about 0.01 wt % to about 25 wt %, including about 0.1 wt %, about 1 wt %, about 5 wt %, about 10 wt %, or about 20 wt % on a dry basis. It should be noted that then when relatively large amounts of additives are incorporated, such as higher than about 1 wt %, there may be a reduction in energy content calculated on the basis of the total activated carbon weight.

It should be noted that certain embodiments incorporate additives as binders or other modifiers to enhance final properties for a particular application.

In additional embodiments, the contaminant adsorbed carbon particles may include at least one, at least two, at least three, or all of, carbon dioxide, nitrogen oxides, mercury, and sulfur dioxide and/or in any combination.

In certain embodiments, the additive may be selected from; an acid, a base, a salt, a metal, a metal oxide, a metal hydroxide, a metal halide, and/or a combination thereof. In additional embodiments, the additive may be selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorspar, bentonite, calcium oxide, lime, sodium hydroxide, potassium hydroxide, hydrogen bromide, hydrogen chloride, sodium silicate, potassium permanganate, organic acids, citric acid, and/or combinations.

It should be noted multiple contaminants may be removed by the pre-determined pore configuration activated carbon particles. In certain embodiments, the contaminant-adsorbed carbon particles include at least two contaminants, at least three contaminants, a plurality of contaminants, or more. The pre-determined pore configuration activated carbon as disclosed herein may allow multi-pollutant control as well as control of certain targeted pollutants for instance selenium.

In certain embodiments, a pre-determined pore configuration activated carbon composition that includes iron and/or an iron-containing compound as a "magnetic activated carbon" product. This results in the material being susceptible to a magnetic field. In certain applications iron or iron-containing compound may be separated using magnetic separation devices. In certain embodiments, the pre-determined pore configuration activated carbon, which contains iron, may be separated using magnetic separation, in these processes where magnetic separation is to be employed, magnetic metal separators may be magnet cartridges, plate magnets, or another known device and configuration.

As described in this disclosure, different embodiments of the disclosure are premised, at least in part, on the assumption that multiple reactors and/or multiple zones within a single reactor can be utilized and operated in such a way to optimize the pre-determined pore configuration activated carbon yielded, and the finalized product quality from pyrolysis, this while maintaining certain amount of flexibility and adjustability for various feedstocks and desired product requirements.

In certain embodiments, feedstock may be milled, ground, or a sized feedstock of desired diameter, in alternate embodiments it is desirable for the feedstock to be carefully milled or sized prior to thermal pyrolysis, or subsequently after the thermal pyrolysis process has occurred. Additionally, by carefully controlling the initial treatment it will tend to preserve the carbon sources strength and cell-wall integrity that may be present in different carbon sources. This may be important for the final product in order to retain some, most, or all of the shape and strength of the pre-determined pore configuration activated carbon sources starting shape and strength.

In various embodiments, measures may be taken to prepare the carbon source. For example, and without limitation, in various alternate embodiments the carbon source is prepared by drying, which may be over an extended period of time, for example over a period of time that is no less than 1 hour, no less than about 2 hours, no less than about 3 hours, no less than about 4 hours, no less than about 5 hours, no less than about 6 hours, no less than about 7 hours, no less than about 8 hours, no less than about 9 hours, no less than about 10 hours, no less than about 11 hours, no less than about 12 hours, no less than about 13 hours, no less than about 14 hours, no less than about 15 hours, no less than about 16 hours, no less than about 17 hours, no less than about 18 hours, no less than about 19 hours, no less than about 20 hours, no less than about 21 hours, no less than about 22 hours, no less than about 23 hours, or no less than about 24 hours, this may allow water, oils, tars, gases, energy sources, to exit the carbon source without destroying the structure of the feedstock.

In alternate embodiments, the use of a slow progressive heat rate during pyrolysis (for example in contrast to flash pyrolysis) over seconds, minutes, or hours, may be used to allow water and gases to exit the carbon source without destroying the structure of the feedstock. For example and without limitation, the rate of temperature may increase during the pyrolysis process initial heating rate and may range from about 1° C. per minute to about 40° C. per minute, for example 5 about 1° C. per minute, about 2° C. per minute, about 4° C. per minute, about 5° C. per minute, about 10° C. per minute, about 15° C. per minute, about 20° C. per minute, about 25° C. per minute, about 30° C. per minute, about 35° C. per minute, or about 40° C. per minute. In some alternative embodiments, the temperature increase may occur in a pre-heat zone to produce a preheated carbon source feedstock. In additional alternative embodiments, the temperature increase and time period for such an increase occurs predominantly or entirely in a pre-heat zone to produce a preheated carbon source feedstock. In additional embodiments, the temperature of a preheated carbon source feedstock is increased in a pre-pyrolysis zone. In additional embodiments, the temperature increase occurs at least in part in the carbonization zone or the pyrolysis zone. In additional embodiments, the temperature increase occurs predominantly or entirely in the carbonization zone or the pyrolysis zone. In additional embodiments, the preheat zone, the pre-pyrolysis zone, the carbonization zone or the pyrolysis zone is configured to increase the temperature during pyrolysis initially, from a low temperature to the final, higher temperature over a specific period of time. In additional embodiments, the temperature increase is linear or substantially linear over a period of time. In alternate embodiments, the rate of temperature increases or decreases over time such that the temperature during the preheating, the pre-pyrolysis and/or the carbonization or the pyrolysis is at least partially nonlinear in operation, for example logarithmic or substantially logarithmic for at least a portion of the preheat, pre-pyrolysis and/or carbonization or pyrolysis step or steps. In alternate embodiments, an additive is used prior to drying and/or pyrolysis, which may be used to reduce gas formation that could damage the vascular structure of the feedstock during the pyrolysis process and/or produces a specific predetermined pore configuration for the finished activated carbon product. In alternate embodiments, which may be prior to pyrolysis, the dried feedstock carbon source is sized using a mesh or screen designed to be less destructive to the structure of carbon source.

In alternate embodiments, the carbon source is prepared by milling, grinding, or pulverising, to form a plurality of carbon source pieces that are substantially uniform size and substantially uniform shape. For example and without limitation, the carbon source can be processed to produce a fine particulate or particle size of approximately uniform size (e.g., a desired mesh size). Alternatively, the carbon source can be processed to produce nano or micro sized particles having substantially uniform dimensions (e.g., approximately less than 1 μm by approximately less than 1 μm by approximately less than 1 μm pieces). Alternatively, the carbon source can be processed to produce nano or micro sized particles having substantially irregular dimensions (e.g., approximately 1 μm by approximately 1 μm by approximately 1 μm pieces). In alternate embodiments, the carbon source can be prepared by to form lengths of material with substantially uniform width and depth dimensions or diameters (e.g., approximately 2 μm by approximately 2 μm by approximately 2 μm pieces). In alternate embodiments, the carbon source can be prepared by to form lengths of material with substantially uniform width and depth dimensions or diameters (e.g., approximately 3 μm by approximately 3 μm by approximately 3 μm pieces). In alternate embodiments, the carbon source can be prepared by to form lengths of material with substantially uniform width and depth dimensions or diameters (e.g., approximately 4 μm by approximately 4 μm by approximately 4 μm pieces). In alternate embodiments, the carbon source can be prepared by to form lengths of material with substantially uniform width and depth dimensions or diameters (e.g., approximately 5 μm by approximately 5 μm by approximately 5 μm pieces). In alternate embodiments, the carbon source can be prepared by to form lengths of material with substantially uniform width and depth dimensions or diameters (e.g., approximately 6 μm by approximately 6 μm by approximately 6 μm pieces). In alternate embodiments, the carbon source can be prepared by to form lengths of material with substantially uniform width and depth dimensions or diameters (e.g., approximately 7 μm by approximately 7 μm by approximately 7 μm pieces). In alternate embodiments, the carbon source can be prepared by to form lengths of material with substantially uniform width and depth dimensions or diameters (e.g., approximately 8 μm by approximately 8 μm by approximately 8 μm pieces). In alternate embodiments, the carbon source can be prepared by to form lengths of material with substantially uniform width and depth dimensions or diameters (e.g., approximately 9 μm by approximately 9 μm by approximately 9 μm pieces). In alternate embodiments, the carbon source can be prepared by to form lengths of material with substantially uniform width and depth dimensions or diameters (e.g., approximately 10 μm by approximately 10 μm by approximately 10 μm pieces). In alternate embodiments, the carbon source can be prepared by to form lengths of material with substantially uniform width and depth dimensions or diameters (e.g., approximately 15 μm by approximately 15 μm by approximately 15 μm pieces). In alternate embodiments, the carbon source can be prepared by to form lengths of material with substantially uniform width and depth dimensions or diameters (e.g., approximately 20 μm by approximately 20 μm by approximately 20 μm pieces). In alternate embodiments, the carbon source can be prepared by to form lengths of material with substantially uniform width and depth dimensions or diameters (e.g., approximately 25 μm by approximately 25 μm by approximately 25 μm pieces). In alternate embodiments, the carbon source can be prepared by to form lengths of material with substantially uniform width and depth dimensions or diameters (e.g., approximately 30 μm by approximately 30 μm by approximately 30 μm pieces). In alternate embodiments, the carbon source can be prepared by to form lengths of material with substantially uniform width and depth dimensions or diameters (e.g., approximately 35 μm by approximately 35 μm by approximately 35 μm pieces). In alternate embodiments, the carbon source can be prepared by to form lengths of material with substantially uniform width and depth dimensions or diameters (e.g., approximately 40 µm by approximately 40 µm by approximately 40 µm pieces). In alternate embodiments, the carbon source can be prepared by to form lengths of material with substantially uniform width and depth dimensions or diameters (e.g., approximately 45 µm by approximately 45 µm by approximately 45 µm pieces). In alternate embodiments, the carbon source can be prepared by to form lengths of material with substantially uniform width and depth dimensions or diameters (e.g., approximately 50 µm by approximately 50 µm by approximately 50 µm pieces). In alternate embodiments, the carbon source can be prepared by to form lengths of material with substantially uniform width and depth dimensions or diameters (e.g., approximately 60 µm by approximately 60 µm by approximately 60 µm pieces). In alternate embodiments, the carbon source can be prepared by to form lengths of material with substantially uniform width and depth dimensions or diameters (e.g., approximately 70 µm by approximately 70 µm by approximately 70 µm pieces). In alternate embodiments, the carbon source can be prepared by to form lengths of material with substantially uniform width and depth dimensions or diameters (e.g., approximately 80 µm by approximately 80 µm by approximately 80 µm pieces). In alternate embodiments, the carbon source can be prepared by to form lengths of material with substantially uniform width and depth dimensions or diameters (e.g., approximately 90 µm by approximately 90 µm by approximately 90 µm pieces). In alternate embodiments, the carbon source can be prepared by to form lengths of material with substantially uniform width and depth dimensions or diameters (e.g., approximately 100 µm by approximately 100 µm by approximately 100 µm pieces). In alternate embodiments, the carbon source can be prepared by to form lengths of material with substantially uniform width and depth dimensions or diameters (e.g., approximately 200 µm by approximately 200 µm by approximately 200 µm pieces). In alternate embodiments, the carbon source can be prepared by to form lengths of material with substantially uniform width and depth dimensions or diameters (e.g., approximately 300 µm by approximately 300 µm by approximately 300 µm pieces). In alternate embodiments, the carbon source can be prepared by to form lengths of material with substantially uniform width and depth dimensions or diameters (e.g., approximately 400 µm by approximately 400 µm by approximately 400 µm pieces). In alternate embodiments, the carbon source can be prepared by to form lengths of material with substantially uniform width and depth dimensions or diameters (e.g., approximately 500 µm by approximately 500 µm by approximately 500 µm pieces). In alternate embodiments, the carbon source can be prepared by to form lengths of material with substantially uniform width and depth dimensions or diameters (e.g., approximately 600 µm by approximately 600 µm by approximately 600 µm pieces).

In alternate embodiments, the carbon source can be prepared by to form lengths of material with substantially uniform width and depth dimensions or diameters (e.g., approximately 700 µm by approximately 700 µm by approximately 700 µm pieces). In alternate embodiments, the carbon source can be prepared by to form lengths of material with substantially uniform width and depth dimensions or diameters (e.g., approximately 800 µm by approximately 800 µm by approximately 800 µm pieces). In alternate embodiments, the carbon source can be prepared by to form lengths of material with substantially uniform width and depth dimensions or diameters (e.g., approximately 900 µm by approximately 900 µm by approximately 900 µm pieces). In alternate embodiments, the carbon source can be prepared by to form lengths of material with substantially uniform width and depth dimensions or diameters (e.g., approximately 1000 µm by approximately 1000 µm by approximately 1000 µm pieces).

In certain exemplified embodiments, present a multi reactor design of the present disclosure. In these embodiments two or a plurality of different reactors may be utilized, including any number of reactor combinations may be used. In additional embodiments, the reactor is mechanically connected to at least one other reactor via a material feed system. In additional exemplary embodiments, the material feed system may control atmosphere and/or temperature conditions and carbon transport rate.

In certain embodiments, the device includes a gas-phase separator mechanism and includes at least one input and a single or plurality of outputs. The at least one input may be mechanically connected to the exhaust ports on the first reactor and the second reactor of the device. In additional embodiments one of the outputs may be connected to the carbon source recovery unit, and another one of the outputs may be connected to a collection device and/or equipment or additional further processing equipment, a non-limiting example would be an acid hydrogenation unit and/or distillation column. In additional embodiments, a gas-phase separator may be used to processes the off-gases, from the first reactor and the second reactor, which may produce a condensate, and/or an enrichment or enriched gas. In additional embodiments, condensable material may be used for energy recovery, as a non-limiting examples or, a dryer, reactor, and/or process gas heater, or for other carbon processing systems. In additional embodiments, material that is non-condensable as a nonlimiting example CO, can be used for energy and/or heat recovery, as a non-limiting example in a dryer, a reactor, and/or a process gas heater, which may be as an inert gas used throughout in the process, for instance as a non-limiting example in a deaeration unit, a reactor, a cooler, or used within the system for during carbon source processing.

In additional embodiments, the condensate material may include polar compounds examples of non-limiting examples include, acetic acid, methanol and furfural. In additional embodiments, the enrichment gas that is produced by the gas-phase separator may include non-polar gases, nonlimiting examples include carbon monoxide, terpenes, methane, carbon dioxide, etc. In additional embodiments, the gas phase separator may comprise a fractionation column. In an additional embodiment, acetic acid may be sent via a line or channel to an optional acid hydrogenation unit. In an additional embodiment, methanol and/or furfural may be sent via optional additional line(s) and/or channels to the distillation and/or processing unit.

In additional embodiments, the carbon recovery unit itself has the mechanical means to enrich the material. In additional embodiments, the carbon source may be enriched in a separate enrichment from that of the carbon recovery unit. In some embodiments, the carbon recovery unit may be used as a vessel for storing the carbonized material, and wherein the separate material enrichment unit may be the unit in which gases are introduced during the processing of material.

In additional embodiments, the carbon recovery unit may also enrich the carbonized carbon source. This may occur as the carbonized material exits the third reactor by means of the material feed system and then enters the carbon recovery unit. In additional embodiments, the carbon recovery unit may also include an input that may be connected to the gas phase separator(s). In an additional embodiment, enriched gas may be directed into the carbon recovery unit which may then be combined with the activated carbon material to create a high carbon content activated carbon product. In additional embodiments, the carbon-enriched gas which may be from an external source, may also be directed to the carbon recovery unit and then may be combined with the carbonized carbon source to add additional carbon to the activated carbon product produced. In additional embodiments, the carbonized carbon source is temperature-reduced. Illustratively, the system can be co-located near a petroleum coke, coal, oil, or biomass processing facility and carbon enriched gas directed or taken from the co-located processing facility can be used as the gas from an external source.

In certain embodiments, each zone and/or reactor is adapted to extract and collect off gases from one or more of the individual zones and/or reactors. In additional embodiments, off gases from each zone and/or reactor may remain separate for disposal, analysis and/or later use. In additional embodiments, each reactor and/or zone may contain a gas detection system such as an FTIR that can monitor gas formation within a zone and/or reactor. In additional embodiments, off-gases from a plurality of zones and/or reactors may be combined for disposal, additionally for analysis and/or later use, as well off gases from one or more zones and/or reactors can be fed to a process gas heater. In additional embodiments, off-gases from one or more zones and/or reactors may be fed into a carbon recovery unit. In an additional embodiment, off-gases from one or more zones and/or reactors may be fed to a gas-phase separator prior to the introduction in the carbon recovery unit.

In an additional embodiment, a gas-phase separator may comprise a fractionation column. Depending on the specific embodiment any fractionation column known to those skilled in the art may be used. In additional embodiments, off-gases may be separated into non-polar compounds and polar compounds which may be accomplished using a standard fractionation column which may be heated to a suitable temperature, and/or a packed column. In yet an additional embodiment, nonpolar compounds and/or enriched gases from the gas-phase separator may be extracted for optional use at a later time. In additional embodiments, off gases from one or more zones and/or reactors may be fed to a process gas heater for use. In additional embodiments, gases extracted from the preheat zone and/or reactor, the pyrolysis zone and/or reactor and optionally the cooling zone and/or reactor may be extracted into a combined stream and may be then fed into the gas-phase separator. In additional embodiments, one or more of the zones and/or reactors may be configured to control the flow and quantity of gas is introduced into a combined stream or individual stream.

In certain embodiments the off-gases from the device are directed into the gas phase separator. In additional embodiments, the off-gases may include the extracted gases from the first preheat zone and/or reactor, and combined with the extracted gases from the second pyrolysis zone and/or reactor, or may be either gas stream individually. As the off gases enter the gas phase separator, the off gases may be separated into polar compounds and non-polar compounds, such as non-polar gases. In additional embodiments, the gas phase separator may be a known fractionation column.

In certain embodiments, the enriched gases which have been extracted from the combined off-gases may be directed, from the gas-phase separator, into the carbon recovery unit via an input, which may be used to enrich the material. In additional embodiments, the extracted gases may be first introduced into a material enrichment unit, and then may be directed to a separate carbon recovery unit. In additional embodiments, the material enrichment may take place in the carbon recovery unit. In an additional embodiment, the gas-phase separator may include a plurality of outputs. In additional embodiments, one output from the gas-phase separator may be connected to the carbon recovery unit and may introduce an enriched gas stream to the carbon recovery unit. In an additional embodiment, a portion of the enriched gas stream may be directed to the carbon recovery unit and another portion may be directed to a scrubber, and/or another suitable purifying apparatus to clean and allow the disposal of unwanted gas. In additional embodiments, off-gases that have not been sent to the carbon recovery unit may be used for either energy recovery or as an inert gas as an example in the deaeration unit, reactor, device, or cooler. In additional embodiments, off-gases from the carbon recovery unit may be used for either energy recovery as an inert gas as an example in the deaeration unit, reactor, or cooler, or in a secondary recovery unit.

In additional embodiments, an additional output from the gas phase separator extracts polar compounds, which may be optionally condensed into a liquid component and/or form, this may include a plurality of different liquid parts. In additional embodiments, the described liquid may include water, acetic acid, methanol and furfural. In additional embodiments, the outputted liquid may be stored, disposed of, further processed, or re-used. An example of this would be water outputted in one portion of the device can be re-used to heat or cool another portion of a device. In an additional embodiment, the water may be drained. In certain embodiments the acetic acid, methanol and furfural that may be outputted may be routed to storage tanks for re-use, re-sale, distillation or refinement.

In alternate embodiments, the carbon recovery unit may comprise a housing with an upper portion and a lower portion. In certain embodiments by which a material enrichment unit is separate from the carbon recovery unit, the material enrichment unit may include features similar to those discussed with respect to the carbon recovery unit. In alternate embodiments, the carbon recovery unit, may comprise: a housing with an upper portion and a lower portion; an inlet at the bottom of the lower portion of the housing that may be configured to carry reactor off-gas; an outlet at a top of the upper portion of the housing that may be configured to carry a concentrated gas stream; a path defined between the upper portion and lower portion of the housing; a transport system following the path, the transport system may be configured to transport a reagent, wherein the housing may be shaped in such a fashion as to allow the reagent to adsorb at least some of the reactor off gas. In additional embodiments, the upper portion may include a plurality of outlets and the lower portion may include a plurality of inlets. In certain embodiments, the housing may be substantially free of corners which have an angle of 110 degrees or less, 90 degrees or less, 80 degrees or less or 70 degrees or less.

In additional embodiments, the housing may be substantially free of convex corners. In an additional embodiment, the housing may be substantially free of convex corners capable of producing eddies and/or trapping air. In an additional embodiment, the housing may be substantially shaped like a cube, rectangular prism, ellipsoid, a stereographic ellipsoid, a spheroid, two cones affixed base-to-base, two regular tetrahedrons affixed base-to-base, two rectangular pyramids affixed base-to-base or two isosceles triangular prisms affixed base-to-base.

In an additional embodiment, the upper portion and lower portion of the housing may be substantially shaped like a half-ellipsoid, half rectangular prism, half stereographic ellipsoid, a half-spheroid, a cone, a regular tetrahedron, a rectangular pyramid, an isosceles triangular prism and/or a round-to-rectangular duct transition.

In an additional embodiment, an inlet at the bottom of the lower portion of the housing and an outlet at the top of the upper portion of the housing may be configured to connect with a pipe. In an additional embodiment, the top of the lower portion of the housing and the bottom of the upper portion of the housing may be substantially rectangular, circular or elliptical. In an additional embodiment, the width between the top of the lower portion of the housing and the bottom of the upper portion of the housing may be wider than a width of the transport feed system. In an additional embodiment, the width of the transport system may be its height.

In an additional embodiment, the carbon recovery unit may comprise a path defined between the upper portion and the lower portion, an inlet opening and an outlet opening. In an additional embodiment, the inlet opening and the outlet opening may be configured to receive the transport feed system. In an additional embodiment, the transport system may be at least semi-permeable or permeable to the enriching gas.

In an additional embodiment, the inlet opening may include an inlet opening sealing mechanism which may reduce the escape of gas and the outlet opening may include an outlet opening sealing mechanism which may reduce the escape of gas. In an additional embodiment, the inlet and outlet opening sealing mechanisms may comprise an airlock.

In alternative embodiments, the lower portion of the housing of the carbon recovery unit may have a narrow round bottom connection opening, which may be connected to the gas-phase separator for the transport of a gas stream. In additional embodiments, the top of the lower portion of the housing of the carbon recovery unit may be substantially rectangular in shape, and may be substantially wider than the narrow round bottom connection opening. In an additional embodiment, the lower portion may transition from a round bottom opening to a rectangular top opening. In an additional embodiment, a rectangular top opening of the lower portion may be about six feet wide which may run along the direction of the conveyor system. In additional embodiments, the top portion of the carbon recovery unit may be shaped substantially similarly to the lower portion. In an additional embodiment, the lower opening of the top portion may be wider than the top opening of the lower portion. In an additional embodiment, the rectangular lower opening of the top portion may be about six and a half feet wide which may run along the direction of the conveyor system. In an additional embodiment, the top portion may be configured to capture all of the gases passed through the carbon recovery unit that have not been adsorbed by the activated materials.

In various embodiments, the shape of the lower portion of the carbon recovery unit aids in slowing down and dispersing the gases across a wider surface area of the conveyor carrying the activated carbon material. In additional embodiments, the precise shape of the lower and upper portions of the carbon recovery unit may directly depend upon the angle of gas dispersion coming from the gas-phase separator pipe. In additional embodiments, the gas may naturally tend to expand as it is pumped up at a flared range that may be between 5 and 30 degrees from the vertical. In an additional embodiment, the flare angle may be approximately 15 degrees. It should also be appreciated that the lower portion of the carbon recovery unit may be constructed with as few creases and corners as possible in order to prevent the trapping of air or formation of eddies.

In an additional embodiment, the carbon recovery unit may be configured to connect to the gas-phase separator, as well as the device. In additional embodiments, the carbon recovery unit may be connected to the output of the cooling reactor and/or zone, or the last cooling zone of the device or outside of the device. In an additional embodiment, the output of the cooling reactor and/or zone includes activated carbon product that may have been processed in the device. In an additional embodiment, the activated carbon material may enter the carbon recovery unit along a suitable transport system. In additional embodiments, the top portion and the bottom portion of the carbon recovery unit may be connected to one another, and may define a pathway through which a transport system may pass. In an additional embodiment, the transport feed system may be constructed with a porous or mesh material configured to allow gas to pass through. It should be appreciated that the transport feed system may be configured to pass through the opening of the carbon recovery unit and then through an exit opening in the carbon recovery device. In additional embodiments, the entrance and the exit into and out of the carbon recovery unit may be appropriately sealed with an airlock and/or another suitable sealing mechanism to prevent gases from escaping through the conveyor opening and/or openings. In additional embodiments, off gases that are not sent to or through the carbon recovery unit may be used for either energy recovery, which may be in a process gas heater, or as an inert gas which may be in the deaeration unit, reactor, device, or cooler. In additional embodiments, off gases from the carbon recovery unit may be used for either energy recovery which may be in a process gas heater, as an inert gas which may be in the deaeration unit, reactor, device, or cooler, or in a secondary recovery unit or storage device.

In additional embodiments, the process may operate by first outputting the activated carbon material from the cooling zone and onto the transport system using a suitable discharge mechanism from the cooling reactor and/or zone. In an additional embodiment, the activated carbon product may be spread across the width of the transport system in order to minimize material stacking and/or bunching and maximize surface area meant for gaseous absorption. In additional embodiments the point at which an activated carbon product is deposited and suitably spread onto the transport feed system, the transport feed system may transport the activated carbon material through the opening in the carbon recovery unit which may be defined between the lower portion and the top portion. In certain embodiments, the carbon recovery unit, the activated carbon product may adsorb gases piped into the lower portion of the carbon recovery unit from the gas-phase separator. In certain embodiments, after an activated carbon product is enriched with non-polar gases, it should be understood that the activated carbon product may become a high carbon activated carbon material. In additional embodiments, the high carbon activated carbon material may be a final product of the process disclosed herein and may be transported away from the carbon recovery unit which may be into a suitable storage and/or post processing device.

In an additional embodiment, after the enriched gases pass through the conveyor and the activated carbon material, the resulting gas may be extracted at the top portion of the carbon recovery unit. In additional embodiments, the exhausted gases may be carried away to a suitable scrubber, stack and/or a recovery system. In additional embodiments, the exhaust gases may be exploited for any reusable qualities within the system, including usage in the secondary carbon recovery unit and/or for energy. In additional embodiments, off-gases that are not sent to the carbon recovery unit may be used for either energy recovery which may be in a process gas heater and/or as an inert gas which may be in the deaeration unit, reactor, device, or cooler. In additional embodiments, off gases from the carbon recovery unit may be used for either energy recovery which may be in a process gas heater, as an inert gas which may be in the deaeration unit, reactor, device, or cooler, and/or in the secondary recovery unit.

In certain embodiments, it should be noted that the activated carbon product may include a high amount of carbon, and carbon is known to have a high preference for adsorbing non-polar gases. In certain embodiments it should also be noted that the enriched gas stream may include primarily non-polar gases such as terpenes, carbon monoxide, carbon dioxide and methane. In additional embodiments, as the enriched gas(es) which may be directed from the gas-phase separator into the carbon recovery unit, the gas flow rate and the conveyor speed may be monitored and controlled which may be used to the ensure maximum absorption of the non-polar gases in the activated carbon material. In an additional embodiment, high-energy organic compounds may comprise at least a portion of the enriched gases eluted during the carbonization process, and may be outputted from the gas phase separator to the carbon recovery unit. In additional embodiments, enriched gases may be further enriched with for example additional additives, which may be prior to being introduced to the carbon recovery unit and/or the material enrichment unit.

In certain embodiments, the residence time of the activated carbon material in the carbon recovery unit may be controlled and may vary based upon the composition of the activated carbon material and additionally the gas flow and/or composition. In an additional embodiment, the activated carbon material may be passed through one or more carbon recovery units, which may be more than one time. In additional embodiments, the output of enriched air from the gas-phase separator and/or the output of exhausted air from the carbon recovery unit may be diverted or bifurcated into an additional carbon recovery unit or units and/or further refined and/or used for energy and/or inert gas for use in the process and/or device.

In additional embodiments, the system may include a single-reactor system, which may include a material feed system, a pre-soak mixer, a pre-heater dryer, a pyrolysis reactor, a washer cooler, a mixer, and a carbon recovery unit. In additional embodiments, the system may include an optional dryer located between, or forming a single apparatus, the material feed system and the pre-heater. In additional embodiments the pyrolysis reactor includes at least one gas inlet and at least one outlet which may be for outputting substances from the pyrolysis reactor. In additional embodiments, the substances that are outputted through outlets may include condensable vapors and/or non-condensable gases. In additional embodiments it should be noted that the pyrolysis reactor may include one or more zones, not discussed in detail herein. In additional embodiments, the system may include one or more reactors in addition to the pyrolysis reactor.

In certain embodiments, a single-reactor, multiple zone device system includes a material feed system, a device having a pyrolysis zone and a cooling zone, and a carbon recovery unit. In additional embodiments the device also includes an optional; mixer, soaker, dryer, heater, washer, $2^{nd}$ dryer, electrode mixer. It should be noted that moisture from the mixer, soaker, dryer, heater, washer, dryer, may be removed during the drying process. In additional embodiments the device also includes an optional cooler that may be outside of the device. In certain embodiments the device may include a separate carbon recovery unit. In additional embodiments, the carbon recovery unit may be an appropriate vessel in which the enriched material may be stored, and which may follow the material enrichment unit, and the carbon recovery unit may not further enrich the material.

In additional embodiments, an optional process gas heater may be used in the system and attached to the device. In additional embodiments, vapors and/or other off gases from the device may be inputted into the optional process gas heater, along with an external source of any one or more of air, natural gas, nitrogen, helium, and argon. In additional embodiments, the air emissions from the process gas heater may be inputted into dryer as heat and/or an energy recovery system. In additional embodiments the device may include a plurality of zones such as: a pre-heat zone, a pyrolysis zone, and a cooling zone. In certain embodiments, the device may also include a material feed system that may be in communication with one or more of the zones, and may have at least one gas inlet in communication with one or more of the zones. In additional embodiments, as discussed below, one or more of the zones may also include at least one outlet for outputting substances, such as condensable vapors and/or non-condensable gases. In additional embodiments, one or more of the zones may also include an outlet for outputting the carbon from the device.

In certain embodiments it should be noted that although the gas inlet may be connected to the pre-heat zone, in separate embodiments this may include inlets into any combination of the zones. In additional embodiments, it should be appreciated that although the gaseous outlet comes from the pyrolysis zone, alternate embodiments may include outlets out of one or more of any combination of the zones. In additional embodiments, inputs and outputs within the device may include an outlet of the pyrolysis zone which is then input into the pre-heat zone. Additionally, it should be noted that, each of the reactors in the device may be connected to one another via the material feed system.

In additional embodiments, the pre-heat zone and/or the carbon source feedstock hopper of the device may be configured for feeding coal, oil, petroleum coke, biomass, or another carbon-containing feedstock. This may additionally be done in a manner that does not "shock" the carbon source material, which may rupture the cell walls and initiate a fast decomposition of the solid phase which may result in vapors and gases. In an additional embodiment, the pre-heat zone may be considered to be a mild pyrolysis.

In additional embodiments, the pyrolysis zone of the device is configured as the primary reaction zone, in which preheated material may undergo pyrolysis chemistry to release gases and condensable vapors, this may result in a solid material which is a high-carbon reaction intermediate. Carbon source material components which may be cellulose, hemicellulose, and lignin, may decompose and create vapors, which may escape by penetrating through pores or creating new micro and/or nanopores. This effect from pyrolysis contributes to the creation of porosity and the higher surface area of an activated carbon.

In additional embodiments, the cooling zone of the device may be configured to receive the carbon intermediate and for cooling down the solids, it should be noted that the cooling zone will be at a lower temperature than the pyrolysis zone. It should be understood that in the cooling zone, the chemistry, heat management, and mass transport can be complex. In additional embodiments, secondary reactions may occur in the cooling zone. It should be noted that carbon components that are presently in the gas phase may decompose to form additional fixed carbon and/or become adsorbed onto and/or into the carbon. It should therefore be understood that the carbon material is not simply the solid, devolatilized residue throughout the processing steps, but rather may include additional carbon that has been deposited from the gas phase, for instance as decomposition of organic vapors, gasses, tars, that may form carbon.

In additional embodiments, the systems may comprise multiple reactors and/or zones and may include an optional deaerator and an optional dryer. The device may also include a material feed system, pyrolysis reactor, cooling reactor, cooler and a carbon recovery unit. Additionally, a gas source may be configured to input gas into one or both of the pyrolysis reactor(s) and the cooling reactor. In additional embodiments, the pyrolysis reactor may include an outlet to output at least the condensable vapors and/or non-condensable gases. In additional embodiments, the carbon recovery unit may include an outlet to output activated carbon from the system.

In additional embodiments, the device may comprise an optional de-aerator and an optional dryer. As an example, the optional de-aerator may be connected to the system between the material feed system and the pyrolysis reactor. In addition, the dryer may be connected to the system between the material soaking system and the pyrolysis reactor and/or between the washing and cooling system and the mixing system(s). In additional embodiments, the dryer and/or deaerator may also connect to one another such that the material from the material feed system may follow any number of different paths through the material feed system, the de-aerator, the dryer, and to the pyrolysis reactor(s). In certain embodiments, the material may only pass through one of the optional de-aerator and/or dryer.

Certain embodiments may extend the concept of additional carbon formation by including a separate material enrichment unit, and in which cooled carbon is subjected to an environment including carbon-containing species, which may enrich the carbon content of the final product. In these described embodiments the temperature of this unit may be below pyrolysis temperatures, and wherein the additional carbon may be expected to be in the form of adsorbed carbonaceous species, as opposed to additional fixed carbon.

In alternative embodiments, it should be noted that there are a large number of options for intermediate input and output, the purge and/or probe, streams of one or more phases present in any particular reactor, various mass and energy recycle schemes, various additives that may be introduced anywhere throughout the process, adjustability of process conditions including both reaction and separation conditions in order to tailor product distributions, and various additional parameter control modifications. In certain embodiments, the zone or reactor-specific input and output streams may be used to enable good process monitoring and control, such as through FTIR sampling and dynamic process adjustments for the device.

In certain embodiments, it should be noted that the carbon source size reduction is a costly and energy-intensive process. Pyrolyzed material may be sized with significantly less energy input, where it may be more energy efficient to reduce the particle size of the product, not the feedstock after pyrolyzing. This in certain embodiments is an option because the disclosed system and method does not require a fine starting material, and there is not necessarily a particle-size reduction during the pyrolysis portion of the process. The disclosed system and method provides for processing very large pieces of feedstock.

In certain embodiments, the device may allow the ability to maintain the approximate shape of feed material throughout the process. In certain embodiments, the device may allow the ability to modify the approximate shape of feed material throughout the process, including specifically reducing the particle size to a fine or ultra-fine powder. In additional embodiments, the feed material may be sufficiently dry that it does not be further dried before pyrolysis.

In additional embodiments, it may be desirable to provide a relatively low-oxygen environment in the pyrolysis reactor and during the process, such as about 10%, 5%, 3%, or 1% $O_2$ in the gas phase. It should be appreciated that uncontrolled combustion should be avoided in the pyrolysis reactor, one main reason is for safety. It should also be appreciated that some amount of total carbon oxidation to $CO_2$ may occur, and that heat released from the exothermic oxidation may assist the endothermic pyrolysis chemistry. During the pyrolysis process large amounts of oxidation of carbon, including partial oxidation to syngas, may reduce the carbon yield to solids.

In certain embodiments, it can be difficult to achieve a strictly oxygen-free environment in each of the reactor(s) or the device. In certain embodiments, the reactor(s) and/or the device may be substantially free of molecular oxygen in the gas phase. In additional embodiments, and in order to ensure that little or no oxygen is present in the reactor(s) or device, it may be desirable to remove air from the carbon source material before it is introduced to the reactor(s) or the device.

In additional embodiments, a deaeration unit may be utilized in which the carbon source material, before or after drying, is conveyed in the presence of another gas which may remove adsorbed oxygen and/or penetrate the feedstock pores which may remove oxygen from the pores. In certain embodiments, gases that have lower than 21 vol % $O_2$ may be used, which may have varying effectiveness. In certain embodiments, nitrogen may be employed. In certain embodiments, CO and/or $CO_2$ may be employed. In additional embodiments, mixtures of gases may be used, such as a mixture of nitrogen and a small amount of oxygen as a mixture. In certain embodiments, steam may be present in the deaeration gas, although for many embodiments adding significant moisture back to the carbon source material should be avoided. In certain embodiments, the effluent from the deaeration unit may be purged which may be to the atmosphere or to an emissions treatment unit and/or recycled.

In certain embodiments, the effluent and/or a portion thereof, from the deaeration unit may be introduced into the pyrolysis reactor itself since the oxygen removed from the solids may now be highly diluted. In this embodiment and additional embodiments, it may be advantageous to introduce the deaeration effluent gas to the last zone of the reactor, in this form the device may be operated in a countercurrent configuration.

In alternative embodiments, various types of deaeration units can be utilized. In certain embodiments, if drying is performed, deaerating after drying may prevent the step of scrubbing soluble oxygen out of the moisture present. In additional embodiments, the drying and deaerating steps may be combined into a single unit and/or step, or some amount of deaeration may be achieved during drying.

In additional embodiments, the optionally and optionally deaerated carbon source material may be introduced to a pyrolysis reactor and/or multiple reactors in series and/or parallel. In various embodiments, the material feed system may introduce the feedstock using any known means, this may include a screw material feed systems or lock hoppers, as non-limiting examples. In additional embodiments, the material feed system incorporates an airlock and/or seal.

In certain embodiments, a single reactor is employed and wherein multiple zones can be present. Multiple zones, such as two, three, four, or more zones, may allow for the separate control of temperature, solids residence time, gas residence time, gas composition, flow pattern, and/or pressure, which may be used to adjust the overall process performance.

It should be noted that references to "zones" shall be broadly construed to include regions of space within a single physical unit and/or device, physically separate units and/or devices, and/or any combination thereof. For a device, the demarcation of zones within that device may relate to structure, such as the presence of flights within the device or distinct heating elements to provide heat to separate zones. In additional embodiments, the demarcation of zones in a device may relate to function, such as at least: distinct temperatures, fluid flow patterns, solid flow patterns, and extent of reaction. In alternate embodiments, and for a single batch reactor, "zones" are operating regimes in time, rather than in space. Additional embodiments include the use of multiple batch devices and/or system and method.

In certain embodiments, it should be understood that there are not necessarily abrupt transitions from one zone to another or subsequent zone. As an example, the boundary between the preheating zone and pyrolysis zone may be somewhat arbitrary, wherein a certain amount of pyrolysis may take place in a portion of the preheating zone, and a certain amount of "preheating" may continue to take place in the pyrolysis zone. In certain embodiments, the temperature profile in the device is typically continuous, including at zone boundaries within the zone and/or zones.

In alternative embodiments, the device may employ a pre-heat zone which may be operated under conditions of preheating and/or mild pyrolysis. In certain embodiments, the temperature of the preheat zone may be from about 80° C. to about 500° C., such as about 300° C. to about 400° C. In certain embodiments, the temperature of the pre-heat zone is not high enough as to shock the biomass material which may rupture the cell walls and initiate a fast decomposition of the solid phase into vapors and gases. In a general non limiting description pyrolysis, commonly known as fast or flash pyrolysis, is avoided in the present disclosure, though in some embodiments may be beneficial.

Throughout this disclosure all references to zone temperatures should be construed in a non-limiting way to include temperatures that may apply to the bulk solids present, or the gas phase, or the reactor or device walls which may be on the process side. It should be noted that there will be a temperature gradient in each zone, both axially and radially, as well as temporally, meaning following start-up or due to transients. Thus, throughout this disclosure references to zone temperatures may be references to average temperatures and/or other effective temperatures that may influence the actual kinetics of the system. Physical temperatures may be directly measured by thermocouples or other temperature probes, or indirectly measured or estimated by other means and at varying or predetermined times.

In certain embodiments the second zone, and/or the primary pyrolysis zone, may be operated under conditions to produce pyrolysis and/or carbonization. In certain embodiments the temperature of the pyrolysis reactor and/or zone may be selected from about 250° C. to about 1100° C., such as about 300° C., 350° C., 400° C., 450° C., 500° C., 550° C., 600° C., or 650° C., or 700°., C. or 750° C., or 800° C., or 850° C., or 900° C., or 950° C., or 1000° C., or 1050° C., or 1100° C., or about 700° C.

Within the pyrolysis reactor and/or zone, preheated carbon source material may undergo pyrolysis chemistry to release gases and condensable vapors, which may leave a significant amount of solid material as a high-carbon reaction intermediate material. Carbon source material components may decompose and create vapors, which escape the material by penetrating through pores or creating new pores, generally micro and meso pores. In certain embodiments, the temperature will at least depend on the residence time of the pyrolysis reactor and/or zone, as well as the nature of the feedstock and its specific properties.

In various embodiments, the cooling zone is operated to cool down the carbon intermediate material to vary of degrees. In certain embodiments, the temperature of the cooling zone is lower than that of the pyrolysis zone. In additional embodiments, the temperature for the cooling zone is selected from a range of about 100° C. to about 500° C., such as about 150° C. to about 300° C.

In certain embodiments, a chemical reaction(s) may continue to occur within the cooling zone. It should be noted that in various embodiments, secondary pyrolysis reactions are initiated and/or allowed to occur in the cooling zone. Carbon source components that are presently in the gas phase may condense; this may be due to the reduced temperature of the cooling zone. In certain embodiments when temperature remains sufficiently high, it will promote reactions that may form additional fixed carbon derived from and formed by the condensed liquids, this may be considered secondary pyrolysis, and may at least form bonds between adsorbed species and the fixed carbon materials. In the above description, one exemplary reaction that may take place is the conversion of carbon monoxide to carbon dioxide, plus fixed carbon, referred to as the Boudouard reaction.

In certain embodiments, the residence times of the zones may vary, this may be for a desired amount of pyrolysis, where higher temperatures may allow for lower reaction times, and vice versa. It should be understood that the residence time in a continuous device and/or reactor is the volume divided by the volumetric flow rate. It should also be understood that the residence time in a batch reactor is the batch reaction time, following the heating to the desired reaction temperature.

Additionally, it should be noted that in multiphase devices, there are multiple residence times. In this disclosure and in the present context, for each zone, there will be a residence time with a residence-time distribution, for both the solids phase and the vapor phase. In certain embodiments and for a given device employing multiple zones, and with a given throughput, the residence times for the zones will generally be coupled on the solids side requirements, but residence times may be uncoupled on the vapor side results when multiple inlet and outlet ports are utilized in individual zones. It should also be noted that in certain embodiments, the solids and vapor residence times may be uncoupled.

In certain embodiments, the solids residence time of a preheating zone may be selected from about 5 min to about 120 min, such as about 10 min which may depend on the temperature and time required to reach a desired preheat temperature. It should be understood that the heat-transfer rate, which will generally depend on the particle type and size, the physical apparatus, and on the heating parameters, will generally dictate the minimum residence time necessary to allow the solids to reach a predetermined or specified preheat temperature.

In certain embodiments, the solids residence time of the pyrolysis reactor and/or zone may be selected from about 5 min to about 1440 min, such as about 20 min, 30 min, 45 min, 60 min, 75 min, 90 min, 105 min, 120 min, 135 min, 150 min, 200 min, 300 min, 5 400 min, 500 min, 600 min, 700 min, 800 min, 900 min, 1000 min, 1100 min, 1200 min, 1300 min, 1440 min, or about 120 min. It should be noted that depending on the pyrolysis temperature in the reactor and/or zone, it should be considered and ensured that sufficient time to allow the carbonization chemistry to take place is reached. In certain embodiments, and for times below about 10 min, in order to remove high quantities of non-carbon elements, in general the temperature would need to be quite high, such as an example of above 800° C. Generally, this temperature would promote a fast pyrolysis and therefore its generation of vapors and gases derived from the carbon source is generally to be avoided when the intended product is solid carbon.

In additional embodiments, a static system reaching an equilibrium conversion will be reached at a certain time. When this is the case that vapor is continuously flowing over solids and allows for continuous volatile material removal, the equilibrium constraint may be removed to allow for the pyrolysis and the devolatilization to continue, until the reaction rate approaches zero. At this stage, generally, longer reaction times would tend not to substantially alter the remaining recalcitrant solids.

In certain embodiments, the solids residence time of the cooling zone may be selected from about 5 min to about 120 min, such as about 30 min. Dependent upon the cooling temperature in the reactor and/or zone, there needs to be sufficient time to allow the carbon material to cool to the desired temperature. It should be understood that the cooling rate and temperature will dictate the minimum residence time necessary to allow the carbon to be cooled.

In certain embodiments, the residence times of the process phases may be separately selected and controlled. In certain embodiments the vapor residence time of the preheating zone may be selected from about 0.01 min to about 60 min, such as about 1 min. In certain embodiments the vapor residence time of the pyrolysis zone may be selected from about 0.01 min to about 240 min, such as about 120 min. In certain embodiments the vapor residence time of the cooling zone may be selected from about 0.01 min to about 150 min, such as about 10 min. It should be noted that a short vapor residence time will generally promote fast sweeping of volatiles out of the system, while generally longer vapor residence times tend to promote reactions of components in the vapor phase with the solid phase.

It should be understood that the mode of operation for the device, reactor, and/or zones, and overall system, may be continuous, semi-continuous, batch, or any combination or variation. In certain embodiments, the device is a continuous, countercurrent reactor device in which solids and vapor flow are generally substantially in opposite directions. The device may also be operated in batch but with simulated countercurrent flow of vapors, such as by periodically introducing and removing gas phases from the batch vessel, which may be used by the device or stored for later use.

In certain embodiments various flow patterns may be desired and constructed. In alternate embodiments, the chemical reactions and simultaneous separations involving multiple phases in multiple zones, the fluid dynamics, generally, can be quite complex. In certain embodiments the flow of solids may be well-mixed in the radial dimension, while the flow of vapor may be well mixed in both radial and axial dimensions. In certain embodiments multiple inlet and outlet ports for vapor may contribute to the overall mixing.

In additional embodiments, the step of separating at least a portion of the condensable vapors and at least a portion of the non-condensable gases from the hot pyrolyzed solids may be accomplished within the reactor itself, and/or using a distinct separation unit or devices. In additional embodiments, a substantially inert sweep gas may be introduced into one or more of the zones, which may be used to force condensable vapors and non-condensable gases to be carried away from the zone(s) in the sweep gas, and out of the device.

In certain embodiments, the process may be operated at standard atmospheric pressure. It should be understood that there are many advantages associated with operation at a standard atmospheric pressure, this includes aspects such as mechanical simplicity to enhanced safety. In additional embodiments, the pyrolysis zone is operated at a pressure of about 90 kPa, 95 kPa, 100 kPa, 101 kPa, 102 kPa, 105 kPa, or 110 kPa being absolute pressures.

In certain embodiments operating under a vacuum such as 10-100 kPa may be used to allow fast sweeping of volatiles out of the system. In additional embodiments operating at higher pressures such as 100-1000 kPa may be used when the device off gases are constructed to be fed to a high-pressure operation or portion of the device. It should be noted that elevated pressures may also be used to allow heat transfer, chemistry, or separations throughout the device and for heat and energy recycling.

In additional embodiments, the step of separating at least a portion of the condensable vapors and at least a portion of the non-condensable gases from the hot pyrolyzed solids may be accomplished within the reactor itself, and or using a distinct separation unit or devices. In additional embodiments, a substantially inert sweep gas may be introduced into one or more of the zones, which may be used to force condensable vapors and non-condensable gases to be carried away from the zone (s) in the sweep gas, and out of the device.

In alternate embodiments, the sweep gas may be $N_2$, Ar, CO, $CO_2$, $H_2$, $H_2O$, $CH_4$, and/or other light hydrocarbons, and/or combinations thereof. In certain embodiments, the sweep gas may first be preheated prior to introduction, or cooled if it is obtained from a heated source or from an elevated temperature zone.

In additional embodiments, the sweep gas may be used to remove the volatile components, for instance by forcing them out of the system before they can condense or further react. It should be noted that the sweep gas can allow volatiles to be removed at higher rates than would be attained merely from volatilization at a given process temperature, and additionally the use of the sweep gas can allow milder temperatures to be used to remove a certain quantity of volatiles. It should also be understood that the reason the sweep gas improves the volatiles removal is that the mechanism of separation is not merely relative volatility but instead the liquid and/or vapor phase disengagement assisted by the sweep gas.

It should be understood that it is important to remove gases laden with volatile organic carbon from subsequent processing stages and/or from remaining in the pyrolysis reactor, this in order to produce a product with high fixed carbon and purity. Generally, without removal, the volatile carbon may be adsorbed or absorb onto the pyrolyzed solids, thereby requiring additional energy and/or cost to achieve a purer form of carbon. In certain embodiments, by removing vapors quickly, it is also possible that the porosity may be enhanced in the pyrolyzing solids.

In alternative embodiments, sweep gas in conjunction with a relatively low process pressure, such as standard atmospheric pressure, may provide for fast vapor removal without large amounts of inert gas.

In certain embodiments, the sweep gas may flow countercurrent to the flow direction of feedstock. In additional embodiments, the sweep gas may flow concurrent to the flow direction of feedstock. In alternative embodiments, the flow pattern of solids may approach plug flow while the flow pattern of the sweep gas, and gas phase generally, may approach fully mixed flow in one or more zones.

In certain embodiments, the sweep may be performed in any one or more of the devices zones. In additional embodiments, the sweep gas may be introduced into the cooling zone and extracted in conjunction with volatiles that have been produced from or in the cooling and/or pyrolysis zones. In certain embodiments, the sweep gas may be introduced into the pyrolysis zone and/or extracted from the pyrolysis and/or preheating zones. In certain embodiments, the sweep gas may be introduced into the preheating zone and/or extracted from the pyrolysis zone. In certain embodiments, the sweep gas may be introduced into each of the preheating, pyrolysis, and cooling zones and/or also extracted from each of the zones independently or in concert.

In certain embodiments, the zone and/or zones in which separation is carried out is a physically separate unit or device from the main device. In some embodiments the separation unit or zone may be located between zones, as an example, there may be a separation unit located between pyrolysis and cooling zones.

In certain embodiments, the sweep gas may be introduced continuously, especially when the solids flow is continuously processed. In certain embodiments, when the pyrolysis reaction is operated as a batch process, the sweep gas may be introduced after a certain amount of time, or periodically, in order to remove volatiles. It should be noted that even when the pyrolysis reaction is operated continuously, the sweep gas may be introduced semi-continuously and/or periodically, which may be with suitable valves and controls.

In some embodiments the volatiles containing sweep gas may exit from the one or more zones, and then may be combined, even if obtained from multiple zones. It should be understood that the resulting gas stream, containing various vapors, may be fed to a process gas heater for control of air emissions, and additionally any known thermal-oxidation unit may be employed. In certain embodiments, the process gas heater may be fed with natural gas and air, to reach sufficient temperatures for substantial destruction of volatiles contained therein.

In some embodiments the effluent of the process gas heater may be a hot gas stream comprising water, carbon dioxide, and nitrogen. Additionally, the effluent stream may be purged directly to air emissions. In certain embodiments, the energy content of the process gas heater effluent may be recovered, for instance in a waste heat recovery unit. In additional embodiments, the energy content may also be recovered for instance by a heat exchange with another stream. In certain embodiments the energy content may be utilized by directly or indirectly heating, or assisting with heating, a unit elsewhere in the process, an example being a dryer or the reactor. In certain embodiments the device may be constructed to allow essentially all of the process gas heater effluent to be used for indirect heating for instance for the dryer, or additionally the process gas heater may consume fuels other than natural gas.

The disclosed process will vary the yield of carbonaceous material, depending on many of the described factors which include the type of feedstock and process conditions. In certain embodiments, the net yield of solids as a percentage of the starting feedstock, on a dry basis, is at least 25%, 30%, 35%, 40%, 45%, 50%, 55%, 60%, 65%, 70%, 75%, 80%, 85%, 90%, 95% or higher. During the process the remainder will be split between condensable vapors, and may include terpenes, tars, alcohols, acids, aldehydes, or ketones; and non-condensable gases, such as carbon monoxide, hydrogen, carbon dioxide, and methane. Additionally, the amounts of condensable vapors as compared to non-condensable gases may also vary depending on process conditions, which also includes the water that may be present. In additional embodiments, the incorporation of an additive before the pyrolysis step may improve the yield of carbonaceous material, as compared to an identical process where the additive is added after the pyrolysis step or with no additive added altogether. In certain embodiments, an additive such as a halogen-containing additive may be added to a wet carbon source which may also be after drying the carbon source but before pyrolysis where the resulting mass yield of carbonaceous material may be greater than the mass yield of an activated carbon produced where an additive was not added at any time, or subsequently added after pyrolysis, but where it is an otherwise identical process.

It should be understood that in terms of the carbon balance, in certain embodiments the net yield of carbon as a percentage of starting carbon source from a feedstock is at least 25%, 30%, 40%, 50%, 60%, 70%, 80%, 90%, 95% or higher. In certain embodiments the carbon material may contain between about 40% and about 95% of the carbon contained in the starting carbon source. It should be understood the rest of the carbon material results in the formation of methane, carbon monoxide, carbon dioxide, light hydrocarbons, aromatics, tars, terpenes, alcohols, acids, aldehydes, or ketones.

In certain embodiments, some portion of these compounds may be combined with carbon rich solids to enrich the carbon and energy content of the material. In additional embodiments, some or all of the resulting gas stream from the reactor, which may contain various vapors, and which may be condensed, at least in part, which may then be passed over cooled pyrolyzed solids derived from the cooling zone and/or from the separate cooler.

In certain embodiments, following the reaction and the cooling within the cooling zone, the carbonaceous material may be introduced into a cooler. In certain embodiments, solids are collected and/or remain in the reactor and simply allowed to cool at slow rates. In certain embodiments, the carbonaceous solids are reactive and/or unstable in air, in these embodiments it may be desirable to maintain an inert atmosphere and/or rapidly cool the solids to a temperature which may be less than or equal to about 20° C., about 30° C., about 40° C., such as ambient room temperature. In certain embodiments, a water quench may be employed for rapid cooling. In additional embodiments, a fluidized bed cooler may be employed. It should be note that a "cooler" may be broadly construed to also include an assortment of different containers, tanks, pipes, or portions thereof. In certain embodiments it should be noted that the cooler may be distinct from the cooling unit and/or cooling reactor.

In certain embodiments, the process may further comprise operating the cooler to cool the warm pyrolyzed solids with steam, this may result in generating a cool pyrolyzed solids while generating a superheated steam. In this embodiment, the drying portion may be carried out, at least in part, with the superheated steam derived from the cooler and/or cooling process. Additionally in some embodiments, the cooler may be operated to first cool the warm or hot pyrolyzed solids with steam to reach a lower cooler temperature, and then in certain embodiments with air to reach second cooler temperature, it should be noted the second cooler temperature is lower than the first cooler temperature and may be associated with a reduced combustion risk for the warm or hot pyrolyzed material in the presence of the air.

In certain embodiments after cooling to ambient conditions, the carbon material may be recovered and stored, used, conveyed to another site operation, transported to another site, or otherwise disposed, traded, or sold. Additionally, the solids may be fed to a unit to reduce particle size, which may include a variety size-reducing units that are known in the art, including crushers, shredders, grinders, pulverisers, jet mills, pin mills, and ball mills and drums, and planetary ball mills.

In certain embodiments, using a screen and/or mesh and/or some other means for separation based on particle size may be incorporated into the device. In some embodiments, a portion of the screened material for instance larger pieces or large may be returned to the grinding portion. In certain embodiments, the cooled pyrolyzed material is ground into a fine powder which may be as small as about the micrometer size range, which may be a pulverized carbon or activated carbon product.

In alternate embodiments, various additives may be introduced throughout the process, before, during, and/or after any step disclosed throughout this disclosure. The various additives which can be broadly classified as the process additives, the product additives, may be selected to improve one or more properties of the activated carbon material, or a downstream product incorporating a reagent.

In additional embodiments, additives may be added at any suitable time during the entire process or processes. In certain embodiments without limitation, the additive may be added before, during or after a feedstock drying step; before, during or after a feedstock deaerating step; before, during or after a pyrolysis step; before, during or after a separation step; before, during or after any cooling step; before, during or after an activated carbon recovery step; before, during or after a pulverizing step; before, during or after a sizing step; before, during or after a electrode mix mixing step; before, during or after an application, forming, or applying step; and/or before, during or after a packaging step.

It should be noted that additives may be incorporated at or on feedstock supply facilities, transport trucks, unloading equipment, storage bins, conveyors and including open or closed conveyors, dryers, process heaters, or any other units, devices or processing equipment. It should also be noted that additives may be added throughout the pyrolysis process itself, this may require using suitable means for introducing additives, and may also be added after carbonization, pulverization, meshing, mixing and/or during an application stage.

In certain embodiments, the device may comprise a hopper into which feedstock can be fed. The hopper which is optionally configured to enable the addition and/or the mixing of reactor off-gases such as a vapor stream and/or additives and/or gases from an external source and/or internal source to feedstock carbon source material before conveying the material to a reactor. During the process, activated carbon may be mechanically conveyed through the reactor before exiting at the opposing end. It should be noted that steam, nitrogen, argon, helium, carbon dioxide, KOH or a combination thereof may be introduced into reactor and/or carbon source material. Additionally, vapor stream may be removed at least in part from the reactor and is optionally fed into the hopper, and then may be few into a thermal oxidizer. Additionally, a heat exchanger may enable heat from the emissions of the thermal oxidizer to heat a gas stream, which in some embodiments may comprise nitrogen and/or carbon dioxide and/or argon. In some embodiments, the gas stream or a portion thereof, may be recycled via a path and/or channel to the reactor, and/or optionally to the carbon source material before entry into the reactor. In certain embodiments, off-gases can be disposed of according to standard methods, for example through a stack and/or burn.

In certain embodiments, a two-reactor carbon source processing unit comprises a first multizone reactor unit, which may be configured substantially similarly to processing units described above. In certain embodiments, however, at least a portion of the activated carbon produced by the reactor may be fed into a hopper and then into second reactor this may be accomplished via a path. In certain embodiments at least a portion of the optionally thermally oxidized and optionally adjusted vapor stream which was produced by first reactor, thermal oxidizer and heat exchanger may be fed counter-currently into the second reactor. Additionally, at least a portion of the off gases from the second reactor may be recycled to indirectly heat the second reactor. In certain embodiments, portions of the off gases that have not recycled, such as by heat, may be disposed of, for instance by a stack.

In certain embodiments, the present disclosure provides a continuous process for producing activated carbon, the process comprising: (a) providing a starting carbon source comprising; coal, and/or oil, and/or petroleum coke, and/or biomass; (b) said process providing optional drying said carbon source to remove at least a portion of moisture from the material; (c) in one or more indirectly heated reaction zone(s), providing for mechanically conveying said carbon source and counter-currently contacting said carbon source with a vapor stream comprising a substantially inert gas and an activation agent or means comprising at least one of water or carbon dioxide or KOH, to generate carbon solids, condensable vapors, and non-condensable gases, and where said condensable vapors and said non-condensable gases enter said vapor stream; (d) removing at least a portion of said vapor stream during the process from said the reaction zone(s), in order to generate a separated or segregated vapor stream; (e) recycling at least a portion of said separated or segregated vapor stream, or a thermally treated for thereof, which is to said feedstock prior to step (c) and/or to a gas inlet of said the reaction zone(s); and (f) during the process recovering at least a portion of said carbon solids from said the reaction zone(s) as activated carbon.

In alternate embodiments, step (b) may be carried out to remove at least a portion of moisture contained within the carbon source material. For one example, the carbon source may be dried to contain about 12 wt % or less moisture, such as about 8 wt % or about 4 wt % or about 2 wt % or about 1 wt % or less moisture. In alternative embodiments, no additional water may be added to the carbon source material. During the process the activation agent may include water that is derived from moisture contained originally in the feedstock, though KOH (potassium hydroxide) with distilled water is preferred.

In certain embodiments, the activation agent may include both water and carbon dioxide. The ratio of water against carbon dioxide may be optimized to increase or control pore size distribution during activation of the solids from the carbon source.

In certain embodiments, the activation agent may include both water and KOH. The ratio of water against KOH and soaking time may be optimized to increase or control pore size distribution during activation of the solids from the carbon source.

In certain embodiments, the process comprises adding an additive before the pyrolysis step, such as KOH and water. In comparable type embodiments, the resulting activated carbon may be produced in a mass yield that is higher than activated carbon produced without additive, or with an additive added during or after the pyrolysis step but by an otherwise identical method. In an additional embodiment, the activated carbon material performs as well as or better than the comparable activated carbon material. In additional embodiments, the process requires less energy input to produce an activated carbon product when an additive such as KOH is added before the pyrolysis step. In certain embodiments, the resulting carbon has a higher fixed carbon content compared to an activated carbon produced without an additive, or with additive added during or after the pyrolysis step, but by an otherwise a similar or identical process.

In additional embodiments, the additive, such as a non-limiting example of KOH, is distributed thoroughly and/or evenly throughout the carbon source starting material for a period of time prior to heating and/or pyrolysis, a soak time, for a period of about 10 min, about 20 min, about 30 min, about 40 min, about 50 min, about 1 hour, about 1.5 hours, about 2 hours, about 3 hours, about 4 hours, 5 about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 24 hours, about 25 hours, about 26 hours, about 27 hours, about 28 hours, about 29 hours, about 30 hours, about 31 hours, about 32 hours, about 33 hours, about 34 hours, about 35 hours, about 36 hours, about 37 hours, about 38 hours, about 39 hours, about 40 hours, about 41 hours, about 42 hours, about 43 hours, about 44 hours, about 45 hours, about 46 hours, about 47 hours, about 48 hours, about 49 hours, about 50 hours, or around 12 hours, rather than, or in addition to, activated carbon produced by the same process but wherein the additive is added during or after the pyrolysis step. In certain embodiments, the activated carbon may require less additive to achieve a desired performance characteristic when added before the pyrolysis step compared to an activated carbon produced by an otherwise identical process but wherein the additive is added during or after the pyrolysis step.

In additional embodiments, at least one of the indirectly heated reaction zone(s) is preferably maintained at a reaction temperature selected from about 600° C. to about 1100° C. In alternative embodiments, all of the indirectly heated reaction zone(s) are maintained at a maximum reaction temperature less than or equal to about 1100° C., and preferably 800° C.

In certain embodiments, step (d) may comprise removing at least a portion of the condensable vapor(s) from the reaction zone. In additional embodiments, step (d) may comprise removing all of the vapor stream from the reaction zone(s).

In certain embodiments, step (e) may comprise introducing at least some of the separated vapor stream to the gas inlet of the reaction zone and/or to the feedstock material prior to step (c). In additional embodiments, step (e) may comprise introducing a thermally treated form of at least some of the separated vapor stream to the gas inlet of the reaction zone(s) and/or to the feedstock material prior to step (c).

In certain embodiments, step (e) may further comprise additional heating of the separated vapor stream, and/or a thermally treated form. In additional embodiments, step (e) may further comprise adjusting gas composition of the separated vapor stream, or a thermally treated form. In some embodiments adjusting the gas composition may include introducing one or more species that may be selected from the group consisting of water, carbon dioxide, nitrogen, argon, vaporized KOH, and oxygen.

In certain embodiments, the adjusted gas composition may comprise from 0% to 100% water, in an example about 0%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100% water.

In certain embodiments, the adjusted gas composition may comprise from 0% to 100% carbon dioxide, in an example about 0%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100% carbon dioxide.

In certain embodiments, the adjusted gas composition may comprise from 0% to 100% nitrogen, in an example about 0%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100% nitrogen.

In certain embodiments, the adjusted gas composition may comprise from 0% to 100% argon, in an example about 0%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100% argon.

In certain embodiments, the adjusted gas composition may comprise from 0% to 100% vaporized KOH, in an example about 0%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100% vaporized KOH.

In certain embodiments, the adjusted gas composition may comprise from 0% to 100% oxygen, in an example about 0%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100% oxygen. In additional embodiments, the adjusted gas composition comprises no more than about 16%, no more than about 14%, no more than about 12%, no more than about 10%, no more than about 8%, no more than about 6%, no more than about 4%, or no more than about 2% or no more than about 1% of oxygen.

In certain embodiments, the separated vapor stream, or a thermally treated form, may contain, or be adjusted to contain, about less than or equal to 1 wt %, in an example such as about 0.1, 0.2, 0.5, or 0.8 wt %, a combined carbon monoxide and VOC content. In certain embodiments the gas composition may be adjusted to contain at least about 70 wt % nitrogen, at least about 75% nitrogen, at least about 80% nitrogen, at least about 85% nitrogen, at least about 90% nitrogen, at least about 95% nitrogen, or about 100% nitrogen. In certain embodiments the gas composition may be adjusted to contain at least about 70 wt % argon, at least about 75% argon, at least about 80% argon, at least about 85% argon, at least about 90% argon, at least about 95% argon, or about 100% argon.

In certain embodiments, some of the separated vapor stream, or a thermally treated form, may be introduced to a delivery system which may be configured for mechanically feeding the feedstock material into the first indirectly heated reaction zone, wherein such a delivery system may include a feed auger or screw, as examples.

In certain embodiments, some of the activation agent may be derived from the separated vapor stream, or a thermally treated form. In certain embodiments step (e) may increase the surface area and Iodine Number of the carbon solids. In additional embodiments, step (f) may comprise recovering all of the solids from the reaction zone(s) as activated carbon.

In certain embodiments, an additive may be introduced before, during, or after one or more of the steps and/or to the electrolyte, and wherein the additive may be selected from an acid, a base, a salt, a metal, a metal oxide, a metal hydroxide, a metal halide, iodine, an iodine compound, or a combination thereof. In additional embodiments, the additive may be selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorspar, bentonite, calcium oxide, lime, sodium hydroxide, potassium hydroxide, hydrogen bromide, hydrogen chloride, sodium silicate, potassium permanganate, organic acids, iodine, an iodine compound, sodium perchlorate, organic perchlorate salts ammonium, alkali metal and alkali earth perchlorates, transition metal perchlorates and/or combinations thereof.

In a number of embodiments, the activated carbon may be characterized by an Iodine Number of at least about 500, 1000, 1500, 2000, 2500, 3000, 3500. The activated carbon may additionally be characterized by a surface area of at least about 500 m2/g, 1000 m2/g, 1500 m2/g, 2000 m2/g, 2500 m2/g, 3000 m2/g, 3500 m2/g, 4000 m2/g or higher.

In additional embodiments, at least a portion of the activated carbon may be present in the form of graphene. Additionally, the activated carbon may be responsive to an externally applied magnetic field. Additionally, the activated carbon may have a higher electrical conductivity and/or capacitance from the starting carbon source material.

In certain embodiments, the activated carbon may be responsive to an externally applied magnetic field. In additional embodiments, the magnetic properties of the activated carbon may be due, in part, to the presence of a magnetic metal or compound thereof, an example being iron. In additional embodiments, the activated carbon may be responsive to an externally applied magnetic field notwithstanding the presence or absence of iron, an iron compound, another magnetic metal or compound thereof, an ore, a metalloid or compound thereof, or another non-graphene material that may itself respond to an externally applied or generated magnetic field.

In alternative embodiments, the process further comprises introducing at least some of the separated vapor stream, or a thermally treated form, to the reactor(s) for growing and/or forming graphene on a substrate which may be in two or three dimensions. In this process, the carbon contained in the vapor may be deposited onto a substrate, an example being silicon, to form a single layer(s) of carbon, which may take the shape of the substrate where the substrate is a layer or has three-dimensional features.

It should be noted that the liquid or vapor stream from an external source may vary widely. In certain embodiments, the vapor stream(s) may include CO, $CO_2$, $CH_4$, light hydrocarbons, tars, or the like. In certain embodiments, liquid streams may include heavier hydrocarbons, which may include olefins or aromatics, methanol, ethanol, or heavier alcohols, organic acids, aldehydes, or the like. In additional embodiments, an external source may be a VOC off-gas stream from an adjacent or co-located chemical or fuel plant, as examples. It should be understood that combinations are possible in certain embodiments, including not only liquid and vapor streams but also mixtures of external sources of recycled gases within the system, such as a separated vapor stream, or a thermally treated form.

In certain embodiments, the present disclosure provides a continuous process for producing graphene, the process may comprise: (a) providing a carbon source feedstock comprising coal, oil, petroleum coke, biomass, or combination thereof; (b) optionally drying said feedstock in order to remove at least a portion of moisture from said material; (c) in one a plurality of indirectly heated reaction zone(s), mechanically conveying said carbon source material and counter currently contacting the said carbon source material with a vapor stream which may comprise a substantially inert gas and an activation agent including at least one of water or carbon dioxide or KOH, to generate carbon solids, condensable vapors, and non-condensable gases, wherein said condensable vapors and said non-condensable gases may enter said vapor stream; (d) removing at least a portion of said vapor stream from said the reaction zone(s), in order to generate a separated vapor stream; (e) recycling at least a portion of the said separated vapor stream, or the thermally treated form thereof, to said feedstock prior to step (c) and/or to a gas inlet of said the reaction zone(s); and (f) recovering at least a portion of said carbon solids from said reaction zone(s) as graphene.

In certain embodiments, the carbon solids recovered in step (f) may consist of graphene-containing activated carbon. In certain embodiments the graphene containing activated carbon may contain widely varying fractions of graphene, this relative to total carbon present in said activated carbon. In certain embodiments, the mass (or mole) ratio of carbon present as graphene to total carbon in the activated carbon may be from about 0.0001 to about 1, such as about 0.001, about 0.005, about 0.01, about 0.005, about 0.1, about 0.15, about 0.2, about 0.25, about 0.3, about 0.4, about 0.5, about 0.6, about 0.7, about 0.8, about 0.9, about 0.95, about 0.95 or higher.

In certain embodiments, it should also be explained that the graphene content may not necessarily be uniform throughout the activated carbon. In certain embodiments, graphene formation may occur essentially throughout the solids and/or form on the surface of the carbon solids.

In certain embodiments the process may further comprise separating graphene from the graphene containing activated carbon. It should be noted that separation may be achieved by mechanical, magnetic, electrical means, such as by a centrifuge, magnetic separator, or electrostatic precipitator.

In additional embodiments, carbon solids may further be treated to increase graphene content. In additional embodiments, a catalyst may be used to enhance graphene growth. In additional embodiments the carbon solids may be introduced into, or form part of, a separate process in order to fabricate or transfer graphene on a substrate or by means of a device.

In additional embodiments, the graphene or graphene containing activated carbon may be responsive to an externally applied magnetic field. In additional embodiments, the graphene or graphene containing activated carbon may have an electrical conductance value and/or an electrical capacitance value which may be greater than the carbon source material.

In additional embodiments, the present disclosure provides a continuous process for producing graphene containing activated carbon, the process comprising: (a) providing a carbon source feedstock comprising coal, oil, petroleum coke, biomass, or combination thereof; (b) optionally drying said feedstock to remove at least a portion of moisture from the said carbon source feedstock; (c) in one or a plurality of indirectly heated reaction zone(s), mechanically conveying said carbon source material and counter currently contacting said material with a vapor stream comprising a substantially inert gas and an activation agent comprising at least one of water or carbon dioxide or KOH, to generate solids, condensable vapors, and non-condensable gases, wherein said condensable vapors and said non-condensable gases enter said vapor stream; (d) removing at least a portion of said vapor stream from said the reaction zone(s), to generate a separated and/or segregated vapor stream; (e) recycling at least a portion of said separated and/or segregated vapor stream, or a thermally treated form, to said carbon source material prior to step (c) and/or to a gas inlet of said the reaction zone(s), in order to increase the surface area of carbon in said solids; and (f) recovering at least a portion of said carbon solids from said the reaction zone(s) as activated carbon, wherein said activated carbon comprises, on a dry basis, about or greater than 55 wt % or more total carbon, about 15 wt % or lesser hydrogen, and less than or equal to about 1 wt % nitrogen and/or argon, wherein at least a portion of said activated carbon is present in the form of graphene, wherein said activated carbon composition is characterized by an Iodine Number higher than about 500, and wherein said activated carbon may be responsive to an externally applied magnetic field.

In certain embodiments, an additive may be selected from; a metal, a metal oxide, a metal hydroxide, or any combination thereof. As examples, an additive may be selected from, but is not limited to, magnesium, manganese, aluminum, nickel, chromium, silicon, boron, cerium, molybdenum, phosphorus, tungsten, vanadium, iron halide, iron chloride, iron bromide, magnesium oxide, dolomite, dolomitic lime, fluorite, fluorspar, bentonite, calcium oxide, lime, and/or any combinations thereof.

In alternative embodiments, an additive may be selected from; an acid, a base, or a salt thereof. As an example, an additive may be selected from, but not limited to, sodium hydroxide, potassium hydroxide, magnesium oxide, hydrogen bromide, hydrogen chloride, sodium silicate, potassium permanganate, organic acids such as citric acid, or any combinations thereof.

In alternative embodiments, an additive may be selected from; a metal halide, where metal halides are compounds that are between metals and halogens such as fluorine, chlorine, bromine, iodine, and astatine. Halogens may form many compounds with metals, and metal halides are generally obtained by direct combination, or more generally, neutralization of basic metal salt with a hydrohalic acid. In certain embodiments, an additive may be selected from iron halide such as $FeX_2$ and/or $FeX_3$, iron chloride such as $FeCl_2$ and/or $FeCl_3$, iron bromide such as $FeBr_2$ and/or $FeBr_3$, or hydrates thereof, and/or any combination.

In certain variations, an activated carbon composition comprises, on a dry basis: 55-95 wt % about or more total carbon material; 2-20 wt % about or less hydrogen; 1-10 wt % about or less nitrogen; 0.5-5 wt % about or less phosphorus; 0.2-5 wt % about or less sulfur; and an additive that may be selected from an acid, a base, a salt, a metal, a metal oxide, a metal hydroxide, a metal halide, iodine, an iodine compound, or any combination thereof.

In certain embodiments, the additive may comprise iodine or an iodine compound, or a combination of an iodine and one or more iodine compounds. In embodiments with the additive iodine, it may remain present in the activated carbon composition as an absorbed or intercalated molecular $I_2$, as a physically or chemically adsorbed molecular $I_2$, as an absorbed or intercalated atomic I, as a physically or chemically adsorbed atomic I, and/or any combination.

In embodiments where the additive comprises one or more iodine compounds, the iodine compound may be selected from the group consisting of iodide ion, hydrogen iodide, an iodide salt, a metal iodide, ammonium iodide, an iodine oxide, triiodide ion, a triiodide salt, a metal triiodide, ammonium triiodide, iodate ion, an iodate salt, a polyiodide, iodoform, iodic acid, methyl iodide, an iodinated hydrocarbon, periodic acid, orthoperiodic acid, metaperiodic acid, and combinations, salts, acids, bases, or derivatives thereof.

In certain variations, a process for producing an activated carbon, the process comprising: (a) providing a carbon source feedstock comprising coal, oil, petroleum coke, biomass, or combination thereof; (b) drying the feedstock to remove moisture contained within the carbon source feedstock; (c) deaerating the feedstock to remove interstitial oxygen, if any, contained with the carbon source feedstock; (d) pyrolyzing the carbon source material in the presence of a substantially inert gas for at least 10 minutes and up to 48 hours, and with a pyrolysis temperature selected from about 250° 10 C. to about 1100° C., in order to generate hot pyrolyzed carbon solids, condensable vapors, and non-condensable gases; (e) separating and/or segregating at least a portion of the condensable vapors and at least a portion of the non-condensable gases from the hot pyrolyzed carbon solids; (f) cooling the hot pyrolyzed carbon solids, in the presence of the substantially inert gas for at least 5 minutes up to 48 hours, and with a cooling temperature less than or equal to about the pyrolysis reaction temperature, to generate warm pyrolyzed carbon solids; (g) in a cooling unit that may separate from the cooling zone, cooling the warm pyrolyzed carbon solids to generate cool pyrolyzed carbon solids; (h) recovering activated carbon comprising at least a portion of the cool pyrolyzed carbon solids; and (i) pulverizing the activated carbon to reduce average particle size of the activated carbon composition. Wherein in certain variations an additive is introduced before, during, or after one or more of steps (a)-(i), and additionally wherein the additive is selected from an acid, a base, a salt, a metal, a metal oxide, a metal hydroxide, a metal halide, iodine, an iodine compound, and/or a combination thereof.

In certain embodiments, the additive may comprise iodine or an iodine compound, or a combination of iodine and one or more iodine compounds, which may be optionally dissolved in a solvent. It should be noted various solvents for iodine or iodine compounds are known in the art. As examples, alkyl halides such as though not limited to, n-propyl bromide or n-butyl iodide. Also including alcohols such as methanol or ethanol. In certain embodiments, a tincture of iodine may be employed to allow the introduction of the additive into the composition.

In certain embodiments, the additive may comprise iodine that is introduced as a solid that sublimes to an iodine vapor for incorporation into the activated carbon composition. Wherein at room temperature, iodine is a solid, and under heating, the iodine sublimes into a vapor. Therefor, solid iodine particles may be introduced into any stream, vessel, pipe, or container, such as a barrel or a bag, that may also contain the activated carbon composition. It should be noted that heating the iodine particles will cause them to sublime, and the vapor can then penetrate into the carbon particles, therefor incorporating iodine as an additive on the surface of the particles and potentially within said particles.

In additional embodiments, the disclosure provides a method for reducing and/or removing at least one contaminant from a gas-phase emission stream, said 5 method comprising: (a) providing a gas-phase emissions stream that comprises at least one contaminant; (b) contacting the gas-phase emissions stream with an additive and activated carbon particles comprising to generate contaminant-adsorbed particles; and (c) separating and/or segregating at least a portion of said contaminant adsorbed particles from said gas phase emissions stream in order to produce a contaminant reduced gas phase emissions stream.

In certain embodiments, the activated carbon particles may further comprise an additive. In various embodiments, step (b) may comprise directly adding the additive to said gas phase emissions stream. In additional embodiments, the additive may be selected from the group consisting of an acid, a base, a salt, a metal, a metal oxide, a metal hydroxide, a metal halide, iodine, an iodine compound, and various combinations thereof. In certain embodiments, the additive may be selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorspar, bentonite, calcium oxide, lime, sodium hydroxide, potassium hydroxide, hydrogen bromide, hydrogen chloride, sodium silicate, potassium permanganate, organic acids, iodine, an iodine compound, and combinations thereof. In alternative embodiments, the contaminant may be a metal selected from the group consisting of mercury, boron, selenium, arsenic, compounds thereof, salts thereof and/or mixtures thereof. In alternative embodiments, the contaminant may be a hazardous air pollutant. In alternative embodiments, the contaminant may be a volatile organic compound. In alternative embodiments, the contaminant may be a non-condensable gas selected from the group consisting of nitrogen oxides, carbon monoxide, carbon dioxide, hydrogen sulfide, sulfur dioxide, sulfur trioxide, methane, ethane, ethylene, ozone, ammonia, and/or combinations thereof.

In certain embodiments, the contaminant adsorbed carbon particles may include at least one contaminant selected from the group that consists of carbon dioxide, nitrogen oxides, mercury, sulfur dioxide, absorbed or absorbable forms thereof, reacted forms thereof, and/or mixtures thereof.

In certain embodiments, the gas phase emissions stream may be derived from, and/or arises out of, and/or is produced by combustion of a fuel comprising said activated carbon. In alternative embodiments, the gas phase emissions stream may be derived from, and/or arises out of, and/or is produced by co-combustion of coal and said activated carbon. embodiments, the gas phase emissions stream may be derived from, and or arises out of, and or is produced by co-combustion of coal and said activated carbon.

In additional embodiments, the disclosed method further comprises (d) treating said contaminant adsorbed carbon particles to regenerate the said activated carbon.

In certain embodiments, the disclosed method further comprises (d') combusting said contaminant adsorbed carbon particles in order to generate heat that may be converted to generate energy.

In certain embodiments, a disclosed method of using activated carbon to reduce mercury emissions comprises: (a) providing a gas phase emissions stream comprising mercury and gas phase stream path; (b) contacting the said gas phase emissions stream with activated carbon particles which comprises iron or an iron-containing compound to form mercury-adsorbed carbon particles; and (c) separating and/or segregating at least a portion of said mercury adsorbed carbon particles from said gas phase emissions stream and gas stream path using electrostatic precipitation, in order to produce a mercury reduced gas phase emissions stream.

In alternate embodiments, the presence of iron or an iron-containing compound in the activated carbon enhances the electrostatic precipitation, thereby improving mercury collection and control.

In alternate embodiments, the disclosed method further comprises: (d) separating and/or segregating at least a portion of said mercury adsorbed carbon particles from other electrostatic precipitates formed during step (c). In certain embodiments, the step (d) comprises exposing said mercury adsorbed carbon particles to a magnetic field and/or magnetic fields.

In alternative embodiments, a process for producing energy may comprise: (a) providing a carbon containing feedstock material; and (b) oxidizing said carbon-containing feedstock in order to generate energy and a gas phase emissions stream which is composed of at least one contaminant, wherein the activated carbon composition is within the path of the gas phase emissions stream and adsorbs at least a portion of the at least one contaminant.

In alternative embodiments, a carbon containing feedstock material comprises the at least one contaminant, or a precursor element. In certain embodiments, the carbon containing feedstock material may comprise coal and/or petroleum coke. In additional embodiments, the carbon containing feedstock material may consist essentially of a carbon source. In certain embodiments, the at least one contaminant may comprise; a metal selected from the group consisting of mercury, boron, selenium, arsenic, and/or a compound thereof, a salt thereof, and/or mixtures thereof. In certain embodiments, the at least one contaminant may comprise a hazardous air pollutant or volatile organic compound. In certain embodiments, the at least one contaminant may comprise a non condensable gas selected from the group consisting of nitrogen oxides, carbon monoxide, carbon dioxide, hydrogen sulfide, sulfur dioxide, sulfur trioxide, methane, ethane, ethylene, ozone, ammonia, and/or combinations thereof. In certain embodiments, the activated carbon comprises an additive that may be selected from the group consisting of; an acid, a base, a salt, a metal, a metal oxide, a metal hydroxide, a metal halide, iodine, an iodine compound, and/or combinations thereof. In certain embodiments, the optional additive may be selected from the group consisting of; magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorspar, bentonite, calcium oxide, lime, sodium hydroxide, potassium hydroxide, hydrogen bromide, hydrogen chloride, sodium silicate, potassium permanganate, organic acids, iodine, an iodine compound, and/or combinations thereof.

In any embodiment or method of use disclosed herein, the activated carbon may have a heat value of at least about 5,000 BTU/lb, for example about 5,000, at least about 6,000, at least about 7,000, at least about 8,000, at least about 9,000, at least about 10,000, at least about 11,000, at least about 12,000, and or greater than about 12,000 BTU/lb.

In any embodiment or method of use disclosed herein, activated carbon as disclosed herein may be added to, such as mixed with, fuel anywhere in a fuel delivery, fuel storage, fuel preparation, or fuel mixing process in any suitable location, such as a fuel yard, in storage bins, on conveyors, in mixers, during injection, as non-limiting examples. Additionally or alternatively to the foregoing, activated carbon may be added to a combustion zone or either mixed with, or independent from, other fuel source(s), as examples and without limitation, in certain embodiments the activated carbon may be provided at or before a combustion zone, at or before a burner tip, and/or before and/or concurrently with a step of oxidizing the carbon containing feedstock material.

In certain embodiments, a method of using an activated carbon to purify a liquid comprises: (a) providing a liquid comprising at least one contaminant and a liquid path; and (b) contacting said liquid with an additive and activated carbon to generate contaminant adsorbed carbon particles and a contaminant reduced liquid.

In certain embodiments, the activated carbon particles comprise an additive. In additional embodiments, the additive may be selected from the group consisting of; an acid, a base, a salt, a metal, a metal oxide, a metal hydroxide, a metal halide, iodine, an iodine compound, and/or combinations thereof. In additional embodiments, the additive may be selected from the group consisting of; magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorspar, bentonite, calcium oxide, lime, sodium hydroxide, potassium hydroxide, hydrogen bromide, hydrogen chloride, sodium silicate, potassium permanganate, organic acids, iodine, an iodine compound, and/or combinations thereof. In additional embodiments, the said at least one contaminant may be a metal selected from the group consisting of arsenic, boron, selenium, mercury, a compound thereof, a salt thereof, and/or mixtures or combinations thereof. In certain embodiments, the at least one contaminant may comprise an organic compound. In additional embodiments, the said at least one contaminant may comprise a halogen. In certain embodiments, the said at least one contaminant may comprise hydrogen sulfide. In certain embodiments, the said at least one contaminant may comprise a chlorination by-product. In certain embodiments, the said at least one contaminant comprises a pesticide or herbicide. In various embodiments, the liquid may generally comprise water.

In additional embodiments, the disclosed method further comprises treating the contaminant adsorbed carbon particles to regenerate said activated carbon. In additional embodiments, the disclosed method further comprises combusting the contaminant adsorbed carbon particles to generate heat that may be used to generate energy.

In certain embodiments, the present disclosure provides a method of removing at least a portion of a sulfur contaminant from a liquid comprising: (a) providing a liquid comprising a sulfur contaminant and a path; and (b) contacting said contaminated liquid with an additive and activated carbon particles, wherein after step (b) at least a portion of the activated carbon comprises a sulfur contaminant.

In additional embodiments, the sulfur contaminant may be selected from the group consisting of; elemental sulfur, sulfuric acid, sulfurous acid, sulfur dioxide, sulfur trioxide, sulfate anions, bisulfate anions, sulfite anions, bisulfite anions, thiols, sulfides, disulfides, polysulfides, thioethers, thioesters, thioacetals, sulfoxides, sulfones, thiosulfinates, sulfimides, sulfoximides, sulfonediimines, sulfur halides, thioketones, thioaldehydes, sulfur oxides, thiocarboxylic acids, thioamides, sulfonic acids, sulfinic acids, sulfenic acids, sulfonium, oxosulfonium, sulfuranes, persulfuranes, derivatives thereof, salts thereof and/or combinations thereof. In additional embodiments, the said sulfur contaminant may be a sulfate in an ionic and/or in a salt form. In additional embodiments, the additive may be selected from the group consisting of an acid, a base, a salt, a metal, a metal oxide, a metal hydroxide, a metal halide, iodine, an iodine compound, and/or combinations thereof. In additional embodiments, the additive may be selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorspar, bentonite, calcium oxide, lime, sodium hydroxide, potassium hydroxide, hydrogen bromide, hydrogen chloride, sodium silicate, potassium permanganate, organic acids, iodine, an iodine compound, and/or combinations thereof. In additional embodiments, step (b) may comprise the filtration and/or the operation of the general osmosis process of said liquid. In additional embodiments, step (b) may comprise contacting the liquid with an osmosis membrane which 5 may comprise said activated carbon and said additive. In additional embodiments, step (b) may comprise adding said activated carbon particles directly to the said liquid. In additional embodiments, the method may further comprise: (c) sedimentation of said activated carbon particles with the said sulfur contaminant from the said liquid. In additional embodiments, the liquid may comprise wastewater. In alternative embodiments, the wastewater may be produced by a process selected from the group consisting of metal mining, acid mine drainage, mineral processing, municipal sewer treatment, pulp and paper production, oil extraction, oil processing, natural gas cleaning and production, and ethanol production. In alternative embodiments, the liquid may be a natural body of water.

In certain embodiment, the present disclosure provides for a process to reduce concentration of sulfates in water comprising: (a) providing a volume or stream of water comprising sulfates and a path for the volume or stream; and (b) contacting the said water with an additive and activated carbon.

In additional embodiments, before step (a) the water may comprise sulfates at a concentration of greater than about 5 mg/L, and after step (b) the water may comprise sulfates at a concentration of no more than about 5 mg/L. In additional embodiments, after step (b) the water may comprise sulfates at a concentration of no more than about 4 mg/L. In additional embodiments, the water may be a wastewater stream. In alternative embodiments, the wastewater stream may be produced by a process selected from the group consisting of; metal mining, acid mine drainage, mineral processing, municipal sewer treatment, pulp and paper production, oil production, petroleum coke production, natural gas processing, and ethanol production. In alternate embodiments, the water is a natural body of water and/or a man-made body for example a tailing's pond. In additional embodiment, the additive may be selected from the group consisting of; an acid, a base, a salt, a metal, a metal oxide, a metal hydroxide, a metal halide, iodine, an iodine compound, and/or combinations thereof. In additional embodiments, the additive may be selected from the group consisting of; magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorspar, bentonite, calcium oxide, lime, sodium hydroxide, potassium hydroxide, hydrogen bromide, hydrogen chloride, sodium silicate, potassium permanganate, organic acids, iodine, an iodine compound, and/or combinations thereof.

In certain embodiments, the present disclosure provides a method for removing a sulfur contaminant from a gas phase emissions stream comprising: (a) providing a gas phase emissions stream comprising at least one sulfur contaminant and a gas phase emissions stream path or channel; (b) contacting the gas phase emissions stream with an additive and activated carbon; and (c) separating and/or segregating the at least a portion of said activated 5 carbon particles from said gas phase emissions stream after step (b).

In additional embodiments, the sulfur containing contaminant may be from the group consisting of; elemental sulfur, sulfuric acid, sulfurous acid, sulfur dioxide, sulfur trioxide, sulfate anions, bisulfate anions, sulfite anions, bisulfite anions, thiols, sulfides, disulfides, polysulfides, thioethers, thioesters, thioacetals, sulfoxides, sulfones, thiosulfinates, sulfimides, sulfoximides, sulfonediimines, sulfur halides, thioketones, thioaldehydes, sulfur oxides, thiocarboxylic acids, thioamides, sulfonic acids, sulfinic acids, sulfenic acids, sulfonium, oxosulfonium, sulfuranes, persulfuranes, salts thereof, derivatives thereof and/or combinations thereof.

In an additional embodiment, the subsequent disclosure provides a system and method of reducing or removing at least one contaminant from a gas-phase emission stream, said system and method comprising: (a) providing at least one gas-phase emissions stream and at least one contaminant; (b) contacting the said gas-phase emissions stream(s) with an additive and a pre-determined pore configuration activated carbon to generate activated carbon containing contaminants; and (c) additionally separating at least a portion of said contaminant activated carbon from said gas-phase emissions stream to produce a gas-phase emissions stream with a reduced amount of contaminants.

In an additional embodiment, the present disclosure provides a system and method to reduce mercury emissions comprising: (a) providing a gas-phase emissions stream comprising mercury; (b) contacting the gas-phase emissions stream with a pre-determined pore configuration activated-carbon particles comprising iron or an iron-containing compound in order to generate mercury-adsorbed carbon particles; and (c) separating at least a portion of the said mercury-adsorbed carbon particles from said gas-phase emissions stream by using electrostatic precipitation, this in order to produce a mercury-reduced gas-phase emissions stream.

In an additional embodiment, the present disclosure provides a system and method for removing at least a portion of a sulfur contaminant from a liquid, said system and method comprising: (a) providing a liquid comprising the sulfur contaminant; and (b) contacting said contaminated liquid with an additive and a pre-determined pore configuration activated-carbon particles, wherein after step (b) a portion of the activated carbon particles comprise a sulfur contaminant.

In an additional embodiment, the present disclosure provides a system and method to reduce a concentration of sulfates in water, said system and method comprising: (a) providing water comprising sulfates; and (b) then contacting said water with an additive and a pre-determined pore configuration activated-carbon particles.

In an additional embodiment, the present disclosure provides a system and method for removing a contaminant such as sulfur from a gas-phase emissions stream, said system and method comprising: (a) providing a gas-phase emissions stream comprising at least one sulfur contaminant; (b) contacting said gas-phase emissions stream with an additive and a pre-determined pore configuration activated carbon particles; and (c) separating the at least a portion of said activated carbon particles from said gas-phase emissions stream after step (b).

In certain embodiments, high-quality carbon materials and compositions with high fractions of fixed carbon, may be obtained by use of the disclosed processes and systems.

In additional embodiments, the gas phase emissions stream may be derived from, arises out of, or is produced by; combustion of a fuel comprising said activated carbon. In alternative embodiments, the gas phase emissions stream may be derived from, arises out of, or is produced by co-combustion of coal and said activated carbon. In additional embodiments, the additive may be selected from the group consisting of an acid, a base, a salt, a metal, a metal oxide, a metal hydroxide, a metal halide, iodine, an iodine compound, and/or combinations thereof. In alternative embodiments, the additive may be selected from the group consisting of magnesium, manganese, aluminum, nickel, iron, chromium, silicon, boron, cerium, molybdenum, phosphorus, tungsten, vanadium, iron chloride, iron bromide, magnesium oxide, dolomite, dolomitic lime, fluorite, fluorspar, bentonite, calcium oxide, lime, sodium hydroxide, potassium hydroxide, hydrogen bromide, hydrogen chloride, sodium silicate, potassium permanganate, organic acids, iodine, an iodine compound, and/or combinations thereof. In additional embodiments, step (c) may comprise a filtration step. In additional embodiments, step (c) may comprise an electrostatic precipitation step. In alternative embodiments, step (c) may comprise scrubbing.

In certain embodiments, the present disclosure provides a method for reducing and/or removing one or more contaminants from a gas and/or liquid comprising: (a) providing a gas and/or liquid stream containing one or more contaminants and a path for said gas or liquid stream; and (b) contacting said gas and/or liquid stream with a activated carbon comprising, on a dry basis, about 55-95 wt % or more total carbon, about 5-15 wt % or less hydrogen, and less than or equal to about 1 wt % nitrogen or argon, and wherein an Iodine Number having at least about 500, and wherein said composition is responsive to an externally applied magnetic field.

In certain embodiments, the present disclosure provides a method for reducing or removing one or more contaminants from a gas and/or liquid comprising: (a) providing a gas and/or liquid stream containing one or more contaminants and a path for the gas and/or liquid stream; and (b) contacting said gas and/or liquid stream with an activated carbon composition comprising, on a dry basis, about 55-95 wt % or more total carbon, about 5-15 wt % or 5 less hydrogen, and less than or equal to about 1 wt % nitrogen or argon, and an Iodine Number having at least about 500, wherein at least a portion of said activated carbon is present in the form of graphene.

In certain embodiments, the present disclosure provides a method of reducing or removing a contaminant from a liquid or gas, said method comprising: (a) obtaining an activated carbon comprising, on a dry basis, about 55-95 wt % or more total carbon, about 5-15 wt % or less hydrogen, and less than or equal to about 1 wt % nitrogen or argon, wherein at least a portion of said activated carbon is present in the form of graphene; (b) optionally separating said graphene from said activated carbon composition; and (c) contacting the liquid and/or gas with said graphene, in separated form or as part of said activated carbon composition.

In additional embodiments, the liquid may be water.

In certain embodiments, the present disclosure provides a composition comprising graphene, wherein the said graphene may be derived from an activated carbon comprising, on a dry basis, about 55-95 wt % or more total carbon, about 5-15 wt % or less hydrogen, and less than or equal to about 1 wt % nitrogen or argon; and wherein at least a portion of said carbon is present as graphene. In additional embodiments, the composition may be included in an adhesive, a sealant, a coating, a paint, an ink, a component of a composite material, a catalyst, a catalyst support, a battery electrode component, a fuel cell electrode component, a graphene based circuit or memory system component, an energy storage material or component, a supercapacitor component, a sink for static electricity dissipation, a material for electronic or ionic transport, a high bandwidth communication system component, a component of an infrared sensor, a component of a chemical sensor, a component of a biological sensor, a component of an electronic display, a component of a voltaic cell, and/or a graphene aerogel.

In certain embodiments, the present disclosure provides a method for using graphene comprising: (a) obtaining an activated carbon comprising, on a dry basis, about 55-95 wt % or more total carbon, about 5-15 wt % or less hydrogen, and less than or equal to about 1 wt % nitrogen or argon; and wherein at least a portion of said carbon is present in the form of graphene; (b) optionally separating said graphene from said activated carbon composition; (c) using said graphene, in said separated form or as part of said activated carbon composition, in an adhesive, sealant, coating, paint, and/or ink.

In alternative embodiments, the present disclosure provides a method of using graphene comprising: (a) obtaining an activated carbon comprising, on a dry basis, about 55-95 wt % or more total carbon, about 5-15 wt % or less hydrogen, and less than or equal to about 1 wt % nitrogen or argon; and wherein at least a portion of said carbon is present in the form of graphene; (b) optionally separating said graphene from said activated carbon; (c) using said graphene, in said separated form or as part of said activated carbon, as a component in a composite material to adjust mechanical or electrical properties of said composite material.

In certain embodiments, the present disclosure provides a method of using graphene comprising: (a) obtaining a activated carbon comprising, on a dry basis, about 55-95 wt % or more total carbon, about 5-15 wt % or less hydrogen, and less than or equal to about 1 wt % nitrogen or argon; and wherein at least a portion of said carbon is present in the form of graphene; (b) optionally separating said graphene from said activated carbon; (c) using said graphene, in said separated form or as part of said activated carbon, as a catalyst, a catalyst support, a battery electrode material, or a fuel cell electrode material.

In certain embodiments, the present disclosure provides a method of using graphene comprising: (a) obtaining an activated carbon comprising, on a dry basis, about 55-95 wt % or more total carbon, about 5-15 wt % or less hydrogen, and less than or equal to about 1 wt % nitrogen or argon; and wherein at least a portion of said carbon is present in the form of graphene; (b) optionally separating said graphene from said activated carbon; (c) using said graphene, in said separated form or as part of said activated carbon composition, in a graphene based circuit and/or memory system.

In certain embodiments, the present disclosure provides a method of using graphene comprising: (a) obtaining an activated carbon comprising, on a dry basis, about 55-95 wt % or more total carbon, about 5-15 wt % or less hydrogen, and less than or equal to about 1 wt % nitrogen or argon; and wherein at least a portion of said carbon is present in the form of graphene; (b) optionally separating said graphene from said activated carbon; (c) using said graphene, in said separated form or as part of said activated carbon composition, as an energy storage material and/or as a supercapacitor component.

In certain embodiments, the present disclosure provides a method of using graphene comprising: (a) obtaining an activated carbon comprising, on a dry basis, about 55-95 wt % or more total carbon, about 5-15 wt % or less hydrogen, and less than or equal to about 1 wt % nitrogen or argon; and wherein at least a portion of said carbon is present in the form of graphene; (b) optionally separating said graphene from said activated carbon; (c) using said graphene, in said separated form or as part of said activated carbon composition, as a sink for static electricity dissipation in a liquid or vapor fuel delivery system.

In certain embodiments, the present disclosure provides a method of using graphene comprising: (a) obtaining an activated carbon comprising, on a dry basis, about 55-95 wt % or more total carbon, about 5-15 wt % or less hydrogen, and less than or equal to about 1 wt % nitrogen or argon; and wherein at least a portion of said carbon is present in the form of graphene; (b) optionally separating said graphene from said activated carbon; (c) using said graphene, in said separated form or as part of said activated carbon composition, as a material for electronic or ionic transport.

In certain embodiments, the present disclosure provides a method of using graphene comprising: (a) obtaining an activated carbon comprising, on a dry basis, about 55-95 wt % or more total carbon, about 5-15 wt % or less hydrogen, and less than or equal to about 1 wt % nitrogen or argon; and wherein at least a portion of said carbon is present in the form of graphene; (b) optionally separating said graphene from said activated carbon; (c) using said graphene, in said separated form or as part of said activated carbon composition, in a high-bandwidth communication system.

In certain embodiments, the present disclosure provides a method of using graphene comprising: (a) obtaining an activated carbon comprising, on a dry basis, about 55-95 wt % or more total carbon, about 5-15 wt % or less hydrogen, and less than or equal to about 1 wt % nitrogen or argon; and wherein at least a portion of said carbon is present in the form of graphene; (b) optionally separating said graphene from said activated carbon; (c) using said graphene, in said separated form or as part of said activated carbon composition, as a component of an infrared, chemical, or biological sensor.

In certain embodiments, the present disclosure provides a method of using graphene comprising: (a) obtaining an activated carbon comprising, on a dry basis, about 55-95 wt % or more total carbon, about 5-15 wt % or less hydrogen, and less than or equal to about 1 wt % nitrogen or argon; and wherein at least a portion of said carbon is present in the form of graphene; (b) optionally separating said graphene from said activated carbon; (c) using said graphene, in said separated form or as part of said activated carbon composition, as a component of an electronic display.

In certain embodiments, the present disclosure provides a method of using graphene comprising: (a) obtaining an activated carbon comprising, on a dry basis, about 55-95 wt % or more total carbon, about 5-15 wt % or less hydrogen, and less than or equal to about 1 wt % nitrogen or argon; and wherein at least a portion of said carbon is present in the form of graphene; (b) optionally separating said graphene from said activated carbon; (c) using said graphene, in said separated form or as part of said activated carbon composition, as a component of a photovoltaic cell.

In certain embodiments, the present disclosure provides a method of using graphene comprising: (a) obtaining an activated carbon comprising, on a dry basis, about 55-95 wt % or more total carbon, about 5-15 wt % or less hydrogen, and less than or equal to about 1 wt % nitrogen or argon; and wherein at least a portion of said carbon is present in the form of graphene; (b) optionally separating said graphene from said activated carbon; (c) using said graphene, in said separated form or as part of said activated carbon composition, to form a graphene aerogel.

In certain embodiments, providing a method of using activated carbon to reduce emissions, the method comprising: (a) providing activated carbon particles; (b) providing a gas phase emissions stream comprising at least one selected contaminant and a path or duct for the gas phase emissions stream; (c) providing an additive which is introduced into the activated carbon, selected to assist in removal of the contaminant from the gas phase emissions stream; (d) introducing the activated carbon particles with the additive into the gas phase emissions stream(s), in order to adsorb at least a portion of said contaminant affixed to said activated carbon particles, thereby generating contaminant adsorbed activated carbon particles within the gas phase emissions stream; and (e) separating and/or segregating at least a portion of the said contaminant adsorbed activated carbon material from the gas-phase emissions stream, in order to produce a contaminant reduced gas phase emissions stream.

In certain embodiments, the activated carbon composition comprises 55-95 wt % or more total carbon; 5-15 wt % or less hydrogen; 1 wt % or less nitrogen or argon; 0.5-3 wt % or less phosphorus; and 0.2-4 wt % or less sulfur. The additive may be provided as part and/or co-mingled with the activated carbon material. Alternatively, and/or additionally, the additive may be introduced directly, intermittently and/or continuously, into the gas-phase emissions stream.

The additive which may be used to assist in removal of the selected contaminant from the gas phase emissions stream, can be selected from; an acid, a base, a salt, a metal, a metal oxide, a metal hydroxide, a metal halide, iodine, an iodine compound, and/or a combination thereof. In additional embodiments, the additive may comprise iodine or an iodine compound, or a combination of iodine and/or one or more iodine compounds, which may be optionally dissolved in a solvent.

In additional embodiments, the contaminant may be a metal, such as a metal from the group consisting of mercury, boron, selenium, arsenic, and/or any compound, salt, and mixture thereof. In additional embodiments, the selected contaminant may be a hazardous air pollutant and/or a volatile organic compound. In additional embodiments, the selected contaminant may be a non-condensable gas which may be from the group consisting of; nitrogen oxides, carbon monoxide, carbon dioxide, hydrogen sulfide, sulfur dioxide, sulfur trioxide, methane, ethane, ethylene, ozone, ammonia, and/or combinations thereof.

In additional embodiments, contaminant adsorbed carbon material may include, in absorbed, adsorbed, or a reacted form, at least one, two, three, and/or all contaminants from the group consisting of; carbon dioxide, nitrogen oxides, mercury, and sulfur dioxide.

In additional embodiments, the gas phase emissions stream may be derived from the combustion of a fuel comprising the activated carbon composition. In additional embodiments, the gas phase emissions stream may be derived from co-combustion of coal and the activated carbon composition.

In certain embodiments, the separating in step (e) may comprise filtration, which may for example utilize fabric type filters. In additional embodiments, the separating in step (e) comprises a process of electrostatic precipitation. Scrubbing, which may include wet or dry scrubbing, may also be exploited. Additionally, the contaminant adsorbed carbon particles may be treated in order to regenerate the activated carbon material. In additional embodiments, the contaminant adsorbed carbon material may be thermally oxidized catalytically or non-catalytically. Additionally, the contaminant adsorbed carbon particles, or a regenerated form, may be combusted to provide heat that may be used to generate energy and/or gasified to provide syngas.

In additional embodiments, a method of using activated carbon material to reduce mercury emissions, comprises: (a) providing activated carbon material composition that includes an additive comprising iodine or an iodine containing compound; (b) providing a gas phase emissions stream comprising mercury and a path or channel for the gas phase emission stream; (c) introducing the activated carbon material into the gas phase emissions stream, to adsorb at least a portion of said mercury onto the activated carbon material, thereby generating mercury adsorbed activated carbon material within the gas phase emissions stream; and (d) separating and/or segregating at least a portion of the mercury adsorbed activated carbon material from the gas phase emissions stream by using electrostatic precipitation, in order to produce a mercury reduced gas phase emissions stream.

In additional embodiments, a process for energy production is provided, the process comprising: (a) providing a carbon containing feedstock material comprising; and (b) oxidizing the carbon containing feedstock material to generate heat that may be used to generate energy and a gas phase emissions stream, wherein the use of the activated carbon composition within the carbon containing feedstock material is effective to adsorb at least one contaminant that has been produced as a by-product of the oxidizing and/or derived from the carbon containing feedstock material, thereby reducing emissions of the contaminant, and additionally where the activated carbon material may further include an additive that may be selected from; an acid, a base, a salt, a metal, a metal oxide, a metal hydroxide, a metal halide, iodine, an iodine compound, and/or a combination thereof.

In certain embodiments, the contaminant, and/or a precursor thereof, may be contained within the carbon containing feedstock material. In additional embodiments, the contaminant may be produced as a by-product of oxidizing. The carbon source feedstock may further comprise biomass, coal, oil, petroleum coke, gas matter or by product, or another carbonaceous feedstock.

In certain embodiments, contaminant may be a metal from the group consisting of; mercury, boron, selenium, arsenic, and any compound, salt, and/or mixture thereof, a hazardous air pollutant; a volatile organic compound; or a non-condensable gas from the group consisting of; nitrogen oxides, carbon monoxide, carbon dioxide, hydro-gen sulfide, sulfur dioxide, sulfur trioxide, methane, ethane, ethylene, ozone, ammonia; and/or combinations thereof.

In certain embodiments, a method of using activated carbon composition to purify a liquid, comprises: (a) providing an activated carbon material; (b) providing a liquid that comprises at least one contaminant; (c) providing an additive selected to assist in removal of the contaminant from the said liquid; and (d) contacting the said liquid with the said activated carbon material and the said additive, in order to adsorb at least a portion of the at least one said contaminant onto or into the activated carbon particles, thereby resulting in contaminant adsorbed carbon particles and a contaminant reduced liquid material.

The said additive may be provided as part of the activated carbon material and/or introduced directly into the liquid. The said additive may be an acid, a base, a salt, a metal, a metal oxide, a metal hydroxide, a metal halide, iodine, an iodine compound, and/or a combination thereof.

In certain embodiments, the additive may comprise iodine that may be present in the activated carbon as absorbed or intercalated molecular $I_2$, physically or chemically adsorbed molecular $I_2$, absorbed or intercalated atomic I, physically or chemically adsorbed atomic I, and/or a combination thereof.

In certain embodiments, the additive may comprise an iodine containing compound, such as a compound from the group consisting of; iodide ion, hydrogen iodide, an iodide salt, a metal iodide, ammonium iodide, an iodine oxide, triiodide ion, a triiodide salt, a metal triiodide, ammonium triiodide, iodate ion, an iodate salt, a polyiodide, iodoform, iodic acid, methyl iodide, an iodinated hydrocarbon, periodic acid, orthoperiodic acid, metaperiodic acid, and/or combinations, salts, acids, bases, and/or derivatives thereof.

It should be noted that additives may result in a final product with higher energy content and/or energy density. Such an increase in energy content may be resultant from an increase in total carbon, fixed carbon, volatile carbon, or even hydrogen. In addition, the increase in energy content may be a result of the removal of non-combustible matter and/or from removal of material having lower energy density than carbon. In additional embodiments, additives may reduce the extent of liquid formation, rather favoring of solid and gas formation, or favoring of solid formations.

In additional embodiments, additives may chemically modify the starting carbon source material, or the treated carbon source material prior to pyrolysis, which may also lead to a reduced rupturing of cell walls offering for greater strength and integrity and may also be used to specifically tailor the pore size and distribution to ensure an optimal coupling and performance of an electrolyte. In additional embodiments, additives may also be used to increase fixed carbon content of carbon source feedstock prior to pyrolysis.

It should be noted additives may result in a final activated carbon product with improved mechanical properties, such as yield strength, compressive strength, tensile strength, fatigue strength, impact strength, elastic modulus, bulk modulus, and/or shear modulus. Additionally, additives may improve mechanical properties by simply being present for instance the additive itself imparts strength to the mixture or due to some transformation that takes place within the additive phase or within the resulting final mixture. In additional embodiments, reactions such as vitrification may occur such as within a portion of the activated carbon material that includes the additive, which may improve the final strength.

It should be noted that chemical additives may be applied to wet or dry carbon source material. It should also be noted that additives may be applied as a solid powder, a spray, a mist, a liquid, or a vapor. In additional embodiments, additives may be introduced through spraying of a liquid solution an example being an aqueous solution or mixed in a solvent, or by soaking in tanks, bins, bags, and/or other containers.

In alternate embodiments, a dip pre-treatment may be used where the solid feedstock may be dipped into a container comprising the additive and may comprise additional materials such as diluents such as water, either batchwise or continuously, which may be for a time sufficient to allow penetration of the additive into the carbon source material.

In additional embodiments, additives applied to the carbon source feedstock may reduce energy requirements for the pyrolysis process, and/or increase the yield of the carbonaceous product. In additional embodiments, additives applied to the carbon source feedstock may provide functionality that is desired for the intended use of the carbonaceous product, as will be further described below.

In certain embodiments, the process for producing activated carbon may further comprise a step of sizing for instance; sorting, screening, classifying, and so on for the warm or cool pyrolyzed carbon material to form sized pyrolyzed carbon. The sized pyrolyzed carbon may then be used in applications which call for an activated carbon product having a certain particle size and/or specific characteristics for instance a specific distribution of pores such as micro and meso pores.

In different embodiments, the process capacity and/or throughput, may vary widely from small laboratory scale production to full scale commercial bio-refineries, including any pilot, demonstration, or semi-commercial scale production facility. In additional embodiments, the process capacity is at least about 1 kg a day, 10 kg a day, 100 kg a day, 1 ton a day where all tons are metric tons, 10 tons a day, 100 tons a day, 500 tons a day, 1000 tons a day, 2000 tons a day, 10,000 tons a day, 50,000 tons a day, or higher.

In additional embodiments, a portion of activated carbon produced may be recycled to the front end, or at various stages, of the process, for instance to the drying or deaeration unit or directly to the device or reactor, or for contaminant removal or reduction from exhaust gas streams or discharge affluent water streams. When returning the activated carbon to the front end and passing it through the process again, treated carbon source solids may become higher in fixed carbon. Throughout the process the solid, liquid, and gas streams produced as a result of production or existing as part of the process can be independently filtered, recycled, passed to subsequent steps, and/or removed or purged from the process at any point or volume.

In certain embodiments, pyrolyzed material may be recovered and then fed to a separate reactor for a further pyrolysis process, this in order to create a material with higher carbon purity. In additional embodiments, the secondary process may occur in a simple design for instance a container, such as a steel drum, where heated inert gas for instance heated $N_2$ may be passed through. Alternative containers that may be useful for this purpose include; process tanks, barrels, bins, totes, sacks, and roll-offs. In addition, a secondary sweep gas with volatiles may be sent to the process gas heater, or back to the main device. In these embodiments, in order to cool the final product, another stream of inert gas, which may be initially at ambient temperature, may be passed through the solids to cool the said solids, then returned to an inert gas preheat system and/or the device. In additional embodiments, the secondary process may take place in a separate carbonization or pyrolysis reactor, where preheated substantially inert gas may be inputted to pyrolyze the material and drive the carbonization reaction.

For the many embodiments, the device may include a purging means for removing oxygen from the system. As an example, purging means may comprise one or more inlets to introduce a substantially inert gas, and/or one or more outlets to remove the substantially inert gas and displaced oxygen from the device and/or system. In additional embodiments, the purging means may be a deaerator disposed in operable communication between the dryer and the reactor.

The device may be configured with at least a first gas inlet and a first gas outlet. The first gas inlet and the first gas outlet may be disposed of and in communication with a plurality of different zones, or with the same zone or zones.

In certain embodiments, the device is configured with a second gas inlet and/or a second gas outlet. In alternative embodiments, the device is configured with a third gas inlet and/or a third gas outlet. In alternative embodiments, the device is configured with a fourth gas inlet and/or a fourth gas outlet.

In alternative embodiments, each zone present in the device is configured with a gas inlet and a gas outlet.

It should be explained that gas inlets and outlets not only provide introduction and withdrawal of vapor, but gas outlets, as or with additional probes, in particular allow precise process monitoring and control of the various stages of the process, which may include all of the stages of the process. It should be understood that precise process monitoring may result in yield and efficiency improvements, both dynamically as well as over a period of time, this may be especially recognisable when operational history can be utilized to regularly adjust process conditions.

In certain embodiments, a reaction gas probe may be disposed in operable communication with the pyrolysis zone. It should be noted that a reaction gas probe may be useful to extract gases and analyze them, which may be used in order to determine extent of reaction, pyrolysis selectivity, or other process monitoring and information retrieval. It should be noted, that based on a measurement, the process or device systems may be controlled or adjusted in any number of ways, such as by adjusting feed rate, rate of inert gas sweep, temperature this may be for one or more zones, pressure which may be of one or more zones, additives and additive control.

As explained herein, and intended, "monitor and control" via reaction gas probes should be construed to include any one or more sample extractions via reaction gas probes, and/or optionally making the process or equipment adjustments based on the measurements, if deemed necessary or desirable, using well-known principles of process control such as feedback, feedforward, proportional-integral-derivative logic.

It should be noted that a reaction gas probe may be configured to extract gas samples in a variety of ways. As examples, a sampling line may have a lower pressure than the pyrolysis reactor pressure, when the sampling line is opened a specified amount of gas can readily be extracted from pyrolysis zone. Additionally, the sampling line may be under vacuum, such as when the pyrolysis zone is near atmospheric pressure. Generally, a reaction gas probe will be associated with one gas output, and/or a portion thereof, for example a line split from a gas output line.

In certain embodiments, both a gas input and a gas output may be utilized as a reaction gas probe by periodically introducing an inert gas into a zone, and thereby pulling the inert gas with a process sample out of the gas output. In certain embodiments, such an arrangement could be used in a zone that does not otherwise have a gas inlet or outlet for the substantially inert gas for processing, or, the reaction gas probe could be associated with a separate gas inlet or outlet that is in addition to process inlets and/or outlets. In additional embodiments, a sampling of inert gas that is introduced and extracted periodically for sampling, for embodiments that utilize samples, could even be different than the processing inert gas, which may be for reasons of accuracy in analysis or to introduce an analytical tracer.

As examples, acetic acid concentration in the gas phase of the pyrolysis zone may be measured using a gas probe to extract a sample, which may then be analyzed using a suitable technique, for instance gas chromatography, GC; mass spectroscopy, MS; GC-MS, or Fourier-Transform Infrared Spectroscopy, FTIR. CO and/or the $CO_2$ concentration in the gas phase could be measured and used as an indication of the pyrolysis selectivity toward gases and/or vapors. Additionally, terpene concentration in the gas phase may be measured and used as an indication of the pyrolysis selectivity toward liquids.

In certain embodiments, the system may further comprise at least one additional gas probe disposed in operable communication with the cooling zone, or with the drying zone if part of the device or the preheating zone if part of the device.

As possible examples of the pyrolysis reactor or reactors may be selected from any suitable reactor configuration which is capable of carrying out the pyrolysis process. Exemplary reactor configurations may include, non-limiting examples of; fixed-bed reactors, fluidized-bed reactors, entrained-flow reactors, augers, rotating cones, rotary drum kilns, calciners, roasters, moving-bed reactors, transport-bed reactors, ablative reactors, rotating cones, or microwave-assisted pyrolysis reactors.

In certain embodiments where an auger is used, sand or another heat carrier can optionally be employed, as an example, the feedstock and sand can be fed at one end of a screw. The auger screw can mix the sand and feedstock and then convey them through the reactor. In this example the screw can provide control of the feedstock residence time and doesn't dilute the pyrolyzed material with a carrier or fluidizing gas, where the sand may be reheated in a separate vessel.

In certain embodiments where an ablative process is used, the feedstock may be moved at a high speed against a hot metal surface. Ablation of char forming at the surfaces can maintain a high rate of heat transfer. Where this apparatus may prevent dilution of material. Additionally, the feedstock particles may be suspended in a carrier gas and forced at a high speed through a cyclone whose wall(s) is heated.

In additional embodiments where a fluidized-bed reactor is used, the feedstock may be introduced into a bed of hot sand fluidized by a gas, this is typically a recirculated product gas. As examples the reference to "sand" is meant to include similar, substantially inert materials, such as glass particles, recovered ash particles, and similar materials. As referenced high heat-transfer rates from fluidized sand or similar materials can result in rapid heating of the feedstock. Where there may be some ablation by attrition with the sand or similar particles. Heat may be provided by heat-exchanger tubes where hot combustion gas flows.

Circulating fluidized-bed reactors may be employed, wherein gas, sand or similar material, and feedstock move together. Examples of exemplary transport gases include recirculated product gases and/or combustion gases. Wherein the high heat-transfer rates from the sand ensure rapid heating of the feedstock, and ablation may be expected to be stronger than with standard fluidized beds. It should be noted a separator(s) may be employed to separate the product gases from the sand and/or char particles. It should be noted that the sand particles can be reheated in a fluidized burner vessel and recycled to the reactor.

In certain embodiments, the device is a continuous reactor comprising a feedstock inlet, a plurality of spatially separated zones configured for separately controlling the temperature, carbon source material transport, and mixing within each of the zones, and a carbon material outlet, and where one of the zones may be configured with a first gas inlet for introducing a substantially inert gas into the device or the zone(s), and wherein one or more of the zones may be configured with a first gas outlet.

In certain embodiments the reactor includes at least a plurality of; two, three, four, or more zones. Wherein each of the zones may be disposed in communication with separately adjustable heating means selected from the group consisting of electrical heat transfer, steam heat transfer, hot-oil heat transfer, phase-change heat transfer, waste heat transfer, and/or combinations. In additional embodiments, at least one zone may be heated with an effluent stream from the process gas heater, if present.

The device may be configured for separately adjusting the gas phase composition and gas phase residence time of at least two of the zones, which additionally may be up to and including all zones present in the device.

The device may be equipped with a second gas inlet and/or a second gas outlet, wherein in additional embodiments, the device is configured with a gas inlet for each zone. In additional embodiments, the device is configured with a gas outlet for each zone. The device may be a co-current or countercurrent reactor(s).

In certain embodiments, the material feed system may comprise a screw or auger feed mechanism. In additional embodiments, the carbon source material outlet comprises a screw or auger output mechanism.

In certain embodiments, the device may utilize a rotating calciner with a screw material feed system. In additional embodiments, some or all of the device is axially rotatable, for example it spins about its centerline axis, wherein the speed of rotation may impact the solid flow pattern, and heat and the mass transport. It should be noted that each of the zones may be configured with flights disposed on internal walls, which may provide agitation of solids, where the flights may be separately adjustable in each of the zones.

In additional embodiments, alternative means of agitating solids may be employed, such as augers, screws, or paddle conveyors. In certain exemplified embodiments, the device includes a single, continuous auger disposed throughout each of the zones. In additional embodiments, the device and/or reactor includes twin screws disposed throughout each of the zones.

In certain embodiments, the system may be designed specifically with the capability to maintain the approximate size of feed material throughout the process, in order to process the carbon source feedstock without destroying or significantly damaging its structure. In additional embodiments, the pyrolysis zone does not contain augers, screws, or rakes that may greatly reduce the size of feed material being pyrolyzed.

In certain embodiments, the system further includes a process gas heater disposed in operable communication with the outlet at which condensable vapors and non-condensable gases may be removed. The said process gas heater may be configured to receive a separate fuel, such as natural gas, and an oxidant, such as air, into the combustion chamber, which may be adapted for combustion of the fuel and at least a portion of the condensable vapor(s). In addition, certain non-condensable gases may also be oxidized, such as CO or $CH_4$, to $CO_2$.

In certain embodiments when a process gas heater is employed, the system may include a heat exchanger disposed between the process gas heater and the dryer, which may be configured to utilize at least some of the heat from the combustion for the dryer. It should be noted this embodiment can contribute significantly to the overall energy efficiency of the process.

In certain embodiments, the system may further comprise a material enrichment unit, disposed in operable communication with the cooler, which may be configured for combining condensable vapors, in at least partially condensed form, with the carbon material solids. Wherein the material enrichment unit may increase the carbon content of the activated carbon obtained from the carbon recovery unit.

In certain embodiments, the system may further include a separate pyrolysis zone adapted to further pyrolyze the activated carbon to further increase its carbon content. Wherein the separate pyrolysis zone may be a relatively simply container, unit, or device, such as a tank, barrel, bin, drum, tote, sack, or roll-off.

In certain embodiments, the overall system may be at a fixed location, or it may be made portable. Additionally, the system may be constructed using modules which may be simply duplicated for commercial scale-up. In certain embodiments, the system may also be constructed using economy-of-scale principles, as is well known for process industries.

In additional embodiments, separation techniques can include or use distillation columns, flash vessels, centrifuges, cyclones, membranes, filters, packed beds, capillary columns. Additionally, separation can be principally based, for example, on distillation, absorption, adsorption, or diffusion, and can utilize differences in vapor pressure, activity, molecular weight, density, viscosity, polarity, chemical functionality, affinity to a stationary phase, and/or any combinations thereof.

In certain embodiments, the first and second output streams may be separated from the intermediate feed stream based on relative volatility. As an example, the separation unit may be a distillation column, a flash tank, and/or a condenser.

In certain embodiments, the first and second output streams may be separated intermediate feed stream based on relative polarity. As an example, the separation unit may be a stripping column, a packed bed, a chromatography column, or membranes.

In certain embodiments, the first output stream comprises polar compounds, and the second output stream comprises non-polar compounds. As a result, the polar compounds may include at least one carbon-containing molecule selected from the group consisting of methanol, furfural, and acetic acid. As a result, the non-polar compounds may include at least one carbon-containing molecule selected from the group consisting of carbon monoxide, carbon dioxide, methane, a terpene, and a terpene derivative.

In certain embodiments, further separations may be employed to recover one or more non-condensable gases or condensable vapors, for use within the process and/or further processing. As an example, further processing may be included in order to produce refined CO or syngas.

In certain embodiments, separation of acetic acid may be conducted, followed by reduction of the said acetic acid into ethanol.

In certain embodiments, an activated carbon production system comprises: (a) a material feed system configured to introduce a carbon source feedstock; (b) an optional dryer, disposed in operable communication with the material feed system, which is configured to remove moisture contained within a carbon source feedstock; (c) a device, disposed in operable communication with the dryer, wherein the device contains at least a pyrolysis zone disposed in operable communication with a spatially separated cooling zone, and wherein the device may be configured with an outlet to remove condensable vapors and non-condensable gases from carbon solids; (d) a cooler, disposed in operable communication with the device; (e) a carbon source material enrichment unit, disposed in operable communication with the cooler, configured in order to pass the condensable vapors and/or the non-condensable gases across the solids, in order to form enriched solids with increased carbon content; and (f) the carbon recovery unit, disposed in operable communication with the material enrichment unit.

The system may further incorporate a preheating zone, disposed in operable communication with the pyrolysis zone. In additional embodiments, the dryer may be configured as a drying zone within the device. It should be noted that each of the zones may be located within a single device or in separate devices, and additionally the cooler may be disposed within the device.

In certain embodiments, the cooling zone may be configured with a gas inlet, and the pyrolysis zone may be configured with a gas outlet, in order to generate substantially countercurrent flow of the gas phase relative to the solid phase. In additional embodiments, the preheating zone and/or the drying zone, or a dryer, may be configured with a gas outlet, to generate substantially countercurrent flow of the gas phase relative to the solid phase.

In additional embodiments following formation from pyrolysis, the activated carbon may be pulverized into a powder. "Pulverization" in this example is meant to include any sizing, milling, pulverizing, grinding, crushing, extruding, or other primarily mechanical treatment to reduce the average particle size and uniform particle shape. In certain embodiments the mechanical treatment may be assisted by chemical or electrical forces. It should be noted that pulverization may be a batch, continuous, or semi-continuous process which may be carried out at a different location than that of formation of the pyrolyzed solids.

In certain embodiments, there may be the incorporation of additives into the process, into the product, or both. In additional embodiments, the activated carbon includes at least one process additive incorporated during the process.

In certain embodiments, a separation step may include filtration, for instance fabric filters or electrostatic precipitation (ESP). It should be understood fabric filters, also known as baghouses, may utilize engineered fabric filter tubes, envelopes, or cartridges. Additionally, there are several types of baghouses, including pulse-jet, shaker-style, and reverse-air systems. It should be noted that the separation in step may also include scrubbing.

In certain embodiments, an electrostatic precipitator, or electrostatic air cleaner, or a particulate collection device that removes particles from a flowing gas using the force of an induced electrostatic charge may be used in conjunction with the device. It should be noted that electrostatic precipitators are highly efficient filtration devices that minimally impede the flow of gases through the device, and can easily remove fine particulate matter from an air stream.

In certain embodiments, an electrostatic precipitator may be used for different aspects or uses of or for the device, which may be dry or wet. It should be understood that a wet electrostatic precipitator operates with saturated gas streams to remove liquid droplets such as sulfuric acid mist from industrial process gas streams. In certain embodiments wet electrostatic precipitators may be useful when the gases are high in moisture content, contain combustible particulate, or have particles that are sticky in nature.

In certain embodiments, the contaminant-adsorbed carbon particles may be treated to regenerate the activated carbon particles. In additional embodiments, the method may include thermally oxidizing the contaminant adsorbed carbon particles. The contaminant adsorbed carbon particles, or a regenerated form thereof, may additionally be combusted to provide energy.

In certain embodiments, relating specifically to mercury removal, a method of using activated carbon composition to reduce mercury emissions comprises: (a) providing activated carbon particles comprising a composition that includes iron or an iron-containing compound; (b) providing a gas phase emissions stream that contains mercury; (c) introducing the activated carbon particles into the gas-phase emissions stream, in order to adsorb at least a portion of the said mercury onto the activated carbon particles, thereby generating mercury adsorbed carbon particles within the gas-phase emissions stream; and (d) separating at least a portion of the said mercury adsorbed carbon particles from the gas-phase emissions stream using electrostatic precipitation and/or filtration, to produce a mercury reduced gas-phase emissions stream.

In additional embodiments, a method of using activated carbon composition to reduce emissions for example mercury and may further comprise using the activated carbon as a fuel source. In additional embodiments, the high heat value of the activated carbon product can be utilized in addition to its ability to reduce emissions by adsorbing, absorbing and/or chemisorbing potential pollutants. In an embodiment, the activated carbon product, when used as a fuel source and as a mercury control product, prevents at least 70% of mercury from emanating from a power plant, for example about 70%, about 75%, about 80%, about 85%, about 90%, about 95%, about 96%, about 97%, about 98%, 98.5%, about 99%, about 99.1%, about 99.2%, about 99.3%, about 99.4%, about 99.5%, about 99.6%, about 99.7%, about 99.8%, about 99.9%, or greater than about 99.9% of mercury.

In certain embodiments, a magnetic activated carbon product can be separated out of the ash stream. Under the ASTM standards for use of fly ash in cement, the fly ash is required to come from coal products.

In certain embodiments, the same activated carbon may be used in multiple processes, either in an integrated way or in sequence, an activated carbon may, at the end of its useful life as a performance material, then be introduced to a combustion process for energy value or to a metal process as examples.

In certain embodiments liquid filtration may be done by the activated carbon and may be an aqueous liquid, such as water. In additional embodiments, the water is wastewater associated with a process selected from the group consisting of metal mining, acid mine drainage, mineral processing, municipal sewer treatment, pulp and paper, ethanol, and any other industrial process.

The accompanying description should not be construed as limiting in any way as to the potential applications of the activated carbon. Injection of activated carbon into gas streams may be useful for control of contaminant emissions in gas streams or liquid streams derived from coal-fired power plants, biomass-fired power plants, metal processing plants, crude-oil refineries, chemical plants, polymer plants, pulp and paper plants, cement plants, waste incinerators, food processing plants, gasification plants, and syngas plants. Essentially any industrial process or site that employs fossil fuel or biomass for generation of energy or heat, may benefit from gas treatment by the activated carbon described herein. While for liquid-phase applications, a wide amount of industrial processes that use or produce liquid streams may benefit from treatment by the activated carbon described herein.

In exemplary embodiments, activated carbon may be injected, such as into the ductwork, which may be upstream of a particulate matter control device, such as an electrostatic precipitator and/or fabric filter. In additional embodiments, a flue gas desulfurization, dry or wet, system may be downstream of the activated carbon injection point. In additional embodiments, the activated carbon may be pneumatically injected as a powder.

The activated carbon provided by the present disclosure has a wide range of commercial uses, examples being without limitation, the activated carbon may be utilized in emissions control, water purification, groundwater treatment, wastewater treatment, air stripper applications, PCB removal applications, odor removal applications, soil vapor extractions, manufactured gas plants, industrial water filtration, industrial fumigation, tank and process vents, pumps, blowers, filters, pre-filters, mist filters, ductwork, piping modules, absorbers, and columns, batteries, capacitors, and/or supercapacitors.

The energy storage production device may include different aspects for producing energy storage devices such as and including; producing a desired activated carbon; material mixing; material application such as winding, rolling, cutting, layering, of electrodes and current collectors; assembly of energy storage devices and their contents; welding or current collector leads and terminals; electrolyte mixing; electrolyte injection or saturation; container sealing; vacuum function capability; producing a completed energy storage device for instance a supercapacitor or battery.

It should be noted that the device may include a continuous operation from raw materials into a finished energy storage device, where the device is mechanically coupled for all of the aspects of the process, or the device may be separated into a plurality of different individual sections or zones, individual processes, consecutive processes, with a single or plurality of devices. Additionally various embodiments may include a production process that is continuous to produce, from raw carbon source to a predesigned activated carbon, finished electrode material, or mix, and then may additionally include a further production process to construct and then complete an energy storage device, where a supercapacitor is the preferred energy storage device.

The invention claimed is:

1. An electrostatic storage device comprising:
 a container with a cover removably attached to the container, allowing access to internal contents of said electrostatic storage device, the internal contents comprising an electrolyte and a module comprising electrodes including activated carbon and separators arranged in layers, wherein:
 the electrodes are separated by at least one said separator; and
 the electrodes and the separators comprise perforations that are aligned through the layers; and wherein:
 the activated carbon comprises a plurality of pores of which:
 over 87% by volume are micropores having diameters less than 2 nm;
 0.001%-2% by volume are macropores having diameters greater than 50 nm; and
 the remainder by volume are mesopores having diameters in a range of 2 nm to 50 nm.

2. The electrostatic storage device of claim 1 wherein said cover is attached to the container except when the cover is removed from the container, in which case the internal contents of the electrostatic storage device are accessible for servicing.

3. The electrostatic storage device of claim 1 wherein said electrostatic storage device has gasket material forming a seal between the container and the cover.

4. The electrostatic storage device of claim 1 wherein said electrostatic storage device is a capacitor, an ultracapacitor, a supercapacitor, a double-layer electrolytic capacitor, or a hybrid capacitor.

5. The electrostatic storage device of claim 1 wherein when said electrolyte is administered during servicing, saturation of the electrodes and conductive energy storage materials of the electrostatic storage device occurs.

6. The electrostatic storage device of claim 1 wherein said container is resealable.

7. The device of claim 1 wherein the electrolyte is liquid electrolyte.

8. The device of claim 1, wherein the layers are flat and the electrodes and the separators form a cuboid.

9. The device of claim 1, wherein the container comprises an inlet port and an outlet port.

10. The device of claim 1, wherein the module is removable from the container as a cartridge.

11. The device of claim 1 wherein:
 the electrolyte is administered, re-administered, removed, or additional electrolyte is added to the container while the cover is open; and
 the electrolyte and the additional electrolyte, when added, are injected into the perforations allowing saturation of the electrodes and the separators.

12. The electrostatic storage device of claim 1 wherein the electrolyte has an average of solvated ion sizes equal to or less than 1 nm.

13. The electrostatic storage device of claim 1, wherein up to 95% by volume of the plurality of pores are the micropores.

14. The electrostatic storage device of claim 1, wherein a majority of the mesopores have diameters in a range of 2 nm to 5 nm.

15. The electrostatic storage device of claim 1, wherein:
 at least some of the micropores are connected to at least some of the mesopores; and
 at least some of the mesopores, to which micropores are connected, are connected to at least some of the macropores.

16. The electrostatic storage device of claim 1, wherein the layers are segmented.

17. A system comprising multiple electrostatic storage devices,
 each electrostatic storage device comprising:
 a container with a cover removably attached to the container, allowing access to internal contents of said electrostatic storage device, the internal contents comprising an electrolyte and a module comprising electrodes including activated carbon and separators arranged in layers, wherein:
 the electrodes are separated by at least one said separator; and
 the electrodes and the separators comprise perforations that are aligned through the layers; and wherein:
 the activated carbon comprises a plurality of pores of which:
 over 87% by volume are micropores having diameters less than 2 nm;
 0.001%-2% by volume are macropores having diameters greater than 50 nm; and
 the remainder by volume are mesopores having diameters in a range of 2 nm to 50 nm.

18. The system of claim 17 wherein, for each electrostatic storage device, said cover is attached to the container of the electrostatic storage device except when said cover is removed from the container of the electrostatic storage device, in which case the internal contents of the electrostatic storage device are accessible for servicing.

19. The system of claim 17 wherein each electrostatic storage device has gasket material forming a seal between the container and the cover.

20. The system of claim 17 wherein each electrostatic storage device is a capacitor, an ultracapacitor, a supercapacitor, a double-layer electrolytic capacitor, or a hybrid capacitor.

21. The system of claim 17 wherein when said electrolyte is administered during servicing, saturation of the electrodes and conductive energy storage materials of the respective electrostatic storage device occurs.

22. The system of claim 17 wherein said container of each electrostatic storage device is resealable.

23. The system of claim 17 wherein:
the electrolyte is administered, re-administered, removed, or additional electrolyte is added to the container while the cover is open; and
the electrolyte and the additional electrolyte, when added, are injected into the perforations allowing saturation of the electrodes and the separators.

24. A capacitor comprising a casing, said casing comprising in combination, a pair of spaced apart electrodes including activated carbon derived from a low-cost carbon source and with a conductive additive, and an ion permeable separator material between said electrodes, the capacitor further comprising:
(a) means on said casing to connect said electrodes to a source of power;
(b) an electrolyte fluid in said casing, the electrolyte fluid contacting said electrodes and said ion permeable separator material;
(c) means for said casing to be composed of a container with a cover removably attached to the container that allows access to internal contents of said casing;
(d) means for said electrodes and said ion permeable separator material to be in layers and have perforations passing through the layers, the electrodes being separated by at least one separator comprising said ion permeable separator material;
(e) means for said capacitor to have said electrolyte fluid re-administered, said electrolyte fluid removed, and have additional electrolyte fluid added to the container with the cover open; and
(f) means for said capacitor to have said container resealed;
wherein the activated carbon comprises a plurality of pores of which:
over 87% by volume are micropores having diameters less than 2 nm;
0.001%-2% by volume are macropores having diameters greater than 50 nm; and
the remainder by volume are mesopores having diameters in a range of 2 nm to 50 nm.

25. The capacitor of claim 24 wherein the carbon source is selected from a group consisting of coal, bituminous coke, petroleum coke, and a product derived from waste or biomass, or is any combination selected therefrom.

26. The capacitor of claim 24 wherein the electrolyte fluid is a cosolvent salt electrolyte and has ingredients of sodium perchlorate with a general formula of $NaClO_4$, acetonitrile with a general formula of $CH_3CN$, and water.

27. The capacitor of claim 24 wherein the electrolyte fluid has a molar ratio of approximately 7-8, consisting of 1-part sodium perchlorate to 1.5 parts water to 2.4 parts acetonitrile.

28. The capacitor of claim 24 wherein the electrolyte fluid has a molar ratio in a range of 4-10, the electrolyte fluid consisting of a range of 0.25 up to 2 parts sodium perchlorate and a range of 0.25 up to 3 parts water and a range of 0.25 up to 4 parts acetonitrile.

29. The capacitor of claim 24 wherein said electrolyte fluid comprises at least one of lithium bis(trifluoromethanesulfonyl) imide (LiTFSI), sodium chloride, ammonium dichlorate, magnesium sulfate, and sodium bicarbonate.

30. The capacitor of claim 24 wherein the electrolyte fluid comprises at least one of a cosolvent in-salt electrolyte, an aqueous electrolyte, an organic electrolyte, and an ionic fluid.

31. The capacitor of claim 24 wherein the electrodes are composed of at least one of stainless steel, titanium, copper, and aluminum.

32. The capacitor of claim 24 wherein the electrodes are composed of at least one of a conductive foil, a mesh, and a weave.

33. The capacitor of claim 24 wherein said ion permeable separator material is at least one of a cellulose material, a paper dielectric, a plastic dielectric, and a dielectric material.

34. The capacitor of claim 24 wherein the activated carbon is in a composite that has a composition: an approximate range of 75% to 88% of the activated carbon from the carbon source, an approximate range of 4% to 20% of the conductive additive including at least one of carbon black, acetylene black, furnace black, lampblack, and channel black, and an approximate range of 3% to 12% of binding material including at least one of PTFE (polytetrafluoroethylene), PVDF (polyvinylidene difluoride) dispersed in water, and PVDF not dispersed in water.

35. A system comprising a capacitor comprising a casing, said casing comprising in combination a pair of spaced apart electrodes including activated carbon derived from a carbon source and with a conductive additive, and an ion permeable separator material between said electrodes, wherein:
(a) the casing comprises connectors configured to connect said electrodes to a source of power;
(b) an electrolyte fluid is in said casing, the electrolyte fluid contacting said electrodes and said ion permeable separator material;
(c) said casing is composed of a container with a cover removably attached to the container that allows access to internal contents of said casing;
(d) said electrodes and said ion permeable separator material are arranged in layers with perforations passing through the layers, the electrodes being separated by at least one separator comprising said ion permeable separator material;
(e) said electrolyte fluid is re-administered, removed, or additional electrolyte fluid is added to the container with the cover open; and
(f) said container is resealable;
wherein the activated carbon comprises a plurality of pores of which:
over 87% by volume are micropores having diameters less than 2 nm;
0.001%-2% by volume are macropores having diameters greater than 50 nm; and
the remainder by volume are mesopores having diameters in a range of 2 nm to 50 nm.

36. The system of claim 35 wherein the carbon source of the capacitor is selected from a group consisting of coal, bituminous coke, petroleum coke, and a product derived from waste or biomass, or is any combination selected therefrom.

37. The system of claim 35 wherein the electrolyte fluid of the capacitor is a cosolvent salt electrolyte and has ingredients of sodium perchlorate with a general formula of $NaClO_4$, acetonitrile with a general formula of $CH_3CN$, and water.

38. The system of claim 35 wherein the electrolyte fluid of the capacitor has a molar ratio of approximately 7-8, consisting of 1-part sodium perchlorate to 1.5 parts water to 2.4 parts acetonitrile.

39. The system of claim 35 wherein the electrolyte fluid of the capacitor has a molar ratio in a range of 4-10, consisting of a range of 0.25 up to 2 parts sodium perchlorate and a range of 0.25 up to 3 parts water and a range of 0.25 up to 4 parts acetonitrile.

40. The system of claim 35 wherein said electrolyte fluid of the capacitor comprises at least one of lithium bis (trifluoromethanesulfonyl) imide (LiTFSI), sodium chloride, ammonium dichlorate, magnesium sulfate, and sodium bicarbonate.

41. The system of claim 35 wherein the electrolyte fluid of the capacitor comprises at least one of a cosolvent in-salt electrolyte, an aqueous electrolyte, an organic electrolyte, and an ionic fluid.

42. The system of claim 35 wherein the electrodes of the capacitor are composed of at least one of stainless steel, titanium, copper, and aluminum.

43. The system of claim 35 wherein the electrodes of the capacitor are composed of at least one of a conductive foil, a mesh, and a weave.

44. The system of claim 35 wherein said ion permeable separator material of the capacitor is at least one of a cellulose material, a paper dielectric, a plastic dielectric, and a dielectric material.

45. The system of claim 35 wherein the activated carbon of the capacitor is in a composite that has a composition: an approximate range of 75% to 88% of the activated carbon from the carbon source, an approximate range of 4% to 20% of the conductive additive including at least one of carbon black, acetylene black, furnace black, lampblack, and channel black, and an approximate range of 3% to 12% of binding material including at least one of PTFE (polytetrafluoroethylene), PVDF (polyvinylidene difluoride) dispersed in water, and PVDF not dispersed in water.

46. A system for a capacitor comprising in combination, a casing, said casing comprising in combination a pair of spaced apart electrodes including activated carbon derived from a carbon source and with a conductive additive, an ion permeable separator material layered between said electrodes, further comprising:
  (a) means on said casing to connect said electrodes to a source of power;
  (b) means for an electrolyte fluid to be in said casing, the electrolyte fluid contacting said electrodes and said ion permeable separator material;
  (c) means for said capacitor to be composed of a resealable or un-resealable container that allows access to internal contents of said capacitor;
  (d) means for said electrodes and said ion permeable separator material to be arranged in layers with perforations passing through the layers, the electrodes being separated by at least one separator comprising said ion permeable separator material;
  (e) means for said electrolyte fluid to be re-administered, removed, or have additional electrolyte fluid added; and
  (f) means for said capacitor to have said resealable container resealed;
  wherein the activated carbon comprises a plurality of pores of which:
    over 87% by volume are micropores having diameters less than 2 nm;
    0.001%-2% by volume are macropores having diameters greater than 50 nm; and
    the remainder by volume are mesopores having diameters in a range of 2 nm to 50 nm.

* * * * *

UNITED STATES PATENT AND TRADEMARK OFFICE
CERTIFICATE OF CORRECTION

| | |
|---|---|
| PATENT NO. | : 12,381,043 B2 |
| APPLICATION NO. | : 18/439211 |
| DATED | : August 5, 2025 |
| INVENTOR(S) | : Mitchell Miller, Ali Khosrozadeh and Jian Liu |

It is certified that error appears in the above-identified patent and that said Letters Patent is hereby corrected as shown below:

In the Claims

Column 159, Claim 24, Line 3, cancelation of the word "low-cost"

Signed and Sealed this
Thirtieth Day of September, 2025

John A. Squires
*Director of the United States Patent and Trademark Office*